United States Patent
Breakfield et al.

(10) Patent No.: US 12,471,598 B2
(45) Date of Patent: Nov. 18, 2025

(54) METHYLOBACTERIUM STRAINS FOR ENHANCING PLANT PRODUCTION AND METHODS RELATED THERETO

(71) Applicant: NewLeaf Symbiotics, Inc., St. Louis, MO (US)

(72) Inventors: Natalie Breakfield, St. Louis, MO (US); Patrick Vogan, St. Louis, MO (US); Doug Bryant, St. Louis, MO (US); Janne Kerovuo, St. Louis, MO (US); Allison Jack, St. Louis, MO (US); Ashley Haddox, St. Louis, MO (US)

(73) Assignee: NewLeaf Symbiotics, Inc., St. Louis, MO (US)

( * ) Notice: Subject to any disclaimer, the term of this patent is extended or adjusted under 35 U.S.C. 154(b) by 406 days.

(21) Appl. No.: 18/247,934

(22) PCT Filed: Oct. 6, 2021

(86) PCT No.: PCT/US2021/053808
§ 371 (c)(1),
(2) Date: Apr. 5, 2023

(87) PCT Pub. No.: WO2022/076588
PCT Pub. Date: Apr. 14, 2022

(65) Prior Publication Data
US 2024/0023558 A1    Jan. 25, 2024

Related U.S. Application Data

(63) Continuation-in-part of application No. PCT/US2021/035480, filed on Jun. 2, 2021.

(60) Provisional application No. 63/209,286, filed on Jun. 10, 2021, provisional application No. 63/088,837, filed on Oct. 7, 2020.

(51) Int. Cl.
| | |
|---|---|
| *A01N 63/20* | (2020.01) |
| *A01C 1/06* | (2006.01) |
| *A01C 21/00* | (2006.01) |
| *A01G 22/15* | (2018.01) |
| *A01G 31/00* | (2018.01) |
| *A01P 21/00* | (2006.01) |
| *C12N 1/20* | (2006.01) |
| *C12R 1/01* | (2006.01) |

(52) U.S. Cl.
CPC ............... *A01N 63/20* (2020.01); *A01C 1/06* (2013.01); *A01C 21/00* (2013.01); *A01G 22/15* (2018.02); *A01G 31/00* (2013.01); *A01P 21/00* (2021.08); *C12N 1/205* (2021.05); *C12R 2001/01* (2021.05)

(58) Field of Classification Search
None
See application file for complete search history.

(56) References Cited

U.S. PATENT DOCUMENTS

| | | |
|---|---|---|
| 5,512,069 A | 4/1996 | Holland et al. |
| 2003/0211082 A1 | 11/2003 | Holland |
| 2009/0116803 A1 | 5/2009 | Watanabe et al. |
| 2016/0295868 A1 | 10/2016 | Jones et al. |
| 2016/0302423 A1 | 10/2016 | Jones et al. |
| 2018/0295841 A1 | 10/2018 | Rioux |
| 2019/0116803 A1 | 4/2019 | DiDonato Floro et al. |

FOREIGN PATENT DOCUMENTS

| | | |
|---|---|---|
| KR | 20080097013 A | 11/2008 |
| WO | 2008049230 A1 | 5/2008 |
| WO | 2020/117690 A1 | 6/2020 |

OTHER PUBLICATIONS

Maliti et al., "Effects of *Methylobacterium* spp. Strains on Rice *Oryza sativa* L. Callus Induction, Plantlet Regeneration, and Seedlings Growth In Vitro 1," J. Torrey Bot Soc., 132(2):355-367, Apr. 2005.

Extended Search Report of the European Patent Office in EP Application No. 21878476.7, dated May 10, 2024, 11pgs.

International Search Report and Written Opinion dated Nov. 12, 2021 relating to PCT/US2021/35480, 13 pages.

International Search Report and Written Opinion dated Feb. 17, 2022 relating to PCT/US2021/53808, 14 pages.

Madhaiyan, Munusamy et al., Growth promotion and induction of systemic resistance in rice cultivar Co-47 (*Oryza sativa* L.) by *Methylobacterium* spp., Bot. Bull. Acad. Sin. (2004) 45, pp. 315-324.

Yergeau, Etienne et al., Metatranscriptomic Analysis of the Response of River Biofilms to Pharmaceutical Products, Using Anonymous DNA Microarrays, Applied and Environmental Microbiology, Aug. 2010, vol. 76, No. 16, pp. 5432-5439.

UniProKB Accession No. A0A0S9QTE8, DNA helicase, Feb. 17, 2016 [online] [Retrieved on Feb. 1, 2022]. Retrieved from the Internet: URL: https://www.uniprot.org/uniprot/A0A0S9QTE8, 6 pages.

*Primary Examiner* — Alton N Pryor
(74) *Attorney, Agent, or Firm* — Stinson LLP

(57) ABSTRACT

*Methylobacterium* strains that enhance early growth of plants, improve propagation/transplant vigor, increase nutrient uptake, improve stand establishment, improve stress tolerance, and/or increase a plant's ability to utilize nutrients are provided herein. Also provided are methods to identify *Methylobacterium* strains that improve nitrogen use efficiency in various crop plants.

7 Claims, No Drawings
Specification includes a Sequence Listing.

SEQUENCE LISTING

```
<160> NUMBER OF SEQ ID NOS: 107

<210> SEQ ID NO 1
<211> LENGTH: 300
<212> TYPE: DNA
<213> ORGANISM: Methylobacterium

<400> SEQUENCE: 1
acggtcaccc cacggactgg gcgagtacct caccggtgtt ctatcataac gccgagttag      60
ttttcgaccg tcccttatgc gatgtaccac cggtgtcggc agccgatttc gtcccaccgg     120
gagctggcgt tccggttcag accaccatca tcggtcacga tgtctggatt ggacacgggg     180
ccttcatctc ccccggcgtg actataggaa acggcgcgat cgtcggggcc caggcggtcg     240
tcacaagaga tgtcccaccc tatgcggtag ttgctggcgt ccccgcgacc gtacgacgat     300

<210> SEQ ID NO 2
<211> LENGTH: 300
<212> TYPE: DNA
<213> ORGANISM: Methylobacterium

<400> SEQUENCE: 2
ccaataaaag cgttggccgc ctgggcaacc cgatccgagc ctaagactca aagcgcaagc      60
gaacacttgg tagagacagc ccgccgacta cggcgttcca gcactctccg gctttgatcg     120
```

```
gataggcatt ggtcaaggtg ccggtggtga tgacctcgcc cgccgcaagc ggcgaattac    180
tcggatcagc ggccagcacc tcgaccaagt gtcggagcgc gaccaaaggg ccacgttcga    240
ggacgtttga ggcgcgacca gtctcgatag tctcatcgtc gcggcgaagc tgcacctcga    300

<210> SEQ ID NO 3
<211> LENGTH: 300
<212> TYPE: DNA
<213> ORGANISM: Methylobacterium

<400> SEQUENCE: 3
cgatggcacc gacctgccat gcctctgccg tccgcgccag aatggtaaag aggacgaagg     60
gggtaaggat cgtcgctgca gtgttgagca gcgaccagag aaggggggccg aacatcggca   120 tcaaacctcg attgccactc ggacgcgaag cgcgtcttga aggagggatg gaagcgaaac   180
ggccgcagag taaccgccga cgaaagattg caccccctcat cgagcaggat cggaggtgaa   240
ggcaagcgtg ggttattggt aagtgcaaaa aatataatgg tagcgtcaga tctagcgttc   300

<210> SEQ ID NO 4
<211> LENGTH: 23
<212> TYPE: DNA
<213> ORGANISM: Artificial Sequence
<220> FEATURE:
<223> OTHER INFORMATION: Synthetic

<400> SEQUENCE: 4
cctcaccggt gttctatcat aac                                             23

<210> SEQ ID NO 5
<211> LENGTH: 20
<212> TYPE: DNA
<213> ORGANISM: Artificial Sequence
<220> FEATURE:
<223> OTHER INFORMATION: Synthetic

<400> SEQUENCE: 5
ccgatgatgg tggtctgaac                                                 20

<210> SEQ ID NO 6
<211> LENGTH: 21
<212> TYPE: DNA
<213> ORGANISM: Artificial Sequence
<220> FEATURE:
<223> OTHER INFORMATION: Synthetic

<400> SEQUENCE: 6
cgtcccttat gcgatgtacc a                                               21

<210> SEQ ID NO 7
<211> LENGTH: 22
<212> TYPE: DNA
<213> ORGANISM: Artificial Sequence
<220> FEATURE:
<223> OTHER INFORMATION: Synthetic

<400> SEQUENCE: 7
gatccgagcc taagactcaa ag                                              22

<210> SEQ ID NO 8
<211> LENGTH: 21
<212> TYPE: DNA
<213> ORGANISM: Artificial Sequence
<220> FEATURE:
```

<223> OTHER INFORMATION: Synthetic

<400> SEQUENCE: 8
gaccaatgcc tatccgatca a    21

<210> SEQ ID NO 9
<211> LENGTH: 20
<212> TYPE: DNA
<213> ORGANISM: Artificial Sequence
<220> FEATURE:
<223> OTHER INFORMATION: Synthetic

<400> SEQUENCE: 9
aacacttggt agagacagcc    20

<210> SEQ ID NO 10
<211> LENGTH: 21
<212> TYPE: DNA
<213> ORGANISM: Artificial Sequence
<220> FEATURE:
<223> OTHER INFORMATION: Synthetic

<400> SEQUENCE: 10
aaggagggat ggaagcgaaa c    21

<210> SEQ ID NO 11
<211> LENGTH: 19
<212> TYPE: DNA
<213> ORGANISM: Artificial Sequence
<220> FEATURE:
<223> OTHER INFORMATION: Synthetic

<400> SEQUENCE: 11
ataacccacg cttgccttc    19

<210> SEQ ID NO 12
<211> LENGTH: 21
<212> TYPE: DNA
<213> ORGANISM: Artificial Sequence
<220> FEATURE:
<223> OTHER INFORMATION: Synthetic

<400> SEQUENCE: 12
cgcagagtaa ccgccgacga a    21

<210> SEQ ID NO 13
<211> LENGTH: 300
<212> TYPE: DNA
<213> ORGANISM: Methylobacterium

<400> SEQUENCE: 13
gcaaaacgac ctaatagttc tacagcggca tgcgccaagt cagcgcggtg aacagtatac    60
ctgggagcaa cttgtcctcc gaaacccaca taaaacaaat tactcctggc agtgcccagt    120
ccatcaaaat cgaatacaat atttctcgag gaggcatctg taatagcctg ccaaagcaac    180
aaagctatgg cgccgttatg actttcattg cttctggtag acataaaata atatgccgat    240
ttgtgatccc aaatgtagaa tattgccgca tcaattgcgc aagtttatt tcggatcgat    300

<210> SEQ ID NO 14
<211> LENGTH: 300
<212> TYPE: DNA
<213> ORGANISM: Methylobacterium

<400> SEQUENCE: 14

```
ggcgccaacg gtatgatcgc atgattttcc tgcggcatag cttgcgggaa tggcgtattt      60
ggcgctctcc tcaggaattt ctaagggcat acgcaggaac tctacagcac ttttactggt     120
attttgtagt gacagcggag gaggctggtg ctcaaggtaa tcgtgatgaa gtgatccggg     180
ccattcgggg cgcgttttcta gtcttttccaa tccgcgccct gtaccacgta ttacgccgga     240
ccggtctgcg ccgcgccgcc ctcttgaccg ccctaaatgt ctaagagcgt ctaacaaagc     300
```

```
<210> SEQ ID NO 15
<211> LENGTH: 300
<212> TYPE: DNA
<213> ORGANISM: Methylobacterium

<400> SEQUENCE: 15
```

```
gacgatatcg ctcatcttca ctgcattgaa gctggtgccg tactgcatag ggatgaaaaa      60
gtgatgcgga tagacggctg acgggaaagc gcctggtcga tcgaagactt tgctgacgag     120
gttgtggtag ccccggatat aggcatcgaa ggccgggacg ttgatcccat cctttgcctt     180
atcttgactg gcgtcgtcgc gtgccgtcag aacgggcacg tcgcaggtca tcgaggccag     240
caccttgcgg aacacctgcg ttccgccgtt gggattatcg acggcgaacg cggtggccgc     300
```

```
<210> SEQ ID NO 16
<211> LENGTH: 21
<212> TYPE: DNA
<213> ORGANISM: Artificial Sequence
<220> FEATURE:
<223> OTHER INFORMATION: Synthetic

<400> SEQUENCE: 16
```

```
gtcctccgaa acccacataa a                                                21
```

```
<210> SEQ ID NO 17
<211> LENGTH: 23
<212> TYPE: DNA
<213> ORGANISM: Artificial Sequence
<220> FEATURE:
<223> OTHER INFORMATION: Synthetic

<400> SEQUENCE: 17
```

```
ctaccagaag caatgaaagt cat                                              23
```

```
<210> SEQ ID NO 18
<211> LENGTH: 22
<212> TYPE: DNA
<213> ORGANISM: Artificial Sequence
<220> FEATURE:
<223> OTHER INFORMATION: Synthetic

<400> SEQUENCE: 18
```

```
tctgtaatag cctgccaaag ca                                               22
```

```
<210> SEQ ID NO 19
<211> LENGTH: 19
<212> TYPE: DNA
<213> ORGANISM: Artificial Sequence
<220> FEATURE:
<223> OTHER INFORMATION: Synthetic

<400> SEQUENCE: 19
```

```
ggctggtgct caaggtaat                                                   19
```

```
<210> SEQ ID NO 20
```

```
<211> LENGTH: 20
<212> TYPE: DNA
<213> ORGANISM: Artificial Sequence
<220> FEATURE:
<223> OTHER INFORMATION: Synthetic

<400> SEQUENCE: 20
acatttaggg cggtcaagag                                              20

<210> SEQ ID NO 21
<211> LENGTH: 19
<212> TYPE: DNA
<213> ORGANISM: Artificial Sequence
<220> FEATURE:
<223> OTHER INFORMATION: Synthetic

<400> SEQUENCE: 21
atgaagtgat ccgggccat                                               19

<210> SEQ ID NO 22
<211> LENGTH: 21
<212> TYPE: DNA
<213> ORGANISM: Artificial Sequence
<220> FEATURE:
<223> OTHER INFORMATION: Synthetic

<400> SEQUENCE: 22
ccgtactgca tagggatgaa a                                            21

<210> SEQ ID NO 23
<211> LENGTH: 21
<212> TYPE: DNA
<213> ORGANISM: Artificial Sequence
<220> FEATURE:
<223> OTHER INFORMATION: Synthetic

<400> SEQUENCE: 23
taaggcaaag gatgggatca a                                            21

<210> SEQ ID NO 24
<211> LENGTH: 21
<212> TYPE: DNA
<213> ORGANISM: Artificial Sequence
<220> FEATURE:
<223> OTHER INFORMATION: Synthetic

<400> SEQUENCE: 24
ttgctgacga ggttgtggta g                                            21

<210> SEQ ID NO 25
<211> LENGTH: 300
<212> TYPE: DNA
<213> ORGANISM: Methylobacterium

<400> SEQUENCE: 25
caactatgta gacccgacgg tgcgatttca cttcgcaaag ccgcagggca gcacccttgc   60
gctcaatgtt gacgccagcg tgatctatac tattaccgtc acgcacacgc agggcggcgt  120
acagattcat cgcgagagta agaaccacca tcagaccatc acgcgcagcg acctgagcaa  180
gcagttcggc gttggtgtgg ccgaccagct gacgcgcgat caggtcatga aggtgatcga  240
gtcggcattt cgcgacgcta cccgctaaga tcggcgccca cgaaacgcta cgagactagg  300

<210> SEQ ID NO 26
<211> LENGTH: 300
```

```
<212> TYPE: DNA
<213> ORGANISM: Methylobacterium

<400> SEQUENCE: 26
agccggcatc ttgttcaagg cgctcacctc gacgccgacg ctgtaggcga cttgagaggg    60
cgtctcatat gaacgaagca tcttcgcgta gagaaccttc ttgttctcct gcgtgatgtt   120
cgctttgcag acgttgactg ccgccatgaa cgccgaagcc ttgcgcgctt catcgtaatc   180
gcctgcgaag gcgggtagtg aaaagcttag tgcaatggca aacacagccg ccgaacgtcg   240
catggtatcc gtccccgatt gacggcagtg ccgccatatc tcggctttag cagagctgat   300

<210> SEQ ID NO 27
<211> LENGTH: 300
<212> TYPE: DNA
<213> ORGANISM: Methylobacterium

<400> SEQUENCE: 27
aacctgcgcc ggccgaggtt tcgcgagccg tcgccacggg caacgcctcg cccgcgatgt    60
gcaaaaaagt ccccggcact tcgcgccgtc gtccgatcca cgaccgcgaa tttctcaacg   120
agtacaaggt gcttatggga gatccgagcg tccgtcccgg agcccgagac cgcgcggccc   180
gagtaatagg cgaaaaagac tcctactcct cgggcttctc gggcccctc agcaacatct    240 acgcttgccg cccatcaccc tggcgggaga tcagcgacga gacacaggcc cacttcgccc   300

<210> SEQ ID NO 28
<211> LENGTH: 22
<212> TYPE: DNA
<213> ORGANISM: Artificial Sequence
<220> FEATURE:
<223> OTHER INFORMATION: Synthetic

<400> SEQUENCE: 28
ttgacgccag cgtgatctat ac                                             22

<210> SEQ ID NO 29
<211> LENGTH: 22
<212> TYPE: DNA
<213> ORGANISM: Artificial Sequence
<220> FEATURE:
<223> OTHER INFORMATION: Synthetic

<400> SEQUENCE: 29
gtgatggtct gatggtggtt ct                                             22

<210> SEQ ID NO 30
<211> LENGTH: 19
<212> TYPE: DNA
<213> ORGANISM: Artificial Sequence
<220> FEATURE:
<223> OTHER INFORMATION: Synthetic

<400> SEQUENCE: 30
tattaccgtc acgcacacg                                                 19

<210> SEQ ID NO 31
<211> LENGTH: 24
<212> TYPE: DNA
<213> ORGANISM: Artificial Sequence
<220> FEATURE:
<223> OTHER INFORMATION: Synthetic

<400> SEQUENCE: 31
```
cttcgcgtag agaaccttct tgtt                                        24

<210> SEQ ID NO 32
<211> LENGTH: 22
<212> TYPE: DNA
<213> ORGANISM: Artificial Sequence
<220> FEATURE:
<223> OTHER INFORMATION: Synthetic

<400> SEQUENCE: 32
cttcgcaggc gattacgatg aa                                          22

<210> SEQ ID NO 33
<211> LENGTH: 20
<212> TYPE: DNA
<213> ORGANISM: Artificial Sequence
<220> FEATURE:
<223> OTHER INFORMATION: Synthetic

<400> SEQUENCE: 33
cgtgatgttc gctttgcaga                                             20

<210> SEQ ID NO 34
<211> LENGTH: 23
<212> TYPE: DNA
<213> ORGANISM: Artificial Sequence
<220> FEATURE:
<223> OTHER INFORMATION: Synthetic

<400> SEQUENCE: 34
ccgcgaattt ctcaacgagt aca                                         23

<210> SEQ ID NO 35
<211> LENGTH: 21
<212> TYPE: DNA
<213> ORGANISM: Artificial Sequence
<220> FEATURE:
<223> OTHER INFORMATION: Synthetic

<400> SEQUENCE: 35
gcccgaggag taggagtctt t                                           21

<210> SEQ ID NO 36
<211> LENGTH: 20
<212> TYPE: DNA
<213> ORGANISM: Artificial Sequence
<220> FEATURE:
<223> OTHER INFORMATION: Synthetic

<400> SEQUENCE: 36
aggtgcttat gggagatccg                                             20

<210> SEQ ID NO 37
<211> LENGTH: 300
<212> TYPE: DNA
<213> ORGANISM: Methylobacterium

<400> SEQUENCE: 37
agtcattgat caagcaaccc ctattgagtt ggatatcgaa ggatcaaggt cgcgtcaata    60
gatgcatcta tcaggccaaa tgtcgctttt caagaatggc tctttcgaag ctatctttat   120
aatcgctcgc cattctctca ttaccaaaat cgaccttaac tagctcgaca ttgatgcgag   180
cagctccggc aaacgaggag agattgacct taaaggaatt gaacgcctca agcaattcag   240
acacattacc aggagtgcta tagcaacaac cagacccata tcggtcaata acctctttta   300

<210> SEQ ID NO 38
<211> LENGTH: 300
<212> TYPE: DNA
<213> ORGANISM: Methylobacterium

<400> SEQUENCE: 38

```
cgcaaaacga tttatcactg ccatcttgtt gtttgataac ccttttttac cagacgttat      60
gctgggcgag aaagaggact agcagatcgg agcggtatcg cgattttcg gtagttcgcg      120
cctacaacag gataagatcc gatagtgaag caacatggct gttttttgat ttgtaagtca     180
gcaacttaag cagccagcct atctgccgtc gcagacgctt gaggcatcgg gcagcatctt     240
agaaaaggtg gcagtaattg ccacagcgga acgtagcggc acggataagc acgcagggtc    300
```

<210> SEQ ID NO 39
<211> LENGTH: 300
<212> TYPE: DNA
<213> ORGANISM: Methylobacterium

<400> SEQUENCE: 39

```
cccatctgga cccaatatcc ccttcatcga caattcccga gtaagtgtgg gttcgaggat     60
ttcgcgaaac agccttgttc gttcctccgg ccttaaaatt ggcgtgccgt cgggagatcg    120
ataggcatcc cttacctgcc tttcgaccgc cggcacacgc gcgccggtcg tcgtgttcac    180
ggccacggaa tggacgaagg tgcgccgctc atttcgctcg tttgccgtct ccaccatcca    240
ggaggccagc aggacggttt cgtctcgacc gccggtcaca cacaccgcaa gggactcagg    300
```

<210> SEQ ID NO 40
<211> LENGTH: 22
<212> TYPE: DNA
<213> ORGANISM: Artificial Sequence
<220> FEATURE:
<223> OTHER INFORMATION: Synthetic

<400> SEQUENCE: 40

```
tcgctcgcca ttctctcatt ac                                              22
```

<210> SEQ ID NO 41
<211> LENGTH: 22
<212> TYPE: DNA
<213> ORGANISM: Artificial Sequence
<220> FEATURE:
<223> OTHER INFORMATION: Synthetic

<400> SEQUENCE: 41

```
aggtcaatct ctcctcgttt gc                                              22
```

<210> SEQ ID NO 42
<211> LENGTH: 18
<212> TYPE: DNA
<213> ORGANISM: Artificial Sequence
<220> FEATURE:
<223> OTHER INFORMATION: Synthetic

<400> SEQUENCE: 42

```
tcgacattga tgcgagca                                                   18
```

<210> SEQ ID NO 43
<211> LENGTH: 22
<212> TYPE: DNA
<213> ORGANISM: Artificial Sequence
<220> FEATURE:
```

<223> OTHER INFORMATION: Synthetic

<400> SEQUENCE: 43
ttcgcgccta caacaggata ag        22

<210> SEQ ID NO 44
<211> LENGTH: 23
<212> TYPE: DNA
<213> ORGANISM: Artificial Sequence
<220> FEATURE:
<223> OTHER INFORMATION: Synthetic

<400> SEQUENCE: 44
cagataggct ggctgcttaa gtt        23

<210> SEQ ID NO 45
<211> LENGTH: 18
<212> TYPE: DNA
<213> ORGANISM: Artificial Sequence
<220> FEATURE:
<223> OTHER INFORMATION: Synthetic

<400> SEQUENCE: 45
tccgatagtg aagcaaca        18

<210> SEQ ID NO 46
<211> LENGTH: 24
<212> TYPE: DNA
<213> ORGANISM: Artificial Sequence
<220> FEATURE:
<223> OTHER INFORMATION: Synthetic

<400> SEQUENCE: 46
gagtaagtgt gggttcgagg attt        24

<210> SEQ ID NO 47
<211> LENGTH: 23
<212> TYPE: DNA
<213> ORGANISM: Artificial Sequence
<220> FEATURE:
<223> OTHER INFORMATION: Synthetic

<400> SEQUENCE: 47
aggtaaggga tgcctatcga tct        23

<210> SEQ ID NO 48
<211> LENGTH: 18
<212> TYPE: DNA
<213> ORGANISM: Artificial Sequence
<220> FEATURE:
<223> OTHER INFORMATION: Synthetic

<400> SEQUENCE: 48
cggaggaacg aacaaggc        18

<210> SEQ ID NO 49
<211> LENGTH: 300
<212> TYPE: DNA
<213> ORGANISM: Methylobacterium

<400> SEQUENCE: 49
acctgctaaa atcacgtcct ctcagattga aaaatcattg aagaaacgtg tcgaacgatt        60
gccggggatt atgacgttag atcaattgaa aaatacaagc tttgaaattg agttacagcc       120
aaaagatgcc ccggatccgg acccatcaga cttcggtggc tagttcgagc caaactcgaa       180

```
cgtcgccatg gcgcgcaagt cgcaatacca tttcacagcg cagcggttat ttcgttgtac    240
actgtagcaa tgcgtcggct tgcgcgcttc cgctggcgat caaaggtccg ccgatttacg    300
```

<210> SEQ ID NO 50
<211> LENGTH: 300
<212> TYPE: DNA
<213> ORGANISM: Methylobacterium

<400> SEQUENCE: 50

```
tcccgaacat acaatggagg aagcgtgtgg taggccaatt tgtaacgaaa tatggcatcg     60
gtcacggctc tctcaataaa ttcgatctca agtcttctga acgagcatgc ctcatcctta    120
tcctgagcga acgcctgcca gtttgcagtc attccaacat acatagccaa aaaggcgagg    180
tagaccttca tacgggcacc tcaatcgtcc ccattcgttc aagctccttc aagataacag    240
ccgcaccaca ttgctgagat cgaagattcg gatcaaatat tccatcaaat ttatactttc    300
```

<210> SEQ ID NO 51
<211> LENGTH: 300
<212> TYPE: DNA
<213> ORGANISM: Methylobacterium

<400> SEQUENCE: 51

```
gcatcctttg cgctcgcagg cctaaggtca agcccggtta cttcgtttgg tagaacgagg     60
tagacgatgc ctagtcttaa ggtggcccat gttaaccaac agggccagaa catgattata    120
gttccgttag atgccaactt cggttacaaa accgatggtg agcagtccga catcatgttc    180
gaaatacagg acgcggcgcg gtccgccggt cttgcgggtg ccgtagtagc gttctggcag    240
tcaggtggac aaacccgttt ccggggcccg gctccgtggc acccattcct tcgcagcctc    300
```

<210> SEQ ID NO 52
<211> LENGTH: 22
<212> TYPE: DNA
<213> ORGANISM: Artificial Sequence
<220> FEATURE:
<223> OTHER INFORMATION: Synthetic

<400> SEQUENCE: 52

```
gcgcaagtcg caataccatt tc                                              22
```

<210> SEQ ID NO 53
<211> LENGTH: 21
<212> TYPE: DNA
<213> ORGANISM: Artificial Sequence
<220> FEATURE:
<223> OTHER INFORMATION: Synthetic

<400> SEQUENCE: 53

```
cgtaaatcgg cggacctttg a                                               21
```

<210> SEQ ID NO 54
<211> LENGTH: 19
<212> TYPE: DNA
<213> ORGANISM: Artificial Sequence
<220> FEATURE:
<223> OTHER INFORMATION: Synthetic

<400> SEQUENCE: 54

```
cgcagcggtt atttcgttg                                                  19
```

<210> SEQ ID NO 55

```
<211> LENGTH: 22
<212> TYPE: DNA
<213> ORGANISM: Artificial Sequence
<220> FEATURE:
<223> OTHER INFORMATION: Synthetic

<400> SEQUENCE: 55
acgagcatgc ctcatcctta tc                                              22

<210> SEQ ID NO 56
<211> LENGTH: 21
<212> TYPE: DNA
<213> ORGANISM: Artificial Sequence
<220> FEATURE:
<223> OTHER INFORMATION: Synthetic

<400> SEQUENCE: 56
cgattgaggt gcccgtatga a                                               21

<210> SEQ ID NO 57
<211> LENGTH: 20
<212> TYPE: DNA
<213> ORGANISM: Artificial Sequence
<220> FEATURE:
<223> OTHER INFORMATION: Synthetic

<400> SEQUENCE: 57
tgccagtttg cagtcattcc                                                 20

<210> SEQ ID NO 58
<211> LENGTH: 23
<212> TYPE: DNA
<213> ORGANISM: Artificial Sequence
<220> FEATURE:
<223> OTHER INFORMATION: Synthetic

<400> SEQUENCE: 58
cccggttact tcgtttggta gaa                                             23

<210> SEQ ID NO 59
<211> LENGTH: 24
<212> TYPE: DNA
<213> ORGANISM: Artificial Sequence
<220> FEATURE:
<223> OTHER INFORMATION: Synthetic

<400> SEQUENCE: 59
cgaagttggc atctaacgga acta                                            24

<210> SEQ ID NO 60
<211> LENGTH: 20
<212> TYPE: DNA
<213> ORGANISM: Artificial Sequence
<220> FEATURE:
<223> OTHER INFORMATION: Synthetic

<400> SEQUENCE: 60
tggcccatgt taaccaacag                                                 20

<210> SEQ ID NO 61
<211> LENGTH: 300
<212> TYPE: DNA
<213> ORGANISM: Methylobacterium

<400> SEQUENCE: 61
gcccttctgt caggcgatat tgtataatgg cgttgcccca atagaagcag ccattcgtgc     60
```

```
gagggcagca gcgacgctag gtcgaaagag catcctaatc tcgatcaaga tgcgactgag    120
atttctgatg aaatatcta gacacaagca aagctggtga aattacaacg atcatggcga    180
caattgcggc caattcggcc ggaacttgaa ggaacataaa aatgaatatt acaaatatac    240
cgcaaagcat gtagagttgc tacaccaagg gtcgggacgt ccaaaaaaac tcactgagga    300

<210> SEQ ID NO 62
<211> LENGTH: 300
<212> TYPE: DNA
<213> ORGANISM: Methylobacterium

<400> SEQUENCE: 62
ggaacataaa aatgaatatt acaaatatac cgcaaagcat gtagagttgc tacaccaagg     60
gtcgggacgt ccaaaaaaac tcactgagga agtcgactgg aagcacgagg cgccccccc    120 aggagcgggg cgaccggcaa gggggcccgc aattgtcgcc atgatcgacc agcttaggta    180
ggatcctctt tcgacctaac gaatggctgc ttctattggg caacgccat tatacaatat    240 cgcctgacca tctggaacgc ggcccggtcc accggcaggt tggcgacgac agcgtcggag    300

<210> SEQ ID NO 63
<211> LENGTH: 300
<212> TYPE: DNA
<213> ORGANISM: Methylobacterium

<400> SEQUENCE: 63
cggcgtcgac cagccgggcg aactgcttgg gcatgctctc ccgcgacgcc ggccacagcc     60
gcgtccccgt ccctccgcac aggatcatcg ggtggatttg aaaggcaaaa cgggacatca    120
ggataggccg ctcaggcgtt ggcgctgagg cgcttgatgt cggcgtcgac catctcggtg    180
atcagcgcct cgaggctggt ctcggcctcc cagccgaagg tcgccttggc cttggcgggg    240
ttgcccagca gcacctcgac ctctgccggc cggaacagcg ccgggtcgac gatcaggtgg    300

<210> SEQ ID NO 64
<211> LENGTH: 300
<212> TYPE: DNA
<213> ORGANISM: Methylobacterium

<400> SEQUENCE: 64
ctggacatgc gcccaccccg gccaagtccg accgcaccgg caaccgctcc tgtagtcgtc     60
gtcatcgttc tcacccctga ggcggagacc gtccgctaac ggggtgtctc aagcaaccgt    120
ggggcggagg aacacgcacg tagtcgcgtt caaggttcg cacgaacgcc tcggccatgc    180
cgttgctctg cgggctctcc agcggcgtcg ttttttggcac caaaccaagg tcgcgggcga    240
agcggcgcgt gtcgcgggga ctgtcaggaa tttcgtgtgg gggcggccat agtggatccg    300

<210> SEQ ID NO 65
<211> LENGTH: 300
<212> TYPE: DNA
<213> ORGANISM: Methylobacterium

<400> SEQUENCE: 65
ggaaatcggc ttcaagtacg acgtcacgcc ggccatgcag gtcacgggtg cactgttcaa     60
tctcgagcgc gacaaccagc cgttcccctc gaacgtggag tccggcctcg tccttggcgc    120
aggtcagaca cgcacccagg gcgcggaaat cggcctggcc ggctatctaa ccgattggtg    180
gcaggtcttt ggcggctacg cttataccga ggcacgcgta ctctcgccac tggaagacga    240
```
tggagacgtg atcgcagcag gtaatctcgt cggcaacgtt ccgctaaata ctttcagtct    300

<210> SEQ ID NO 66
<211> LENGTH: 300
<212> TYPE: DNA
<213> ORGANISM: Methylobacterium

<400> SEQUENCE: 66
cggcctggcc ggctatctaa ccgattggtg gcaggtcttt ggcggctacg cttataccga     60
ggcacgcgta ctctcgccac tggaagacga tggagacgtg atcgcagcag gtaatctcgt    120
cggcaacgtt ccgctaaata ctttcagtct gttcaacaag ttcgatatca acgagaattt    180
ctccgttgct ctgggctatt actatcagga tgccagcttt gcctcctcag acaatgcagt    240
gcgtttgcca agttattcgc ggttcgatgg cgggttgttc tatcgattcg acgagttgac    300

<210> SEQ ID NO 67
<211> LENGTH: 300
<212> TYPE: DNA
<213> ORGANISM: Methylobacterium

<400> SEQUENCE: 67
acgttccgct aaatactttc agtctgttca acaagttcga tatcaacgag aatttctccg     60
ttgctctggg ctattactat caggatgcca gctttgcctc ctcagacaat gcagtgcgtt    120
tgccaagtta ttcgcggttc gatggcgggt tgttctatcg attcgacgag ttgacacgcg    180
ttcagcttag cgtcgagaac attttcgaca ggcgttacat catcaactcc aacaacaaca    240
acaacctcac gcctggcgcg ccgagaacag tccgcgtgca attgatcgct cggttctaaa    300

<210> SEQ ID NO 68
<211> LENGTH: 300
<212> TYPE: DNA
<213> ORGANISM: Methylobacterium

<400> SEQUENCE: 68
agcccacaag cctgatgcac ttaactacat cctctaatgt cgcgccaatt tgcttggcgg     60
caggggatgt tgtatcgtca taggcttgtc taaccggaac ttgtttgcca atctctttgg    120
cgatcgcaac cgccatctcg tgttcgtcaa ccatgtgcgc gttcctctaa ttgcactcat    180
ggtgccacgt gcacctccga tcgtctcgtg tctagaatga aggtgggaac aaccttacac    240
aggctttcgc gacgcgcgaa tttctggttt ctccgcctcg gatgtgggtt tgagcgcttc    300

<210> SEQ ID NO 69
<211> LENGTH: 300
<212> TYPE: DNA
<213> ORGANISM: Methylobacterium

<400> SEQUENCE: 69
cttttcattt gtcatgatct cgaccaaggt attcacggca agctcggtct gttgcttagc     60
aagtgcctga acttcgcgaa cgatcggctc tcgacccttc gggttcgaga cctgtcccTT    120
ttgaaaacca cgtgccctac acttttcggg atcaaggtgc gggttggctt tggtcaaaat    180
tctctggcgt cccattacac gccctccgca tcatcgttcc cgcgaacgat ctgaccccccg    240
acttccgcga ggaagcgtgt ggcgtgatcc tcgaagcgga atgccacctc gaactgttcc    300

<210> SEQ ID NO 70
<211> LENGTH: 300
<212> TYPE: DNA
<213> ORGANISM: Methylobacterium

<400> SEQUENCE: 70

```
cagcagcaag cagatcgttg aaaaccgctt gaaccgcatc ttgatcggga ccggaaccaa      60
tcaggtcatc taggtaaacc gagacgtaaa ctcgtttgcg ctcggcatct ttcagaacgt     120
ccgtgatgcc agaccgcatt agtaccatcg tcgccaaggc gggcgactga acgaagccga     180
tcggcagaga gtaacgggga ccgcccctaa tcgggttgcg aacgcaagac cacttagcaa     240
aggttcgagc acggccgaac ttcgcatggt ggagagccgc ggcaacacgg ttccgtgata     300
```

<210> SEQ ID NO 71
<211> LENGTH: 300
<212> TYPE: DNA
<213> ORGANISM: Methylobacterium

<400> SEQUENCE: 71

```
tagacattcc aacaaaccgg caagaggctc gtcctcactc gaggatttgt tgggacttgc      60
atgatgtcga agcggagccg ttatgacctg ggtgcgatca tgcgccgagc atgggagatg     120
gctcgggagg cggcattcgc ggttggcgag cgggcacgga ctcaccttgc tgccgcgatg     180
cgcagcgcgt gggccgaagc caagttggca ctcgcgccca cgaagacgga gcaggatcgt     240
ctctctccga gcgacatgat cggacatgag gacgcctacc aaggccgggt tctaaaatat     300
```

<210> SEQ ID NO 72
<211> LENGTH: 300
<212> TYPE: DNA
<213> ORGANISM: Methylobacterium

<400> SEQUENCE: 72

```
aagatggata cgacaagcgc gattacatta tttgcgaaat agatggacaa ataaaagaca      60
aaggactgat gtatttcctt aaatctggac aagttgacct ctttcacata gaagtcacca     120
ctccctttgg gacaatttgg tgtcacgaaa acatagaggc cgaacttctt agctgaatta     180
tcgcgctccg ggttcttatg cggctgagtg aagcgcggga cagcttgcga gcagggccgc     240
caatggcagc cgggatgaca caatgctcgg tctcccgacg cttcttcaat cgggagcgct     300
```

<210> SEQ ID NO 73
<211> LENGTH: 299
<212> TYPE: DNA
<213> ORGANISM: Methylobacterium

<400> SEQUENCE: 73

```
agctgaatta tcgcgctccg ggttcttatg cggctgagtg aagcgcggga cagcttgcga      60
gcagggccgc caatggcagc cgggatgaca caatgctcgg tctcccgacg cttcttcaat     120
cgggagcgct tcgcagcccg gggcggcgcg ctcatgcgtc acgacctggg ccctgcgcac     180
cttcgcggcc ccgccgtccc ggcagatccc tgatgcccca gtgggcggc cactccatca     240
aagaaccccg gcctgtggca gatctcgtag gcataccgag gttccgcagt gcccccacc     299
```

<210> SEQ ID NO 74
<211> LENGTH: 300
<212> TYPE: DNA
<213> ORGANISM: Methylobacterium

<400> SEQUENCE: 74

```
accgaaggcg tccccggaca cgaaggcctg aaacaccata tctgtggcga tcaggccgac      60
gtggtcgcgg acttcaactg gcagagaatg ccaggccgct tcgatttcag atgatactgg     120
```

```
tacggacata ggagcggctt agctttctca gtgcaaatgt gattgattcc ggctcaaaaa    180
tgatcttgat cggacgagac gttttcaatc catgtcgtgt tgccatcgcc gatcggtgcg    240
tcaagagaca gatggcgccg accgtagata cgcgttcggg ttgcccgcac cgcttctcca    300

<210> SEQ ID NO 75
<211> LENGTH: 300
<212> TYPE: DNA
<213> ORGANISM: Methylobacterium

<400> SEQUENCE: 75
ggaggtgtga tctgatgatg tgctggatga aattggcggt cgagcacttg ttcagcttgg     60
ccagctcgac gagatcggcg tgatgctcgg cgtcgatcag gatgttcagc gagaccggac    120
gtacgcagga cttggtatta gcgccgttgc gcatcagctt gcagccttgc tctgcttctc    180
agcgtgccgc gtcaggatga ccctgatgta gctgttgagg ttgatgccgt aatagcctgc    240
ggactctgtg agatcccggc gaagatcgtc ggcgagggtc aggcggatgg tgctggtcgg    300

<210> SEQ ID NO 76
<211> LENGTH: 300
<212> TYPE: DNA
<213> ORGANISM: Methylobacterium

<400> SEQUENCE: 76
aagtaaccgc tcaacatgat cttcagcatg ttgtccaaca gcaggagaat acatgtaatt     60
caccatgacc ggcaagctgc gactggccat tgcttccacc gcttgaatgt agcgatcgaa    120
tttcgcaaaa tcagggtgga atgaaaatat cgaaccaaac tgcgagcctt gaatccgttc    180
tgcaaaatta tcgaaaaatt ttcttggccg actgccgttc gaaaacattc ttacgtttac    240
atgcggcccg cctgaaacaa gacagtctac cagctctggg aaatgggggt gaagggtcgg    300

<210> SEQ ID NO 77
<211> LENGTH: 279
<212> TYPE: PRT
<213> ORGANISM: Methylobacterium
<220> FEATURE:
<221> NAME/KEY: MISC_FEATURE
<222> LOCATION: (1)..(63)
<223> OTHER INFORMATION: Xaa = any amino acid or absent
<220> FEATURE:
<221> NAME/KEY: MISC_FEATURE
<222> LOCATION: (67)..(67)
<223> OTHER INFORMATION: Xaa = any amino acid or absent
<220> FEATURE:
<221> NAME/KEY: MISC_FEATURE
<222> LOCATION: (70)..(77)
<223> OTHER INFORMATION: Xaa = any amino acid or absent
<220> FEATURE:
<221> NAME/KEY: MISC_FEATURE
<222> LOCATION: (79)..(80)
<223> OTHER INFORMATION: Xaa = any amino acid or absent
<220> FEATURE:
<221> NAME/KEY: MISC_FEATURE
<222> LOCATION: (105)..(135)
<223> OTHER INFORMATION: Xaa = any amino acid or absent
<220> FEATURE:
<221> NAME/KEY: MISC_FEATURE
<222> LOCATION: (141)..(151)
<223> OTHER INFORMATION: Xaa = any amino acid or absent
<220> FEATURE:
<221> NAME/KEY: MISC_FEATURE
<222> LOCATION: (153)..(153)
<223> OTHER INFORMATION: Xaa = any amino acid or absent
<220> FEATURE:
<221> NAME/KEY: MISC_FEATURE
<222> LOCATION: (155)..(155)
<223> OTHER INFORMATION: Xaa = any amino acid or absent
```

```
<220> FEATURE:
<221> NAME/KEY: MISC_FEATURE
<222> LOCATION: (158)..(159)
<223> OTHER INFORMATION: Xaa = any amino acid or absent
<220> FEATURE:
<221> NAME/KEY: MISC_FEATURE
<222> LOCATION: (163)..(163)
<223> OTHER INFORMATION: Xaa = any amino acid or absent
<220> FEATURE:
<221> NAME/KEY: MISC_FEATURE
<222> LOCATION: (166)..(166)
<223> OTHER INFORMATION: Xaa = any amino acid or absent
<220> FEATURE:
<221> NAME/KEY: MISC_FEATURE
<222> LOCATION: (174)..(174)
<223> OTHER INFORMATION: Xaa = any amino acid or absent
<220> FEATURE:
<221> NAME/KEY: MISC_FEATURE
<222> LOCATION: (179)..(179)
<223> OTHER INFORMATION: Xaa = any amino acid or absent
<220> FEATURE:
<221> NAME/KEY: MISC_FEATURE
<222> LOCATION: (189)..(189)
<223> OTHER INFORMATION: Xaa = any amino acid or absent
<220> FEATURE:
<221> NAME/KEY: MISC_FEATURE
<222> LOCATION: (195)..(216)
<223> OTHER INFORMATION: Xaa = any amino acid or absent
<220> FEATURE:
<221> NAME/KEY: MISC_FEATURE
<222> LOCATION: (222)..(230)
<223> OTHER INFORMATION: Xaa = any amino acid or absent
<220> FEATURE:
<221> NAME/KEY: MISC_FEATURE
<222> LOCATION: (233)..(233)
<223> OTHER INFORMATION: Xaa = any amino acid or absent
<220> FEATURE:
<221> NAME/KEY: MISC_FEATURE
<222> LOCATION: (236)..(240)
<223> OTHER INFORMATION: Xaa = any amino acid or absent
<220> FEATURE:
<221> NAME/KEY: MISC_FEATURE
<222> LOCATION: (242)..(279)
<223> OTHER INFORMATION: Xaa = any amino acid or absent

<400> SEQUENCE: 77

Xaa Xaa Xaa Xaa Xaa Xaa Xaa Xaa Xaa Xaa Xaa Xaa Xaa Xaa Xaa Xaa
1               5                   10                  15

Xaa Xaa Xaa Xaa Xaa Xaa Xaa Xaa Xaa Xaa Xaa Xaa Xaa Xaa Xaa Xaa
            20                  25                  30

Xaa Xaa Xaa Xaa Xaa Xaa Xaa Xaa Xaa Xaa Xaa Xaa Xaa Xaa Xaa Xaa
        35                  40                  45

Xaa Xaa Xaa Xaa Xaa Xaa Xaa Xaa Xaa Xaa Xaa Xaa Xaa Xaa Xaa Met
    50                  55                  60

Pro Thr Xaa Leu Pro Xaa Xaa Xaa Xaa Xaa Xaa Xaa Xaa Arg Xaa Xaa
65                  70                  75                  80

Pro Val Arg Arg Leu Ser Trp Pro Asp Thr Ala Arg Phe Leu Ile Leu
                85                  90                  95

Val Ala Arg Val Arg Leu Leu Asp Xaa Xaa Xaa Xaa Xaa Xaa Xaa Xaa
            100                 105                 110

Xaa Xaa Xaa Xaa Xaa Xaa Xaa Xaa Xaa Xaa Xaa Xaa Xaa Xaa Xaa Xaa
        115                 120                 125

Xaa Xaa Xaa Xaa Xaa Xaa Xaa Leu Arg Leu His Ala Xaa Xaa Xaa Xaa
    130                 135                 140

Xaa Xaa Xaa Xaa Xaa Xaa Xaa Val Xaa Arg Xaa Gly Ser Xaa Xaa Ala
145                 150                 155                 160

Gly Asp Xaa Leu Leu Xaa Leu Met Arg Arg Trp Leu Ala Xaa His Glu
                165                 170                 175
```

```
Ala Ile Xaa Ala Leu Leu Pro Gly Val Pro Glu Pro Xaa His Val Ala
        180                 185                 190

Gln Val Xaa Xaa Xaa Xaa Xaa Xaa Xaa Xaa Xaa Xaa Xaa Xaa
        195                 200                 205

Xaa Xaa Xaa Xaa Xaa Xaa Xaa Arg Ala Ile Leu Gln Xaa Xaa Xaa
        210                 215                 220

Xaa Xaa Xaa Xaa Xaa Xaa Val Pro Xaa Ser Arg Xaa Xaa Xaa Xaa Xaa
225                 230                 235                 240

Pro Xaa Xaa Xaa Xaa Xaa Xaa Xaa Xaa Xaa Xaa Xaa Xaa
        245                 250                 255

Xaa Xaa Xaa Xaa Xaa Xaa Xaa Xaa Xaa Xaa Xaa Xaa Xaa Xaa Xaa
        260                 265                 270

Xaa Xaa Xaa Xaa Xaa Xaa Xaa
        275

<210> SEQ ID NO 78
<211> LENGTH: 154
<212> TYPE: PRT
<213> ORGANISM: Methylobacterium
<220> FEATURE:
<221> NAME/KEY: MISC_FEATURE
<222> LOCATION: (1)..(10)
<223> OTHER INFORMATION: Xaa = any amino acid or absent
<220> FEATURE:
<221> NAME/KEY: MISC_FEATURE
<222> LOCATION: (19)..(19)
<223> OTHER INFORMATION: Xaa = any amino acid or absent
<220> FEATURE:
<221> NAME/KEY: MISC_FEATURE
<222> LOCATION: (52)..(52)
<223> OTHER INFORMATION: Xaa = any amino acid or absent
<220> FEATURE:
<221> NAME/KEY: MISC_FEATURE
<222> LOCATION: (71)..(71)
<223> OTHER INFORMATION: Xaa = any amino acid or absent
<220> FEATURE:
<221> NAME/KEY: MISC_FEATURE
<222> LOCATION: (74)..(74)
<223> OTHER INFORMATION: Xaa = any amino acid or absent
<220> FEATURE:
<221> NAME/KEY: MISC_FEATURE
<222> LOCATION: (94)..(94)
<223> OTHER INFORMATION: Xaa = any amino acid or absent
<220> FEATURE:
<221> NAME/KEY: MISC_FEATURE
<222> LOCATION: (96)..(154)
<223> OTHER INFORMATION: Xaa = any amino acid or absent

<400> SEQUENCE: 78

Xaa Xaa Xaa Xaa Xaa Xaa Met Xaa Xaa Pro Leu Arg Arg Thr Val
1               5                   10                  15

Gln Val Xaa Glu Asp Gly Arg Met Asn Leu Pro Ala Asp Met Arg Arg
        20                  25                  30

Val Leu Gly Leu Thr Gly Ala Gly Arg Val Ile Leu Thr Gln Asp Glu
            35                  40                  45

Asp Gly Ile Xaa Ile Thr Thr Ala Glu Gln Ala Leu Lys Arg Val Arg
        50                  55                  60

Ser Leu Ala Ala Pro Phe Xaa Arg Gly Xaa Gly Ser Val Val Asp Glu
65                  70                  75                  80

Phe Ile Ala Glu Arg Arg Ala Asp Ala Ala Arg Glu Asp Xaa Glu Xaa
            85                  90                  95

Xaa Xaa Xaa Xaa Xaa Xaa Xaa Xaa Xaa Xaa Xaa Xaa Xaa Xaa Xaa
        100                 105                 110
```

```
Xaa Xaa Xaa Xaa Xaa Xaa Xaa Xaa Xaa Xaa Xaa Xaa Xaa
        115                 120                 125

Xaa Xaa Xaa Xaa Xaa Xaa Xaa Xaa Xaa Xaa Xaa Xaa Xaa
        130                 135                 140

Xaa Xaa Xaa Xaa Xaa Xaa Xaa Xaa Xaa Xaa
145                 150

<210> SEQ ID NO 79
<211> LENGTH: 103
<212> TYPE: PRT
<213> ORGANISM: Methylobacterium
<220> FEATURE:
<221> NAME/KEY: MISC_FEATURE
<222> LOCATION: (2)..(29)
<223> OTHER INFORMATION: Xaa = any amino acid or absent
<220> FEATURE:
<221> NAME/KEY: MISC_FEATURE
<222> LOCATION: (42)..(42)
<223> OTHER INFORMATION: Xaa = any amino acid or absent
<220> FEATURE:
<221> NAME/KEY: MISC_FEATURE
<222> LOCATION: (69)..(72)
<223> OTHER INFORMATION: Xaa = any amino acid or absent
<220> FEATURE:
<221> NAME/KEY: MISC_FEATURE
<222> LOCATION: (77)..(103)
<223> OTHER INFORMATION: Xaa = any amino acid or absent

<400> SEQUENCE: 79

Met Xaa Xaa Xaa Xaa Xaa Xaa Xaa Xaa Xaa Xaa Xaa Xaa Xaa Xaa
1               5                   10                  15

Xaa Xaa Xaa Xaa Xaa Xaa Xaa Xaa Xaa Xaa Xaa Xaa Pro Gln Ser
            20                  25                  30

Tyr Ala Leu Gln Ile Leu Ala Ile Ala Xaa Ala Met Ser Val Leu Gly
            35                  40                  45

Leu Gly Gly Val Trp Ile Ala Ser Arg Ile Tyr Asp Arg Asn Thr Arg
    50                  55                  60

Arg Leu Glu Ala Xaa Xaa Xaa Xaa Arg Arg Gly Asp Xaa Xaa Xaa Xaa
65                  70                  75                  80

Xaa Xaa Xaa Xaa Xaa Xaa Xaa Xaa Xaa Xaa Xaa Xaa Xaa Xaa Xaa
            85                  90                  95

Xaa Xaa Xaa Xaa Xaa Xaa Xaa
            100

<210> SEQ ID NO 80
<211> LENGTH: 2503
<212> TYPE: PRT
<213> ORGANISM: Methylobacterium
<220> FEATURE:
<221> NAME/KEY: MISC_FEATURE
<222> LOCATION: (1)..(7)
<223> OTHER INFORMATION: Xaa = any amino acid or absent
<220> FEATURE:
<221> NAME/KEY: MISC_FEATURE
<222> LOCATION: (12)..(27)
<223> OTHER INFORMATION: Xaa = any amino acid or absent
<220> FEATURE:
<221> NAME/KEY: MISC_FEATURE
<222> LOCATION: (29)..(33)
<223> OTHER INFORMATION: Xaa = any amino acid or absent
<220> FEATURE:
<221> NAME/KEY: MISC_FEATURE
<222> LOCATION: (39)..(39)
<223> OTHER INFORMATION: Xaa = any amino acid or absent
<220> FEATURE:
<221> NAME/KEY: MISC_FEATURE
<222> LOCATION: (42)..(42)
<223> OTHER INFORMATION: Xaa = any amino acid or absent
```

-continued

```
<220> FEATURE:
<221> NAME/KEY: MISC_FEATURE
<222> LOCATION: (46)..(47)
<223> OTHER INFORMATION: Xaa = any amino acid or absent
<220> FEATURE:
<221> NAME/KEY: MISC_FEATURE
<222> LOCATION: (50)..(50)
<223> OTHER INFORMATION: Xaa = any amino acid or absent
<220> FEATURE:
<221> NAME/KEY: MISC_FEATURE
<222> LOCATION: (58)..(58)
<223> OTHER INFORMATION: Xaa = any amino acid or absent
<220> FEATURE:
<221> NAME/KEY: MISC_FEATURE
<222> LOCATION: (60)..(60)
<223> OTHER INFORMATION: Xaa = any amino acid or absent
<220> FEATURE:
<221> NAME/KEY: MISC_FEATURE
<222> LOCATION: (62)..(63)
<223> OTHER INFORMATION: Xaa = any amino acid or absent
<220> FEATURE:
<221> NAME/KEY: MISC_FEATURE
<222> LOCATION: (65)..(65)
<223> OTHER INFORMATION: Xaa = any amino acid or absent
<220> FEATURE:
<221> NAME/KEY: MISC_FEATURE
<222> LOCATION: (71)..(71)
<223> OTHER INFORMATION: Xaa = any amino acid or absent
<220> FEATURE:
<221> NAME/KEY: MISC_FEATURE
<222> LOCATION: (73)..(73)
<223> OTHER INFORMATION: Xaa = any amino acid or absent
<220> FEATURE:
<221> NAME/KEY: MISC_FEATURE
<222> LOCATION: (75)..(75)
<223> OTHER INFORMATION: Xaa = any amino acid or absent
<220> FEATURE:
<221> NAME/KEY: MISC_FEATURE
<222> LOCATION: (77)..(77)
<223> OTHER INFORMATION: Xaa = any amino acid or absent
<220> FEATURE:
<221> NAME/KEY: MISC_FEATURE
<222> LOCATION: (79)..(79)
<223> OTHER INFORMATION: Xaa = any amino acid or absent
<220> FEATURE:
<221> NAME/KEY: MISC_FEATURE
<222> LOCATION: (81)..(81)
<223> OTHER INFORMATION: Xaa = any amino acid or absent
<220> FEATURE:
<221> NAME/KEY: MISC_FEATURE
<222> LOCATION: (87)..(87)
<223> OTHER INFORMATION: Xaa = any amino acid or absent
<220> FEATURE:
<221> NAME/KEY: MISC_FEATURE
<222> LOCATION: (89)..(89)
<223> OTHER INFORMATION: Xaa = any amino acid or absent
<220> FEATURE:
<221> NAME/KEY: MISC_FEATURE
<222> LOCATION: (92)..(92)
<223> OTHER INFORMATION: Xaa = any amino acid or absent
<220> FEATURE:
<221> NAME/KEY: MISC_FEATURE
<222> LOCATION: (95)..(98)
<223> OTHER INFORMATION: Xaa = any amino acid or absent
<220> FEATURE:
<221> NAME/KEY: MISC_FEATURE
<222> LOCATION: (101)..(101)
<223> OTHER INFORMATION: Xaa = any amino acid or absent
<220> FEATURE:
<221> NAME/KEY: MISC_FEATURE
<222> LOCATION: (108)..(108)
<223> OTHER INFORMATION: Xaa = any amino acid or absent
<220> FEATURE:
<221> NAME/KEY: MISC_FEATURE
<222> LOCATION: (112)..(116)
<223> OTHER INFORMATION: Xaa = any amino acid or absent
<220> FEATURE:
<221> NAME/KEY: MISC_FEATURE
<222> LOCATION: (119)..(120)
```

```
<223> OTHER INFORMATION: Xaa = any amino acid or absent
<220> FEATURE:
<221> NAME/KEY: MISC_FEATURE
<222> LOCATION: (123)..(126)
<223> OTHER INFORMATION: Xaa = any amino acid or absent
<220> FEATURE:
<221> NAME/KEY: MISC_FEATURE
<222> LOCATION: (130)..(130)
<223> OTHER INFORMATION: Xaa = any amino acid or absent
<220> FEATURE:
<221> NAME/KEY: MISC_FEATURE
<222> LOCATION: (132)..(133)
<223> OTHER INFORMATION: Xaa = any amino acid or absent
<220> FEATURE:
<221> NAME/KEY: MISC_FEATURE
<222> LOCATION: (135)..(142)
<223> OTHER INFORMATION: Xaa = any amino acid or absent
<220> FEATURE:
<221> NAME/KEY: MISC_FEATURE
<222> LOCATION: (144)..(144)
<223> OTHER INFORMATION: Xaa = any amino acid or absent
<220> FEATURE:
<221> NAME/KEY: MISC_FEATURE
<222> LOCATION: (148)..(149)
<223> OTHER INFORMATION: Xaa = any amino acid or absent
<220> FEATURE:
<221> NAME/KEY: MISC_FEATURE
<222> LOCATION: (162)..(163)
<223> OTHER INFORMATION: Xaa = any amino acid or absent
<220> FEATURE:
<221> NAME/KEY: MISC_FEATURE
<222> LOCATION: (182)..(182)
<223> OTHER INFORMATION: Xaa = any amino acid or absent
<220> FEATURE:
<221> NAME/KEY: MISC_FEATURE
<222> LOCATION: (186)..(186)
<223> OTHER INFORMATION: Xaa = any amino acid or absent
<220> FEATURE:
<221> NAME/KEY: MISC_FEATURE
<222> LOCATION: (189)..(189)
<223> OTHER INFORMATION: Xaa = any amino acid or absent
<220> FEATURE:
<221> NAME/KEY: MISC_FEATURE
<222> LOCATION: (192)..(192)
<223> OTHER INFORMATION: Xaa = any amino acid or absent
<220> FEATURE:
<221> NAME/KEY: MISC_FEATURE
<222> LOCATION: (195)..(195)
<223> OTHER INFORMATION: Xaa = any amino acid or absent
<220> FEATURE:
<221> NAME/KEY: MISC_FEATURE
<222> LOCATION: (197)..(197)
<223> OTHER INFORMATION: Xaa = any amino acid or absent
<220> FEATURE:
<221> NAME/KEY: MISC_FEATURE
<222> LOCATION: (200)..(201)
<223> OTHER INFORMATION: Xaa = any amino acid or absent
<220> FEATURE:
<221> NAME/KEY: MISC_FEATURE
<222> LOCATION: (205)..(205)
<223> OTHER INFORMATION: Xaa = any amino acid or absent
<220> FEATURE:
<221> NAME/KEY: MISC_FEATURE
<222> LOCATION: (220)..(220)
<223> OTHER INFORMATION: Xaa = any amino acid or absent
<220> FEATURE:
<221> NAME/KEY: MISC_FEATURE
<222> LOCATION: (222)..(226)
<223> OTHER INFORMATION: Xaa = any amino acid or absent
<220> FEATURE:
<221> NAME/KEY: MISC_FEATURE
<222> LOCATION: (230)..(241)
<223> OTHER INFORMATION: Xaa = any amino acid or absent
<220> FEATURE:
<221> NAME/KEY: MISC_FEATURE
<222> LOCATION: (244)..(249)
<223> OTHER INFORMATION: Xaa = any amino acid or absent
<220> FEATURE:
<221> NAME/KEY: MISC_FEATURE
```

```
<222> LOCATION: (266)..(266)
<223> OTHER INFORMATION: Xaa = any amino acid or absent
<220> FEATURE:
<221> NAME/KEY: MISC_FEATURE
<222> LOCATION: (268)..(269)
<223> OTHER INFORMATION: Xaa = any amino acid or absent
<220> FEATURE:
<221> NAME/KEY: MISC_FEATURE
<222> LOCATION: (276)..(276)
<223> OTHER INFORMATION: Xaa = any amino acid or absent
<220> FEATURE:
<221> NAME/KEY: MISC_FEATURE
<222> LOCATION: (289)..(289)
<223> OTHER INFORMATION: Xaa = any amino acid or absent
<220> FEATURE:
<221> NAME/KEY: MISC_FEATURE
<222> LOCATION: (302)..(303)
<223> OTHER INFORMATION: Xaa = any amino acid or absent
<220> FEATURE:
<221> NAME/KEY: MISC_FEATURE
<222> LOCATION: (306)..(306)
<223> OTHER INFORMATION: Xaa = any amino acid or absent
<220> FEATURE:
<221> NAME/KEY: MISC_FEATURE
<222> LOCATION: (306)..(306)
<223> OTHER INFORMATION: Xaa = any amino acid or absent
<220> FEATURE:
<221> NAME/KEY: MISC_FEATURE
<222> LOCATION: (312)..(312)
<223> OTHER INFORMATION: Xaa = any amino acid or absent
<220> FEATURE:
<221> NAME/KEY: MISC_FEATURE
<222> LOCATION: (315)..(321)
<223> OTHER INFORMATION: Xaa = any amino acid or absent
<220> FEATURE:
<221> NAME/KEY: MISC_FEATURE
<222> LOCATION: (324)..(324)
<223> OTHER INFORMATION: Xaa = any amino acid or absent
<220> FEATURE:
<221> NAME/KEY: MISC_FEATURE
<222> LOCATION: (326)..(326)
<223> OTHER INFORMATION: Xaa = any amino acid or absent
<220> FEATURE:
<221> NAME/KEY: MISC_FEATURE
<222> LOCATION: (336)..(347)
<223> OTHER INFORMATION: Xaa = any amino acid or absent
<220> FEATURE:
<221> NAME/KEY: MISC_FEATURE
<222> LOCATION: (358)..(366)
<223> OTHER INFORMATION: Xaa = any amino acid or absent
<220> FEATURE:
<221> NAME/KEY: MISC_FEATURE
<222> LOCATION: (370)..(371)
<223> OTHER INFORMATION: Xaa = any amino acid or absent
<220> FEATURE:
<221> NAME/KEY: MISC_FEATURE
<222> LOCATION: (373)..(374)
<223> OTHER INFORMATION: Xaa = any amino acid or absent
<220> FEATURE:
<221> NAME/KEY: MISC_FEATURE
<222> LOCATION: (376)..(378)
<223> OTHER INFORMATION: Xaa = any amino acid or absent
<220> FEATURE:
<221> NAME/KEY: MISC_FEATURE
<222> LOCATION: (381)..(382)
<223> OTHER INFORMATION: Xaa = any amino acid or absent
<220> FEATURE:
<221> NAME/KEY: MISC_FEATURE
<222> LOCATION: (385)..(385)
<223> OTHER INFORMATION: Xaa = any amino acid or absent
<220> FEATURE:
<221> NAME/KEY: MISC_FEATURE
<222> LOCATION: (388)..(388)
<223> OTHER INFORMATION: Xaa = any amino acid or absent
<220> FEATURE:
<221> NAME/KEY: MISC_FEATURE
<222> LOCATION: (390)..(390)
<223> OTHER INFORMATION: Xaa = any amino acid or absent
<220> FEATURE:
```

```
<221> NAME/KEY: MISC_FEATURE
<222> LOCATION: (394)..(394)
<223> OTHER INFORMATION: Xaa = any amino acid or absent
<220> FEATURE:
<221> NAME/KEY: MISC_FEATURE
<222> LOCATION: (400)..(400)
<223> OTHER INFORMATION: Xaa = any amino acid or absent
<220> FEATURE:
<221> NAME/KEY: MISC_FEATURE
<222> LOCATION: (402)..(403)
<223> OTHER INFORMATION: Xaa = any amino acid or absent
<220> FEATURE:
<221> NAME/KEY: MISC_FEATURE
<222> LOCATION: (406)..(406)
<223> OTHER INFORMATION: Xaa = any amino acid or absent
<220> FEATURE:
<221> NAME/KEY: MISC_FEATURE
<222> LOCATION: (410)..(410)
<223> OTHER INFORMATION: Xaa = any amino acid or absent
<220> FEATURE:
<221> NAME/KEY: MISC_FEATURE
<222> LOCATION: (413)..(420)
<223> OTHER INFORMATION: Xaa = any amino acid or absent
<220> FEATURE:
<221> NAME/KEY: MISC_FEATURE
<222> LOCATION: (423)..(430)
<223> OTHER INFORMATION: Xaa = any amino acid or absent
<220> FEATURE:
<221> NAME/KEY: MISC_FEATURE
<222> LOCATION: (432)..(434)
<223> OTHER INFORMATION: Xaa = any amino acid or absent
<220> FEATURE:
<221> NAME/KEY: MISC_FEATURE
<222> LOCATION: (436)..(436)
<223> OTHER INFORMATION: Xaa = any amino acid or absent
<220> FEATURE:
<221> NAME/KEY: MISC_FEATURE
<222> LOCATION: (438)..(446)
<223> OTHER INFORMATION: Xaa = any amino acid or absent
<220> FEATURE:
<221> NAME/KEY: MISC_FEATURE
<222> LOCATION: (452)..(452)
<223> OTHER INFORMATION: Xaa = any amino acid or absent
<220> FEATURE:
<221> NAME/KEY: MISC_FEATURE
<222> LOCATION: (455)..(459)
<223> OTHER INFORMATION: Xaa = any amino acid or absent
<220> FEATURE:
<221> NAME/KEY: MISC_FEATURE
<222> LOCATION: (462)..(467)
<223> OTHER INFORMATION: Xaa = any amino acid or absent
<220> FEATURE:
<221> NAME/KEY: MISC_FEATURE
<222> LOCATION: (469)..(470)
<223> OTHER INFORMATION: Xaa = any amino acid or absent
<220> FEATURE:
<221> NAME/KEY: MISC_FEATURE
<222> LOCATION: (474)..(474)
<223> OTHER INFORMATION: Xaa = any amino acid or absent
<220> FEATURE:
<221> NAME/KEY: MISC_FEATURE
<222> LOCATION: (477)..(477)
<223> OTHER INFORMATION: Xaa = any amino acid or absent
<220> FEATURE:
<221> NAME/KEY: MISC_FEATURE
<222> LOCATION: (503)..(503)
<223> OTHER INFORMATION: Xaa = any amino acid or absent
<220> FEATURE:
<221> NAME/KEY: MISC_FEATURE
<222> LOCATION: (508)..(508)
<223> OTHER INFORMATION: Xaa = any amino acid or absent
<220> FEATURE:
<221> NAME/KEY: MISC_FEATURE
<222> LOCATION: (511)..(511)
<223> OTHER INFORMATION: Xaa = any amino acid or absent
<220> FEATURE:
<221> NAME/KEY: MISC_FEATURE
<222> LOCATION: (513)..(513)
<223> OTHER INFORMATION: Xaa = any amino acid or absent
```

```
<220> FEATURE:
<221> NAME/KEY: MISC_FEATURE
<222> LOCATION: (516)..(517)
<223> OTHER INFORMATION: Xaa = any amino acid or absent
<220> FEATURE:
<221> NAME/KEY: MISC_FEATURE
<222> LOCATION: (521)..(522)
<223> OTHER INFORMATION: Xaa = any amino acid or absent
<220> FEATURE:
<221> NAME/KEY: MISC_FEATURE
<222> LOCATION: (525)..(529)
<223> OTHER INFORMATION: Xaa = any amino acid or absent
<220> FEATURE:
<221> NAME/KEY: MISC_FEATURE
<222> LOCATION: (531)..(561)
<223> OTHER INFORMATION: Xaa = any amino acid or absent
<220> FEATURE:
<221> NAME/KEY: MISC_FEATURE
<222> LOCATION: (563)..(563)
<223> OTHER INFORMATION: Xaa = any amino acid or absent
<220> FEATURE:
<221> NAME/KEY: MISC_FEATURE
<222> LOCATION: (566)..(583)
<223> OTHER INFORMATION: Xaa = any amino acid or absent
<220> FEATURE:
<221> NAME/KEY: MISC_FEATURE
<222> LOCATION: (587)..(587)
<223> OTHER INFORMATION: Xaa = any amino acid or absent
<220> FEATURE:
<221> NAME/KEY: MISC_FEATURE
<222> LOCATION: (590)..(590)
<223> OTHER INFORMATION: Xaa = any amino acid or absent
<220> FEATURE:
<221> NAME/KEY: MISC_FEATURE
<222> LOCATION: (598)..(599)
<223> OTHER INFORMATION: Xaa = any amino acid or absent
<220> FEATURE:
<221> NAME/KEY: MISC_FEATURE
<222> LOCATION: (612)..(612)
<223> OTHER INFORMATION: Xaa = any amino acid or absent
<220> FEATURE:
<221> NAME/KEY: MISC_FEATURE
<222> LOCATION: (620)..(621)
<223> OTHER INFORMATION: Xaa = any amino acid or absent
<220> FEATURE:
<221> NAME/KEY: MISC_FEATURE
<222> LOCATION: (623)..(627)
<223> OTHER INFORMATION: Xaa = any amino acid or absent
<220> FEATURE:
<221> NAME/KEY: MISC_FEATURE
<222> LOCATION: (636)..(636)
<223> OTHER INFORMATION: Xaa = any amino acid or absent
<220> FEATURE:
<221> NAME/KEY: MISC_FEATURE
<222> LOCATION: (639)..(639)
<223> OTHER INFORMATION: Xaa = any amino acid or absent
<220> FEATURE:
<221> NAME/KEY: MISC_FEATURE
<222> LOCATION: (650)..(651)
<223> OTHER INFORMATION: Xaa = any amino acid or absent
<220> FEATURE:
<221> NAME/KEY: MISC_FEATURE
<222> LOCATION: (656)..(656)
<223> OTHER INFORMATION: Xaa = any amino acid or absent
<220> FEATURE:
<221> NAME/KEY: MISC_FEATURE
<222> LOCATION: (671)..(671)
<223> OTHER INFORMATION: Xaa = any amino acid or absent
<220> FEATURE:
<221> NAME/KEY: MISC_FEATURE
<222> LOCATION: (673)..(673)
<223> OTHER INFORMATION: Xaa = any amino acid or absent
<220> FEATURE:
<221> NAME/KEY: MISC_FEATURE
<222> LOCATION: (677)..(680)
<223> OTHER INFORMATION: Xaa = any amino acid or absent
<220> FEATURE:
<221> NAME/KEY: MISC_FEATURE
<222> LOCATION: (683)..(683)
```

```
<223> OTHER INFORMATION: Xaa = any amino acid or absent
<220> FEATURE:
<221> NAME/KEY: MISC_FEATURE
<222> LOCATION: (685)..(685)
<223> OTHER INFORMATION: Xaa = any amino acid or absent
<220> FEATURE:
<221> NAME/KEY: MISC_FEATURE
<222> LOCATION: (692)..(692)
<223> OTHER INFORMATION: Xaa = any amino acid or absent
<220> FEATURE:
<221> NAME/KEY: MISC_FEATURE
<222> LOCATION: (710)..(711)
<223> OTHER INFORMATION: Xaa = any amino acid or absent
<220> FEATURE:
<221> NAME/KEY: MISC_FEATURE
<222> LOCATION: (730)..(730)
<223> OTHER INFORMATION: Xaa = any amino acid or absent
<220> FEATURE:
<221> NAME/KEY: MISC_FEATURE
<222> LOCATION: (733)..(733)
<223> OTHER INFORMATION: Xaa = any amino acid or absent
<220> FEATURE:
<221> NAME/KEY: MISC_FEATURE
<222> LOCATION: (751)..(751)
<223> OTHER INFORMATION: Xaa = any amino acid or absent
<220> FEATURE:
<221> NAME/KEY: MISC_FEATURE
<222> LOCATION: (757)..(759)
<223> OTHER INFORMATION: Xaa = any amino acid or absent
<220> FEATURE:
<221> NAME/KEY: MISC_FEATURE
<222> LOCATION: (761)..(761)
<223> OTHER INFORMATION: Xaa = any amino acid or absent
<220> FEATURE:
<221> NAME/KEY: MISC_FEATURE
<222> LOCATION: (764)..(764)
<223> OTHER INFORMATION: Xaa = any amino acid or absent
<220> FEATURE:
<221> NAME/KEY: MISC_FEATURE
<222> LOCATION: (766)..(766)
<223> OTHER INFORMATION: Xaa = any amino acid or absent
<220> FEATURE:
<221> NAME/KEY: MISC_FEATURE
<222> LOCATION: (770)..(770)
<223> OTHER INFORMATION: Xaa = any amino acid or absent
<220> FEATURE:
<221> NAME/KEY: MISC_FEATURE
<222> LOCATION: (775)..(776)
<223> OTHER INFORMATION: Xaa = any amino acid or absent
<220> FEATURE:
<221> NAME/KEY: MISC_FEATURE
<222> LOCATION: (779)..(783)
<223> OTHER INFORMATION: Xaa = any amino acid or absent
<220> FEATURE:
<221> NAME/KEY: MISC_FEATURE
<222> LOCATION: (786)..(786)
<223> OTHER INFORMATION: Xaa = any amino acid or absent
<220> FEATURE:
<221> NAME/KEY: MISC_FEATURE
<222> LOCATION: (816)..(825)
<223> OTHER INFORMATION: Xaa = any amino acid or absent
<220> FEATURE:
<221> NAME/KEY: MISC_FEATURE
<222> LOCATION: (829)..(829)
<223> OTHER INFORMATION: Xaa = any amino acid or absent
<220> FEATURE:
<221> NAME/KEY: MISC_FEATURE
<222> LOCATION: (838)..(839)
<223> OTHER INFORMATION: Xaa = any amino acid or absent
<220> FEATURE:
<221> NAME/KEY: MISC_FEATURE
<222> LOCATION: (857)..(858)
<223> OTHER INFORMATION: Xaa = any amino acid or absent
<220> FEATURE:
<221> NAME/KEY: MISC_FEATURE
<222> LOCATION: (863)..(864)
<223> OTHER INFORMATION: Xaa = any amino acid or absent
<220> FEATURE:
<221> NAME/KEY: MISC_FEATURE
```

-continued

```
<222> LOCATION: (869)..(870)
<223> OTHER INFORMATION: Xaa = any amino acid or absent
<220> FEATURE:
<221> NAME/KEY: MISC_FEATURE
<222> LOCATION: (877)..(877)
<223> OTHER INFORMATION: Xaa = any amino acid or absent
<220> FEATURE:
<221> NAME/KEY: MISC_FEATURE
<222> LOCATION: (883)..(883)
<223> OTHER INFORMATION: Xaa = any amino acid or absent
<220> FEATURE:
<221> NAME/KEY: MISC_FEATURE
<222> LOCATION: (886)..(886)
<223> OTHER INFORMATION: Xaa = any amino acid or absent
<220> FEATURE:
<221> NAME/KEY: MISC_FEATURE
<222> LOCATION: (893)..(894)
<223> OTHER INFORMATION: Xaa = any amino acid or absent
<220> FEATURE:
<221> NAME/KEY: MISC_FEATURE
<222> LOCATION: (896)..(902)
<223> OTHER INFORMATION: Xaa = any amino acid or absent
<220> FEATURE:
<221> NAME/KEY: MISC_FEATURE
<222> LOCATION: (905)..(905)
<223> OTHER INFORMATION: Xaa = any amino acid or absent
<220> FEATURE:
<221> NAME/KEY: MISC_FEATURE
<222> LOCATION: (907)..(908)
<223> OTHER INFORMATION: Xaa = any amino acid or absent
<220> FEATURE:
<221> NAME/KEY: MISC_FEATURE
<222> LOCATION: (911)..(913)
<223> OTHER INFORMATION: Xaa = any amino acid or absent
<220> FEATURE:
<221> NAME/KEY: MISC_FEATURE
<222> LOCATION: (916)..(916)
<223> OTHER INFORMATION: Xaa = any amino acid or absent
<220> FEATURE:
<221> NAME/KEY: MISC_FEATURE
<222> LOCATION: (922)..(922)
<223> OTHER INFORMATION: Xaa = any amino acid or absent
<220> FEATURE:
<221> NAME/KEY: MISC_FEATURE
<222> LOCATION: (926)..(927)
<223> OTHER INFORMATION: Xaa = any amino acid or absent
<220> FEATURE:
<221> NAME/KEY: MISC_FEATURE
<222> LOCATION: (929)..(929)
<223> OTHER INFORMATION: Xaa = any amino acid or absent
<220> FEATURE:
<221> NAME/KEY: MISC_FEATURE
<222> LOCATION: (936)..(936)
<223> OTHER INFORMATION: Xaa = any amino acid or absent
<220> FEATURE:
<221> NAME/KEY: MISC_FEATURE
<222> LOCATION: (938)..(938)
<223> OTHER INFORMATION: Xaa = any amino acid or absent
<220> FEATURE:
<221> NAME/KEY: MISC_FEATURE
<222> LOCATION: (944)..(947)
<223> OTHER INFORMATION: Xaa = any amino acid or absent
<220> FEATURE:
<221> NAME/KEY: MISC_FEATURE
<222> LOCATION: (949)..(952)
<223> OTHER INFORMATION: Xaa = any amino acid or absent
<220> FEATURE:
<221> NAME/KEY: MISC_FEATURE
<222> LOCATION: (954)..(954)
<223> OTHER INFORMATION: Xaa = any amino acid or absent
<220> FEATURE:
<221> NAME/KEY: MISC_FEATURE
<222> LOCATION: (956)..(956)
<223> OTHER INFORMATION: Xaa = any amino acid or absent
<220> FEATURE:
<221> NAME/KEY: MISC_FEATURE
<222> LOCATION: (959)..(970)
<223> OTHER INFORMATION: Xaa = any amino acid or absent
<220> FEATURE:
```

```
<221> NAME/KEY: MISC_FEATURE
<222> LOCATION: (973)..(977)
<223> OTHER INFORMATION: Xaa = any amino acid or absent
<220> FEATURE:
<221> NAME/KEY: MISC_FEATURE
<222> LOCATION: (980)..(980)
<223> OTHER INFORMATION: Xaa = any amino acid or absent
<220> FEATURE:
<221> NAME/KEY: MISC_FEATURE
<222> LOCATION: (982)..(982)
<223> OTHER INFORMATION: Xaa = any amino acid or absent
<220> FEATURE:
<221> NAME/KEY: MISC_FEATURE
<222> LOCATION: (985)..(989)
<223> OTHER INFORMATION: Xaa = any amino acid or absent
<220> FEATURE:
<221> NAME/KEY: MISC_FEATURE
<222> LOCATION: (991)..(993)
<223> OTHER INFORMATION: Xaa = any amino acid or absent
<220> FEATURE:
<221> NAME/KEY: MISC_FEATURE
<222> LOCATION: (996)..(996)
<223> OTHER INFORMATION: Xaa = any amino acid or absent
<220> FEATURE:
<221> NAME/KEY: MISC_FEATURE
<222> LOCATION: (998)..(998)
<223> OTHER INFORMATION: Xaa = any amino acid or absent
<220> FEATURE:
<221> NAME/KEY: MISC_FEATURE
<222> LOCATION: (1006)..(1006)
<223> OTHER INFORMATION: Xaa = any amino acid or absent
<220> FEATURE:
<221> NAME/KEY: MISC_FEATURE
<222> LOCATION: (1008)..(1009)
<223> OTHER INFORMATION: Xaa = any amino acid or absent
<220> FEATURE:
<221> NAME/KEY: MISC_FEATURE
<222> LOCATION: (1016)..(1016)
<223> OTHER INFORMATION: Xaa = any amino acid or absent
<220> FEATURE:
<221> NAME/KEY: MISC_FEATURE
<222> LOCATION: (1019)..(1020)
<223> OTHER INFORMATION: Xaa = any amino acid or absent
<220> FEATURE:
<221> NAME/KEY: MISC_FEATURE
<222> LOCATION: (1023)..(1024)
<223> OTHER INFORMATION: Xaa = any amino acid or absent
<220> FEATURE:
<221> NAME/KEY: MISC_FEATURE
<222> LOCATION: (1026)..(1026)
<223> OTHER INFORMATION: Xaa = any amino acid or absent
<220> FEATURE:
<221> NAME/KEY: MISC_FEATURE
<222> LOCATION: (1030)..(1034)
<223> OTHER INFORMATION: Xaa = any amino acid or absent
<220> FEATURE:
<221> NAME/KEY: MISC_FEATURE
<222> LOCATION: (1038)..(1039)
<223> OTHER INFORMATION: Xaa = any amino acid or absent
<220> FEATURE:
<221> NAME/KEY: MISC_FEATURE
<222> LOCATION: (1046)..(1047)
<223> OTHER INFORMATION: Xaa = any amino acid or absent
<220> FEATURE:
<221> NAME/KEY: MISC_FEATURE
<222> LOCATION: (1049)..(1050)
<223> OTHER INFORMATION: Xaa = any amino acid or absent
<220> FEATURE:
<221> NAME/KEY: MISC_FEATURE
<222> LOCATION: (1053)..(1053)
<223> OTHER INFORMATION: Xaa = any amino acid or absent
<220> FEATURE:
<221> NAME/KEY: MISC_FEATURE
<222> LOCATION: (1055)..(1056)
<223> OTHER INFORMATION: Xaa = any amino acid or absent
<220> FEATURE:
<221> NAME/KEY: MISC_FEATURE
<222> LOCATION: (1058)..(1058)
<223> OTHER INFORMATION: Xaa = any amino acid or absent
```

```
<220> FEATURE:
<221> NAME/KEY: MISC_FEATURE
<222> LOCATION: (1060)..(1061)
<223> OTHER INFORMATION: Xaa = any amino acid or absent
<220> FEATURE:
<221> NAME/KEY: MISC_FEATURE
<222> LOCATION: (1063)..(1065)
<223> OTHER INFORMATION: Xaa = any amino acid or absent
<220> FEATURE:
<221> NAME/KEY: MISC_FEATURE
<222> LOCATION: (1067)..(1067)
<223> OTHER INFORMATION: Xaa = any amino acid or absent
<220> FEATURE:
<221> NAME/KEY: MISC_FEATURE
<222> LOCATION: (1069)..(1069)
<223> OTHER INFORMATION: Xaa = any amino acid or absent
<220> FEATURE:
<221> NAME/KEY: MISC_FEATURE
<222> LOCATION: (1073)..(1073)
<223> OTHER INFORMATION: Xaa = any amino acid or absent
<220> FEATURE:
<221> NAME/KEY: MISC_FEATURE
<222> LOCATION: (1076)..(1076)
<223> OTHER INFORMATION: Xaa = any amino acid or absent
<220> FEATURE:
<221> NAME/KEY: MISC_FEATURE
<222> LOCATION: (1079)..(1080)
<223> OTHER INFORMATION: Xaa = any amino acid or absent
<220> FEATURE:
<221> NAME/KEY: MISC_FEATURE
<222> LOCATION: (1082)..(1084)
<223> OTHER INFORMATION: Xaa = any amino acid or absent
<220> FEATURE:
<221> NAME/KEY: MISC_FEATURE
<222> LOCATION: (1090)..(1090)
<223> OTHER INFORMATION: Xaa = any amino acid or absent
<220> FEATURE:
<221> NAME/KEY: MISC_FEATURE
<222> LOCATION: (1093)..(1095)
<223> OTHER INFORMATION: Xaa = any amino acid or absent
<220> FEATURE:
<221> NAME/KEY: MISC_FEATURE
<222> LOCATION: (1097)..(1099)
<223> OTHER INFORMATION: Xaa = any amino acid or absent
<220> FEATURE:
<221> NAME/KEY: MISC_FEATURE
<222> LOCATION: (1103)..(1104)
<223> OTHER INFORMATION: Xaa = any amino acid or absent
<220> FEATURE:
<221> NAME/KEY: MISC_FEATURE
<222> LOCATION: (1107)..(1109)
<223> OTHER INFORMATION: Xaa = any amino acid or absent
<220> FEATURE:
<221> NAME/KEY: MISC_FEATURE
<222> LOCATION: (1111)..(1112)
<223> OTHER INFORMATION: Xaa = any amino acid or absent
<220> FEATURE:
<221> NAME/KEY: MISC_FEATURE
<222> LOCATION: (1114)..(1114)
<223> OTHER INFORMATION: Xaa = any amino acid or absent
<220> FEATURE:
<221> NAME/KEY: MISC_FEATURE
<222> LOCATION: (1116)..(1118)
<223> OTHER INFORMATION: Xaa = any amino acid or absent
<220> FEATURE:
<221> NAME/KEY: MISC_FEATURE
<222> LOCATION: (1121)..(1122)
<223> OTHER INFORMATION: Xaa = any amino acid or absent
<220> FEATURE:
<221> NAME/KEY: MISC_FEATURE
<222> LOCATION: (1128)..(1129)
<223> OTHER INFORMATION: Xaa = any amino acid or absent
<220> FEATURE:
<221> NAME/KEY: MISC_FEATURE
<222> LOCATION: (1132)..(1132)
<223> OTHER INFORMATION: Xaa = any amino acid or absent
<220> FEATURE:
<221> NAME/KEY: MISC_FEATURE
<222> LOCATION: (1136)..(1136)
```

```
<223> OTHER INFORMATION: Xaa = any amino acid or absent
<220> FEATURE:
<221> NAME/KEY: MISC_FEATURE
<222> LOCATION: (1140)..(1140)
<223> OTHER INFORMATION: Xaa = any amino acid or absent
<220> FEATURE:
<221> NAME/KEY: MISC_FEATURE
<222> LOCATION: (1143)..(1143)
<223> OTHER INFORMATION: Xaa = any amino acid or absent
<220> FEATURE:
<221> NAME/KEY: MISC_FEATURE
<222> LOCATION: (1146)..(1148)
<223> OTHER INFORMATION: Xaa = any amino acid or absent
<220> FEATURE:
<221> NAME/KEY: MISC_FEATURE
<222> LOCATION: (1150)..(1150)
<223> OTHER INFORMATION: Xaa = any amino acid or absent
<220> FEATURE:
<221> NAME/KEY: MISC_FEATURE
<222> LOCATION: (1156)..(1157)
<223> OTHER INFORMATION: Xaa = any amino acid or absent
<220> FEATURE:
<221> NAME/KEY: MISC_FEATURE
<222> LOCATION: (1159)..(1159)
<223> OTHER INFORMATION: Xaa = any amino acid or absent
<220> FEATURE:
<221> NAME/KEY: MISC_FEATURE
<222> LOCATION: (1166)..(1167)
<223> OTHER INFORMATION: Xaa = any amino acid or absent
<220> FEATURE:
<221> NAME/KEY: MISC_FEATURE
<222> LOCATION: (1169)..(1169)
<223> OTHER INFORMATION: Xaa = any amino acid or absent
<220> FEATURE:
<221> NAME/KEY: MISC_FEATURE
<222> LOCATION: (1172)..(1191)
<223> OTHER INFORMATION: Xaa = any amino acid or absent
<220> FEATURE:
<221> NAME/KEY: MISC_FEATURE
<222> LOCATION: (1193)..(1193)
<223> OTHER INFORMATION: Xaa = any amino acid or absent
<220> FEATURE:
<221> NAME/KEY: MISC_FEATURE
<222> LOCATION: (1195)..(1197)
<223> OTHER INFORMATION: Xaa = any amino acid or absent
<220> FEATURE:
<221> NAME/KEY: MISC_FEATURE
<222> LOCATION: (1199)..(1199)
<223> OTHER INFORMATION: Xaa = any amino acid or absent
<220> FEATURE:
<221> NAME/KEY: MISC_FEATURE
<222> LOCATION: (1202)..(1204)
<223> OTHER INFORMATION: Xaa = any amino acid or absent
<220> FEATURE:
<221> NAME/KEY: MISC_FEATURE
<222> LOCATION: (1206)..(1209)
<223> OTHER INFORMATION: Xaa = any amino acid or absent
<220> FEATURE:
<221> NAME/KEY: MISC_FEATURE
<222> LOCATION: (1214)..(1215)
<223> OTHER INFORMATION: Xaa = any amino acid or absent
<220> FEATURE:
<221> NAME/KEY: MISC_FEATURE
<222> LOCATION: (1218)..(1219)
<223> OTHER INFORMATION: Xaa = any amino acid or absent
<220> FEATURE:
<221> NAME/KEY: MISC_FEATURE
<222> LOCATION: (1221)..(1221)
<223> OTHER INFORMATION: Xaa = any amino acid or absent
<220> FEATURE:
<221> NAME/KEY: MISC_FEATURE
<222> LOCATION: (1223)..(1223)
<223> OTHER INFORMATION: Xaa = any amino acid or absent
<220> FEATURE:
<221> NAME/KEY: MISC_FEATURE
<222> LOCATION: (1228)..(1228)
<223> OTHER INFORMATION: Xaa = any amino acid or absent
<220> FEATURE:
<221> NAME/KEY: MISC_FEATURE
```

```
<222> LOCATION: (1231)..(1232)
<223> OTHER INFORMATION: Xaa = any amino acid or absent
<220> FEATURE:
<221> NAME/KEY: MISC_FEATURE
<222> LOCATION: (1235)..(1236)
<223> OTHER INFORMATION: Xaa = any amino acid or absent
<220> FEATURE:
<221> NAME/KEY: MISC_FEATURE
<222> LOCATION: (1238)..(1238)
<223> OTHER INFORMATION: Xaa = any amino acid or absent
<220> FEATURE:
<221> NAME/KEY: MISC_FEATURE
<222> LOCATION: (1241)..(1243)
<223> OTHER INFORMATION: Xaa = any amino acid or absent
<220> FEATURE:
<221> NAME/KEY: MISC_FEATURE
<222> LOCATION: (1245)..(1245)
<223> OTHER INFORMATION: Xaa = any amino acid or absent
<220> FEATURE:
<221> NAME/KEY: MISC_FEATURE
<222> LOCATION: (1247)..(1247)
<223> OTHER INFORMATION: Xaa = any amino acid or absent
<220> FEATURE:
<221> NAME/KEY: MISC_FEATURE
<222> LOCATION: (1250)..(1251)
<223> OTHER INFORMATION: Xaa = any amino acid or absent
<220> FEATURE:
<221> NAME/KEY: MISC_FEATURE
<222> LOCATION: (1253)..(1258)
<223> OTHER INFORMATION: Xaa = any amino acid or absent
<220> FEATURE:
<221> NAME/KEY: MISC_FEATURE
<222> LOCATION: (1261)..(1261)
<223> OTHER INFORMATION: Xaa = any amino acid or absent
<220> FEATURE:
<221> NAME/KEY: MISC_FEATURE
<222> LOCATION: (1263)..(1265)
<223> OTHER INFORMATION: Xaa = any amino acid or absent
<220> FEATURE:
<221> NAME/KEY: MISC_FEATURE
<222> LOCATION: (1267)..(1277)
<223> OTHER INFORMATION: Xaa = any amino acid or absent
<220> FEATURE:
<221> NAME/KEY: MISC_FEATURE
<222> LOCATION: (1280)..(1280)
<223> OTHER INFORMATION: Xaa = any amino acid or absent
<220> FEATURE:
<221> NAME/KEY: MISC_FEATURE
<222> LOCATION: (1283)..(1283)
<223> OTHER INFORMATION: Xaa = any amino acid or absent
<220> FEATURE:
<221> NAME/KEY: MISC_FEATURE
<222> LOCATION: (1285)..(1287)
<223> OTHER INFORMATION: Xaa = any amino acid or absent
<220> FEATURE:
<221> NAME/KEY: MISC_FEATURE
<222> LOCATION: (1289)..(1291)
<223> OTHER INFORMATION: Xaa = any amino acid or absent
<220> FEATURE:
<221> NAME/KEY: MISC_FEATURE
<222> LOCATION: (1293)..(1294)
<223> OTHER INFORMATION: Xaa = any amino acid or absent
<220> FEATURE:
<221> NAME/KEY: MISC_FEATURE
<222> LOCATION: (1301)..(1301)
<223> OTHER INFORMATION: Xaa = any amino acid or absent
<220> FEATURE:
<221> NAME/KEY: MISC_FEATURE
<222> LOCATION: (1305)..(1313)
<223> OTHER INFORMATION: Xaa = any amino acid or absent
<220> FEATURE:
<221> NAME/KEY: MISC_FEATURE
<222> LOCATION: (1319)..(1319)
<223> OTHER INFORMATION: Xaa = any amino acid or absent
<220> FEATURE:
<221> NAME/KEY: MISC_FEATURE
<222> LOCATION: (1322)..(1325)
<223> OTHER INFORMATION: Xaa = any amino acid or absent
<220> FEATURE:
```

-continued

```
<221> NAME/KEY: MISC_FEATURE
<222> LOCATION: (1328)..(1329)
<223> OTHER INFORMATION: Xaa = any amino acid or absent
<220> FEATURE:
<221> NAME/KEY: MISC_FEATURE
<222> LOCATION: (1331)..(1452)
<223> OTHER INFORMATION: Xaa = any amino acid or absent
<220> FEATURE:
<221> NAME/KEY: MISC_FEATURE
<222> LOCATION: (1454)..(1454)
<223> OTHER INFORMATION: Xaa = any amino acid or absent
<220> FEATURE:
<221> NAME/KEY: MISC_FEATURE
<222> LOCATION: (1457)..(1458)
<223> OTHER INFORMATION: Xaa = any amino acid or absent
<220> FEATURE:
<221> NAME/KEY: MISC_FEATURE
<222> LOCATION: (1464)..(1464)
<223> OTHER INFORMATION: Xaa = any amino acid or absent
<220> FEATURE:
<221> NAME/KEY: MISC_FEATURE
<222> LOCATION: (1467)..(1469)
<223> OTHER INFORMATION: Xaa = any amino acid or absent
<220> FEATURE:
<221> NAME/KEY: MISC_FEATURE
<222> LOCATION: (1471)..(1472)
<223> OTHER INFORMATION: Xaa = any amino acid or absent
<220> FEATURE:
<221> NAME/KEY: MISC_FEATURE
<222> LOCATION: (1476)..(1476)
<223> OTHER INFORMATION: Xaa = any amino acid or absent
<220> FEATURE:
<221> NAME/KEY: MISC_FEATURE
<222> LOCATION: (1478)..(1478)
<223> OTHER INFORMATION: Xaa = any amino acid or absent
<220> FEATURE:
<221> NAME/KEY: MISC_FEATURE
<222> LOCATION: (1482)..(1482)
<223> OTHER INFORMATION: Xaa = any amino acid or absent
<220> FEATURE:
<221> NAME/KEY: MISC_FEATURE
<222> LOCATION: (1485)..(1486)
<223> OTHER INFORMATION: Xaa = any amino acid or absent
<220> FEATURE:
<221> NAME/KEY: MISC_FEATURE
<222> LOCATION: (1488)..(1488)
<223> OTHER INFORMATION: Xaa = any amino acid or absent
<220> FEATURE:
<221> NAME/KEY: MISC_FEATURE
<222> LOCATION: (1493)..(1493)
<223> OTHER INFORMATION: Xaa = any amino acid or absent
<220> FEATURE:
<221> NAME/KEY: MISC_FEATURE
<222> LOCATION: (1497)..(1497)
<223> OTHER INFORMATION: Xaa = any amino acid or absent
<220> FEATURE:
<221> NAME/KEY: MISC_FEATURE
<222> LOCATION: (1501)..(1501)
<223> OTHER INFORMATION: Xaa = any amino acid or absent
<220> FEATURE:
<221> NAME/KEY: MISC_FEATURE
<222> LOCATION: (1503)..(1503)
<223> OTHER INFORMATION: Xaa = any amino acid or absent
<220> FEATURE:
<221> NAME/KEY: MISC_FEATURE
<222> LOCATION: (1505)..(1506)
<223> OTHER INFORMATION: Xaa = any amino acid or absent
<220> FEATURE:
<221> NAME/KEY: MISC_FEATURE
<222> LOCATION: (1508)..(1511)
<223> OTHER INFORMATION: Xaa = any amino acid or absent
<220> FEATURE:
<221> NAME/KEY: MISC_FEATURE
<222> LOCATION: (1515)..(1515)
<223> OTHER INFORMATION: Xaa = any amino acid or absent
<220> FEATURE:
<221> NAME/KEY: MISC_FEATURE
<222> LOCATION: (1524)..(1526)
<223> OTHER INFORMATION: Xaa = any amino acid or absent
```

```
<220> FEATURE:
<221> NAME/KEY: MISC_FEATURE
<222> LOCATION: (1530)..(1531)
<223> OTHER INFORMATION: Xaa = any amino acid or absent
<220> FEATURE:
<221> NAME/KEY: MISC_FEATURE
<222> LOCATION: (1534)..(1538)
<223> OTHER INFORMATION: Xaa = any amino acid or absent
<220> FEATURE:
<221> NAME/KEY: MISC_FEATURE
<222> LOCATION: (1541)..(1541)
<223> OTHER INFORMATION: Xaa = any amino acid or absent
<220> FEATURE:
<221> NAME/KEY: MISC_FEATURE
<222> LOCATION: (1550)..(1550)
<223> OTHER INFORMATION: Xaa = any amino acid or absent
<220> FEATURE:
<221> NAME/KEY: MISC_FEATURE
<222> LOCATION: (1552)..(1553)
<223> OTHER INFORMATION: Xaa = any amino acid or absent
<220> FEATURE:
<221> NAME/KEY: MISC_FEATURE
<222> LOCATION: (1560)..(1560)
<223> OTHER INFORMATION: Xaa = any amino acid or absent
<220> FEATURE:
<221> NAME/KEY: MISC_FEATURE
<222> LOCATION: (1563)..(1565)
<223> OTHER INFORMATION: Xaa = any amino acid or absent
<220> FEATURE:
<221> NAME/KEY: MISC_FEATURE
<222> LOCATION: (1570)..(1576)
<223> OTHER INFORMATION: Xaa = any amino acid or absent
<220> FEATURE:
<221> NAME/KEY: MISC_FEATURE
<222> LOCATION: (1583)..(1589)
<223> OTHER INFORMATION: Xaa = any amino acid or absent
<220> FEATURE:
<221> NAME/KEY: MISC_FEATURE
<222> LOCATION: (1591)..(1591)
<223> OTHER INFORMATION: Xaa = any amino acid or absent
<220> FEATURE:
<221> NAME/KEY: MISC_FEATURE
<222> LOCATION: (1595)..(1595)
<223> OTHER INFORMATION: Xaa = any amino acid or absent
<220> FEATURE:
<221> NAME/KEY: MISC_FEATURE
<222> LOCATION: (1604)..(1604)
<223> OTHER INFORMATION: Xaa = any amino acid or absent
<220> FEATURE:
<221> NAME/KEY: MISC_FEATURE
<222> LOCATION: (1607)..(1611)
<223> OTHER INFORMATION: Xaa = any amino acid or absent
<220> FEATURE:
<221> NAME/KEY: MISC_FEATURE
<222> LOCATION: (1615)..(1615)
<223> OTHER INFORMATION: Xaa = any amino acid or absent
<220> FEATURE:
<221> NAME/KEY: MISC_FEATURE
<222> LOCATION: (1625)..(1625)
<223> OTHER INFORMATION: Xaa = any amino acid or absent
<220> FEATURE:
<221> NAME/KEY: MISC_FEATURE
<222> LOCATION: (1635)..(1637)
<223> OTHER INFORMATION: Xaa = any amino acid or absent
<220> FEATURE:
<221> NAME/KEY: MISC_FEATURE
<222> LOCATION: (1652)..(1652)
<223> OTHER INFORMATION: Xaa = any amino acid or absent
<220> FEATURE:
<221> NAME/KEY: MISC_FEATURE
<222> LOCATION: (1654)..(1654)
<223> OTHER INFORMATION: Xaa = any amino acid or absent
<220> FEATURE:
<221> NAME/KEY: MISC_FEATURE
<222> LOCATION: (1656)..(1656)
<223> OTHER INFORMATION: Xaa = any amino acid or absent
<220> FEATURE:
<221> NAME/KEY: MISC_FEATURE
<222> LOCATION: (1708)..(1711)
```

```
<223> OTHER INFORMATION: Xaa = any amino acid or absent
<220> FEATURE:
<221> NAME/KEY: MISC_FEATURE
<222> LOCATION: (1714)..(1714)
<223> OTHER INFORMATION: Xaa = any amino acid or absent
<220> FEATURE:
<221> NAME/KEY: MISC_FEATURE
<222> LOCATION: (1735)..(1735)
<223> OTHER INFORMATION: Xaa = any amino acid or absent
<220> FEATURE:
<221> NAME/KEY: MISC_FEATURE
<222> LOCATION: (1737)..(1741)
<223> OTHER INFORMATION: Xaa = any amino acid or absent
<220> FEATURE:
<221> NAME/KEY: MISC_FEATURE
<222> LOCATION: (1757)..(1757)
<223> OTHER INFORMATION: Xaa = any amino acid or absent
<220> FEATURE:
<221> NAME/KEY: MISC_FEATURE
<222> LOCATION: (1761)..(1761)
<223> OTHER INFORMATION: Xaa = any amino acid or absent
<220> FEATURE:
<221> NAME/KEY: MISC_FEATURE
<222> LOCATION: (1763)..(1763)
<223> OTHER INFORMATION: Xaa = any amino acid or absent
<220> FEATURE:
<221> NAME/KEY: MISC_FEATURE
<222> LOCATION: (1775)..(1775)
<223> OTHER INFORMATION: Xaa = any amino acid or absent
<220> FEATURE:
<221> NAME/KEY: MISC_FEATURE
<222> LOCATION: (1781)..(1782)
<223> OTHER INFORMATION: Xaa = any amino acid or absent
<220> FEATURE:
<221> NAME/KEY: MISC_FEATURE
<222> LOCATION: (1784)..(1784)
<223> OTHER INFORMATION: Xaa = any amino acid or absent
<220> FEATURE:
<221> NAME/KEY: MISC_FEATURE
<222> LOCATION: (1792)..(1793)
<223> OTHER INFORMATION: Xaa = any amino acid or absent
<220> FEATURE:
<221> NAME/KEY: MISC_FEATURE
<222> LOCATION: (1809)..(1809)
<223> OTHER INFORMATION: Xaa = any amino acid or absent
<220> FEATURE:
<221> NAME/KEY: MISC_FEATURE
<222> LOCATION: (1812)..(1812)
<223> OTHER INFORMATION: Xaa = any amino acid or absent
<220> FEATURE:
<221> NAME/KEY: MISC_FEATURE
<222> LOCATION: (1815)..(1823)
<223> OTHER INFORMATION: Xaa = any amino acid or absent
<220> FEATURE:
<221> NAME/KEY: MISC_FEATURE
<222> LOCATION: (1827)..(1827)
<223> OTHER INFORMATION: Xaa = any amino acid or absent
<220> FEATURE:
<221> NAME/KEY: MISC_FEATURE
<222> LOCATION: (1829)..(1829)
<223> OTHER INFORMATION: Xaa = any amino acid or absent
<220> FEATURE:
<221> NAME/KEY: MISC_FEATURE
<222> LOCATION: (1851)..(1851)
<223> OTHER INFORMATION: Xaa = any amino acid or absent
<220> FEATURE:
<221> NAME/KEY: MISC_FEATURE
<222> LOCATION: (1855)..(1858)
<223> OTHER INFORMATION: Xaa = any amino acid or absent
<220> FEATURE:
<221> NAME/KEY: MISC_FEATURE
<222> LOCATION: (1863)..(1863)
<223> OTHER INFORMATION: Xaa = any amino acid or absent
<220> FEATURE:
<221> NAME/KEY: MISC_FEATURE
<222> LOCATION: (1867)..(1869)
<223> OTHER INFORMATION: Xaa = any amino acid or absent
<220> FEATURE:
<221> NAME/KEY: MISC_FEATURE
```

```
<222> LOCATION: (1871)..(1871)
<223> OTHER INFORMATION: Xaa = any amino acid or absent
<220> FEATURE:
<221> NAME/KEY: MISC_FEATURE
<222> LOCATION: (1881)..(1881)
<223> OTHER INFORMATION: Xaa = any amino acid or absent
<220> FEATURE:
<221> NAME/KEY: MISC_FEATURE
<222> LOCATION: (1896)..(1896)
<223> OTHER INFORMATION: Xaa = any amino acid or absent
<220> FEATURE:
<221> NAME/KEY: MISC_FEATURE
<222> LOCATION: (1899)..(1900)
<223> OTHER INFORMATION: Xaa = any amino acid or absent
<220> FEATURE:
<221> NAME/KEY: MISC_FEATURE
<222> LOCATION: (1902)..(1902)
<223> OTHER INFORMATION: Xaa = any amino acid or absent
<220> FEATURE:
<221> NAME/KEY: MISC_FEATURE
<222> LOCATION: (1906)..(1909)
<223> OTHER INFORMATION: Xaa = any amino acid or absent
<220> FEATURE:
<221> NAME/KEY: MISC_FEATURE
<222> LOCATION: (1920)..(1922)
<223> OTHER INFORMATION: Xaa = any amino acid or absent
<220> FEATURE:
<221> NAME/KEY: MISC_FEATURE
<222> LOCATION: (1920)..(1922)
<223> OTHER INFORMATION: Xaa = any amino acid or absent
<220> FEATURE:
<221> NAME/KEY: MISC_FEATURE
<222> LOCATION: (1944)..(1944)
<223> OTHER INFORMATION: Xaa = any amino acid or absent
<220> FEATURE:
<221> NAME/KEY: MISC_FEATURE
<222> LOCATION: (1952)..(1953)
<223> OTHER INFORMATION: Xaa = any amino acid or absent
<220> FEATURE:
<221> NAME/KEY: MISC_FEATURE
<222> LOCATION: (1965)..(1965)
<223> OTHER INFORMATION: Xaa = any amino acid or absent
<220> FEATURE:
<221> NAME/KEY: MISC_FEATURE
<222> LOCATION: (1969)..(1970)
<223> OTHER INFORMATION: Xaa = any amino acid or absent
<220> FEATURE:
<221> NAME/KEY: MISC_FEATURE
<222> LOCATION: (1973)..(1973)
<223> OTHER INFORMATION: Xaa = any amino acid or absent
<220> FEATURE:
<221> NAME/KEY: MISC_FEATURE
<222> LOCATION: (1976)..(1977)
<223> OTHER INFORMATION: Xaa = any amino acid or absent
<220> FEATURE:
<221> NAME/KEY: MISC_FEATURE
<222> LOCATION: (1979)..(1979)
<223> OTHER INFORMATION: Xaa = any amino acid or absent
<220> FEATURE:
<221> NAME/KEY: MISC_FEATURE
<222> LOCATION: (1992)..(1992)
<223> OTHER INFORMATION: Xaa = any amino acid or absent
<220> FEATURE:
<221> NAME/KEY: MISC_FEATURE
<222> LOCATION: (1997)..(2004)
<223> OTHER INFORMATION: Xaa = any amino acid or absent
<220> FEATURE:
<221> NAME/KEY: MISC_FEATURE
<222> LOCATION: (2007)..(2007)
<223> OTHER INFORMATION: Xaa = any amino acid or absent
<220> FEATURE:
<221> NAME/KEY: MISC_FEATURE
<222> LOCATION: (2012)..(2012)
<223> OTHER INFORMATION: Xaa = any amino acid or absent
<220> FEATURE:
<221> NAME/KEY: MISC_FEATURE
<222> LOCATION: (2014)..(2015)
<223> OTHER INFORMATION: Xaa = any amino acid or absent
<220> FEATURE:
```

```
<221> NAME/KEY: MISC_FEATURE
<222> LOCATION: (2021)..(2021)
<223> OTHER INFORMATION: Xaa = any amino acid or absent
<220> FEATURE:
<221> NAME/KEY: MISC_FEATURE
<222> LOCATION: (2049)..(2051)
<223> OTHER INFORMATION: Xaa = any amino acid or absent
<220> FEATURE:
<221> NAME/KEY: MISC_FEATURE
<222> LOCATION: (2053)..(2053)
<223> OTHER INFORMATION: Xaa = any amino acid or absent
<220> FEATURE:
<221> NAME/KEY: MISC_FEATURE
<222> LOCATION: (2066)..(2066)
<223> OTHER INFORMATION: Xaa = any amino acid or absent
<220> FEATURE:
<221> NAME/KEY: MISC_FEATURE
<222> LOCATION: (2076)..(2076)
<223> OTHER INFORMATION: Xaa = any amino acid or absent
<220> FEATURE:
<221> NAME/KEY: MISC_FEATURE
<222> LOCATION: (2085)..(2085)
<223> OTHER INFORMATION: Xaa = any amino acid or absent
<220> FEATURE:
<221> NAME/KEY: MISC_FEATURE
<222> LOCATION: (2087)..(2087)
<223> OTHER INFORMATION: Xaa = any amino acid or absent
<220> FEATURE:
<221> NAME/KEY: MISC_FEATURE
<222> LOCATION: (2092)..(2092)
<223> OTHER INFORMATION: Xaa = any amino acid or absent
<220> FEATURE:
<221> NAME/KEY: MISC_FEATURE
<222> LOCATION: (2096)..(2097)
<223> OTHER INFORMATION: Xaa = any amino acid or absent
<220> FEATURE:
<221> NAME/KEY: MISC_FEATURE
<222> LOCATION: (2100)..(2100)
<223> OTHER INFORMATION: Xaa = any amino acid or absent
<220> FEATURE:
<221> NAME/KEY: MISC_FEATURE
<222> LOCATION: (2109)..(2165)
<223> OTHER INFORMATION: Xaa = any amino acid or absent
<220> FEATURE:
<221> NAME/KEY: MISC_FEATURE
<222> LOCATION: (2167)..(2178)
<223> OTHER INFORMATION: Xaa = any amino acid or absent
<220> FEATURE:
<221> NAME/KEY: MISC_FEATURE
<222> LOCATION: (2180)..(2186)
<223> OTHER INFORMATION: Xaa = any amino acid or absent
<220> FEATURE:
<221> NAME/KEY: MISC_FEATURE
<222> LOCATION: (2188)..(2191)
<223> OTHER INFORMATION: Xaa = any amino acid or absent
<220> FEATURE:
<221> NAME/KEY: MISC_FEATURE
<222> LOCATION: (2193)..(2209)
<223> OTHER INFORMATION: Xaa = any amino acid or absent
<220> FEATURE:
<221> NAME/KEY: MISC_FEATURE
<222> LOCATION: (2211)..(2212)
<223> OTHER INFORMATION: Xaa = any amino acid or absent
<220> FEATURE:
<221> NAME/KEY: MISC_FEATURE
<222> LOCATION: (2217)..(2218)
<223> OTHER INFORMATION: Xaa = any amino acid or absent
<220> FEATURE:
<221> NAME/KEY: MISC_FEATURE
<222> LOCATION: (2220)..(2222)
<223> OTHER INFORMATION: Xaa = any amino acid or absent
<220> FEATURE:
<221> NAME/KEY: MISC_FEATURE
<222> LOCATION: (2224)..(2225)
<223> OTHER INFORMATION: Xaa = any amino acid or absent
<220> FEATURE:
<221> NAME/KEY: MISC_FEATURE
<222> LOCATION: (2230)..(2231)
<223> OTHER INFORMATION: Xaa = any amino acid or absent
```

```
<220> FEATURE:
<221> NAME/KEY: MISC_FEATURE
<222> LOCATION: (2233)..(2235)
<223> OTHER INFORMATION: Xaa = any amino acid or absent
<220> FEATURE:
<221> NAME/KEY: MISC_FEATURE
<222> LOCATION: (2240)..(2240)
<223> OTHER INFORMATION: Xaa = any amino acid or absent
<220> FEATURE:
<221> NAME/KEY: MISC_FEATURE
<222> LOCATION: (2242)..(2242)
<223> OTHER INFORMATION: Xaa = any amino acid or absent
<220> FEATURE:
<221> NAME/KEY: MISC_FEATURE
<222> LOCATION: (2245)..(2246)
<223> OTHER INFORMATION: Xaa = any amino acid or absent
<220> FEATURE:
<221> NAME/KEY: MISC_FEATURE
<222> LOCATION: (2252)..(2252)
<223> OTHER INFORMATION: Xaa = any amino acid or absent
<220> FEATURE:
<221> NAME/KEY: MISC_FEATURE
<222> LOCATION: (2256)..(2257)
<223> OTHER INFORMATION: Xaa = any amino acid or absent
<220> FEATURE:
<221> NAME/KEY: MISC_FEATURE
<222> LOCATION: (2260)..(2260)
<223> OTHER INFORMATION: Xaa = any amino acid or absent
<220> FEATURE:
<221> NAME/KEY: MISC_FEATURE
<222> LOCATION: (2265)..(2266)
<223> OTHER INFORMATION: Xaa = any amino acid or absent
<220> FEATURE:
<221> NAME/KEY: MISC_FEATURE
<222> LOCATION: (2270)..(2271)
<223> OTHER INFORMATION: Xaa = any amino acid or absent
<220> FEATURE:
<221> NAME/KEY: MISC_FEATURE
<222> LOCATION: (2275)..(2276)
<223> OTHER INFORMATION: Xaa = any amino acid or absent
<220> FEATURE:
<221> NAME/KEY: MISC_FEATURE
<222> LOCATION: (2278)..(2279)
<223> OTHER INFORMATION: Xaa = any amino acid or absent
<220> FEATURE:
<221> NAME/KEY: MISC_FEATURE
<222> LOCATION: (2283)..(2286)
<223> OTHER INFORMATION: Xaa = any amino acid or absent
<220> FEATURE:
<221> NAME/KEY: MISC_FEATURE
<222> LOCATION: (2288)..(2288)
<223> OTHER INFORMATION: Xaa = any amino acid or absent
<220> FEATURE:
<221> NAME/KEY: MISC_FEATURE
<222> LOCATION: (2290)..(2291)
<223> OTHER INFORMATION: Xaa = any amino acid or absent
<220> FEATURE:
<221> NAME/KEY: MISC_FEATURE
<222> LOCATION: (2298)..(2298)
<223> OTHER INFORMATION: Xaa = any amino acid or absent
<220> FEATURE:
<221> NAME/KEY: MISC_FEATURE
<222> LOCATION: (2300)..(2301)
<223> OTHER INFORMATION: Xaa = any amino acid or absent
<220> FEATURE:
<221> NAME/KEY: MISC_FEATURE
<222> LOCATION: (2303)..(2308)
<223> OTHER INFORMATION: Xaa = any amino acid or absent
<220> FEATURE:
<221> NAME/KEY: MISC_FEATURE
<222> LOCATION: (2313)..(2322)
<223> OTHER INFORMATION: Xaa = any amino acid or absent
<220> FEATURE:
<221> NAME/KEY: MISC_FEATURE
<222> LOCATION: (2325)..(2327)
<223> OTHER INFORMATION: Xaa = any amino acid or absent
<220> FEATURE:
<221> NAME/KEY: MISC_FEATURE
<222> LOCATION: (2329)..(2329)
```

```
<223> OTHER INFORMATION: Xaa = any amino acid or absent
<220> FEATURE:
<221> NAME/KEY: MISC_FEATURE
<222> LOCATION: (2332)..(2332)
<223> OTHER INFORMATION: Xaa = any amino acid or absent
<220> FEATURE:
<221> NAME/KEY: MISC_FEATURE
<222> LOCATION: (2335)..(2335)
<223> OTHER INFORMATION: Xaa = any amino acid or absent
<220> FEATURE:
<221> NAME/KEY: MISC_FEATURE
<222> LOCATION: (2340)..(2340)
<223> OTHER INFORMATION: Xaa = any amino acid or absent
<220> FEATURE:
<221> NAME/KEY: MISC_FEATURE
<222> LOCATION: (2342)..(2353)
<223> OTHER INFORMATION: Xaa = any amino acid or absent
<220> FEATURE:
<221> NAME/KEY: MISC_FEATURE
<222> LOCATION: (2356)..(2356)
<223> OTHER INFORMATION: Xaa = any amino acid or absent
<220> FEATURE:
<221> NAME/KEY: MISC_FEATURE
<222> LOCATION: (2359)..(2367)
<223> OTHER INFORMATION: Xaa = any amino acid or absent
<220> FEATURE:
<221> NAME/KEY: MISC_FEATURE
<222> LOCATION: (2370)..(2370)
<223> OTHER INFORMATION: Xaa = any amino acid or absent
<220> FEATURE:
<221> NAME/KEY: MISC_FEATURE
<222> LOCATION: (2373)..(2374)
<223> OTHER INFORMATION: Xaa = any amino acid or absent
<220> FEATURE:
<221> NAME/KEY: MISC_FEATURE
<222> LOCATION: (2376)..(2406)
<223> OTHER INFORMATION: Xaa = any amino acid or absent
<220> FEATURE:
<221> NAME/KEY: MISC_FEATURE
<222> LOCATION: (2414)..(2414)
<223> OTHER INFORMATION: Xaa = any amino acid or absent
<220> FEATURE:
<221> NAME/KEY: MISC_FEATURE
<222> LOCATION: (2416)..(2416)
<223> OTHER INFORMATION: Xaa = any amino acid or absent
<220> FEATURE:
<221> NAME/KEY: MISC_FEATURE
<222> LOCATION: (2418)..(2418)
<223> OTHER INFORMATION: Xaa = any amino acid or absent
<220> FEATURE:
<221> NAME/KEY: MISC_FEATURE
<222> LOCATION: (2423)..(2503)
<223> OTHER INFORMATION: Xaa = any amino acid or absent

<400> SEQUENCE: 80

Xaa Xaa Xaa Xaa Xaa Xaa Xaa Asp Thr Leu Glu Xaa Xaa Xaa Xaa Xaa
1               5                   10                  15

Xaa Xaa Xaa Xaa Xaa Xaa Xaa Xaa Xaa Xaa Arg Xaa Xaa Xaa Xaa
            20                  25                  30

Xaa Leu Ala Cys Thr Val Xaa Asp His Xaa Ser Ile Ala Xaa Xaa Gln
        35                  40                  45

Asn Xaa Val Pro Ile Ile Arg Asp Ile Xaa Leu Xaa Asn Xaa Xaa Asp
    50                  55                  60

Xaa Asp Leu Ala Asp Val Xaa Leu Xaa Ile Xaa Ala Xaa Pro Xaa Leu
65                  70                  75                  80

Xaa Arg Pro Leu Thr Leu Xaa Ile Xaa Arg Ile Xaa Ala Gly Xaa Xaa
                85                  90                  95

Xaa Xaa Ile Asp Xaa Pro Asp Leu Arg Ile Asp Xaa Ala Ile Leu Xaa
            100                 105                 110

Xaa Xaa Xaa Xaa Ala Gly Xaa Xaa Glu Ser Xaa Xaa Xaa Xaa Val Thr
            115                 120                 125
```

```
Leu Xaa Leu Xaa Xaa Ser Xaa Xaa Xaa Xaa Xaa Xaa Xaa Glu Xaa
    130                 135                 140

Ala Arg Glu Xaa Xaa Asp Leu Arg Leu Leu Pro Ser His Trp Gly
145                 150                 155                 160

Gly Xaa Xaa Ala Ala Pro Glu Leu Leu Ala Ala Phe Val Arg Pro Asn
            165                 170                 175

Asp Pro Ala Val Asp Xaa Ile Leu Arg Xaa Ala Xaa Ile Leu Xaa
                180                 185                 190

Arg Ala Xaa Arg Xaa Thr Ala Xaa Xaa Asp Gly Tyr Xaa Ser Gly Arg
        195                 200                 205

Lys Ala Arg Ala Trp Glu Met Ala Glu Ala Ile Xaa Ala Xaa Xaa Xaa
210                 215                 220

Xaa Xaa Ala Met Ala Xaa Xaa Xaa Xaa Xaa Xaa Xaa Xaa Xaa
225                 230                 235                 240

Xaa Arg Ile Xaa Xaa Xaa Xaa Xaa Xaa Tyr Val Leu Pro Pro Ala Ser
                245                 250                 255

Phe Glu Arg Ser Gly Gln Lys Val Arg Xaa Pro Xaa Xaa Ile Val Glu
        260                 265                 270

Arg Arg Leu Xaa Thr Cys Leu Asp Leu Thr Leu Leu Trp Ala Ala Cys
            275                 280                 285

Xaa Glu Gln Ala Gly Leu Asn Pro Leu Leu Val Leu Thr Xaa Xaa His
    290                 295                 300

Ala Xaa Leu Gly Leu Trp Leu Xaa Asp Glu Xaa Xaa Xaa Xaa Xaa
305                 310                 315                 320

Xaa Asp Asp Xaa Gln Xaa Leu Arg Lys Arg Arg Asp Leu Gln Glu Xaa
                325                 330                 335

Xaa Xaa Xaa Xaa Xaa Xaa Xaa Xaa Xaa Xaa Leu Ile Leu Ile Glu
            340                 345                 350

Thr Thr Ile Leu Thr Xaa Xaa Xaa Xaa Xaa Xaa Xaa Xaa Asp Pro
        355                 360                 365

Pro Xaa Xaa Phe Xaa Xaa Ala Xaa Xaa Xaa Gly Ala Xaa Xaa Ile Asp
        370                 375                 380

Xaa Asp Ala Xaa Ala Xaa Leu Glu Met Xaa Leu Asp Leu Arg Arg Xaa
385                 390                 395                 400

Arg Xaa Xaa Gly Ile Xaa Pro Leu Asp Xaa Gly Glu Xaa Xaa Xaa Xaa
        405                 410                 415

Xaa Xaa Xaa Xaa Ala Pro Xaa Xaa Xaa Xaa Xaa Xaa Xaa Leu Xaa
            420                 425                 430

Xaa Xaa Gln Xaa Leu Xaa Xaa Xaa Xaa Xaa Xaa Xaa Ala Pro
        435                 440                 445

Pro Ser Phe Xaa Glu Asp Xaa Xaa Xaa Xaa Ile Asp Xaa Xaa Xaa
450                 455                 460

Xaa Xaa Xaa Pro Xaa Xaa Arg Leu Glu Xaa Trp Lys Xaa Arg Leu Leu
465                 470                 475                 480

Asp Leu Thr Leu Arg Asn Lys Leu Leu Asn Phe Lys Pro Gly Lys Gly
                485                 490                 495

Ser Leu Thr Leu Asp Cys Xaa Glu Pro Gly Ala Xaa Glu Asp Xaa Leu
        500                 505                 510

Xaa Ala Gly Xaa Xaa Phe Arg Leu Xaa Xaa Arg Pro Xaa Xaa Xaa
        515                 520                 525

Xaa Asp Xaa Xaa Xaa Xaa Xaa Xaa Xaa Xaa Xaa Xaa Xaa Xaa Xaa
530                 535                 540
```

```
Xaa Xaa Xaa Xaa Xaa Xaa Xaa Xaa Xaa Xaa Xaa Ala Xaa Xaa
545                 550                 555                 560

Xaa Arg Xaa Glu Ile Xaa Xaa Xaa Xaa Xaa Xaa Xaa Xaa Xaa
            565                 570                 575

Xaa Xaa Xaa Xaa Xaa Xaa Xaa Glu Leu Glu Xaa Arg Leu Xaa Asp Leu
        580                 585                 590

Phe Arg Leu Ala Arg Xaa Xaa Phe Glu Glu Gly Gly Ala Asn Val Leu
    595                 600                 605

Phe Leu Ala Xaa Gly Phe Leu Thr Trp Thr Arg Xaa Gly Xaa Xaa
    610                 615                 620

Xaa Xaa Xaa Arg Ala Pro Leu Leu Val Pro Xaa Ala Leu Xaa Arg
625                 630                 635                 640

Ala Ser Val Arg Ala Gly Phe Arg Leu Xaa Xaa His Asp Glu Xaa
                645                 650                 655

Arg Leu Asn Pro Thr Leu Leu Glu Met Leu Arg Gln Asp Phe Xaa Leu
            660                 665                 670

Xaa Met Pro Asp Xaa Xaa Xaa Xaa Leu Pro Xaa Asp Xaa Ser Gly Ile
        675                 680                 685

Asp Val Glu Xaa Ile Trp Arg Ile Val Arg Thr His Ile Arg Asp Leu
    690                 695                 700

Lys Gly Trp Glu Val Xaa Xaa Glu Val Val Leu Ser Ala Phe Ser Phe
705                 710                 715                 720

Thr Lys Phe Leu Met Trp Lys Asp Leu Xaa Glu Arg Xaa Asp Leu Leu
                725                 730                 735

Lys Arg Ser Pro Val Val Arg His Leu Leu Asp Thr Pro Lys Xaa Ala
            740                 745                 750

Tyr Gly Asp Gly Xaa Xaa Xaa Thr Xaa Phe Pro Xaa Pro Xaa Arg Leu
    755                 760                 765

Asp Xaa Glu His Pro Pro Xaa Xaa Ile Phe Xaa Xaa Xaa Xaa Pro
    770                 775                 780

Leu Xaa Ala Asp Ser Ser Gln Leu Ser Ala Ile Leu Ala Ala Ser
785                 790                 795                 800

Gly Lys Asp Phe Val Leu Phe Gly Pro Pro Gly Thr Gly Lys Ser Xaa
                805                 810                 815

Xaa Xaa Xaa Xaa Xaa Xaa Xaa Xaa Gln Thr Ile Xaa Asn Met Ile
        820                 825                 830

Ala Gln Cys Leu Ala Xaa Xaa Gly Arg Thr Val Leu Phe Val Ser Gln
                835                 840                 845

Lys Ser Ala Ala Leu Glu Val Val Xaa Xaa Arg Arg Arg Leu Xaa Xaa
850                 855                 860

Val Gly Leu Gly Xaa Xaa Cys Leu Glu Val His Ala Xaa Lys Ala Gln
865                 870                 875                 880

Lys Thr Xaa Val Ile Xaa Gln Leu Arg Glu Ala Trp Xaa Xaa Arg Xaa
            885                 890                 895

Xaa Xaa Xaa Xaa Xaa Xaa Trp Asp Xaa Ala Xaa Xaa Asp Leu Xaa Xaa
        900                 905                 910

Xaa Arg Glu Xaa Leu Asn Gly Val Val Xaa Ser Leu His Xaa Xaa Arg
    915                 920                 925

Xaa Asn Gly Leu Ser Ala His Xaa Ala Xaa Gly Arg Val Ile Ala Xaa
        930                 935                 940

Xaa Xaa Xaa Gly Xaa Xaa Xaa Xaa Leu Xaa Leu Xaa Trp Pro Xaa Xaa
945                 950                 955                 960

Xaa Xaa Xaa Xaa Xaa Xaa Xaa Xaa Xaa Ser Leu Xaa Xaa Xaa Xaa
```

965                 970                 975
Xaa Arg Ala Xaa Cys Xaa Glu Leu Xaa Xaa Xaa Xaa Leu Xaa Xaa
            980                 985                 990
Xaa Val Gly Xaa Ile Xaa Asp His Pro Leu Arg Gly Ile Xaa Ala Xaa
        995                 1000                1005
Xaa Trp Ser Pro Leu Trp Arg Xaa Glu Met Xaa Xaa Ala Ile Xaa
    1010                1015                1020
Xaa Leu Xaa Arg Thr Leu Xaa Xaa Xaa Xaa Xaa Ser Gly Gln Xaa
    1025                1030                1035
Xaa Ala Glu Ala Met Gly Leu Xaa Xaa Leu Xaa Xaa Thr Tyr Xaa
    1040                1045                1050
Gly Xaa Xaa Arg Xaa Leu Xaa Xaa Leu Xaa Xaa Xaa Leu Xaa Arg
    1055                1060                1065
Xaa Glu Ala Arg Xaa Gly Leu Xaa Phe Leu Xaa Xaa Gly Xaa Xaa
    1070                1075                1080
Xaa Leu Arg Gln Ala Val Xaa Ala Arg Xaa Xaa Xaa Gln Xaa Xaa
    1085                1090                1095
Xaa Ala Arg Leu Xaa Xaa Arg Leu Xaa Xaa Xaa Tyr Xaa Xaa Pro
    1100                1105                1110
Xaa Val Xaa Xaa Xaa Asp Leu Xaa Xaa Leu Leu Ala Glu Trp Xaa
    1115                1120                1125
Xaa Ala Lys Xaa Ser Asn Phe Xaa Leu Arg Gly Xaa Arg Leu Xaa
    1130                1135                1140
Arg Val Xaa Xaa Xaa Leu Xaa Pro Phe Ala Gln Gly Xaa Xaa Pro
    1145                1150                1155
Xaa Asp Ile Gly Pro Asp Leu Xaa Xaa Leu Xaa Glu Ile Xaa Xaa
    1160                1165                1170
Xaa Xaa Xaa Xaa Xaa Xaa Xaa Xaa Xaa Xaa Xaa Xaa Xaa Xaa Xaa
    1175                1180                1185
Xaa Xaa Xaa Val Xaa Glu Xaa Xaa Xaa Ala Xaa Leu Gly Xaa Xaa
    1190                1195                1200
Xaa Pro Xaa Xaa Xaa Xaa Trp Ser Asp Pro Xaa Xaa Pro Ala Xaa
    1205                1210                1215
Xaa Phe Xaa Ala Xaa Met Ala Trp Ala Xaa Arg Leu Xaa Xaa Val
    1220                1225                1230
Ile Xaa Xaa Met Xaa Pro Leu Xaa Xaa Xaa Gly Xaa Asp Xaa Val
    1235                1240                1245
Arg Xaa Xaa Leu Xaa Xaa Xaa Xaa Xaa Xaa Leu Asp Xaa Glu Xaa
    1250                1255                1260
Xaa Xaa Leu Xaa Xaa Xaa Xaa Xaa Xaa Xaa Xaa Xaa Xaa Xaa Gly
    1265                1270                1275
Gly Xaa Leu Ala Xaa Ala Xaa Xaa Xaa Phe Xaa Xaa Xaa Arg Xaa
    1280                1285                1290
Xaa Ala Val Lys Ala Ile Glu Xaa Leu Gly Arg Xaa Xaa Xaa Xaa
    1295                1300                1305
Xaa Xaa Xaa Xaa Xaa Leu Ala Gly Arg Ala Xaa Pro Asp Xaa Xaa
    1310                1315                1320
Xaa Xaa Pro Val Xaa Xaa Glu Xaa Xaa Xaa Xaa Xaa Xaa Xaa
    1325                1330                1335
Xaa Xaa Xaa Xaa Xaa Xaa Xaa Xaa Xaa Xaa Xaa Xaa Xaa Xaa
    1340                1345                1350
Xaa Xaa Xaa Xaa Xaa Xaa Xaa Xaa Xaa Xaa Xaa Xaa Xaa Xaa Xaa
    1355                1360                1365

```
Xaa Xaa Xaa Xaa Xaa Xaa Xaa  Xaa Xaa Xaa Xaa Xaa  Xaa Xaa Xaa
    1370            1375              1380

Xaa Xaa Xaa Xaa Xaa Xaa Xaa  Xaa Xaa Xaa Xaa Xaa  Xaa Xaa Xaa
    1385            1390              1395

Xaa Xaa Xaa Xaa Xaa Xaa Xaa  Xaa Xaa Xaa Xaa Xaa  Xaa Xaa Xaa
    1400            1405              1410

Xaa Xaa Xaa Xaa Xaa Xaa Xaa  Xaa Xaa Xaa Xaa Xaa  Xaa Xaa Xaa
    1415            1420              1425

Xaa Xaa Xaa Xaa Xaa Xaa Xaa  Xaa Xaa Xaa Xaa Xaa  Xaa Xaa Xaa
    1430            1435              1440

Xaa Xaa Xaa Xaa Xaa Xaa Xaa  Xaa Xaa Asp Xaa Trp  Val Xaa Xaa
    1445            1450              1455

Thr Leu Ala Val

```
Tyr Tyr Xaa Gly Xaa Leu Val Thr Phe Pro Ser Pro Val Thr Asp
1760                1765                1770

Asp Xaa Arg Ala Val Arg Leu Xaa Xaa Val Xaa Asp Gly Leu Tyr
1775                1780                1785

Glu Arg Gly Xaa Xaa Arg Val Asn Arg Pro Glu Ala Arg Ala Leu
1790                1795                1800

Val Ala Glu Val Val Xaa Arg Leu Xaa Asp Pro Xaa Xaa Xaa Xaa
1805                1810                1815

Xaa Xaa Xaa Xaa Xaa Ala Phe Ala Xaa Glu Xaa Arg Ser Leu Gly
1820                1825                1830

Ile Val Thr Phe Asn Gly Glu Gln Gln Arg Leu Ile Glu Asn Leu
1835                1840                1845

Leu Asp Xaa Glu Arg Arg Xaa Xaa Xaa Pro Glu Leu Glu Xaa
1850                1855                1860

Phe Phe Asp Xaa Xaa Xaa Trp Xaa Glu Pro Val Phe Val Lys Asn
1865                1870                1875

Leu Glu Xaa Val Gln Gly Asp Glu Arg Asp Ala Ile Leu Phe Ser
1880                1885                1890

Val Ala Xaa Gly Pro Xaa Xaa Asp Xaa Thr Gly Arg Xaa Xaa Xaa
1895                1900                1905

Xaa Ile Ser Ser Leu Asn Arg Glu Gly Gly His Xaa Xaa Xaa Arg
1910                1915                1920

Arg Leu Asn Val Ala Ile Thr Arg Ala Arg Arg Glu Leu Val Val
1925                1930                1935

Phe Ala Ser Met Arg Xaa Asp Gln Val Asp Leu Gly Arg Xaa Xaa
1940                1945                1950

Ala Arg Gly Val Arg Asp Phe Lys His Phe Leu Xaa Phe Ala Glu
1955                1960                1965

Xaa Xaa Gly Ala Xaa Ala Leu Xaa Xaa Ala Xaa Ala Pro Thr Gly
1970                1975                1980

Gly Asp Ile Glu Ser Pro Phe Glu Xaa Ala Val Met Ala Xaa Xaa
1985                1990                1995

Xaa Xaa Xaa Xaa Xaa Xaa Ala Leu Xaa Ala Arg Gly Trp Xaa Ile
2000                2005                2010

Xaa Xaa Gln Val Gly Val Ser Xaa Phe Arg Ile Asp Leu Gly Ile
2015                2020                2025

Val His Pro Asp Ala Pro Gly Arg Tyr Leu Ala Gly Val Glu Cys
2030                2035                2040

Asp Gly Ala Thr Tyr Xaa Xaa Xaa His Xaa Ala Ala Thr Ala Arg
2045                2050                2055

Asp Arg Asp Arg Leu Arg Glu Xaa Val Leu Thr Asp Leu Gly Trp
2060                2065                2070

Arg Ile Xaa Arg Val Trp Ser Thr Asp Trp Trp Xaa Asp Xaa Gln
2075                2080                2085

Gly Ala Leu Xaa Arg Leu Asp Xaa Xaa Leu Arg Xaa Asp Leu Asp
2090                2095                2100

Ala Asp Arg Ala Lys Xaa Xaa Xaa Xaa Xaa Xaa Xaa Xaa Xaa Xaa
2105                2110                2115

Xaa Xaa Xaa Xaa Xaa Xaa Xaa Xaa Xaa Xaa Xaa Xaa Xaa Xaa Xaa
2120                2125                2130

Xaa Xaa Xaa Xaa Xaa Xaa Xaa Xaa Xaa Xaa Xaa Xaa Xaa Xaa Xaa
2135                2140                2145

Xaa Xaa Xaa Xaa Xaa Xaa Xaa Xaa Xaa Xaa Xaa Xaa Xaa Xaa Xaa
```

```
                        2150                2155                2160

Xaa  Xaa  Pro  Xaa  Xaa  Xaa  Xaa  Xaa  Xaa  Xaa  Xaa  Xaa  Xaa
     2165                2170                2175

Pro  Xaa  Xaa  Xaa  Xaa  Xaa  Xaa  Gln  Xaa  Xaa  Xaa  Pro  Xaa
     2180                2185                2190

Xaa  Xaa  Xaa  Xaa  Xaa  Xaa  Xaa  Xaa  Xaa  Xaa  Xaa  Xaa  Xaa
     2195                2200                2205

Xaa  Tyr  Xaa  Xaa  Ala  Asp  Leu  Ser  Xaa  Xaa  Gly  Xaa  Xaa  Xaa  Asp
     2210                2215                2220

Xaa  Xaa  Arg  Phe  His  Asp  Xaa  Xaa  Tyr  Xaa  Xaa  Xaa  Leu  Ala  Ala
     2225                2230                2235

Met  Xaa  Ala  Xaa  Val  Val  Xaa  Xaa  Glu  Gly  Pro  Val  Phe  Xaa  Asp
     2240                2245                2250

Ile  Leu  Xaa  Xaa  Arg  Leu  Xaa  Arg  Ala  His  Gly  Xaa  Xaa  Arg  Ile
     2255                2260                2265

Thr  Xaa  Xaa  Leu  Arg  Gln  Xaa  Xaa  Leu  Xaa  Xaa  Val  Asp  Pro  Xaa
     2270                2275                2280

Xaa  Xaa  Xaa  Thr  Xaa  Glu  Xaa  Xaa  Arg  Ile  Val  Leu  Trp  Pro  Xaa
     2285                2290                2295

Gly  Xaa  Xaa  Pro  Xaa  Xaa  Xaa  Xaa  Xaa  Phe  Arg  Pro  Ala  Xaa
     2300                2305                2310

Xaa  Xaa  Xaa  Xaa  Xaa  Xaa  Xaa  Xaa  Xaa  Arg  Ala  Xaa  Xaa  Xaa  Asp
     2315                2320                2325

Xaa  Pro  Leu  Xaa  Glu  Leu  Xaa  Gly  Leu  Ala  Arg  Xaa  Leu  Xaa  Xaa
     2330                2335                2340

Xaa  Xaa  Xaa  Xaa  Xaa  Xaa  Xaa  Xaa  Xaa  Met  Ala  Xaa  Arg  Leu
     2345                2350                2355

Xaa  Xaa  Xaa  Xaa  Xaa  Xaa  Xaa  Xaa  Gly  Leu  Xaa  Arg  Met  Xaa
     2360                2365                2370

Xaa  Ala  Xaa  Xaa  Xaa  Xaa  Xaa  Xaa  Xaa  Xaa  Xaa  Xaa  Xaa  Xaa
     2375                2380                2385

Xaa  Xaa  Xaa  Xaa  Xaa  Xaa  Xaa  Xaa  Xaa  Xaa  Xaa  Xaa  Xaa
     2390                2395                2400

Xaa  Xaa  Xaa  Arg  Ala  Arg  Phe  Ala  Glu  Ala  Xaa  Ala  Xaa  Leu  Xaa
     2405                2410                2415

Ala  Arg  Glu  Ser  Xaa  Xaa  Xaa  Xaa  Xaa  Xaa  Xaa  Xaa  Xaa  Xaa
     2420                2425                2430

Xaa  Xaa  Xaa  Xaa  Xaa  Xaa  Xaa  Xaa  Xaa  Xaa  Xaa  Xaa  Xaa  Xaa
     2435                2440                2445

Xaa  Xaa  Xaa  Xaa  Xaa  Xaa  Xaa  Xaa  Xaa  Xaa  Xaa  Xaa  Xaa  Xaa
     2450                2455                2460

Xaa  Xaa  Xaa  Xaa  Xaa  Xaa  Xaa  Xaa  Xaa  Xaa  Xaa  Xaa  Xaa  Xaa
     2465                2470                2475

Xaa  Xaa  Xaa  Xaa  Xaa  Xaa  Xaa  Xaa  Xaa  Xaa  Xaa  Xaa  Xaa  Xaa
     2480                2485                2490

Xaa  Xaa  Xaa  Xaa  Xaa  Xaa  Xaa  Xaa  Xaa  Xaa
     2495                2500

<210> SEQ ID NO 81
<211> LENGTH: 409
<212> TYPE: PRT
<213> ORGANISM: Methylobacterium
<220> FEATURE:
<221> NAME/KEY: MISC_FEATURE
<222> LOCATION: (1)..(84)
```

```
<223> OTHER INFORMATION: Xaa = any amino acid or absent
<220> FEATURE:
<221> NAME/KEY: MISC_FEATURE
<222> LOCATION: (105)..(105)
<223> OTHER INFORMATION: Xaa = any amino acid or absent
<220> FEATURE:
<221> NAME/KEY: MISC_FEATURE
<222> LOCATION: (115)..(115)
<223> OTHER INFORMATION: Xaa = any amino acid or absent
<220> FEATURE:
<221> NAME/KEY: MISC_FEATURE
<222> LOCATION: (117)..(117)
<223> OTHER INFORMATION: Xaa = any amino acid or absent
<220> FEATURE:
<221> NAME/KEY: MISC_FEATURE
<222> LOCATION: (130)..(130)
<223> OTHER INFORMATION: Xaa = any amino acid or absent
<220> FEATURE:
<221> NAME/KEY: MISC_FEATURE
<222> LOCATION: (132)..(132)
<223> OTHER INFORMATION: Xaa = any amino acid or absent
<220> FEATURE:
<221> NAME/KEY: MISC_FEATURE
<222> LOCATION: (143)..(144)
<223> OTHER INFORMATION: Xaa = any amino acid or absent
<220> FEATURE:
<221> NAME/KEY: MISC_FEATURE
<222> LOCATION: (153)..(159)
<223> OTHER INFORMATION: Xaa = any amino acid or absent
<220> FEATURE:
<221> NAME/KEY: MISC_FEATURE
<222> LOCATION: (173)..(208)
<223> OTHER INFORMATION: Xaa = any amino acid or absent
<220> FEATURE:
<221> NAME/KEY: MISC_FEATURE
<222> LOCATION: (220)..(226)
<223> OTHER INFORMATION: Xaa = any amino acid or absent
<220> FEATURE:
<221> NAME/KEY: MISC_FEATURE
<222> LOCATION: (238)..(247)
<223> OTHER INFORMATION: Xaa = any amino acid or absent
<220> FEATURE:
<221> NAME/KEY: MISC_FEATURE
<222> LOCATION: (260)..(260)
<223> OTHER INFORMATION: Xaa = any amino acid or absent
<220> FEATURE:
<221> NAME/KEY: MISC_FEATURE
<222> LOCATION: (267)..(269)
<223> OTHER INFORMATION: Xaa = any amino acid or absent
<220> FEATURE:
<221> NAME/KEY: MISC_FEATURE
<222> LOCATION: (285)..(285)
<223> OTHER INFORMATION: Xaa = any amino acid or absent
<220> FEATURE:
<221> NAME/KEY: MISC_FEATURE
<222> LOCATION: (298)..(298)
<223> OTHER INFORMATION: Xaa = any amino acid or absent
<220> FEATURE:
<221> NAME/KEY: MISC_FEATURE
<222> LOCATION: (300)..(301)
<223> OTHER INFORMATION: Xaa = any amino acid or absent
<220> FEATURE:
<221> NAME/KEY: MISC_FEATURE
<222> LOCATION: (303)..(303)
<223> OTHER INFORMATION: Xaa = any amino acid or absent
<220> FEATURE:
<221> NAME/KEY: MISC_FEATURE
<222> LOCATION: (305)..(306)
<223> OTHER INFORMATION: Xaa = any amino acid or absent
<220> FEATURE:
<221> NAME/KEY: MISC_FEATURE
<222> LOCATION: (320)..(322)
<223> OTHER INFORMATION: Xaa = any amino acid or absent
<220> FEATURE:
<221> NAME/KEY: MISC_FEATURE
<222> LOCATION: (324)..(324)
<223> OTHER INFORMATION: Xaa = any amino acid or absent
<220> FEATURE:
<221> NAME/KEY: MISC_FEATURE
```

```
<222> LOCATION: (327)..(328)
<223> OTHER INFORMATION: Xaa = any amino acid or absent
<220> FEATURE:
<221> NAME/KEY: MISC_FEATURE
<222> LOCATION: (330)..(330)
<223> OTHER INFORMATION: Xaa = any amino acid or absent
<220> FEATURE:
<221> NAME/KEY: MISC_FEATURE
<222> LOCATION: (333)..(335)
<223> OTHER INFORMATION: Xaa = any amino acid or absent
<220> FEATURE:
<221> NAME/KEY: MISC_FEATURE
<222> LOCATION: (349)..(349)
<223> OTHER INFORMATION: Xaa = any amino acid or absent
<220> FEATURE:
<221> NAME/KEY: MISC_FEATURE
<222> LOCATION: (368)..(382)
<223> OTHER INFORMATION: Xaa = any amino acid or absent
<220> FEATURE:
<221> NAME/KEY: MISC_FEATURE
<222> LOCATION: (386)..(409)
<223> OTHER INFORMATION: Xaa = any amino acid or absent

<400> SEQUENCE: 81

Xaa Xaa Xaa Xaa Xaa Xaa Xaa Xaa Xaa Xaa Xaa Xaa Xaa Xaa Xaa Xaa
1               5                   10                  15

Xaa Xaa Xaa Xaa Xaa Xaa Xaa Xaa Xaa Xaa Xaa Xaa Xaa Xaa Xaa Xaa
            20                  25                  30

Xaa Xaa Xaa Xaa Xaa Xaa Xaa Xaa Xaa Xaa Xaa Xaa Xaa Xaa Xaa Xaa
        35                  40                  45

Xaa Xaa Xaa Xaa Xaa Xaa Xaa Xaa Xaa Xaa Xaa Xaa Xaa Xaa Xaa Xaa
    50                  55                  60

Xaa Xaa Xaa Xaa Xaa Xaa Xaa Xaa Xaa Xaa Xaa Xaa Xaa Xaa Xaa Xaa
65                  70                  75                  80

Xaa Xaa Xaa Xaa Met Gln Thr Ile Leu Tyr Ala Arg Val Ser Thr Ala
                85                  90                  95

Asp Gln Thr Ile Ala His Gln Arg Xaa Gln Ala Glu Ala Ala Gly Phe
            100                 105                 110

Lys Ile Xaa Asp Xaa Val Val Ala Asp Glu Gly Val Ser Gly Val Ser
        115                 120                 125

Thr Xaa Leu Xaa Asp Arg Pro Gln Gly Arg Arg Leu Phe Asp Xaa Xaa
    130                 135                 140

Met Leu Arg Arg Gly Asp Val Leu Xaa Xaa Xaa Xaa Xaa Xaa Xaa Val
145                 150                 155                 160

Val Arg Trp Val Asp Arg Leu Gly Arg Asn Tyr Ala Xaa Xaa Xaa Xaa
                165                 170                 175

Xaa Xaa Xaa Xaa Xaa Xaa Xaa Xaa Xaa Xaa Xaa Xaa Xaa Xaa Xaa Xaa
            180                 185                 190

Xaa Xaa Xaa Xaa Xaa Xaa Xaa Xaa Xaa Xaa Xaa Xaa Xaa Xaa Xaa Xaa
        195                 200                 205

Asp Val Thr Glu Thr Ile Arg Glu Phe Met Arg Xaa Xaa Xaa Xaa Xaa
    210                 215                 220

Xaa Xaa Arg Gly Val Ile Val Arg Thr Val Ile Asn Asn Xaa Xaa Xaa
225                 230                 235                 240

Xaa Xaa Xaa Xaa Xaa Xaa Xaa Met Thr Phe Asp Gly Ala Thr Thr Asp
                245                 250                 255

Pro Met Gln Xaa Ala Val Arg Asp Ala Leu Xaa Xaa Xaa Ile Gly Phe
            260                 265                 270

Met Ala Ala Thr Ala Gln Ala Gln Ala Glu Ala Thr Xaa Lys Glu Ala
        275                 280                 285
```

```
Gln Lys Ala Gly Ile Glu His Ala Lys Xaa Arg Xaa Xaa Glu Xaa Asp
        290                 295                 300

Xaa Xaa Ala Tyr Arg Gly Arg Lys Pro Ser Tyr Thr Arg Glu Gln Xaa
305                 310                 315                 320

Xaa Xaa Asp Xaa Val Arg Xaa Xaa Leu Xaa Gln Gly Xaa Xaa Xaa Val
                325                 330                 335

Ser Ala Ile Ala Lys Ala Thr Gly Leu Ser Arg Gln Xaa Thr Val Tyr
                340                 345                 350

Arg Ile Arg Asp Asn Pro Ala Glu Ala Glu Ala Ala Leu Ala Arg Xaa
                355                 360                 365

Xaa Xaa Xaa Xaa Xaa Xaa Xaa Xaa Xaa Xaa Xaa Xaa Xaa Xaa Trp Ala
        370                 375                 380

Ala Xaa Xaa Xaa Xaa Xaa Xaa Xaa Xaa Xaa Xaa Xaa Xaa Xaa Xaa Xaa
385                 390                 395                 400

Xaa Xaa Xaa Xaa Xaa Xaa Xaa Xaa Xaa
                405

<210> SEQ ID NO 82
<211> LENGTH: 218
<212> TYPE: PRT
<213> ORGANISM: Methylobacterium
<220> FEATURE:
<221> NAME/KEY: MISC_FEATURE
<222> LOCATION: (2)..(19)
<223> OTHER INFORMATION: Xaa = any amino acid or absent
<220> FEATURE:
<221> NAME/KEY: MISC_FEATURE
<222> LOCATION: (23)..(23)
<223> OTHER INFORMATION: Xaa = any amino acid or absent
<220> FEATURE:
<221> NAME/KEY: MISC_FEATURE
<222> LOCATION: (25)..(26)
<223> OTHER INFORMATION: Xaa = any amino acid or absent
<220> FEATURE:
<221> NAME/KEY: MISC_FEATURE
<222> LOCATION: (47)..(47)
<223> OTHER INFORMATION: Xaa = any amino acid or absent
<220> FEATURE:
<221> NAME/KEY: MISC_FEATURE
<222> LOCATION: (51)..(54)
<223> OTHER INFORMATION: Xaa = any amino acid or absent
<220> FEATURE:
<221> NAME/KEY: MISC_FEATURE
<222> LOCATION: (56)..(60)
<223> OTHER INFORMATION: Xaa = any amino acid or absent
<220> FEATURE:
<221> NAME/KEY: MISC_FEATURE
<222> LOCATION: (62)..(62)
<223> OTHER INFORMATION: Xaa = any amino acid or absent
<220> FEATURE:
<221> NAME/KEY: MISC_FEATURE
<222> LOCATION: (74)..(130)
<223> OTHER INFORMATION: Xaa = any amino acid or absent
<220> FEATURE:
<221> NAME/KEY: MISC_FEATURE
<222> LOCATION: (136)..(140)
<223> OTHER INFORMATION: Xaa = any amino acid or absent
<220> FEATURE:
<221> NAME/KEY: MISC_FEATURE
<222> LOCATION: (144)..(145)
<223> OTHER INFORMATION: Xaa = any amino acid or absent
<220> FEATURE:
<221> NAME/KEY: MISC_FEATURE
<222> LOCATION: (147)..(161)
<223> OTHER INFORMATION: Xaa = any amino acid or absent
<220> FEATURE:
<221> NAME/KEY: MISC_FEATURE
<222> LOCATION: (163)..(163)
<223> OTHER INFORMATION: Xaa = any amino acid or absent
<220> FEATURE:
<221> NAME/KEY: MISC_FEATURE
```

```
<222> LOCATION: (166)..(218)
<223> OTHER INFORMATION: Xaa = any amino acid or absent

<400> SEQUENCE: 82

Met Xaa Xaa Xaa Xaa Xaa Xaa Xaa Xaa Xaa Xaa Xaa Xaa Xaa Xaa
 1               5                  10                  15

Xaa Xaa Xaa Tyr Asp Asp Xaa Ile Xaa Xaa Ala Asp Ala Ala Gly
             20                  25                  30

Glu Glu Arg Asp Ala Ile Met Arg Ala Leu Ala Glu Asp Met Xaa Glu
         35                  40                  45

Ala Ser Xaa Xaa Xaa Xaa Arg Xaa Xaa Xaa Xaa Gly Xaa Phe Val
         50                  55                  60

Arg Ala Glu Arg Pro Ala Asp Leu Ala Xaa Xaa Xaa Xaa Xaa Xaa
 65                  70                  75                  80

Xaa Xaa Xaa Xaa Xaa Xaa Xaa Xaa Xaa Xaa Xaa Xaa Xaa Xaa Xaa
             85                  90                  95

Xaa Xaa Xaa Xaa Xaa Xaa Xaa Xaa Xaa Xaa Xaa Xaa Xaa Xaa Xaa
            100                 105                 110

Xaa Xaa Xaa Xaa Xaa Xaa Xaa Xaa Xaa Xaa Xaa Xaa Xaa Xaa Xaa
            115                 120                 125

Xaa Xaa Arg Ala Leu Gly Arg Xaa Xaa Xaa Xaa Asp Arg Arg Xaa
        130                 135                 140

Xaa Gln Xaa Xaa Xaa Xaa Xaa Xaa Xaa Xaa Xaa Xaa Xaa Xaa Xaa
145                 150                 155                 160

Xaa Arg Xaa Ala Ser Xaa Xaa Xaa Xaa Xaa Xaa Xaa Xaa Xaa Xaa
                165                 170                 175

Xaa Xaa Xaa Xaa Xaa Xaa Xaa Xaa Xaa Xaa Xaa Xaa Xaa Xaa Xaa
            180                 185                 190

Xaa Xaa Xaa Xaa Xaa Xaa Xaa Xaa Xaa Xaa Xaa Xaa Xaa Xaa Xaa
            195                 200                 205

Xaa Xaa Xaa Xaa Xaa Xaa Xaa Xaa Xaa Xaa
            210                 215

<210> SEQ ID NO 83
<211> LENGTH: 77
<212> TYPE: PRT
<213> ORGANISM: Methylobacterium
<220> FEATURE:
<221> NAME/KEY: MISC_FEATURE
<222> LOCATION: (1)..(17)
<223> OTHER INFORMATION: Xaa = any amino acid or absent
<220> FEATURE:
<221> NAME/KEY: MISC_FEATURE
<222> LOCATION: (21)..(22)
<223> OTHER INFORMATION: Xaa = any amino acid or absent
<220> FEATURE:
<221> NAME/KEY: MISC_FEATURE
<222> LOCATION: (40)..(40)
<223> OTHER INFORMATION: Xaa = any amino acid or absent
<220> FEATURE:
<221> NAME/KEY: MISC_FEATURE
<222> LOCATION: (50)..(51)
<223> OTHER INFORMATION: Xaa = any amino acid or absent
<220> FEATURE:
<221> NAME/KEY: MISC_FEATURE
<222> LOCATION: (67)..(67)
<223> OTHER INFORMATION: Xaa = any amino acid or absent
<220> FEATURE:
<221> NAME/KEY: MISC_FEATURE
<222> LOCATION: (72)..(73)
<223> OTHER INFORMATION: Xaa = any amino acid or absent

<400> SEQUENCE: 83
```

```
Xaa Xaa Xaa Xaa Xaa Xaa Xaa Xaa Xaa Xaa Xaa Xaa Xaa Xaa Xaa
1               5                   10                  15

Xaa Met Pro Val Xaa Xaa Gly Ile Gly Ile Gly Arg Gly Asp Pro Leu
            20              25                  30

Arg Pro Ala Val Thr Arg Thr Xaa Arg Phe Ser Gly Pro Glu Gly Phe
            35                  40                  45

His Xaa Xaa Pro Gly Ala Leu Trp Leu Ala Ala Ala Pro Leu Leu
        50              55                  60

Ala Thr Xaa Leu Leu Leu Leu Xaa Xaa Arg Leu Ala Ala
65              70                  75
```

<210> SEQ ID NO 84
<211> LENGTH: 101
<212> TYPE: PRT
<213> ORGANISM: Methylobacterium

<400> SEQUENCE: 84

```
Met Pro Thr Ala Ile Pro Ile Arg Pro Ala Pro Glu Arg Cys Leu Ser
1               5                   10                  15

Trp Pro Asp Thr Ala Arg Leu Leu Ile Leu Val Ala Arg Val Arg Ile
            20                  25                  30

Leu Asp Leu Glu Met His Thr Val Val Arg His Gly Ser Gly Phe Ala
            35                  40                  45

Asp Asp Arg Leu Leu His Leu Met Arg Arg Trp Leu Ala Gln His Glu
        50                  55                  60

Ala Ile Ser Ala Leu Leu Pro Gly Val Ala Glu Pro Arg His Val Ala
65              70                  75                  80

Glu Val Arg Ala Ile Leu Gln Val Pro Asn Ser Arg Pro Glu Pro Glu
                85                  90                  95

Asp Arg Arg Ala Leu
            100
```

<210> SEQ ID NO 85
<211> LENGTH: 83
<212> TYPE: PRT
<213> ORGANISM: Methylobacterium

<400> SEQUENCE: 85

```
Met Pro Gln Arg Arg Thr Ile Gln Val Thr Glu Asp Gly Arg Met Asn
1               5                   10                  15

Leu Pro Ala Asp Ile Arg Arg Val Leu Gly Leu Asn Gly Ala Gly Arg
            20                  25                  30

Ile Val Leu Met Gln Asp Glu Asp Gly Ile His Leu Thr Thr Ala Glu
            35                  40                  45

Asp Pro Leu Arg Arg Val Arg Glu Leu Ala Ala Pro Phe Arg Arg Gly
        50                  55                  60

Ser Gly Ser Val Val Asp Glu Phe Ile Ala Glu Arg Arg Ala Asp Ser
65              70                  75                  80

Gly Glu Asp
```

<210> SEQ ID NO 86
<211> LENGTH: 48
<212> TYPE: PRT
<213> ORGANISM: Methylobacterium

<400> SEQUENCE: 86

```
Met Pro Leu Asp Tyr Ala Leu Gln Ile Thr Ala Ile Ala Phe Gly Leu
1               5                   10                  15
```

Ser Val Leu Gly Leu Gly Gly Ala Phe Ile Ala Ser Arg Val Tyr Asp
            20                  25                  30

Arg Asn Thr Arg Arg Tyr Asp Glu Ala Ala Gln Leu His Lys Ala Asp
            35                  40                  45

<210> SEQ ID NO 87
<211> LENGTH: 1982
<212> TYPE: PRT
<213> ORGANISM: Methylobacterium

<400> SEQUENCE: 87

Val Gln Asp Gly Ile Gln Ile Thr Cys Ser Val Thr Glu His Val Ser
1               5                   10                  15

Leu Ala Tyr His Glu Asn Ala Val Pro Val Ile Arg Glu Val Val Val
            20                  25                  30

Glu Asn Thr Ser Glu Gln Glu Leu Ser Asp Val Arg Val Arg Ile Glu
            35                  40                  45

Ser Arg Pro Ala Val Val Gln Pro Leu Thr Leu Arg Ile Asp Arg Ile
        50                  55                  60

Pro Ala Gly Ser Asn His His Ile Glu Leu Pro Asp Val Arg Leu Asp
65                  70                  75                  80

Ala Ala Leu Leu Ala Gly Phe Thr Glu Ala Ser Arg Leu Glu Leu Thr
                85                  90                  95

Val Ile Val Glu Asp Ala Ala Gly Glu Arg Ala Arg His Leu Glu Glu
            100                 105                 110

Leu Arg Val Leu Pro Pro Ser His Trp Gly Gly Arg Ser Ala Pro
            115                 120                 125

Glu Leu Leu Ala Ala Phe Val Arg Pro Asn Asp Pro Ala Val Asp Val
        130                 135                 140

Val Leu Arg Asp Ala Ala Thr Lys Leu Gly Glu Ala Gly Arg Glu Thr
145                 150                 155                 160

Gly Leu Asn Gly Tyr Thr Thr Ala Lys Lys Ser Arg Ala Trp Glu Leu
                165                 170                 175

Ala Glu Ala Ile Trp Ala Ala Ile Ala Asp Arg Arg Ile Ala Tyr Val
            180                 185                 190

Leu Pro Pro Ala Ser Phe Glu Arg Ala Gly Gln Lys Val Arg Gly Pro
        195                 200                 205

Ser Asp Val Leu Glu Arg Lys Val Gly Thr Cys Leu Asp Leu Ser Leu
    210                 215                 220

Leu Tyr Ala Ala Cys Leu Glu Gln Ala Gly Leu Asn Pro Val Leu Val
225                 230                 235                 240

Leu Thr Val Gly His Ala Phe Val Gly Val Trp Leu Gln Asp Asp
                245                 250                 255

Phe Ala Ser Ala Thr Val Asp Asp Met Gln Leu Leu Arg Lys Arg Arg
            260                 265                 270

Asp Leu Gln Asp Leu Val Phe Val Glu Thr Thr Leu Leu Thr Pro Glu
        275                 280                 285

Pro Pro Ala Thr Phe Lys Val Ala Thr Thr Gln Gly Gly Val Gln Val
    290                 295                 300

Glu Asp Glu Ala Pro Ala Leu Glu Ile Ala Ile Asp Val Arg Arg
305                 310                 315                 320

Cys Arg Arg Arg Gly Ile Arg Pro Met Asp Leu Gly Asp Gly Lys Pro
                325                 330                 335

Thr Gly Ile Ala Pro Ala Pro Thr Ile Pro Leu Asn Gln Thr Leu Ser

-continued

```
                340                 345                 350
Ala Pro Pro Ser Phe Glu Glu Ala Arg Ala Pro Val Asp Glu Ala
            355                 360                 365
Pro Glu Thr Pro Val Gly Arg Val Glu Arg Trp Lys Arg Lys Leu Leu
    370                 375                 380
Asp Leu Thr Leu Arg Asn Lys Leu Leu Asn Phe Lys Pro Gly Lys Gly
385                 390                 395                 400
Ser Val Ser Leu Glu Cys Ala Ser Pro Gly Ala Leu Glu Asp Gly Leu
                405                 410                 415
Ala Ala Gly Thr Glu Tyr Arg Leu Lys Pro Leu Ser Asp Val Leu Thr
            420                 425                 430
Gly Ser Asp Glu Arg Ser Ala Asp Leu Tyr Ala Arg Arg His His Asp
        435                 440                 445
Asp Gly Arg Arg Ser Tyr Leu Glu Ala Ala Leu Ala Arg Lys Glu Ile
    450                 455                 460
Tyr Thr Thr Ser Thr Glu Ala Asp Leu Asp Arg Arg Leu Leu Asp Leu
465                 470                 475                 480
Tyr Arg Leu Ala Arg Asn Gly Phe Glu Glu Gly Gly Ala Asn Ile Leu
                485                 490                 495
Phe Leu Ala Val Gly Phe Leu Ser Trp Thr Lys Lys Glu Gly Glu Ala
            500                 505                 510
Ala Tyr Arg Ala Pro Leu Leu Leu Val Pro Val Thr Leu Lys Arg Ser
        515                 520                 525
Ser Val Arg Ala Gly Phe Lys Leu Ala Leu His Asp Asp Glu Val Arg
    530                 535                 540
Ile Asn Pro Thr Leu Leu Glu Met Leu Arg Glu Asp Phe Lys Leu Arg
545                 550                 555                 560
Met Pro Glu Leu Glu Gly Asp Leu Pro Arg Asp Gly Ser Gly Tyr Asp
                565                 570                 575
Val Asp Gly Ile Phe Arg Ile Val Arg Gln His Val Lys Glu Leu Arg
            580                 585                 590
Gly Trp Glu Val Val Pro Asp Val Val Leu Ser Ala Phe Ser Phe Thr
        595                 600                 605
Lys Tyr Leu Met Trp Lys Asp Leu Val Asp Arg Ala Glu Val Leu Lys
    610                 615                 620
Arg Asn Pro Val Val Arg His Leu Ile Asp Thr Pro Lys His Ser Tyr
625                 630                 635                 640
Gly Asp Gly Thr Pro Phe Pro Glu Pro Thr Arg Leu Asp Arg Glu His
                645                 650                 655
Pro Pro Glu Thr Val Phe Ala Pro Leu Ser Ala Asp Ser Ser Gln Leu
            660                 665                 670
Ser Ala Val Leu Ala Ala Gly Gly Lys Asp Phe Val Leu Phe Gly
        675                 680                 685
Pro Pro Gly Thr Gly Lys Ser Gln Thr Ile Gly Asn Met Ile Ala Gln
    690                 695                 700
Cys Leu Ala Gln Gly Arg Thr Val Leu Phe Val Ser Gln Lys Thr Ala
705                 710                 715                 720
Ala Leu Glu Val Val Gln Arg Arg Leu Gln Glu Ile Gly Leu Gly Asp
                725                 730                 735
Tyr Cys Leu Glu Val His Ser Thr Lys Ala Gln Lys Ser Ala Val Leu
            740                 745                 750
Gly Gln Leu Arg Arg Ala Trp His Glu Arg Ser Thr Pro Ser Gln Gly
        755                 760                 765
```

```
Thr Trp Asp Ala Ala Thr Ser Glu Leu Ala Ser Leu Arg Glu Glu Leu
    770                 775                 780

Asn Gly Leu Val Asn Ala Leu His Arg Arg Arg Glu Asn Gly Leu Ser
785                 790                 795                 800

Ala Tyr Glu Ala Phe Gly Arg Val Ile Ala Ser Gly Gly Glu Ala Pro
                805                 810                 815

Leu Val Leu Thr Trp Pro Asp His Leu Ala His Asn Glu Thr Thr Leu
            820                 825                 830

Ala Asn Leu Arg Ala Ala Cys Arg Glu Leu Arg Pro Val Leu Ala Ser
        835                 840                 845

Val Gly Ser Leu Val Asp His Pro Leu Gln Gly Val Glu Ala Thr Gln
    850                 855                 860

Trp Ser Pro Val Trp Arg Asp Asp Met Gly Ala Ala Ile Arg Ala Val
865                 870                 875                 880

Glu Gln Thr Leu Gly Ala Leu Arg Val Ser Gly Gln Ala Phe Ala Glu
                885                 890                 895

Ala Ile Gly Leu Pro Ser Leu Leu Ala Thr Tyr Ala Gly Thr Arg Gly
            900                 905                 910

Leu Val Val Leu Gly Asn Tyr Leu Val Arg Ser Glu Ala Arg Cys Gly
        915                 920                 925

Ala Ala Phe Leu Ala Asp Gly Ala Gly Asp Leu Arg Arg Ala Val Ala
    930                 935                 940

Ala Arg Glu Arg Phe Gln Thr Thr Lys Val Gln Leu Leu Gly Arg Leu
945                 950                 955                 960

Thr Gly Arg Tyr Arg Pro Gly Ile Leu Asp Gln Asn Leu Gly Ala Leu
                965                 970                 975

Leu Ala Glu Trp Val Ala Ala Gln Gly Ala Asn Phe Leu Val Lys Gly
            980                 985                 990

Gly Lys Leu Lys Lys Val Ser Ala Gln Val Gln Pro Tyr Ala Glu Gly
        995                 1000                1005

Pro Leu Pro Pro Asp Leu Gly Pro Asp Leu Thr Gly Leu Ile Glu
    1010                1015                1020

Val Ala Arg His Val Lys Ala Gly Cys Leu Glu Glu Leu Ile Leu
    1025                1030                1035

Ala Arg Leu Gly Leu Pro Trp Ser Asn Pro Asp Cys Pro Ala Ser
    1040                1045                1050

Glu Phe Ala Ser Ala Ile Thr Trp Ala Glu Lys Val Glu Gln Leu
    1055                1060                1065

Leu Asp Ile Leu Gly Pro Leu Ser Leu Gly Ile Asp Gly Leu Arg
    1070                1075                1080

Asp His Leu Val His Leu Val Glu Arg Gln Gly Arg Ala Leu Ala
    1085                1090                1095

Asp Gly Gly Arg Ile Ala Gln Thr Tyr Ala Ala Phe Ala Gln Asp
    1100                1105                1110

Arg Ala Arg Ala Asn Glu Ala Met Lys Ala Leu Gly Val Leu Ala
    1115                1120                1125

Gly Arg Pro Asp Pro Glu Glu Pro Leu Ala Ala Glu Ala Asp Trp
    1130                1135                1140

Ile Glu Arg Ser Cys Thr Ile Ala Arg Arg Leu Ser Ser Gly Leu
    1145                1150                1155

Ser Arg Ala Gln Gly Trp Cys Ala Trp Gln Ala Ala Ala Gln Ser
    1160                1165                1170
```

```
Ala Leu Lys Thr Gly Leu Ala Pro Leu Ile Asp Ala Leu Glu Asp
1175                 1180                1185

Gly Arg Ile Ala Pro Asp Arg Ala Glu Ile Ala Phe Glu Ile Ala
1190                 1195                1200

Tyr Ala Arg Trp Trp Ile Asp Arg Val Val Ser Asp Asp Pro Val
1205                 1210                1215

Leu Arg Arg Phe Leu Pro Ala Arg His Glu Asp Ala Ile Gln Arg
1220                 1225                1230

Phe Arg Ala Ala Asp Ala Arg Val Thr Glu Leu Ser Lys Gln Val
1235                 1240                1245

Val Arg Ser Arg Leu Gly Gly Ile Pro Gly Ala Thr Ala Phe
1250                 1255                1260

Gly Ala Asp Pro Glu Trp Gly Thr Leu Ser His Glu Leu Thr Lys
1265                 1270                1275

Lys Thr Ala His Met Pro Leu Arg Lys Leu Phe Gly Lys Met Pro
1280                 1285                1290

Thr Ala Leu Thr Lys Leu Thr Pro Cys Val Met Met Ser Pro Leu
1295                 1300                1305

Ser Ile Ala Gln Tyr Leu Pro Pro Asp Lys Glu Pro Phe Asp Val
1310                 1315                1320

Val Ile Phe Asp Glu Ala Ser Gln Ile Ser Pro Trp Asp Ala Ile
1325                 1330                1335

Gly Ala Leu Ala Arg Ala Lys Gln Val Val Ile Val Gly Asp Pro
1340                 1345                1350

Glu Gln Leu Pro Pro Thr Asn Val Gly Asp Arg Gly Val Asp Asp
1355                 1360                1365

Ile Glu Asp Gly Ser Asp Val Thr Asp Gln Glu Ser Ile Leu Asp
1370                 1375                1380

Glu Cys Leu Ala Ala Asn Ile Pro Arg Arg Asn Leu Asp Trp His
1385                 1390                1395

Tyr Arg Ser Arg His Glu Ser Leu Ile Ala Phe Ser Asn Ser Arg
1400                 1405                1410

Tyr Tyr Gly Gly Arg Leu Val Thr Phe Pro Ser Pro Val Thr Asp
1415                 1420                1425

Asp Arg Ala Val Arg Leu Thr Leu Val Pro Asp Gly Val Tyr Lys
1430                 1435                1440

Arg Gly Ser Gly Arg Val Asn Arg Pro Glu Ala Arg Ala Val Val
1445                 1450                1455

Ala Asp Ile Val Arg Arg Leu Arg Asp Pro Ser Phe Ser Glu Glu
1460                 1465                1470

Arg Arg Ser Leu Gly Val Val Thr Phe Asn Gly Glu Gln Gln Arg
1475                 1480                1485

Leu Ile Glu Asn Leu Leu Asp Glu Gln Arg Arg Ser Tyr Pro Glu
1490                 1495                1500

Leu Glu Pro Phe Phe Asp Arg Asp Arg Trp His Glu Pro Val Phe
1505                 1510                1515

Val Lys Asn Leu Glu Asn Val Gln Gly Asp Glu Arg Asp Ala Ile
1520                 1525                1530

Ile Phe Ser Val Ala Val Gly Pro Asp Gln Thr Gly Arg Pro Val
1535                 1540                1545

Ser Thr Val Ser Ser Leu Asn Lys Asp Gly Gly His Arg Arg Leu
1550                 1555                1560

Asn Val Ala Ile Thr Arg Ala Arg Arg Glu Leu Val Val Phe Ala
```

```
            1565                1570                1575

Ser Met Arg Pro Glu Gln Ile Asp Leu Gly Arg Thr Arg Ala Arg
        1580                1585                1590

Gly Val Arg Asp Phe Lys His Phe Leu Glu Phe Ala Glu Arg Gly
        1595                1600                1605

Ala Arg Ala Leu Ala Glu Ala Phe Ala Pro Thr Gly Gly Asp Val
        1610                1615                1620

Glu Ser Pro Phe Glu Ala Ala Val Met Ala Gly Leu Glu Ala Arg
        1625                1630                1635

Gly Trp Thr Val His Thr Gln Ile Gly Val Ser Gly Phe Arg Ile
        1640                1645                1650

Asp Leu Gly Ile Val His Pro Asp Ala Pro Gly Arg Tyr Leu Ala
        1655                1660                1665

Gly Val Glu Cys Asp Gly Ala Thr Tyr His Ser Ser Ala Thr Ala
        1670                1675                1680

Arg Asp Arg Asp Arg Leu Arg Glu His Val Leu Thr Asp Leu Gly
        1685                1690                1695

Trp Arg Ile Arg Arg Val Trp Ser Thr Glu Trp Trp Met Asp Ala
        1700                1705                1710

Glu Gly Ala Leu Thr Lys Leu Asp Gln Arg Leu Ile Glu Asp Leu
        1715                1720                1725

Glu Ala Asp Arg Ala Lys Ala Ala Ala Ala Ala Glu Ala Pro
        1730                1735                1740

Arg Asp Val Ala Val Glu Pro Glu Ala Val Glu Gln Glu His Asp
        1745                1750                1755

Glu Pro Thr Gly Glu Pro Glu Val Thr Pro Val Asp Thr Gly
        1760                1765                1770

Pro Ser Glu Pro Ala Asn Asp Leu Glu Pro Val Thr Asp Leu Ile
        1775                1780                1785

Pro Gln Arg Leu Tyr Ala Asp Gln Ala Leu Pro Val Thr Pro Pro
        1790                1795                1800

Ala Pro Lys Pro Glu Val Tyr Asp Asp Val Arg Ala Tyr Arg Ile
        1805                1810                1815

Val Asp Leu Asn Asp Leu Gly Arg Ser Val Glu Pro Gly Arg Phe
        1820                1825                1830

Tyr Asp Ala Ser Tyr Gln Gln Ala Leu Ser Ala Met Val Asp His
        1835                1840                1845

Val Leu Ala Val Glu Gly Pro Ile Tyr Glu Glu Leu Leu Ile Lys
        1850                1855                1860

Arg Ile Ala Arg Ala His Asp Ile Gln Arg Val Gly Pro Leu Val
        1865                1870                1875

Arg Glu Ala Ile Ala Asp Arg Ile Asp Ala Ser Val Ala Arg Thr
        1880                1885                1890

Glu Asp Asp Gly Arg Pro Val Leu Trp Pro Arg Gly Glu Glu Pro
        1895                1900                1905

Arg Ala Ser Tyr Pro His Arg Pro Ala Ser Ala Ala Ile Arg Ser
        1910                1915                1920

His Thr Asp Thr Pro Met Pro Glu Leu Val Gly Ile Ala Met Thr
        1925                1930                1935

Leu Pro Ser Asn Ala Ser Glu Ala Glu Arg Ala Arg Met Ile Gly
        1940                1945                1950

Gln Arg Leu Gly Leu Ser Arg Ile Glu Ala Ser Ala Arg Ala Arg
        1955                1960                1965
```

Phe Glu Arg Ala Ser Glu Leu Ala Arg Gln Ala Ala Val Ala
    1970                1975                1980

<210> SEQ ID NO 88
<211> LENGTH: 210
<212> TYPE: PRT
<213> ORGANISM: Methylobacterium

<400> SEQUENCE: 88

Met Ser Val Val Leu Tyr Ala Arg Val Ser Thr Ala Glu Gln Thr Leu
1               5                   10                  15

Glu His Gln Gln Thr Gln Ala Glu Ala Ala Gly Phe Val Phe Asp Ala
            20                  25                  30

Val Val Ala Asp His Gly Glu Ser Gly Arg Lys Pro Leu Arg Asp Arg
        35                  40                  45

Pro Glu Gly Arg Arg Leu Tyr Asp Met Leu Arg Thr Gly Asp Val Leu
    50                  55                  60

Val Val Arg Trp Ile Asn Arg Leu Gly Arg Ser Tyr Glu Asp Val Thr
65                  70                  75                  80

Gly Val Met Arg Glu Leu Met Gln Arg Gly Val Ile Val Arg Thr Ile
                85                  90                  95

Ile Ser Asn Met Thr Phe Asp Gly Ala Thr Lys Asp Pro Met Gln Arg
            100                 105                 110

Ala Ile Arg Asp Ala Leu Ile Ala Phe Met Ala Ala Gly Glu Ala
        115                 120                 125

Glu Leu Glu Ala Thr Arg Glu Ala Gln Lys Ala Gly Ile Glu His Ala
    130                 135                 140

Arg Lys Gln Ala Asp Gln Thr Ala Tyr Arg Gly Arg Lys Pro Ser Tyr
145                 150                 155                 160

Thr Arg Asp Gln Leu Thr Val Ile Ser Gly Met Leu Gly Arg Gly Ala
                165                 170                 175

Gly Val Ser Ala Ile Ala Ala Glu Thr Gly Leu Ser Arg Gln Thr Ile
            180                 185                 190

Tyr Arg Val Gln Ala Asp Pro Val Glu Ala Glu Ala Ala Leu Ala Arg
        195                 200                 205

Trp Ala
    210

<210> SEQ ID NO 89
<211> LENGTH: 69
<212> TYPE: PRT
<213> ORGANISM: Methylobacterium

<400> SEQUENCE: 89

Met Leu Ser Leu Asp Asp Ile Ala Ala Ala Ala Gly Glu Glu Arg
1               5                   10                  15

Asp Ala Leu Trp Arg Ser Leu Val Glu Asp Met Glu Glu Ala Ala Gly
            20                  25                  30

Arg Arg Arg Gly Gly Arg Gly Leu Val Gln Ala Asp Arg Pro Ala Asp
        35                  40                  45

Leu Ala Arg Ala Leu Gly Arg Asp Arg Val Gln Pro Ser Arg Leu
    50                  55                  60

Ala Arg Ser Ala Ser
65

<210> SEQ ID NO 90

```
<211> LENGTH: 54
<212> TYPE: PRT
<213> ORGANISM: Methylobacterium

<400> SEQUENCE: 90

Met Pro Val Gly Ile Gly Ile Gly Arg Gly Asp Pro Leu Arg Pro Ala
1               5                   10                  15

Val Thr Arg Thr Ala Arg Phe Ser Gly Pro Glu Gly Phe His Pro Gly
                20                  25                  30

Ala Leu Trp Leu Ala Ala Ala Ser Pro Leu Leu Ala Thr Leu Leu Leu
            35                  40                  45

Leu Val Arg Leu Ala Ala
        50

<210> SEQ ID NO 91
<211> LENGTH: 1471
<212> TYPE: DNA
<213> ORGANISM: Methylobacterium

<400> SEQUENCE: 91
ggtgatccag ccgcaggttc ccctacggct accttgttac gacttcaccc cagtcgctga      60
ccctaccgtg gtcgcctgcc tccttgcggt tggcgcagcg ccgtcgggta agaccaactc     120
ccatggtgtg acgggcggtg tgtacaaggc ccgggaacgt attcaccgtg gcatgctgat     180
ccacgattac tagcgattcc gccttcatgc actcgagttg cagagtgcaa tccgaactga     240
gacggctttt ggggatttgc tccagatcgc tccttcgcct cccactgtca ccgccattgt     300
agcacgtgtg tagcccatcc cgtaagggcc atgaggactt gacgtcatcc acaccttcct     360
cgcggcttat caccggcagt ctccctagag tgcccaactg aatgatggca actaaggacg     420
tgggttgcgc tcgttgcggg acttaaccca acatctcacg acgagctg acgacagcca     480
tgcagcacct gtgtgcgcgc accgaagtg accccaaat ctctctgggt aacacgccat     540
gtcaaaggat ggtaaggttc tgcgcgttgc ttcgaattaa accacatgct ccaccgcttg     600
tgcgggcccc cgtcaattcc tttgagtttt aatcttgcga ccgtactccc caggcggaat     660
gctcaaagcg ttagctgcgc tactgcggtg caagcacccc aacagctggc attcatcgtt     720
tacggcgtgg actaccaggg tatctaatcc tgtttgctcc ccacgctttc gcgcctcagc     780
gtcagtaatg gtccagttgg ccgccttcgc caccggtgtt cttgcgaata tctacgaatt     840
tcacctctac actcgcagtt ccaccaacct ctaccatact caagcgtccc agtatcgaag     900
gccattctgt ggttgagcca caggctttca cccccgactt aaaacgccgc ctacgcgccc     960
tttacgccca gtgattccga gcaacgctag ccccttcgt attaccgcgg ctgctggcac    1020
gaagttagcc ggggcttatt cctccggtac cgtcattatc gtcccggata aaagagcttt    1080
acaaccctaa ggccttcatc actcacgcgg catggctgga tcaggcttgc gcccattgtc    1140
caatattccc cactgctgcc tcccgtagga gtctgggccg tgtctcagtc ccagtgtggc    1200
tgatcatcct ctcagaccag ctactgatcg tcgccttggt aggccgttac cccaccaact    1260
agctaatcag acgcgggccg atcttccggc agtaaacctt tccccaaaag ggcgtatccg    1320
gtattagccc tagtttccca gggttattcc gaaccagaag gcacgttccc acgcgttact    1380
cacccgtccg ccgctgaccc cgaaaggccc gctcgacttg catgtgttaa gcctgccgcc    1440
agcgttcgct ctgagccagg atcaaactct c                                   1471

<210> SEQ ID NO 92
<211> LENGTH: 1471
```

```
<212> TYPE: DNA
<213> ORGANISM: Methylobacterium

<400> SEQUENCE: 92
gagtttgatc ctggctcaga gcgaacgctg gcggcaggct taacacatgc aagtcgagcg      60
ggcccttcgg ggtcagcggc ggacgggtga gtaacgcgtg ggaacgtgcc ttctggttcg     120
gaataaccct gggaaactag ggctaatacc ggatacgccc ttatgggaa  aggtttactg     180 ccggaagatc ggcccgcgtc tgattagcta gttggtgggg taacggccta ccaaggcgac    240
gatcagtagc tggtctgaga ggatgatcag ccacactggg actgagacac ggcccagact    300
cctacgggag gcagcagtgg ggaatattgg acaatgggcg caagcctgat ccagccatgc    360
cgcgtgagtg atgaaggcct tagggttgta aagctctttt atccgggacg ataatgacgg    420
taccggagga ataagccccg gctaacttcg tgccagcagc cgcggtaata cgaaggggc     480 tagcgttgct cggaatcact gggcgtaaag gcgcgtagg  cggcgtttta agtcgggggt    540
gaaagcctgt ggctcaacca cagaatggcc ttcgatactg gacgcttga  gtatggtaga    600 ggttggtgga actgcgagtg tagaggtgaa attcgtagat attcgcaaga acaccggtgg    660
cgaaggcggc caactggacc attactgacg ctgaggcgcg aaagcgtggg gagcaaacag    720
gattagatac cctggtagtc cacgccgtaa acgatgaatg ccagctgttg ggtgcttgc     780 accgcagtag cgcagctaac gctttgagca ttccgcctgg ggagtacggt cgcaagatta    840
aaactcaaag gaattgacgg gggcccgcac aagcggtgga catgtggtt  taattcgaag    900 caacgcgcag aaccttacca tcctttgaca tggcgtgtta cccagagaga tttgggtcc     960 acttcggtgg cgcgcacaca ggtgctgcat ggctgtcgtc agctcgtgtc gtgagatgtt   1020
gggttaagtc ccgcaacgag cgcaacccac gtccttagtt gccatcattc agttgggcac   1080
tctagggaga ctgccggtga taagccgcga ggaaggtgtg gatgacgtca agtcctcatg   1140
gcccttacgg gatgggctac acacgtgcta caatggcggt gacagtggga cgcgaaggag   1200
cgatctggag caaatcccca aaagccgtct cagttcggat tgcactctgc aactcgagtg   1260
catgaaggcg gaatcgctag taatcgtgga tcagcatgcc acggtgaata cgttcccggg   1320
ccttgtacac accgcccgtc acaccatggg agttggtctt acccgacggc gctgcgccaa   1380
ccgcaaggag gcaggcgacc acggtagggt cagcgactgg ggtgaagtcg taacaaggta   1440
gccgtagggg aacctgcggc tggatcacct c                                  1471

<210> SEQ ID NO 93
<211> LENGTH: 1473
<212> TYPE: DNA
<213> ORGANISM: Methylobacterium

<400> SEQUENCE: 93
ggtgatccag ccgcaggttc ccctacggct accttgttac gacttcaccc cagtcgctga    60
ccctaccgtg gtcgcctgct ccccttgcgg gtcggcgcag cgccgtcggg taagaccaac   120
tcccatggtg tgacgggcgg tgtgtacaag gcccgggaac gtattcaccg tggcatgctg   180
atccacgatt actagcgatt ccgccttcat gcactgagt  tgcagagtgc aatccgaact   240
gagacggctt ttggagattt gcttgccctc gcgggttcgc gtcccactgt caccgccatt   300
gtagcacgtg tgtagcccat cccgtaaggg ccatgaggac ttgacgtcat ccacaccttc   360
ctcgcggctt atcaccggca gtctccccag agtgcccaac tgaatgatgg caactgagga   420
cgtgggttgc gctcgttgcg ggacttaacc caacatctca cgacacgagc tgacgacagc   480
```

-continued

| | |
|---|---|
| catgcagcac ctgtgtgcgc gctcccgaag gagaccgtgg atctctccac gtaacacgcc | 540 |
| atgtcaaagg atggtaaggt tctgcgcgtt gcttcgaatt aaaccacatg ctccaccgct | 600 |
| tgtgcgggcc cccgtcaatt cctttgagtt ttaatcttgc gaccgtactc cccaggcgga | 660 |
| atgctcaaag cgttagctgc gccactgaga ggcaagcccc caacggctg gcattcatcg | 720 |
| tttacggcgt ggactaccag ggtatctaat cctgtttgct ccccacgctt tcgcgcctca | 780 |
| gcgtcagtgt cggaccagtt ggccgccttc gccaccggtg ttcttgcgaa tatctacgaa | 840 |
| tttcacctct acactcgcag ttccaccaac ctcttccgaa ctcaagtctc ccagtatcga | 900 |
| aggcaattct gtggttgagc acaggctttt cacccccgac ttaaaagacc gcctacgcgc | 960 |
| cctttacgcc cagtgattcc gagcaacgct agccccttc gtattaccgc ggctgctggc | 1020 |
| acgaagttag ccggggctta ttcctccggt accgtcatta tcgtcccgga taaaagagct | 1080 |
| ttacaaccct aaggccttca tcactcacgc ggcatggctg gatcaggctt gcgcccattg | 1140 |
| tccaatattc cccactgctg cctcccgtag gagtctgggc cgtgtctcag tcccagtgtg | 1200 |
| gctgatcatc ctctcagacc agctactgat cgtcgccttg gtaggccgtt accccaccaa | 1260 |
| ctagctaatc agacgcgggc cgatcttccg gcagtaaacc tttcccccaaa agggcgtatc | 1320 |
| cggtattagc tcaagtttcc ctgagttatt ccgaaccaga aggcacgttc ccacgcgtta | 1380 |
| ctcacccgtc cgccgctgac accgaagtgc ccgctcgact tgcatgtgtt aagcctgccg | 1440 |
| ccagcgttcg ctctgagcca ggatcaaact ctc | 1473 |

<210> SEQ ID NO 94
<211> LENGTH: 1475
<212> TYPE: DNA
<213> ORGANISM: Methylobacterium

<400> SEQUENCE: 94

| | |
|---|---|
| gagtttgatc ctggctcaga gcgaacgctg gcggcaggct taacacatgc aagtcgagcg | 60 |
| ggcatcttcg ggtgtcagcg gcggacgggt gagtaacgcg tgggaacgtg ccttctggtt | 120 |
| cggaataact cagggaaact tgagctaata ccggatacgc ccttttgggg aaaggtttac | 180 |
| tgccggaaga tcgcccgcg tctgattagc tagttggtgg ggtaacggcc taccaaggcg | 240 |
| acgatcagta gctggtctga gaggatgatc agccacactg gactgagac acggcccaga | 300 |
| ctcctacggg aggcagcagt ggggaatatt ggacaatggg cgcaagcctg atccagccat | 360 |
| gccgcgtgag tgatgaaggc cttagggttg taaagctctt ttatccggga cgataatgac | 420 |
| ggtaccggag gaataagccc cggctaactt cgtgccagca gccgcggtaa tacgaagggg | 480 |
| gctagcgttg ctcggaatca ctgggcgtaa agggcgcgta ggcggtcttt taagtcgggg | 540 |
| gtgaaagcct gtggctcaac cacagaattg ccttcgatac tgggagactt gagttcggaa | 600 |
| gaggttggtg gaactgcgag tgtagaggtg aaattcgtag atattcgcaa gaacaccggt | 660 |
| ggcgaaggcg gccaactggt ccgacactga cgctgaggcg cgaaagcgtg gggagcaaac | 720 |
| aggattagat accctggtag tccacgccgt aaacgatgaa tgccagccgt tgggggcctt | 780 |
| gcctctcagt ggcgcagcta acgctttgag cattccgcct ggggagtacg gtcgcaagat | 840 |
| taaaactcaa aggaattgac gggggcccgc acaagcggtg gagcatgtgg tttaattcga | 900 |
| agcaacgcgc agaaccttac catcctttga catggcgtgt acgtggaga gatccacggt | 960 |
| ctccttcggg agcgcgcaca caggtgctgc atggctgtcg tcagctcgtg tcgtgagatg | 1020 |
| ttgggttaag tcccgcaacg agcgcaaccc acgtcctcag ttgccatcat tcagttgggc | 1080 |
| actctgggga gactgccggt gataagccgc gaggaaggtg tggatgacgt caagtcctca | 1140 |

-continued

```
tggcccttac gggatgggct acacacgtgc tacaatggcg gtgacagtgg gacgcgaacc     1200
cgcgagggca agcaaatctc caaaagccgt ctcagttcgg attgcactct gcaactcgag     1260
tgcatgaagg cggaatcgct agtaatcgtg gatcagcatg ccacggtgaa tacgttcccg     1320
ggccttgtac acaccgcccg tcacaccatg ggagttggtc ttacccgacg cgctgcgcc      1380
gacccgcaag gggagcaggc gaccacggta gggtcagcga ctggggtgaa gtcgtaacaa     1440
ggtagccgta ggggaacctg cggctggatc acctc                                1475
```

<210> SEQ ID NO 95
<211> LENGTH: 1471
<212> TYPE: DNA
<213> ORGANISM: Methylobacterium

<400> SEQUENCE: 95

```
gagtttgatc ctggctcaga gcgaacgctg gcggcaggct taacacatgc aagtcgagcg       60
ggcctttcgg ggtcagcggc ggacgggtga gtaacgcgtg gaacgtgcc ttctggttcg       120
gaataaccct gggaaactag gctaatacc ggatacgccc ttttggggaa aggtttactg      180
ccggaagatc ggcccgcgtc tgattagcta gttggtgggg taacggccta ccaaggcgac      240
gatcagtagc tggtctgaga ggatgatcag ccacactggg actgagacac ggcccagact      300
cctacgggag gcagcagtgg ggaatattgg acaatgggcg caagcctgat ccagccatgc      360
cgcgtgagtg atgaaggcct tagggttgta agctctttt atccgggacg ataatgacgg      420
taccggagga ataagccccg gctaacttcg tgccagcagc cgcggtaata cgaaggggc      480
tagcgttgct cggaatcact gggcgtaaag ggcgcgtagg cggcgtttta agtcgggggt     540
gaaagcctgt ggctcaacca cagaatggcc ttcgatactg gacgcttga gtatggtaga      600
ggttggtgga actgcgagtg tagaggtgaa attcgtagat attcgcaaga acaccggtgg      660
cgaaggcggc caactggacc attactgacg ctgaggcgcg aaagcgtggg gagcaaacag      720
gattagatac cctggtagtc cacgccgtaa acgatgaatg ccagctgttg gggtgcttgc      780
accgcagtag cgcagctaac gctttgagca ttccgcctgg ggagtacggt cgcaagatta      840
aaactcaaag gaattgacgg gggcccgcac aagcggtgga gcatgtggtt taattcgaag      900
caacgcgcag aaccttacca tcctttgaca tggcgtgtta cccagagaga tttgggtcc     960
acttcggtgg cgcgcacaca ggtgctgcat ggctgtcgtc agctcgtgtc gtgagatgtt    1020
gggttaagtc ccgcaacgag cgcaacccac gtccttagtt gccatcattc agttgggcac    1080
tctagggaga ctgccggtga taagccgcga ggaaggtgtg gatgacgtca agtcctcatg    1140
gcccttacgg gatgggctac acacgtgcta caatggcggt gacagtggga cgcgaaggag    1200
cgatctggag caaatcccca aaagccgtct cagttcggat tgcactctgc aactcgagtg    1260
catgaaggcg gaatcgctag taatcgtgga tcagcatgcc acggtgaata cgttcccggg    1320
ccttgtacac accgcccgtc acaccatggg agttggtctt acccgacggc gctgcgccaa    1380
ccgcaaggag gcaggcgacc acggtagggt cagcgactgg ggtgaagtcg taacaaggta    1440
gccgtagggg aacctgcggc tggatcacct c                                    1471
```

<210> SEQ ID NO 96
<211> LENGTH: 1471
<212> TYPE: DNA
<213> ORGANISM: Methylobacterium

<400> SEQUENCE: 96

-continued

```
gagtttgatc ctggctcaga gcgaacgctg gcggcaggct taacacatgc aagtcgagcg      60
ggcccttcgg ggtcagcggc ggacgggtga gtaacgcgtg ggaacgtgcc ttctggttcg     120
gaataaccct gggaaactag gctaatacc ggatacgccc ttatgggggaa aggtttactg     180
ccggaagatc ggcccgcgtc tgattagcta gttggtgggg taacggccta ccaaggcgac    240
gatcagtagc tggtctgaga ggatgatcag ccacactggg actgagacac ggcccagact    300
cctacgggag gcagcagtgg ggaatattgg acaatgggcg caagcctgat ccagccatgc    360
cgcgtgagtg atgaaggcct tagggttgta aagctcttttt atccgggacg ataatgacgg    420
taccggagga ataagccccg gctaacttcg tgccagcagc cgcggtaata cgaaggggggc    480
tagcgttgct cggaatcact gggcgtaaag ggcgcgtagg cggcgtttta agtcgggggt    540
gaaagcctgt ggctcaacca cagaatggcc ttcgatactg ggacgcttga gtatggtaga    600
ggttggtgga actgcgagtg tagaggtgaa attcgtagat attcgcaaga acaccggtgg    660
cgaaggcggc caactggacc attactgacg ctgaggcgcg aaagcgtggg gagcaaacag    720
gattagatac cctggtagtc cacgccgtaa acgatgaatg ccagctgttg gggtgcttgc    780
accgcagtag cgcagctaac gctttgagca ttccgcctgg ggagtacggt cgcaagatta    840
aaactcaaag gaattgacgg gggcccgcac aagcggtgga gcatgtggtt taattcgaag    900
caacgcgcag aaccttacca tcctttgaca tggcgtgtta cccagagaga tttgggggtcc    960
acttcggtgg cgcgcacaca ggtgctgcat ggctgtcgtc agctcgtgtc gtgagatgtt   1020
gggttaagtc ccgcaacgag cgcaacccac gtccttagtt gccatcattc agttgggcac   1080
tctagggaga ctgccggtga taagccgcga ggaaggtgtg gatgacgtca agtcctcatg   1140
gcccttacgg gatgggctac acacgtgcta caatggcggt gacagtggga cgcgaaggag   1200
cgatctggag caaatcccca aaagccgtct cagttcggat tgcactctgc aactcgagtg   1260
catgaaggcg gaatcgctag taatcgtgga tcagcatgcc acggtgaata cgttcccggg   1320
ccttgtacac accgcccgtc acaccatggg agttggtctt acccgacggc gctgcgccaa   1380
ccgcaaggag gcaggcgacc acggtagggt cagcgactgg ggtgaagtcg taacaaggta   1440
gccgtagggg aacctgcggc tggatcacct c                                  1471
```

<210> SEQ ID NO 97
<211> LENGTH: 1475
<212> TYPE: DNA
<213> ORGANISM: Methylobacterium

<400> SEQUENCE: 97

```
ggtgatccag ccgcaggttc ccctacggct accttgttac gacttcaccc cagtcgctga     60
ccctaccgtg gtcgcctgct cccccttgcgg gtcggcgcag cgccgtcggg taagaccaac    120
tcccatggtg tgacgggcgg tgtgtacaag gcccgggaac gtattcaccg tggcatgctg    180
atccacgatt actagcgatt ccgccttcat gcactgagt tgcagagtgc aatccgaact    240
gagacggctt ttggagattt gcttgccctc gcgggttcgc gtcccactgt caccgccatt    300
gtagcacgtg tgtagcccat cccgtaaggg ccatgaggac ttgacgtcat ccacaccttc    360
ctcgcggctt atcaccggca gtctccccag agtgcccaac taaatgatgg caactgagga    420
cgtgggttgc gctcgttgcg ggacttaacc caacatctca cgacacgagc tgacgacagc    480
catgcagcac ctgtgtgcgc gctcccgaag gagaccgtgg atctctccac gtaacacgcc    540
atgtcaaagg atggtaaggt tctgcgcgtt gcttcgaatt aaaccacatg ctccaccgct    600
tgtgcgggcc cccgtcaatt cctttgagtt ttaatcttgc gaccgtactc cccaggcgga    660
```

```
atgctcaaag cgttagctgc gccactgaga ggcaagcccc ccaacggctg gcattcatcg     720
tttacggcgt ggactaccag ggtatctaat cctgtttgct ccccacgctt tcgcgcctca     780
gcgtcagtgt cggaccagtt ggccgccttc gccaccggtg ttcttgcgaa tatctacgaa     840
tttcacctct acactcgcag ttccaccaac ctcttccgaa ctcaagtctc ccagtatcga     900
aggcaattct gtggttgagc cacaggcttt cacccccgac ttaaaagacc gcctacgcgc     960
cctttacgcc cagtgattcc gagcaacgct agccccttc gtattaccgc ggctgctggc    1020
acgaagttag ccggggctta ttcctccggt accgtcatta tcgtcccgga taaaagagct    1080
ttacaaccct aaggccttca tcactcacgc ggcatggctg gatcaggctt gcgcccattg    1140
tccaatattc cccactgctg cctcccgtag gagtctgggc cgtgtctcag tcccagtgtg    1200
gctgatcatc ctctcagacc agctactgat cgtcgccttg gtaggccgtt accccaccaa    1260
ctagctaatc agacgcgggc cgatcttccg gcagtaaacc tttccccaaa agggcgtatc    1320
cggtattagc tcaagtttcc ctgagttatt ccgaaccaga aggcacgttc ccacgcgtta    1380
ctcacccgtc cgccgctgac acccgaaagt gcccgctcga cttgcatgtg ttaagcctgc    1440
cgccagcgtt cgctctgagc caggatcaaa ctctc                               1475

<210> SEQ ID NO 98
<211> LENGTH: 1473
<212> TYPE: DNA
<213> ORGANISM: Methylobacterium

<400> SEQUENCE: 98
ggtgatccag ccgcaggttc ccctacggct accttgttac gacttcaccc cagtcgctga      60
ccctaccgtg gtcgcctgct cccctttgcgg gtcggcgcag cgccgtcggg taagaccaac    120
tcccatggtg tgacgggcgg tgtgtacaag gcccgggaac gtattcaccg tggcatgctg    180
atccacgatt actagcgatt ccgccttcat gcactcgagt tgcagagtgc aatccgaact    240
gagacggctt ttggagattt gcttgccctc gcgggttcgc gtcccactgt caccgccatt    300
gtagcacgtg tgtagcccat cccgtaaggg ccatgaggac ttgacgtcat ccacaccttc    360
ctcgcggctt atcaccggca gtctccccag agtgcccaac taaatgatgg caactgagga    420
cgtgggttgc gctcgttgcg ggacttaacc caacatctca cgacacgagc tgacgacagc    480
catgcagcac ctgtgtgcgc gctcccgaag gagaccgtgg atctctccac gtaacacgcc    540
atgtcaaagg atggtaaggt tctgcgcgtt gcttcgaatt aaaccacatg ctccaccgct    600
tgtgcgggcc cccgtcaatt cctttgagtt ttaatcttgc gaccgtactc cccaggcgga    660
atgctcaaag cgttagctgc gccactgaga ggcaagcccc ccaacggctg gcattcatcg    720
tttacggcgt ggactaccag ggtatctaat cctgtttgct ccccacgctt tcgcgcctca    780
gcgtcagtgt cggaccagtt ggccgccttc gccaccggtg ttcttgcgaa tatctacgaa    840
tttcacctct acactcgcag ttccaccaac ctcttccgaa ctcaagtctc ccagtatcga    900
aggcaattct gtggttgagc cacaggcttt cacccccgac ttaaaagacc gcctacgcgc    960
cctttacgcc cagtgattcc gagcaacgct agccccttc gtattaccgc ggctgctggc   1020
acgaagttag ccggggctta ttcctccggt accgtcatta tcgtcccgga taaaagagct   1080
ttacaaccct aaggccttca tcactcacgc ggcatggctg gatcaggctt gcgcccattg   1140
tccaatattc cccactgctg cctcccgtag gagtctgggc cgtgtctcag tcccagtgtg   1200
gctgatcatc ctctcagacc agctactgat cgtcgccttg gtaggccgtt accccaccaa   1260
```

| | |
|---|---|
| ctagctaatc agacgcgggc cgatcttccg gcagtaaacc tttccccaaa agggcgtatc | 1320 |
| cggtattagc tcaagtttcc ctgagttatt ccgaaccaga aggcacgttc ccacgcgtta | 1380 |
| ctcacccgtc cgccgctgac accgaagtgc ccgctcgact tgcatgtgtt aagcctgccg | 1440 |
| ccagcgttcg ctctgagcca ggatcaaact ctc | 1473 |

<210> SEQ ID NO 99
<211> LENGTH: 1471
<212> TYPE: DNA
<213> ORGANISM: Methylobacterium

<400> SEQUENCE: 99

| | |
|---|---|
| gagtttgatc ctggctcaga gcgaacgctg gcggcaggct taacacatgc aagtcgagcg | 60 |
| ggcccttcgg ggtcagcggc ggacgggtga gtaacgcgtg gaacgtgcc ttctggttcg | 120 |
| gaataaccct gggaaactag gctaatacc ggatacgccc ttatggggaa aggtttactg | 180 |
| ccggaagatc ggcccgcgtc tgattagcta gttggtgggg taacggccta ccaaggcgac | 240 |
| gatcagtagc tggtctgaga ggatgatcag ccacactggg actgagacac ggcccagact | 300 |
| cctacgggag gcagcagtgg ggaatattgg acaatgggcg caagcctgat ccagccatgc | 360 |
| cgcgtgagtg atgaaggcct agggttgta aagctctttt atccgggacg ataatgacgg | 420 |
| taccggagga ataagccccg gctaacttcg tgccagcagc cgcggtaata cgaaggggc | 480 |
| tagcgttgct cggaatcact gggcgtaaag ggcgcgtagg cggcgtttta agtcgggggt | 540 |
| gaaagcctgt ggctcaacca cagaatggcc ttcgatactg ggacgcttga gtatggtaga | 600 |
| ggttggtgga actgcgagtg tagaggtgaa attcgtagat attcgcaaga acaccggtgg | 660 |
| cgaaggcggc caactggacc attactgacg ctgaggcgcg aaagcgtggg agcaaacag | 720 |
| gattagatac cctggtagtc cacgccgtaa acgatgaatg ccagctgttg gggtgcttgc | 780 |
| accgcagtag cgcagctaac gctttgagca ttccgcctgg ggagtacggt cgcaagatta | 840 |
| aaactcaaag gaattgacgg gggcccgcac aagcggtgga gcatgtggtt taattcgaag | 900 |
| caacgcgcag aaccttacca tcctttgaca tggcgtgtta cccagagaga tttggggtcc | 960 |
| acttcggtgg cgcgcacaca ggtgctgcat ggctgtcgtc agctcgtgtc gtgagatgtt | 1020 |
| gggttaagtc ccgcaacgag cgcaacccac gtccttagtt gccatcattc agttgggcac | 1080 |
| tctagggaga ctgccggtga taagccgcga ggaaggtgtg gatgacgtca agtcctcatg | 1140 |
| gcccttacgg gatgggctac acacgtgcta caatggcggt gacagtggga cgcgaaggag | 1200 |
| cgatctggag caaatcccca aaagccgtct cagttcggat tgcactctgc aactcgagtg | 1260 |
| catgaaggcg gaatcgctag taatcgtgga tcagcatgcc acggtgaata cgttcccggg | 1320 |
| ccttgtacac accgcccgtc acaccatggg agttggtctt acccgacggc gctgcgccaa | 1380 |
| ccgcaagggg gcaggcgacc acggtagggt cagcgactgg ggtgaagtcg taacaaggta | 1440 |
| gccgtagggg aacctgcggc tggatcacct c | 1471 |

<210> SEQ ID NO 100
<211> LENGTH: 1484
<212> TYPE: DNA
<213> ORGANISM: Methylobacterium

<400> SEQUENCE: 100

| | |
|---|---|
| ggtgatccag ccgcaggttc ccctacggct accttgttac gacttcaccc cagtcgctga | 60 |
| ccctaccgtg gtcgcctgcc tccagtcgag caagctcgat ttggttggcg cagcgccgtc | 120 |
| gggtaagacc aactcccatg gtgtgacggg cggtgtgtac aaggcccggg aacgtattca | 180 |

```
ccgtggcatg ctgatccacg attactagcg attccgcctt catgcacgcg agttgcagcg    240
tgcaatccga actgagacgg cttttggaga ttggctccgg gtcacccctt cgcgtcccac    300
tgtcaccgcc attgtagcac gtgtgtagcc catcccgtaa gggccatgag gacttgacgt    360
catccacacc ttcctcgcgg cttatcaccg gcagtctccc tagagtgccc aaccaaatga    420
tggcaactaa ggacgtgggt tgcgctcgtt gcgggactta acccaacatc tcacgacacg    480
agctgacgac agccatgcag cacctgtgtg cgcgccccccg aagggggacct ggaatctctc    540 ccagtaacac gccatgtcaa aggatggtaa ggttctgcgc gttgcttcga attaaaccac    600
atgctccacc gcttgtgcgg gccccccgtca attcctttga gttttaatct tgcgaccgta    660
ctccccaggc ggaatgctta atgcgttagc tgcgctactg cggtgcatgc accccaacag    720
ctagcattca tcgtttacgg cgtggactac cagggtatct aatcctgttt gctccccacg    780 cttttcgcgcc tcagcgtcag taatggtcca gttggccgcc ttcgccaccg gtgttcttgc    840
gaatatctac gaatttcacc tctacactcg cagttccacc aacctctacc atactcaagc    900
gtcccagtat cgaaggccat tctgtggttg agccacaggc tttcaccccc gacttaaaac    960
gccgcctacg cgcccttac gcccagtgat tccgagcaac gctagccccc ttcgtattac   1020
cgcggctgct ggcacgaagt tagccggggc ttattcctcc ggtaccgtca ttatcgtccc   1080
ggagaaaaga gctttacaac cctaaggccg tcatcactca cgcggcatgg ctggatcagg   1140
cttgcgccca ttgtccaata ttccccactg ctgcctcccg taggagtctg gccgtgtct   1200 cagtcccagt gtggctgatc atcctctcag accagctact gatcgtcgcc ttggtaggcc   1260
gttaccccac caacaagcta atcagacgcg ggccgatcct ccggcagtaa acctttctgc   1320
caaagcacgt atccggtatt agccctagtt tcccagggtt atcccagacc ggagggcacg   1380
ttcccacgtg ttactcaccc gtctgccact caccttgcgg tgcgttcgac ttgcatgtgt   1440
taagcctgcc gccagcgttc gctctgagcc aggatcaaac tctc                   1484
```

<210> SEQ ID NO 101
<211> LENGTH: 1475
<212> TYPE: DNA
<213> ORGANISM: Methylobacterium

<400> SEQUENCE: 101

```
ggtgatccag ccgcaggttc ccctacggct accttgttac gacttcaccc cagtcgctga     60
ccctaccgtg gtcgcctgct cccccttgcgg gtcggcgcag cgccgtcggg taagaccaac    120
tcccatggtg tgacgggcgg tgtgtacaag gcccgggaac gtattcaccg tggcatgctg    180
atccacgatt actagcgatt ccgccttcat gcactcgagt tgcagagtgc aatccgaact    240
gagacggctt ttggagattt gcttgccctc gcgggttcgc gtcccactgt caccgccatt    300
gtagcacgtg tgtagcccat cccgtaaggg ccatgaggac ttgacgtcat ccacaccttc    360
ctcgcggctt atcaccggca gtctccccag agtgcccaac tgaatgatgg caactgagga    420
cgtgggttgc gctcgttgcg ggacttaacc caacatctca cgacacgagc tgacgacagc    480
catgcagcac ctgtgtgcgc gctcccgaag gagaccgtgg atctctccac gtaacacgcc    540
atgtcaaagg atggtaaggt tctgcgcgtt gcttcgaatt aaaccacatg ctccaccgct    600
tgtgcgggcc cccgtcaatt cctttgagtt ttaatcttgc gaccgtactc cccaggcgga    660
atgctcaaag cgttagctgc gccactgaga ggcaagcccc caacggctg gcattcatcg    720 tttacggcgt ggactaccag ggtatctaat cctgtttgct ccccacgctt tcgcgcctca    780
```

|  |  |  |  | |
|---|---|---|---|---|
| gcgtcagtgt | cggaccagtt | ggccgccttc | gccaccggtg | ttcttgcgaa tatctacgaa | 840 |
| tttcacctct | acactcgcag | ttccaccaac | ctcttccgaa | ctcaagtctc ccagtatcga | 900 |
| aggcaattct | gtggttgagc | cacaggcttt | cacccccgac | ttaaaagacc gcctacgcgc | 960 |
| cctttacgcc | cagtgattcc | gagcaacgct | agccccttc | gtattaccgc ggctgctggc | 1020 |
| acgaagttag | ccggggctta | ttcctccggt | accgtcatta | tcgtcccgga taaaagagct | 1080 |
| ttacaaccct | aaggcttca | tcactcacgc | ggcatggctg | atcaggctt gcgcccattg | 1140 |
| tccaatattc | cccactgctg | cctcccgtag | gagtctgggc | cgtgtctcag tcccagtgtg | 1200 |
| gctgatcatc | ctctcagacc | agctactgat | cgtcgccttg | gtaggccgtt accccaccaa | 1260 |
| ctagctaatc | agacgcgggc | cgatcttccg | gcagtaaacc | tttccccata agggcgtatc | 1320 |
| cggtattagc | tcaagtttcc | ctgagttatt | ccgaaccaga | aggcacgttc ccacgcgtta | 1380 |
| ctcacccgtc | cgccgctgac | acccgaaagt | gcccgctcga | cttgcatgtg ttaagcctgc | 1440 |
| cgccagcgtt | cgctctgagc | caggatcaaa | ctctc |  | 1475 |

<210> SEQ ID NO 102
<211> LENGTH: 1484
<212> TYPE: DNA
<213> ORGANISM: Methylobacterium

<400> SEQUENCE: 102

|  |  |  |  | |
|---|---|---|---|---|
| ggtgatccag | ccgcaggttc | ccctacggct | accttgttac | gacttcaccc cagtcgctga | 60 |
| ccctaccgtg | gtcgcctgcc | tccagtcgag | caagctcgat | ttggttggcg cagcgccgtc | 120 |
| gggtaagacc | aactcccatg | gtgtgacggg | cggtgtgtac | aaggcccggg aacgtattca | 180 |
| ccgtggcatg | ctgatccacg | attactagcg | attccgcctt | catgcacgcg agttgcagcg | 240 |
| tgcaatccga | actgagacgg | cttttggaga | ttggctccgg | gtcacccctt cgcgtcccac | 300 |
| tgtcaccgcc | attgtagcac | gtgtgtagcc | catcccgtaa | gggccatgag gacttgacgt | 360 |
| catccacacc | ttcctcgcgg | cttatcaccg | gcagtctccc | tagagtgccc aaccaaatga | 420 |
| tggcaactaa | ggacgtgggt | tgcgctcgtt | gcgggactta | acccaacatc tcacgacacg | 480 |
| agctgacgac | agccatgcag | cacctgtgtg | cgcgccccg | aagggaccct ggaatctctc | 540 |
| ccagtaacac | gccatgtcaa | aggatggtaa | ggttctgcgc | gttgcttcga attaaaccac | 600 |
| atgctccacc | gcttgtgcgg | gccccgtca | attcctttga | gttttaatct tgcgaccgta | 660 |
| ctccccaggc | ggaatgctta | atgcgttagc | tgcgctactg | cggtgcatgc accccaacag | 720 |
| ctagcattca | tcgtttacgg | cgtggactac | cagggtatct | aatcctgttt gctccccacg | 780 |
| cttttcgcgcc | tcagcgtcag | taatggtcca | gttggccgcc | ttcgccaccg tgttcttgc | 840 |
| gaatatctac | gaatttcacc | tctacactcg | cagttccacc | aacctctacc atactcaagc | 900 |
| gtcccagtat | cgaaggccat | tctgtggttg | agccacaggc | tttcaccccc gacttaaaac | 960 |
| gccgccacg | cgcccttac | gcccagtgat | tccgagcaac | gctagccccc ttcgtattac | 1020 |
| cgcggctgct | ggcacgaagt | tagccggggc | ttattcctcc | ggtaccgtca ttatcgtccc | 1080 |
| ggagaaaaga | gctttacaac | cctaaggccg | tcatcactca | cgcggcatgg ctggatcagg | 1140 |
| cttgcgccca | ttgtccaata | ttccccactg | ctgcctcccg | taggagtctg gccgtgtct | 1200 |
| cagtcccagt | gtggctgatc | atcctctcag | accagctact | gatcgtcgcc ttggtaggcc | 1260 |
| gttaccccac | caacaagcta | atcagacgcg | ggccgatcct | ccggcagtaa acctttctgc | 1320 |
| caaagcacgt | atccggtatt | agccctagtt | tcccagggtt | atcccagacc ggagggcacg | 1380 |
| ttcccacgtg | ttactcaccc | gtctgccact | caccttgcgg | tgcgttcgac ttgcatgtgt | 1440 |

```
taagcctgcc gccagcgttc gctctgagcc aggatcaaac tctc          1484
```

<210> SEQ ID NO 103
<211> LENGTH: 1471
<212> TYPE: DNA
<213> ORGANISM: Methylobacterium

<400> SEQUENCE: 103

```
ggtgatccag ccgcaggttc ccctacggct accttgttac gacttcaccc cagtcgctga    60
ccctaccgtg gtcgcctgcc tccttgcggt tggcgcagcg ccgtcgggta agaccaactc   120
ccatggtgtg acgggcggtg tgtacaaggc ccgggaacgt attaccgtg gcatgctgat    180
ccacgattac tagcgattcc gccttcatgc actcgagttg cagagtgcaa tccgaactga   240
gacggctttt ggggatttgc tccagatcgc tccttcgcgt cccactgtca ccgccattgt   300
agcacgtgtg tagcccatcc cgtaagggcc atgaggactt gacgtcatcc acaccttcct   360
cgcggcttat caccggcagt ctccctagag tgcccaactg aatgatggca actaaggacg   420
tgggttgcgc tcgttgcggg acttaaccca acatctcacg acacgagctg acgacagcca   480
tgcagcacct gtgtgcgcgc accgaagtg accccaaat ctctctgggt aacacgccat     540
gtcaaaggat ggtaaggttc tgcgcgttgc ttcgaattaa accacatgct ccaccgcttg   600
tgcgggcccc cgtcaattcc tttgagtttt aatcttgcga ccgtactccc caggcggaat   660
gctcaaagcg ttagctgcgc tactgcggtg caagcacccc aacagctggc attcatcgtt   720
tacggcgtgg actaccaggg tatctaatcc tgtttgctcc ccacgctttc gcgcctcagc   780
gtcagtaatg gtccagttgg ccgccttcgc caccggtgtt cttgcgaata tctacgaatt   840
tcacctctac actcgcagtt ccaccaacct ctaccatact caagcgtccc agtatcgaag   900
gccattctgt ggttgagcca caggctttca cccccgactt aaaacgccgc ctacgcgccc   960
tttacgccca gtgattccga gcaacgctag cccccttcgt attaccgcgg ctgctggcac  1020
gaagttagcc ggggcttatt cctccggtac cgtcattatc gtcccggata aaagagcttt  1080
acaaccctaa ggccttcatc actcacgcgg catggctgga tcaggcttgc gcccattgtc  1140
caatattccc cactgctgcc tcccgtagga gtctgggccg tgtctcagtc ccagtgtggc  1200
tgatcatcct ctcagaccag ctactgatcg tcgccttggt aggccgttac cccaccaact  1260
agctaatcag acgcgggccg atcttccggc agtaaacctt tccccataag ggcgtatccg  1320
gtattagccc tagtttccca gggttattcc gaaccggaag gcacgttccc acgcgttact  1380
cacccgtccg ccgctgaccc cgaaaggtcc gctcgacttg catgtgttaa gcctgccgcc  1440
agcgttcgct ctgagccagg atcaaactct c                                 1471
```

<210> SEQ ID NO 104
<211> LENGTH: 1475
<212> TYPE: DNA
<213> ORGANISM: Methylobacterium

<400> SEQUENCE: 104

```
gagtttgatc ctggctcaga gcgaacgctg gcggcaggct taacacatgc aagtcgagcg    60
ggcatcttcg ggtgtcagcg gcggacgggt gagtaacgcg tgggaacgtg ccttctggtt   120
cggaataact cagggaaact tgagctaata ccggatacgc ccttttgggg aaaggtttac   180
tgccggaaga tcgcccgcg tctgattagc tagttggtgg ggtaacggcc taccaaggcg    240
acgatcagta gctggtctga aggatgatc agccacactg ggactgagac acggcccaga   300
```

```
ctcctacggg aggcagcagt ggggaatatt ggacaatggg cgcaagcctg atccagccat      360
gccgcgtgag tgatgaaggc cttagggttg taaagctctt ttatccggga cgataatgac      420
ggtaccggag gaataagccc cggctaactt cgtgccagca gccgcggtaa tacgaagggg      480
gctagcgttg ctcggaatca ctgggcgtaa agggcgcgta ggcggtcttt taagtcgggg      540
gtgaaagcct gtggctcaac cacagaattg ccttcgatac tgggagactt gagttcggaa      600
gaggttggtg gaactgcgag tgtagaggtg aaattcgtag atattcgcaa gaacaccggt      660
ggcgaaggcg gccaactggt ccgacactga cgctgaggcg cgaaagcgtg gggagcaaac      720
aggattagat accctggtag tccacgccgt aaacgatgaa tgccagccgt tgggggctt      780 gcctctcagt ggcgcagcta acgctttgag cattccgcct ggggagtacg gtcgcaagat      840
taaaactcaa aggaattgac ggggccccgc acaagcggtg gagcatgtgg tttaattcga      900
agcaacgcgc agaaccttac catcctttga catggcgtgt tacgtggaga gatccacggt      960
ctccttcggg agcgcgcaca caggtgctgc atggctgtcg tcagctcgtg tcgtgagatg     1020
ttgggttaag tcccgcaacg agcgcaaccc acgtcctcag ttgccatcat tcagttgggc     1080
actctgggga gactgccggt gataagccgc gaggaaggtg tggatgacgt caagtcctca     1140
tggcccttac gggatgggct acacacgtgc tacaatggcg gtgacagtgg gacgcgaacc     1200
cgcgagggca agcaaatctc caaaagccgt ctcagttcgg attgcactct gcaactcgag     1260
tgcatgaagg cggaatcgct agtaatcgtg gatcagcatg ccacggtgaa tacgttcccg     1320
ggccttgtac acaccgcccg tcacaccatg ggagttggtc ttacccgacg cgctgcgcc     1380 gacccgcaag gggagcaggc gaccacggta gggtcagcga ctggggtgaa gtcgtaacaa     1440
ggtagccgta ggggaacctg cggctggatc acctc                                1475
```

<210> SEQ ID NO 105  
<211> LENGTH: 1471  
<212> TYPE: DNA  
<213> ORGANISM: Methylobacterium

<400> SEQUENCE: 105

```
ggtgatccag ccgcaggttc ccctacggct accttgttac gacttcaccc cagtcgctga       60
ccctaccgtg gtcgcctgcc tccttgcggt tggcgcagcg ccgtcgggta agaccaactc      120
ccatggtgtg acgggcggtg tgtacaaggc ccgggaacgt attcaccgtg gcatgctgat      180
ccacgattac tagcgattcc gccttcatgc actcgagttg cagagtgcaa tccgaactga      240
gacggctttt ggggatttgc tccagatcgc tccttgcgt cccactgtca ccgccattgt      300
agcacgtgtg tagcccatcc cgtaagggcc atgaggactt gacgtcatcc acaccttcct      360
cgcggcttat caccggcagt ctccctagag tgcccaactg aatgatggca actaaggacg      420
tgggttgcgc tcgttgcggg acttaaccca acatctcacg acacgagctg acgacagcca      480
tgcagcacct gtgtgcgcgc accgaagtg acccccaaat ctctctgggt aacacgccat      540
gtcaaaggat ggtaaggttc tgcgcgttgc ttcgaattaa accacatgct ccaccgcttg      600
tgcgggcccc cgtcaattcc tttgagtttt aatcttgcga ccgtactccc caggcggaat      660
gctcaaagcg ttagctgcgc tactgcggtg caagcacccc aacagctggc attcatcgtt      720
tacggcgtgg actaccaggg tatctaatcc tgtttgctcc ccacgctttc gcgcctcagc      780
gtcagtaatg gtccagttgg ccgccttcgc caccggtgtt cttgcgaata tctacgaatt      840
tcacctctac actcgcagtt ccaccaacct ctaccatact caagcgtccc agtatcgaag      900
gccattctgt ggttgagcca caggctttca cccccgactt aaaacgccgc ctacgcgccc      960
```

```
tttacgccca gtgattccga gcaacgctag ccccttcgt attaccgcgg ctgctggcac      1020
gaagttagcc ggggcttatt cctccggtac cgtcattatc gtcccggata aaagagcttt      1080
acaaccctaa ggccttcatc actcacgcgg catggctgga tcaggcttgc gcccattgtc      1140
caatattccc cactgctgcc tcccgtagga gtctgggccg tgtctcagtc ccagtgtggc      1200
tgatcatcct ctcagaccag ctactgatcg tcgccttggt aggccgttac cccaccaact      1260
agctaatcag acgcgggccg atcttccggc agtaaacctt tccccaaaag ggcgtatccg      1320
gtattagccc tagtttccca gggttattcc gaaccagaag gcacgttccc acgcgttact      1380
cacccgtccg ccgctgaccc cgaagggccc gctcgacttg catgtgttaa gcctgccgcc      1440
agcgttcgct ctgagccagg atcaaactct c                                     1471
```

<210> SEQ ID NO 106
<211> LENGTH: 1471
<212> TYPE: DNA
<213> ORGANISM: Methylobacterium

<400> SEQUENCE: 106

```
gagtttgatc ctggctcaga gcgaacgctg gcggcaggct taacacatgc aagtcgagcg        60
ggcccttcgg ggtcagcggc ggacgggtga gtaacgcgtg ggaacgtgcc ttctggttcg       120
gaataaccct gggaaactag gctaatacc ggatacgccc ttttggggaa aggtttactg       180
ccggaagatc ggcccgcgtc tgattagcta gttggtgggg taacggccta ccaaggcgac       240
gatcagtagc tggtctgaga ggatgatcag ccacactggg actgagacac ggcccagact       300
cctacgggag gcagcagtgg ggaatattgg acaatgggcg caagcctgat ccagccatgc       360
cgcgtgagtg atgaaggcct agggttgta aagctctttt atccgggacg ataatgacgg       420
taccggagga ataagccccg gctaacttcg tgccagcagc cgcggtaata cgaaggggc       480 tagcgttgct cggaatcact gggcgtaaag ggcgcgtagg cggcgtttta agtcgggggt       540
gaaagcctgt ggctcaacca cagaatggcc ttcgatactg gacgcttga gtatggtaga       600 ggttggtgga actgcgagtg tagaggtgaa attcgtagat attcgcaaga acaccggtgg       660
cgaaggcggc caactggacc attactgacg ctgaggcgcg aaagcgtggg gagcaaacag       720
gattagatac cctggtagtc cacgccgtaa acgatgaatg ccagctgttg gggtgcttgc       780
accgcagtag cgcagctaac gctttgagca ttccgcctgg ggagtacggt cgcaagatta       840
aaactcaaag gaattgacgg gggcccgcac aagcggtgga gcatgtggtt taattcgaag       900
caacgcgcag aaccttacca tcctttgaca tggcgtgtta cccagagaga tttgggtcc       960 acttcggtgg cgcgcacaca ggtgctgcat ggctgtcgtc agctcgtgtc gtgagatgtt      1020
gggttaagtc ccgcaacgag cgcaacccac gtccttagtt gccatcattc agttgggcac      1080
tctagggaga ctgccggtga taagccgcga ggaaggtgtg gatgacgtca agtcctcatg      1140
gcccttacgg gatgggctac acacgtgcta caatggcggt gacagtggga cgcgaaggag      1200
cgatctggag caaatcccca aaagccgtct cagttcggat tgcactctgc aactcgagtg      1260
catgaaggcg gaatcgctag taatcgtgga tcagcatgcc acggtgaata cgttcccggg      1320
ccttgtacac accgcccgtc acaccatggg agttggtctt acccgacggc gctgcgccaa      1380
ccgcaaggag gcaggcgacc acggtagggt cagcgactgg ggtgaagtcg taacaaggta      1440
gccgtagggg aacctgcggc tggatcacct c                                     1471
```

<210> SEQ ID NO 107

<211> LENGTH: 1471
<212> TYPE: DNA
<213> ORGANISM: Methylobacterium

<400> SEQUENCE: 107

```
ggtgatccag ccgcaggttc ccctacggct accttgttac gacttcaccc cagtcgctga      60
ccctaccgtg gtcgcctgcc cccttgcggt tagcgcagcg ccgtcgggta agaccaactc     120
ccatggtgtg acgggcggtg tgtacaaggc ccgggaacgt attcaccgtg gcatgctgat     180
ccacgattac tagcgattcc accttcatgc actcgagttg cagagtgcaa tccgaactga     240
gacggctttt ggggatttgc tcaacctcgc ggtctcgcgt cccactgtca ccgccattgt     300
agcacgtgtg tagcccatcc cgtaagggcc atgaggactt gacgtcatcc acaccttcct     360
cgcggcttat caccggcagt ctccccagag tgcccaactg aatgatggca actgaggacg     420
tgggttgcgc tcgttgcggg acttaaccca acatctcacg acacgagctg acgacagcca     480
tgcagcacct gtgtgcgcgc ctccgaagag gacctggaat ctctcccagt aacacgccat     540
gtcaaaggat ggtaaggttc tgcgcgttgc ttcgaattaa accacatgct ccaccgcttg     600
tgcgggcccc cgtcaattcc tttgagtttt aatcttgcga ccgtactccc caggcggaat     660
gcttaatgcg ttagctgcgc tactgagatg catgcacccc aacagctagc attcatcgtt     720
tacggcgtgg actaccaggg tatctaatcc tgtttgctcc ccacgctttc gcgcctcagc     780
gtcagtgctg gtccagttgg ccgccttcgc caccggtgtt cttgcgaata tctacgaatt     840
tcacctctac actcgcagtt ccaccaacct ctaccagact caagcgtccc agtatcgaag     900
gccattctgt ggttgagcca caggctttca cccccgactt aaaacgccgc ctacgcgccc     960
tttacgccca gtgattccga gcaacgctag ccccccttcgt attaccgcgg ctgctggcac    1020
gaagttagcc ggggcttatt cctccggtac cgtcattatc gtcccggata aaagagcttt    1080
acaaccctaa ggccttcatc actcacgcgg catggctgga tcaggcttgc gcccattgtc    1140
caatattccc cactgctgcc tcccgtagga gtctgggccg tgtctcagtc ccagtgtggc    1200
tgatcatcct ctcagaccag ctactgatcg tcgccttggt aggccgttac cccaccaact    1260
agctaatcag acgcgggccg atccttcggc agtaaacctt tccccaaaag ggcgtatccg    1320
gtattagctc cagtttccca gagttgtccc gaaccaaagg gtacgttccc acgtgttact    1380
cacccgtctg ccactagctc cgaagagccc gttcgacttg catgtgttaa gcctgccgcc    1440
agcgttcgct ctgagccagg atcaaactct c                                   1471
```

METHYLOBACTERIUM STRAINS FOR ENHANCING PLANT PRODUCTION AND METHODS RELATED THERETO

CROSS-REFERENCE TO RELATED APPLICATIONS

This international patent application claims the benefit of U.S. Provisional Patent Application No. 63/088,837, filed Oct. 7, 2020, U.S. Provisional Patent Application No. 63/209,286, filed Jun. 10, 2021, and PCT Application No. PCT/US2021/035480, filed Jun. 2, 2021, the entire disclosures of which are incorporated herein by reference.

SEQUENCE LISTING STATEMENT

A sequence listing containing the file named "NUE_ST25.txt" which is 152,132 bytes (measured in MS-Windows®) and created on Oct. 6, 2021, contains 93 nucleic acid sequences and 14 amino acid sequences is provided herewith via the USPTO's EFS system, and is incorporated herein by reference in its entirety.

BACKGROUND

Plants require certain macronutrients and micronutrients for growth and metabolism. These elements are generally found in the soil as salts and can be consumed by plants as ions. In agriculture, soil can become depleted of one or more of these nutrients requiring the addition of fertilizers to provide sufficient quantities of the nutrients for crop growth. In hydroponic systems, all nutrients must be supplied to the growing plants and are often the greatest cost for a hydroponic plant production system. Methods of enhancing plant production by improving growth and/or increasing nutrient utilization are desired.

One-carbon organic compounds such as methane and methanol are found extensively in nature and are utilized as carbon sources by bacteria classified as methanotrophs and methylotrophs. Methanotrophic bacteria include species in the genera *Methylobacter, Methylomonas, Methylomicrobium, Methylococcus, Methylosinus, Methylocystis, Methylosphaera, Methylocaldum*, and *Methylocella* (Lidstrom, 2006). Methanotrophs possess the enzyme methane monooxygenase which incorporates an atom of oxygen from $O_2$ into methane, forming methanol. All methanotrophs are obligate one-carbon utilizers that are unable to use compounds containing carbon-carbon bonds. Methylotrophs, on the other hand, can also utilize more complex organic compounds, such as organic acids, higher alcohols, sugars, and the like. Thus, methylotrophic bacteria are facultative methylotrophs. Methylotrophic bacteria include species in the genera *Methylobacterium, Hyphomicrobium, Methylophilus, Methylobacillus, Methylophaga, Aminobacter, Methylorhabdus, Methylopila, Methylosulfonomonas, Marinosulfonomonas, Paracoccus, Xanthobacter, Ancylobacter* (also known as *Microcyclus*), *Thiobacillus, Rhodopseudomonas, Rhodobacter, Acetobacter, Bacillus, Mycobacterium, Arthobacter*, and *Nocardia* (Lidstrom, 2006).

Some methylotrophic bacteria of the genus *Methylobacterium* are pink-pigmented. They are conventionally referred to as PPFM bacteria, being pink-pigmented facultative methylotrophs. Green (2005, 2006) identified twelve validated species in the genus *Methylobacterium*, specifically *M. aminovorans, M. chloromethanicum, M dichloromethanicum, M. extorquens, M. fujisawaense, M. mesophilicum, M. organophilum, M radiotolerans, M. rhodesianum, M. rhodinum, M. thiocyanatum*, and *M zatmanii*. However, *M. nodulans* is a nitrogen-fixing *Methylobacterium* that is not a PPFM (Sy et al., 2001). Some publications have reported that other *Methylobacterium* species are capable of fixing nitrogen (Madhaiyan et al. (2015) Biotechnol. Biofuels: 8:222; WO2020245675) although nitrogen fixation pathway genes have not been reported to be present in those species.

SUMMARY

Provided herein are compositions comprising one or more *Methylobacterium* strains that enhance early growth of plants, improve propagation/transplant vigor, increase nutrient uptake, improve stand establishment, improve stress tolerance, and/or increase a plant's ability to utilize nutrients, such as nitrogen, potassium, sulfur, cobalt, copper, zinc, phosphorus, boron, iron, and manganese, and/or that have ability fixate nitrogen. In certain embodiments, the *Methylobacterium* in the composition is selected from the group consisting of LGP2001 (NRRL B-50930), LGP2002 (NRRL B-50931), LGP2009 (NRRL B-50938), LGP2015 (NRRL B-67340), LGP2016 (NRRL B-67341), LGP2017 (NRRL B-67741), LGP2018 (NRRL B-67742), LGP2019 (NRRL B-67743), LGP2020 (NRRL B-67892), LGP2021 (NRRL B-68032), LGP2022 (NRRL B-68033), LGP2023 (NRRL B-68034), LGP2029 (NRRL B-68065), LGP2030 (NRRL B-68066), LGP2031 (NRRL B-68067), LGP2033 (NRRL B-68068), LGP2034 (NRRL B-68069), and LGP2167 (NRRL B-67927). In certain embodiments, the compositions provide for an increase in nitrogen use efficiency of a treated plant. In certain embodiments, the *Methylobacterium* in the composition is a variant of LGP2001 (NRRL B-50930), LGP2002 (NRRL B-50931), LGP2009 (NRRL B-50938), LGP2015 (NRRL B-67340), LGP2016 (NRRL B-67341), LGP2017 (NRRL B-67741), LGP2018 (NRRL B-67742), LGP2019 (NRRL B-67743), LGP2020 (NRRL B-67892), LGP2021 (NRRL B-68032), LGP2022 (NRRL B-68033), LGP2023 (NRRL B-68034), LGP2029 (NRRL B-68065), LGP2030 (NRRL B-68066), LGP2031 (NRRL B-68067), LGP2033 (NRRL B-68068), LGP2034 (NRRL B-68069), and LGP2167 (NRRL B-67927). In certain embodiments, the plants are leafy green plants, including microgreens and/or herbs. In certain embodiments, the plants are fruit or vegetable plants. In certain embodiments, the plants are agricultural row crops. In certain embodiments, the plants are grown in a greenhouse. In certain embodiments, the plants are grown hydroponically or aeroponically.

Also provided are isolated *Methylobacterium* selected from LGP2021 (NRRL B-68032), LGP2022 (NRRL B-68033), LGP2023 (NRRL B-68034), LGP2029 (NRRL B-68065), LGP2030 (NRRL B-68066), LGP2031 (NRRL B-68067), LGP2033 (NRRL B-68068), and LGP2034 (NRRL B-68069), compositions comprising such *Methylobacterium* isolates or variants thereof, and plants, plant parts, or seeds that are at least partially coated with compositions comprising LGP2021 (NRRL B-68032), LGP2022 (NRRL B-68033), LGP2023 (NRRL B-68034), LGP2029 (NRRL B-68065), LGP2030 (NRRL B-68066), LGP2031 (NRRL B-68067), LGP2033 (NRRL B-68068), LGP2034 (NRRL B-68069), or variants thereof. Also provided are compositions comprising a fermentation product comprising a *Methylobacterium* strain that is essentially free of contaminating microorganisms. In certain embodiments, the *Methylobacterium* strain is selected from the group consisting of LGP2021 (NRRL B-68032), LGP2022 (NRRL B-68033), LGP2023 (NRRL B-68034), LGP2029 (NRRL B-68065), LGP2030 (NRRL B-68066), LGP2031 (NRRL B-68067), LGP2033 (NRRL B-68068), and LGP2034 (NRRL B-68069). In certain embodiments, the composition further comprises an an additional active ingredient, an agriculturally acceptable adjuvant, and an agriculturally acceptable excipient.

In certain embodiments, the *Methylobacterium* isolates in the compositions provided herein comprise one or more genetic elements associated with the ability to enhance early plant growth, wherein the one or more genetic elements (i) is recD2_2 or pinR; or (ii) the one or more genetic elements encode a protein having a consensus amino acid sequence of SEQ ID NO: 77 to SEQ ID NO: 83. In some embodiments, *Methylobacterium* isolates in the compositions provided herein that improve early plant growth also impart one or more additional beneficial traits to treated plants or plants grown from treated plant parts or seeds, wherein the trait is enhanced uptake of nutrients, enhanced assimilation of nutrients, and/or enhanced nutrient use efficiency. In some embodiments, plants treated with *Methylobacterium* isolates provided herein demonstrate enhanced nitrogen use efficiency.

Methods of improving the production of plants by applying one or more *Methylobacteirum* strains to the plant, a plant part, or a seed are provided herein. In some embodiments, the composition comprising one or more *Methylobacterium* strains is applied such that it coats or partially coats the plant, plant part, or seed. In some embodiments, plant production is improved by enhancing early plant growth. In some embodiments, plant production is improved by increasing rooting of the plant. In some embodiments, plant production is improved by enhancing propagation/transplant vigor. In some embodiments, plant production is improved by enhancing stand establishment. In some embodiments, plant production is improved by enhancing stress tolerance. In some embodiments, plant production is improved by increasing the content of nutrients present in the plant or a plant part. In certain embodiments, the content of one or more nutrients selected from the group consisting of nitrogen, potassium, sulfur, copper, zinc, phosphorus, boron, iron, and manganese is increased. In certain embodiments, the nitrogen content in the plant is increased. In certain embodiments, the *Methylobacterium* in the composition is selected from the group consisting of LGP2001 (NRRL B-50930), LGP2002 (NRRL B-50931), LGP2009 (NRRL B-50938), LGP2015 (NRRL B-67340), LGP2016 (NRRL B-67341), LGP2017 (NRRL B-67741), LGP2018 (NRRL B-67742), LGP2019 (NRRL B-67743), LGP2020 (NRRL B-67892), LGP2021 (NRRL B-68032), LGP2022 (NRRL B-68033), LGP2023 (NRRL B-68034), LGP2029 (NRRL B-68065), LGP2030 (NRRL B-68066), LGP2031 (NRRL B-68067), LGP2033 (NRRL B-68068), LGP2034 (NRRL B-68069), and LGP2167 (NRRL B-67927). In certain embodiments, the *Methylobacterium* in the composition is selected from the group consisting of LGP2009 (NRRL B-50938), LGP2002 (NRRL B-50931), LGP2017 (NRRL B-67741), LGP2019 (NRRL B-67743), LGP2020 (NRRL-B-67892), LGP2033 (NRRL-B-68068), LGP2022 (NRRL-B-68033), LGP2023 (NRRL-B-68034), and LGP2021 (NRRL-B-68032). For example, in various embodiments, methods for enhancing plant production comprise: (a) applying a composition to a plant, plant part, or seed, wherein the composition comprises at least one *Methylobacterium* selected from the group consisting of LGP2021 (NRRL B-68032), LGP2022 (NRRL B-68033), LGP2023 (NRRL B-68034), LGP2029 (NRRL B-68065), LGP2030 (NRRL B-68066), LGP2031 (NRRL B-68067), LGP2033 (NRRL B-68068), LGP2034 (NRRL B-68069), and variants thereof; and, (b) growing the plant to at least a two leaf stage, thereby enhancing at least one plant trait selected from the group consisting of early plant growth, propagation/transplant vigor, nutrient uptake, stand establishment, stress tolerance and nutrient utilization efficiency; wherein said trait is enhanced in comparison to an untreated control plant that had not received an application of the composition or in comparison to a control plant grown from an untreated seed that had not received an application of the composition. In some embodiments, the *Methylobacterium* in the composition is selected from LGP2001 (NRRL B-50930), LGP2002 (NRRL B-50931), LGP2009 (NRRL B-50938), LGP2015 (NRRL B-67340), a combination of LGP2002 (NRRL B-50931) and LGP2015 (NRRL B-67340), and variants thereof. In certain embodiments, the composition is applied such that it coats or partially coats the plant, plant part, or seed. In certain embodiments, the plant is selected from the group consisting of rosemary, French tarragon, basil, oregano, *Pennisetum*, and/or other herbs. In certain embodiments, the *Methylobacterium* in the composition is a variant of any of the aforementioned *Methylobacterium* isolates. In certain embodiments, the plants are leafy green plants. In certain embodiments, the leafy green plant is selected from the group consisting of spinach, lettuce, beets, swiss chard, watercress, kale, collards, escarole, arugula, endive, bok choy, and turnips. In certain embodiments, plant biomass is increased by treatment with one or more *Methylobacterium* strains as provided herein. In some embodiments, plant biomass is increased as the result of enhanced early growth resulting from treatment with LGP2033 (NRRL B-68068), LGP2022 (NRRL B-68033), LGP2023 (NRRL B-68034), LGP2021 (NRRL B-68032), or variants thereof. In some embodiments, enhanced early growth is assessed at the two true leaf stage of development. In certain embodiments of the methods provided herein, the *Methylobacterium* compositions are applied to plants, plant parts, or seeds of fruits or vegetables grown hydroponically. In some embodiments, the *Methylobacterium* compositions provided herein are applied to plants, plant parts, or seeds of leafy green vegetables. In some embodiments, such leafy green vegetables are grown hydroponically. In certain embodiments, the plants are agricultural row crops.

In certain embodiments of methods to improve plant production provided herein, the plant is a leafy green plant, the plant improvement comprises enhanced early growth, improved propagation/transplant vigor, improved stand establishment, improved stress tolerance, and/or increased levels of nutrients in the plant or plant part and the *Methylobacterium* is selected from LGP2001 (NRRL B-50930), LGP2002 (NRRL B-50931), LGP2009 (NRRL B-50938), LGP2015 (NRRL B-67340), LGP2016 (NRRL B-67341), LGP2017 (NRRL B-67741), LGP2018 (NRRL B-67742), LGP2019 (NRRL B-67743), LGP2020 (NRRL B-67892), LGP2021 (NRRL B-68032), LGP2022 (NRRL B-68033), LGP2023 (NRRL B-68034), LGP2029 (NRRL B-68065), LGP2030 (NRRL B-68066), LGP2031 (NRRL B-68067), LGP2033 (NRRL B-68068), LGP2034 (NRRL B-68069), LGP2167 (NRRL B-67927), or variants thereof. In some embodiments, the leafy green plant is selected from the group consisting of spinach, lettuce, beets, swiss chard, watercress, kale, collards, escarole, arugula, endive, bok choy, and turnips. In some embodiments, the *Methylobacterium* is selected from LGP2001 (NRRL B-50930), LGP2002 (NRRL B-50931), LGP2009 (NRRL B-50938), LGP2015 (NRRL B-67340), a combination of LGP2002 (NRRL B-50931) and LGP2015 (NRRL B-67340), and variants thereof and the leafy green plant comprises rosemary, French tarragon, basil, oregano, *Pennisetum*, and/or other herbs. In certain embodiments of methods to improve plant production provided herein, the plant is a cannabis plant, the plant improvement is selected from enhanced growth and/or rooting, decreased cycling time, and increased biomass or yield, and the *Methylobacterium* is selected from LPG2001 (NRRL B-50930), LGP2002 (NRRL B-50931), LGP2009 (NRRL B-50938), LGP2019 (NRRL B-67743), and variants thereof. In certain embodiments, a variant of LGP2002 has genomic DNA comprising one or more polynucleotide marker fragments of at least 50, 60, 100, 120, 180, 200, 240, or 300 nucleotides of SEQ ID NOS: 13-15. In certain embodiments, a variant of LGP2009 has genomic DNA comprising one or more polynucleotide marker fragments of at least 50, 60, 100, 120, 180, 200, 240, or 300 nucleotides of SEQ ID NOS: 71-73. In certain embodiments, a variant of LGP2019 (NRRL B-67743) has genomic DNA comprising one or more polynucleotide marker fragments of at least 50, 60, 100, 120, 180, 200, 240, or 300 nucleotides of SEQ ID NOS: 25-27.

In certain embodiments, methods of enhancing growth and/or yield of a plant by treatment with a *Methylobacterium* isolate disclosed herein are provided. In some embodiments of such methods, the *Methylobacterium* is selected from LGP2001 (NRRL B-50930), LGP2002 (NRRL B-50931), LGP2009 (NRRL B-50938), LGP2015 (NRRL B-67340), LGP2016 (NRRL B-67341), LGP2017 (NRRL B-67741), LGP2018 (NRRL B-67742), LGP2019 (NRRL B-67743), LGP2020 (NRRL B-67892), LGP2021 (NRRL B-68032), LGP2022 (NRRL B-68033), LGP2023 (NRRL B-68034), LGP2029 (NRRL B-68065), LGP2030 (NRRL B-68066), LGP2031 (NRRL B-68067), LGP2033 (NRRL B-68068), LGP2034 (NRRL B-68069), LGP2167 (NRRL B-67927), or variants thereof and uptake and/or utilization of one or more nutrient components of a fertilizer applied during growth of said plant is enhanced. In some embodiments the one or more nutrient components is selected from the group consisting of nitrogen, phosphorus, potassium, and iron. In some embodiments, the plant is an agricultural row crop. In some embodiments, the plant is a leafy green plant, and in some embodiments the leafy green plant is grown in a hydroponic or aeroponic plant growth system. In some embodiments, a *Methylobacterium* treated plant can be cultivated using reduced rates of fertilizer as compared to standard application rates for said plant. In some embodiments, fertilizer application can be reduced by 5%, 10%, 15%, 20%, 25%, 30%, 35%, 40% or more. In certain embodiments, application of fertilizer can be reduced by at least 25%. In some embodiments the amount of one or more components of said fertilizer is reduced. In some embodiments levels of nitrogen, phosphorus, potassium and/or iron are reduced by 5%, 10%, 15%, 20%, 25%, 30%, 35%, 40% or more. Also provided are food products with enhanced content of nutrients as the result of treatment with *Methylobacterium* isolates and compositions provided herein. In some embodiments, the content of one or more nutrients selected from the group consisting of nitrogen, potassium, sulfur, copper, zinc, phosphorus, boron, iron, and manganese is increased.

Also provided herein are methods of improving growth and yield of rice plants by treating rice plants, plant parts, or seeds with one or more *Methylobacterium* isolates. In some embodiments, harvested seed yield and/or nutrient content of rice plants is improved. In some embodiments, rice seeds are treated and such treatment provides for increased rice seed yield. In some embodiments, the *Methylobacterium* isolate is selected from the group consisting of LGP2016 (NRRL B-67341), LGP2017 (NRRL B-67741), LGP2019 (NRRL B-67743), and variants of these isolates. In certain embodiments bushels per acre yield of rice plants is increased by at least 2-10%. In some embodiments, rice yield is increased by 2, 3, 4, 5, 6, 7, 8, 9, 10, 12, or 15% or more. Rice plants, plant parts, or seeds coated with *Methylobacterium* isolates and/or compositions are also provided herein. In certain embodiments, the *Methylobacterium* has chromosomal genomic DNA having at least 99%, 99.9, 99.8, 99.7, 99.6%, or 99.5% sequence identity to chromosomal genomic DNA of LGP2016 (NRRL B-67341), LGP2017 (NRRL B-67741), or LGP2019 (NRRL B-67743). In certain embodiments, the *Methylobacterium* has genomic DNA comprising one or more polynucleotide marker fragments of at least 50, 60, 100, 120, 180, 200, 240, or 300 nucleotides of SEQ ID NOS: 37-39 or SEQ ID NOS: 25-27.

Also provided herein are methods of improving growth and production of cannabis plants by treating cannabis plants, plant parts, or seeds with one or more *Methylobacterium* isolates. In some embodiments, nutrient content of treated plants is improved. In some embodiments, a cannabis cutting from a mature plant is treated. In some embodiments, a cannabis cutting is treated by immersion in a *Methylobacterium* suspension. In some embodiments, the *Methylobacterium* is present in said suspension at a concentration of greater than $1 \times 10^3$ colony forming units (CFU) per milliliter. In some embodiments, such treatments improve plant growth and rooting of such cuttings. In some embodiments, such treatments provided for a decreased cycling time for production of a cannabis plant as the result of such increased plant growth and rooting. In some embodiments, the *Methylobacterium* isolate is selected from the group consisting of LPG2001 (NRRL B-50930), LGP2002 (NRRL B-50931), LGP2009 (NRRL B-50938), LGP2019 (NRRL B-67743), and variants of these isolates. For example, in various embodiments, methods for enhancing plant growth and/or rooting of a cannabis plant comprise: (a) treating a cannabis plant, plant part, or seed with a composition comprising at least one *Methylobacterium* isolate; and (b) growing the treated plant or growing a plant from the treated plant part or seed to allow production of a rooted plant, wherein plant growth and/or rooting of the cannabis plant is increased in comparison to an untreated control plant that had not received treatment with the composition or in comparison to a control plant grown from an untreated plant part or seed that had not received treatment with the composition. *Cannabis* plants, plant parts, or seeds coated with *Methylobacterium* isolates and/or compositions are also provided herein. Various embodiments include a cannabis plant, part or seed that is at least partially coated with a composition comprising a *Methylobacterium* isolate selected from the group consisting of LPG2001 (NRRL B-50930), LGP2002 (NRRL B-50931), LGP2009 (NRRL B-50938), LGP2019 (NRRL B-67743), and a variant of LPG2001 (NRRL B-50930), LGP2002 (NRRL B-50931), LGP2009 (NRRL B-50938), or LGP2019 (NRRL B-67743), wherein said cannabis plant or a cannabis plant grown from said cannabis plant part or seed demonstrates enhanced plant growth or rooting, or decreased cycling time from cutting to mature plant, in comparison to a control cannabis plant that was not treated with said *Methylobacterium* or a cannabis plant grown from a control cannabis plant part or seed that was not treated with said *Methylobacterium*. In certain embodiments, the *Methylobacterium* has chromosomal genomic DNA having at least 99%, 99.9%, 99.8%, 99.7%, 99.6%, or 99.5% sequence identity to chromosomal genomic DNA of LPG2001 (NRRL B-50930), LGP2002 (NRRL B-50931), LGP2009 (NRRL B-50938), or LGP2019 (NRRL B-67743). In certain embodiments, the *Methylobacterium* has genomic DNA comprising one or more polynucleotide marker fragments of at least 50, 60, 100, 120, 180, 200, 240, or 300 nucleotides of SEQ ID NOS: 13-15, SEQ ID NOS: 71-73, or SEQ ID NOS: 25-27.

Also provided herein are methods of increasing cannabidiol (CBD) content in a cannabis plant, plant part, or seed. In various embodiments, the methods comprise: (a) treating a cannabis plant, plant part, or seed with a composition comprising at least one *Methylobacterium* isolate; and (b) growing the treated plant or growing a plant from the treated plant part or seed to allow production of a rooted plant, wherein CBD content of the cannabis plant is increased in comparison to an untreated control plant that had not received treatment with the composition or in comparison to a control plant grown from an untreated plant part or seed that had not received treatment with the composition. In some embodiments, CBD content can be increased by 5%, 10%, 15%, 20%, 25%, 30%, 35%, 40%, or more.

In certain embodiments of the compositions and methods provided herein, the composition further comprises at least one additional component selected from the group consisting of an additional active ingredient, an agriculturally acceptable adjuvant, and an agriculturally acceptable excipient. In certain embodiments of any of the aforementioned methods, the composition comprises the *Methylobacterium* at a titer of greater than $1\times10^3$ CFU/gm or at a titer of about $1\times10^6$ CFU/gm to about $1\times10^{14}$ CFU/gm for a solid composition or at a titer of greater than $1\times10^3$ CFU/ml or at a titer of about $1\times10^6$ CFU/mL to about $1\times10^{11}$ CFU/mL for a liquid composition.

Various methods for selecting a *Methylobacterium* isolate capable of improving early plant growth are also provided. In some embodiments, the method comprises: a) detecting in the genome of a *Methylobacterium* isolate, one or more genetic elements, wherein said genetic element i) encodes a recD2_2 or pinR protein; or ii) encodes a protein having a consensus amino acid sequence selected from the group consisting of SEQ ID NO: 77 to SEQ ID NO: 83; and b) treating a plant, plant part, or seed with said *Methylobacterium* isolate, and measuring early growth of said plant to identify improved early growth in comparison to a control plant not treated with said *Methylobacterium* isolate. In certain embodiments, the genetic element encodes a protein having at least 50%, 60%, 70%, 75%, 80%, 85%, 90%, or 95% sequence identity to a protein having an amino acid sequence selected from the group consisting of SEQ ID NO: 84 to SEQ ID NO: 90. In certain embodiments, the genetic element encodes a protein having at least 50% sequence identity to a protein having an amino acid sequence selected from the group consisting of SEQ ID NO: 84 to SEQ ID NO: 90. In certain embodiments, the genetic element encodes a protein has an amino acid sequence selected from the group consisting of SEQ ID NO: 84 to SEQ ID NO: 90. In certain embodiments, the plant is a rice lettuce, or spinach plant.

Also provided herein is a method for enhancing plant production that comprises (a) applying a composition to a plant, plant part, or seed, wherein the composition comprises at least one *Methylobacterium* selected from the group consisting of LPG2001 (NRRL B-50930), LGP2002 (NRRL B-50931), LGP2009 (NRRL B-50938), LGP2015 (NRRL B-67340), and variants thereof; and, (b) growing the plant, thereby enhancing at least one plant trait selected from the group consisting of early plant growth, propagation/transplant vigor, nutrient uptake, stand establishment, stress tolerance, and nutrient utilization efficiency; wherein said trait is enhanced in comparison to an untreated control plant that had not received an application of the composition or in comparison to a control plant grown from an untreated seed that had not received an application of the composition; and wherein the plant is selected from the group consisting of microgreens and herbs. In certain embodiments, the herb is selected from the group consisting of rosemary, French tarragon, basil, oregano and *Pennisetum*.

DETAILED DESCRIPTION

Definitions

The term "and/or" where used herein is to be taken as specific disclosure of each of the two or more specified features or components with or without the other. Thus, the term "and/or" as used in a phrase such as "A and/or B" herein is intended to include "A and B," "A or B," "A" (alone), and "B" (alone). Likewise, the term "and/or" as used in a phrase such as "A, B, and/or C" is intended to encompass each of the following embodiments: A, B, and C; A, B, or C; A or C; A or B; B or C; A and C; A and B; B and C; A (alone); B (alone); and C (alone).

As used herein, the terms "include," "includes," and "including" are to be construed as at least having the features or encompassing the items to which they refer while not excluding any additional unspecified features or unspecified items.

As used herein, the term "biological" refers to a component of a composition for treatment of plants or plant parts comprised of or derived from a microorganism. Biologicals include biocontrol agents, other beneficial microorganisms, microbial extracts, natural products, plant growth activators or plant defense agents. Non-limiting examples of biocontrol agents include bacteria, fungi, beneficial nematodes, and viruses. In certain compositions, a biological can comprise a mono-culture or co-culture of *Methylobacterium*, or a combination of *Methylobacterium* strains or isolates that have been separately cultured.

As used herein, a "leafy green plant" refers to a vegetable crop with edible leaves and includes, without limitation, spinach, kale, lettuce (including but not limited to romaine, butterhead, iceberg, and loose leaf lettuces), collard greens, cabbage, beet greens, watercress, swiss chard, arugula, escarole, endive, bok choy, and turnip greens. Leafy green plants as used herein also refers to plants grown for harvest of microgreens and/or herbs, including but not limited to lettuce, cauliflower, broccoli, cabbage, watercress, arugula, garlic, onion, leek, amaranth, swill chard, been, spinach, melon, cucumber, squash, basil, celery, cilantro, radish, radicchio, chicory, dill, rosemary, French tarragon, basil, *Pennisetum*, carrot, fennel, beans, peas, chickpeas, and lentils. Leafy green plants also refer to mixes of assorted leafy green plants, such as mesclun or other mixed salad greens or mixed microgreens. "Leafy green plants" as used herein also encompasses other brassica or cruciferous field greens not specifically mentioned herein by name.

As used herein, a "fruit" or "fruit bearing plant" is a fleshy fruit bearing plant, including but not limited to, melon (including watermelon and cantaloupe), berry (including strawberry, blueberry, blackberry, and raspberry), grape, kiwi, mango, papaya, pineapple, banana, pepper, tomato, squash, and cucumber plants.

As used herein, the term "*Methylobacterium*" refers to genera and species in the methylobacteriaceae family, including bacterial species in the *Methylobacterium* genus and proposed *Methylorubrum* genus (Green and Ardley (2018)). *Methylobacterium* includes pink-pigmented facultative methylotrophic bacteria (PPFM) and also encompasses the non-pink-pigmented *Methylobacterium* nodulans, as well as colorless mutants of *Methylobacterium* isolates. For example, and not by way of limitation, "*Methylobacterium*" refers to bacteria of the species listed below as well as any new *Methylobacterium* species that have not yet been reported or described that can be characterized as *Methylobacterium* or *Methylorubrum* based on phylogenetic analysis: *Methylobacterium adhaesivum; Methylobacterium oryzae; Methylobacterium aerolatum; Methylobacterium oxalidis; Methylobacterium aquaticum; Methylobacterium persicinum; Methylobacterium brachiatum; Methylobacterium phyllosphaerae; Methylobacterium brachythecii; Methylobacterium phyllostachyos; Methylobacterium bullatum; Methylobacterium platani; Methylobacterium cerastii; Methylobacterium pseudosasicola; Methylobacterium currus; Methylobacterium radiotolerans; Methylobacterium dankookense; Methylobacterium soli; Methylobacterium frigidaeris; Methylobacterium specialis; Methylobacterium fujisawaense; Methylobacterium tardum; Methylobacterium gnaphalii; Methylobacterium tarhaniae; Methylobacterium goesingense; Methylobacterium thuringiense; Methylobacterium gossipiicola; Methylobacterium trifolii; Methylobacterium gregans; Methylobacterium variabile; Methylobacterium haplocladii; Methylobacterium aminovorans (Methylorubrum aminovorans); Methylobacterium hispanicum; Methylobacterium extorquens (Methylorubrum extorquens); Methylobacterium indicum; Methylobacterium podarium (Methylorubrum podarium); Methylobacterium iners; Methylobacterium populi (Methylorubrum popuh); Methylobacterium isbiliense; Methylobacterium pseudosasae(Methylorubrum pseudosasae); Methylobacterium jeotgali; Methylobacterium rhodesianum (Methylorubrum rhodesianum); Methylobacterium komagatae; Methylobacterium rhodinum (Methylorubrum rhodinum); Methylobacterium longum; Methylobacterium salsuginis (Methylorubrum salsuginis); Methylobacterium marchantiae; Methylobacterium suomiense* Wethylorubrum *suomiense; Methylobacterium mesophilicum; Methylobacterium thiocyanatum (Methylorubrum thiocyanatum); Methylobacterium nodulans; Methylobacterium zatmanii (Methylorubrum zatmanii);* or *Methylobacterium organophilum.*

"Colonization efficiency" as used herein refers to the relative ability of a given microbial strain to colonize a plant host cell or tissue as compared to non-colonizing control samples or other microbial strains. Colonization efficiency can be assessed, for example and without limitation, by determining colonization density, reported for example as colony forming units (CFU) per mg of plant tissue, or by quantification of nucleic acids specific for a strain in a colonization screen, for example using qPCR.

As used herein "mineral nutrients" (also sometime referred to simply as "nutrients") are micronutrients or macronutrients required or useful for plants or plant parts including for example, but not limited to, nitrogen (N), potassium (K), calcium (Ca), magnesium (Mg), phosphorus (P), and sulfur (S), and the micronutrients chlorine (CO, Iron (Fe), Boron (B), manganese (Mn), zinc (Z), cobalt (Co), copper (Cu), molybdenum (Mo), and nickel (Ni).

As used herein, "vitamins" are organic compounds required in small amounts for normal growth and metabolism. Vitamins are important for human and/or animal growth, and some vitamins have been reported to be beneficial to plants. Vitamins include but are not limited to vitamin A (including but not limited to all-trans-retinol and all-trans-retinyl-esters, as well as all-trans-beta-carotene and other provitamin A carotenoids), vitamin B1 (thiamine), vitamin B2 (riboflavin), vitamin B3 (niacin), vitamin B5 (pantothenic acid), vitamin B6 (pyridoxine), vitamin B7 (biotin), vitamin B9 (folic acid or folate), vitamin B12 (cobalamins), vitamin C (ascorbic acid), vitamin D (calciferols), vitamin E (tocopherols and tocotrienols), and vitamin K (quinones).

As used herein "fertilizer" can be a single nutrient nitrogen fertilizer, such as urea, ammonia, or ammonia solutions (including ammonium nitrate, ammonium sulfate, calcium ammonium nitrate, and urea ammonium nitrate). In certain embodiments, the fertilizer can be a single nutrient phosphate fertilizer, such as a superphosphate or triple superphosphate or mixtures thereof, including double superphosphate. In certain embodiments, the fertilizer can be a single nutrient potassium-based fertilizer, such as muriate of potash. In certain embodiments, the compositions comprise multinutrient fertilizers including binary fertilizers (NP, NK, PK), including, for example monoammonium phosphate, diammonium phosphate, potassium nitrate, and potassium chloride. In further embodiments, three-component fertilizers (NPK) providing nitrogen, phosphorus, and potassium are present in the aqueous compositions. In still further embodiments, the fertilizer comprises micronutrients, which may be chelated or non-chelated. In some embodiments, combinations of various fertilizers can be present in the aqueous solution, including combinations of nitrogen, phosphorus, and/or micronutrient fertilizers. Nutrient solutions provided in hydroponic plant growth systems are also considered "fertilizers" in methods and compositions described herein.

As used herein, the term "strain" shall include all isolates of such strain.

As used herein, "variant" when used in the context of a *Methylobacterium* isolate, refers to any isolate that has chromosomal genomic DNA with at least 99%, 99.9%, 99.8%, 99.7%, 99.6%, or 99.5% sequence identity to chromosomal genomic DNA of a reference *Methylobacterium* isolate, such as, for example, a deposited *Methylobacterium* isolate provided herein. A variant of an isolate can be obtained from various sources including soil, plants or plant material, and water, particularly water associated with plants and/or agriculture. Variants include derivatives obtained from deposited isolates. *Methylobacterium* isolates or strains can be sequenced (for example as taught by Sanger et al. (1977), Bentley et al. (2008) or Caporaso et al. (2012)) and genome-scale comparison of the sequences conducted (Konstantinidis et al. (2005)) using sequence analysis tools, such as BLAST, as taught by Altschul et al. (1990) or clustalw (www.ebi.ac.uk/Tools/msa/clustalw2/). Variants can be identified, for example, by the presence of a 16S sequence of a reference strain, where the variant also demonstrates a plant production enhancement trait of the reference strain. Variants of *Methylobacterium* LGP2002 (NRRL B-50931), LGP2001 (NRRL B-50930), LGP2015 (NRRL B-67340), LGP2021 (NRRL B-68032), LGP2020 (NRRL B-67892), LGP2017 (NRRL B-67741), LGP2018 (NRRL B-67742), LGP2029 (NRRL B-68065), LGP2030 (NRRL B-68066), LGP2019 (NRRL B-67743), LGP2031 (NRRL B-68067), LGP2016 (NRRL B-67341), LGP2033 (NRRL B-68068), LGP2034 (NRRL B-68069), LGP2022 (NRRL B-68033), LGP2023 (NRRL B-68034), or LGP2167 (NRRL B-67927), include, for example, *Methylobacterium* that include at least one gene encoding a 16S RNA that has at least 97%, 98%, 99%, 99.5%, or 100% sequence identity to SEQ ID NOS: 91-107, respectively.

As used herein, "derivative" when used in the context of a *Methylobacterium* isolate, refers to any *Methylobacterium* that is obtained from a deposited *Methylobacterium* isolate provided herein. Derivatives of a *Methylobacterium* isolate include, but are not limited to, derivatives obtained by selection, derivatives selected by mutagenesis and selection, and genetically transformed *Methylobacterium* obtained from a *Methylobacterium* isolate. A "derivative" can be identified, for example, based on genetic identity to the strain or isolate from which it was obtained and will generally exhibit chromosomal genomic DNA with at least 99%, 99.9%, 99.8%, 99.7%, 99.6%, or 99.5% sequence identity to chromosomal genomic DNA of the strain or isolate from which it was derived.

As used herein, "sequence identity" when used to evaluate whether a particular *Methylobacterium* strain is a variant or derivative of a *Methylobacterium* strain provided herein refers to a measure of nucleotide-level genomic similarity between the coding regions of two genomes. Sequence identity between the coding regions of bacterial genomes can be calculated, for example, by determining the Average Nucleotide Identity (ANI) score using FastANI (Jain et al. "High throughput ANI analysis of 90K prokaryotic genomes reveals clear species boundaries", Nat Communications 9, 5114 (2018)) and Han et al. ("ANI tools web: a web tool for fast genome comparison within multiple bacterial strains"; Database, 2016, 1-5).

As used herein, a "correlation" is a statistical measure that indicates the extent to which two or more variables, here plant growth enhancement and identified genetic elements, occur together. A positive correlation indicates that a microbial strain containing a given genetic element is likely to enhance plant growth.

As used herein, a "pan-genome" is the entire set of genes for the microbial population being screened in a plant colonization efficiency screen. Thus, a pan-genome may represent the entire set of genes for a particular species, or the entire set of genes in multiple different species of the same genus or even the entire set of genes for multiple species classified in more than a single genus, where the strains in the population are from closely related genera.

As used herein a "genetic element" refers to an element in a DNA or RNA molecule that comprises a series of adjacent nucleotides at least 20 nucleotides in length and up to 50, 100, 1000, or 10000 or more nucleic acids in length. A genetic element may comprise different groups of adjacent nucleic acids, for example, where the genome of a plant-associated microorganism contains introns and exons. The genetic element may be present on a chromosome or on an extrachromosomal element, such as a plasmid. In eukaryotic plant-associated microorganisms, the genetic element may be present in the nucleus or in the mitochondria. In some embodiments, the genetic element is a functional genetic element (e.g., a gene) that encodes a protein.

As used herein, the terms "homologous" or "homologue" or "ortholog" refer to related genetic elements or proteins encoded by the genetic elements that are determined based on the degree of sequence identity. These terms describe the relationship between a genetic element or encoded protein found in one isolate, species, or strain and the corresponding or equivalent genetic element or protein in another isolate, species, or strain. As used herein, a particular genetic element in a first isolate, species, or strain is considered equivalent to a genetic element present in a second isolate, species, or strain when the proteins encoded by the genetic element in the isolates, species, or strains have at least 50 percent identity. Percent identity can be determined using a number of software programs available in the art including BLASTP, ClustalW, ALLALIGN, DNASTAR, SIM, SEQALN, NEEDLE, SSEARCH, and the like.

As used herein, the term "cultivate" means to grow a plant. A cultivated plant can be one grown and raised on a large agricultural scale or on a smaller scale, including for example a single plant.

As used herein, the term "hydroponic", "hydroponics", or "hydroponically" refers to a method of cultivating plants in the absence of soil.

Where a term is provided in the singular, other embodiments described by the plural of that term are also provided.

To the extent to which any of the preceding definitions is inconsistent with definitions provided in any patent or non-patent reference incorporated herein by reference, any patent or non-patent reference cited herein, or in any patent or non-patent reference found elsewhere, it is understood that the preceding definition will be used herein.

Further Description

Isolated *Methylobacterium* strains that enhance early growth of plants, improve propagation/transplant vigor, increase nutrient uptake, improve stand establishment, improve stress tolerance, and/or increase a plant's ability to utilize nutrients and compositions useful for treatment of plants with such strains are provided herein. In some embodiments, early growth enhancement results in increased yield at harvest, for example increased harvested seed yield. In certain embodiments, the *Methylobacterium* in the composition is selected from the group consisting of LGP2001 (NRRL B-50930), LGP2002 (NRRL B-50931), LGP2009 (NRRL B-50938), LGP2015 (NRRL B-67340), LGP2016 (NRRL B-67341), LGP2017 (NRRL B-67741), LGP2018 (NRRL B-67742), LGP2019 (NRRL B-67743), LGP2020 (NRRL B-67892), LGP2021 (NRRL B-68032), LGP2022 (NRRL B-68033), LGP2023 (NRRL B-68034), LGP2029 (NRRL B-68065), LGP2030 (NRRL B-68066), LGP2031 (NRRL B-68067), LGP2033 (NRRL B-68068), LGP2034 (NRRL B-68069), LGP2167 (NRRL B-67927), and variants thereof.

In certain embodiments, the *Methylobacterium* in the composition comprises a variant of LGP2001 (NRRL B-50930), LGP2002 (NRRL B-50931), LGP2009 (NRRL B-50938), LGP2015 (NRRL B-67340), LGP2016 (NRRL B-67341), LGP2017 (NRRL B-67741), LGP2018 (NRRL B-67742), LGP2019 (NRRL B-67743), LGP2020 (NRRL B-67892), LGP2021 (NRRL B-68032), LGP2022 (NRRL B-68033), LGP2023 (NRRL B-68034), LGP2029 (NRRL B-68065), LGP2030 (NRRL B-68066), LGP2031 (NRRL B-68067), LGP2033 (NRRL B-68068), LGP2034 (NRRL B-68069), or LGP2167 (NRRL B-67927). As noted, variants of *Methylobacterium* LGP2002 (NRRL B-50931), LGP2001 (NRRL B-50930), LGP2015 (NRRL B-67340), LGP2021 (NRRL B-68032), LGP2020 (NRRL B-67892), LGP2017 (NRRL B-67741), LGP2018 (NRRL B-67742), LGP2029 (NRRL B-68065), LGP2030 (NRRL B-68066), LGP2019 (NRRL B-67743), LGP2031 (NRRL B-68067), LGP2016 (NRRL B-67341), LGP2033 (NRRL B-68068), LGP2034 (NRRL B-68069), LGP2022 (NRRL B-68033), LGP2023 (NRRL B-68034), or LGP2167 (NRRL B-67927), include, for example, *Methylobacterium* that include at least one gene encoding a 16S RNA that has at least 97%, 98%, 99%, 99.5%, or 100% sequence identity to SEQ ID NOS: 91-107, respectively.

In certain embodiments, early plant development is enhanced, for example prior to a plant reaching the two true leaf stage. In certain embodiments, the plants are fruit or vegetable plants. In certain embodiments, the plants are leafy green plants. In certain embodiments, the plants are grown in a greenhouse. In certain embodiments, the plants are grown hydroponically or in an aeroponic plant cultivation system. Also provided is an isolated *Methylobacterium* strain selected from LGP2021 (NRRL B-68032), LGP2022 (NRRL B-68033), LGP2023 (NRRL B-68034), LGP2029 (NRRL B-68065), LGP2030 (NRRL B-68066), LGP2031 (NRRL B-68067), LGP2033 (NRRL B-68068), and LGP2034 (NRRL B-68069).

Further provided are methods of improving production of plants including leafy green plants, fruit and vegetable plants, row crops, such as corn, soybean, wheat, barley, and such, and specialty crops, including cannabis crops, by treatment with one or more *Methylobacterium* strains provided herein. In some embodiments, production is improved by enhanced early growth of treated plants or plants grown from treated seeds in comparison to an untreated control plant or in comparison to a control plant grown from an untreated seed. Such enhanced early growth is measured, for example, by an increase in biomass of treated plants, including increased shoot, leaf, root, or whole seedling biomass. Increased early growth can result in various improvements in plant production, including for example increased biomass production or yield of harvested plants, increased and/or more uniform fruit production, faster seed set, earlier maturation, increased rate of leaf growth, increased rate of root growth, increased seed yield, and decreased cycle time in comparison to an untreated control plant or in comparison to a control plant grown from an untreated seed. In certain embodiments, application of *Methylobacterium* strains as provided herein provides for a 1%, 2%, 3%, 4%, 5%, 6%, 7%, 8%, 9%, 10%, 12%, 15%, 17%, 20%, 30%, or 40% increase in any of the aforementioned traits in comparison to an untreated control plant or in comparison to a control plant grown from an untreated seed. In some embodiments, production is enhanced by increased rooting, for example of plant cuttings, where such increased rooting can result in decreased cycling time and/or increased biomass or yield of the treated plants.

Various methods for identifying a *Methylobacterium* strain that enhances plant nitrogen use efficiency are also provided herein. In one method, a plant, plant part, or seed is treated with at least a first *Methylobacterium* strain to obtain a treated seed and/or a treated plant or plant part. Following cultivation of the plant to at least the two true leaf stage, the plant or one or more plant parts is harvested from the cultivated plant and from a control plant grown from an untreated control seed or untreated control plant, or from a plant treated with a second *Methylobacterium* strain. The biomass of the treated and control plant or plant parts are assayed to i) measure growth, for example by measuring root length or biomass and/or shoot biomass, and/or ii) to measure nitrogen content, for example shoot nitrogen content. In some embodiments, nitrogen levels provided to the treated plants or plant parts are reduced from levels normally considered optimal for growth of the plant. In some embodiments, *Methylobacterium* isolates selected for testing in such methods comprise one or more genetic elements correlated with enhanced early plant growth as further described here and exemplified for early growth or rice. In some embodiments, the first *Methylobacterium* isolate comprises a genetic element encoding a protein having a consensus amino acid sequence selected from the group consisting of SEQ ID NO: 77 to SEQ ID NO: 83. In some embodiments, the at least a first *Methylobacterium* strain comprises two or more different *Methylobacterium* isolates. In some embodiments, the plant is cultivated in a hydroponic or aeroponic system. In some embodiments, *Methylobacterium* isolates selected for testing for enhanced nitrogen use efficiency comprise one or more genetic elements encoding proteins involved in production of indole acetic acid (IAA), 1-aminocyclopropane-1-carboxylate (ACC) deaminase, and/or siderophores.

In this manner, a *Methylobacterium* strain or strains is identified and selected, wherein the strain provides for enhanced nitrogen use efficiency in the cultivated plant or a plant part of the cultivated plant in comparison to an untreated control plant or plant part or in comparison to plants treated with other *Methylobacterium* strains when grown in nitrogen limited conditions. In some embodiments, enhanced nitrogen use efficiency is evidenced by enhanced growth and/or enhanced nitrogen content in plants or plant parts. In some embodiments, a rice seed is treated. In other embodiments, a leafy green plant seed, seedling, or part thereof is treated. In some embodiments, plants, seeds, or seedlings are separately treated with two, three, four, or more *Methylobacterium* strains and growth and nitrogen content are compared for plants or plant parts treated with different strains, and a *Methylobacterium* strain or strains demonstrating increased nitrogen content and/or increased growth under nitrogen limited conditions is selected and identified as providing for enhanced nitrogen use efficiency. In other embodiments, *Methylobacterium* strains are applied to seeds for planting and plants grown under nitrogen limited conditions are harvested to determine effect of the strain on plant yield.

In some embodiments, increased seedling root and shoot growth resulting from treatment with *Methylobacterium* may contribute to enhanced nitrogen use efficiency. Thus, identification of genetic elements and encoded proteins that contribute to such enhanced plant growth can be useful for identification of strains having the ability to improve nutrient uptake and utilization, and increase nitrogen use efficiency. Genetic elements and encoded proteins correlated with enhanced plant growth described herein were identified by screening a population of *Methylobacterium* strains and identifying strains that enhance plant growth (hits) and strains which lack the ability to enhance growth of the tested plant (non-hits). A genome-wide association study, or whole genome association study was performed to identify genetic elements correlated with enhanced root and shoot growth. As described herein, a pan-genome was generated (Page et al. (*Bioinformatics* (2015)31:3691-3693) for the tested *Methylobacterium* population and hundreds of additional *Methylobacterium* strains collected from various locations in the United States. Using the pan-genome as a reference, the presence or absence of each genetic element in the "hit" set of strains (plant growth promoting) and the "non-hit" set of strains was determined. The presence and absence scores were used in a correlation analysis to identify the genetic elements that correlate positively with enhanced plant growth. Correlation was established using a statistical significance threshold based on empirical p-value where a cutoff of p less than or equal to 0.05 or p less than or equal to 0.10 is used. Scores for sensitivity, where the presence of the gene is used as a determination that a strain enhances plant growth, and/or specificity, where the non-presence or absence of the gene is used as an indicator that a strain did not promote growth of the tested plant, were also used in the correlation analysis.

In some embodiments, presence of a genetic element associated with enhanced seedling and root growth is detected where a genetic element in a *Methylobacterium* strain encodes a protein having at least 50%, 60%, 70%, 75%, 80%, 85%, 90%, or 95% sequence identity or more to a protein encoded by a genetic element correlated with promoting plant growth. In certain embodiments, the genetic element comprises a gene that encodes a protein having at least 50%, 60%, 70%, 75%, 80%, 85%, 90%, or 95% sequence identity or one or more consensus proteins having an amino acid sequence of SEQ ID NO: 77 to SEQ ID NO: 83. In some embodiments, the genetic element comprises a gene that encodes a protein having at least 50%, 60%, 70%, 75%, 80%, 85%, 90%, or 95% sequence identity or one or more representative sequences of SEQ ID NO: 84 to SEQ ID NO: 90, where the representative sequences are from strains demonstrated herein to promote early plant growth. In some cases, identity to a representative or consensus sequence may be less than 50%, for example, 40% or even 30%. In certain embodiments, the genetic element comprises a gene that encodes a protein having 30% to 50% sequence identity to a protein encoded by SEQ ID NO: 84 to SEQ ID NO: 90.

Also provided herein are methods of enhancing growth and/or yield of a plant, comprising treating a plant or soil where said a plant is growing or will be grown, with a *Methylobacterium* isolate that enhances uptake and/or utilization of one or more nutrient components of a fertilizer that is applied to improve cultivation of said plant. In some embodiments the one or more nutrient components is selected from the group consisting of nitrogen, phosphorus, potassium, and iron. In some embodiments, the *Methylobacterium* isolate is selected from the group consisting of LGP2001 (NRRL B-50930), LGP2002 (NRRL B-50931), LGP2009 (NRRL B-50938), LGP2015 (NRRL B-67340), LGP2016 (NRRL B-67341), LGP2017 (NRRL B-67741), LGP2018 (NRRL B-67742), LGP2019 (NRRL B-67743), LGP2020 (NRRL B-67892), LGP2021 (NRRL B-68032), LGP2022 (NRRL B-68033), LGP2023 (NRRL B-68034), LGP2029 (NRRL B-68065), LGP2030 (NRRL B-68066), LGP2031 (NRRL B-68067), LGP2033 (NRRL B-68068), LGP2034 (NRRL B-68069), and LGP2167 (NRRL B-67927). In some embodiments, treatment with said *Methylobacterium* isolates allows for reduced levels of fertilizer or various fertilizer components during cultivation of said plant. In some embodiments, the plant is an agricultural row crop. In some embodiments, a *Methylobacterium* treated plant can be cultivated using reduced rates of fertilizer as compared to standard application rates for said plant. In some embodiments, fertilizer application can be reduced by 5%, 10%, 15%, 20%, 25%, 30%, 35%, 40%, or more. In certain embodiments, application of fertilizer can be reduced by at least 25%. In some embodiments the amount of one or more components of said fertilizer is reduced. In some embodiments levels of nitrogen, phosphorus, potassium and/or iron are reduced by 5%, 10%, 15%, 20%, 25%, 30%, 35%, 40%, or more. Optimal fertilizer and/or fertilizer components may vary depending on the crop, soil, and/or geographical location. Optimal fertilizer levels can also be determined experimentally, for example by measuring yield at increasing amounts of fertilizer, where the optimal fertilizer concentration is identified by determining the level after which no further yield advantage is observed. An example of determining the optimal nitrogen level for growth is described in Sharma et al. (*Indian J. Genet.* (2018) 78:292-301). In some embodiments, methods for enhancing growth and/or yield of a plant comprise application of a composition comprising one or more *Methylobacterium* isolates selected from the group consisting of LGP2001 (NRRL B-50930), LGP2002 (NRRL B-50931), LGP2009 (NRRL B-50938), LGP2015 (NRRL B-67340), LGP2016 (NRRL B-67341), LGP2017 (NRRL B-67741), LGP2018 (NRRL B-67742), LGP2019 (NRRL B-67743), LGP2020 (NRRL B-67892), LGP2021 (NRRL B-68032), LGP2022 (NRRL B-68033), LGP2023 (NRRL B-68034), LGP2029 (NRRL B-68065), LGP2030 (NRRL B-68066), LGP2031 (NRRL B-68067), LGP2033 (NRRL B-68068), LGP2034 (NRRL B-68069), LGP2167 (NRRL B-67927), and a fertilizer. In some embodiments, the plant is an agricultural row crop. In some embodiments, the plant is a leafy green plant. In some embodiments, a leafy green plant is treated, and the leafy green plant is cultivated in a hydroponic or aeroponic plant growth environment. In some embodiments, the fertilizer or component of the fertilizer are present at a reduced rate compared to the optimal level for the plant. In some embodiments, the nitrogen level is reduced by 5%, 10%, 15%, 20%, 25%, 30%, 35%, 40%, or more.

In some embodiments of methods provided herein, a plant seed is treated. In certain other embodiments, a plant seedling or part thereof is treated. In some embodiments, a plant shoot or seedling is treated. In some embodiments, the treated plant is cultivated to the second true leaf stage (V2) and harvested to determine root and shoot biomass and nitrogen levels. In some embodiments, the treated plant is cultivated for 10 to 14 days. In some embodiments, the treated plant is cultivated for 14 to 28 days. In some embodiments, the treated plant is cultivated for 28 or more days prior to harvest and analysis of tissue samples to determine levels of nitrogen and other mineral nutrients. In some embodiments, treated plant seeds or seedlings are cultivated in a hydroponic system or an aeroponic plant growth system. A hydroponics system can be a water culture system, a nutrient film technique, an ebb and flow system, a drip system, or a wick system. In an aeroponic system, plants are grown in an air or mist environment without the use of soil. In some embodiments, the hydroponic or aeroponic system can be a variation of any of these types or a combination of one or more systems. In some embodiments, a hydroponic or aeroponic system is advantageous over a soil based cultivation system for determining effects of *Methylobacterium* strains due to the presence of fewer background microorganisms. Various inert substrates can be used to support the plants, seedlings, and root systems in hydroponic or aeroponic growth, including but not limited to perlite, rockwool, clay pellets, foam cubes, rock, peat moss, or vermiculite.

In some embodiments, a *Methylobacterium* strain that enhances plant growth or nitrogen use efficiency is more efficient at colonizing a plant host cell or tissue, as compared to other *Methylobacterium* strains. Methods for identifying microbial strains having enhanced colonization efficiency are described in WO2020163027 (PCT/US2020/012041), which is incorporated herein by reference in its entirety. In some embodiments, a *Methylobacterium* strain that increases the nitrogen use efficiency of a plant or plant part also imparts a trait improvement to said plant selected from increased biomass production, decreased cycle time, increased rate of leaf growth, decreased time to develop two true leaves, increased rate of root growth, and increased seed yield.

Various methods of using *Methylobacterium* strains to enhance early growth or rooting, improve propagation/transplant vigor, increase nutrient uptake, improve stand establishment, improve stress tolerance, and/or increase a plant's ability to uptake and/or utilize nutrients, such as nitrogen, potassium, sulfur, cobalt, copper, zinc, phosphorus, boron, iron, and manganese in plants, such as leafy green plants, row crops, cannabis, and other specialty crops are provided herein. In certain embodiments, *Methylobacterium* treatment of a row crop, including but not limited to corn, soybean, rice, canola, and wheat, results in enhanced plant growth and yield. In certain embodiments, the crop is rice and the *Methylobacterium* is selected from the group consisting of LGP2016 (NRRL B-67341), LGP2017 (NRRL B-67741), LGP2019 (NRRL B-67743), and variants thereof. In some embodiments, *Methylobacterium* selected from LGP2002 (NRRL B-50931), LGP2009 (NRRL B-50938), and variants thereof are applied to rosemary, French tarragon, basil, *Pennisetum*, and other herbs. In certain embodiments, *Methylobacterium* treatment of soil, a seed, a leaf, a stem, a root, or a shoot can enhance early growth, propagation/transplant vigor, stand establishment, and/or stress tolerance as well as or alternatively enhance nutrient use efficiency. Enhanced nutrient use efficiency can result in increased levels of nitrogen and other mineral nutrients, including for example, potassium, sulfur, copper, zinc, phosphorus, boron, iron, and manganese in a treated plant. In some embodiments, *Methylobacterium* LGP2001 (NRRL B-50930), LGP2002 (NRRL B-50931), LGP2009 (NRRL B-50938), LGP2015 (NRRL B-67340), LGP2016 (NRRL B-67341), LGP2017 (NRRL B-67741), LGP2018 (NRRL B-67742), LGP2019 (NRRL B-67743), LGP2020 (NRRL B-67892), LGP2021 (NRRL B-68032), LGP2022 (NRRL B-68033), LGP2023 (NRRL B-68034), LGP2029 (NRRL B-68065), LGP2030 (NRRL B-68066), LGP2031 (NRRL B-68067), LGP2033 (NRRL B-68068), LGP2034 (NRRL B-68069), LGP2167 (NRRL B-67927), or variants thereof are applied to plants, plant parts, or seeds.

Alternatively, such *Methylobacterium* may be applied to soil or other growth medium where plants are grown. *Methylobacterium* soil treatments or applications can include, but are not limited to, in-furrow applications (e.g., before, during, and/or after seed deposition), soil drenches, and distribution of granular or other dried formulations to the soil (e.g., before, during, and/or after seed deposition or plant growth). *Methylobacterium* treatments for plants grown in hydroponic systems can include seed treatments prior to germination, foliar applications to germinated plants or parts thereof, and applications in a liquid solution used in the hydroponic system. In certain embodiments, *Methylobacterium* treatment of a plant can include application to the seed, plant, and/or a part of the plant and can thus comprise any *Methylobacterium* treatment or application resulting in colonization of the plant by the *Methylobacterium*. In some embodiments, application of *Methylobacterium* to crops that are propagated by cutting can enhance growth and/or rooting of such plants. Field transplants of such treated and rooted cuttings may demonstrate decreased cycling time and/or improved biomass and/or yield as a result of such treatments. In some embodiments *Methylobacterium* selected from LGP2002 (NRRL B-50931), LGP2009 (NRRL B-50938), LGP2019 (NRRL B-67743), and variants thereof are applied to cannabis cuttings to improve growth and root development.

Treatments or applications to plants described herein can include, but are not limited to, spraying, coating, partially coating, immersing, and/or imbibing the seed, plant, or plant parts with the *Methylobacterium* strains and compositions comprising the same provided herein. In certain embodiments, soil, a seed, a leaf, a stem, a root, a tuber, or a shoot can be sprayed, immersed, and/or imbibed with a liquid, semi-liquid, emulsion, or slurry of a composition provided herein. Such treatments, applications, seed immersion, or imbibition can be sufficient to provide for enhanced early growth and/or increased levels of one or more mineral nutrients and/or vitamins content in harvestable tissue from a treated plant or plant grown from a treated seed in comparison to an untreated plant or plant grown from an untreated seed. Enhanced early growth can lead to further improvements in plant production including an increase in biomass of treated plants, such as increased shoot, root, or whole seedling biomass. Enhanced early growth can result in various additional improvements in plant production, including for example increased yield of harvested plants or harvested plant parts, increased and/or more uniform fruit production, faster seed set, earlier maturation, increased rate of leaf growth, increased rate of root growth, increased seed yield, and decreased cycle time. In certain embodiments, plant seeds or cuttings can be immersed and/or imbibed for at least 1, 2, 3, 4, 5, or 6 hours. Such immersion and/or imbibition can, in certain embodiments, be conducted at temperatures that are not deleterious to the plant seed or the *Methylobacterium*. In certain embodiments, the seeds can be treated at about 15 to about 30 degrees Centigrade or at about 20 to about 25 degrees Centigrade. In certain embodiments, seed imbibition and/or immersion can be performed with gentle agitation. Seed treatments can be effected with both continuous and/or batch seed treaters. In certain embodiments, the coated seeds can be prepared by slurrying seeds with a coating composition comprising a *Methylobacterium* strain that increases the levels of one or more mineral nutrients and/or vitamins and air-drying the resulting product. Air-drying can be accomplished at any temperature that is not deleterious to the seed or the *Methylobacterium*, but will typically not be greater than 30 degrees Centigrade. The proportion of coating that comprises the *Methylobacterium* strain includes, but is not limited to, a range of 0.1 to 25% by weight of the seed or other plant part, 0.5 to 5% by weight of the seed or other plant part, and 0.5 to 2.5% by weight of the seed or other plant part. In certain embodiments, a solid substance used in the seed coating or treatment will have a *Methylobacterium* strain that increases mineral nutrient and/or vitamin content adhered to a solid substance as a result of being grown in biphasic media comprising the *Methylobacterium* strain, solid substance, and liquid media. Methods for growing *Methylobacterium* in biphasic media include those described in U.S. Pat. No. 9,181,541, which is specifically incorporated herein by reference in its entirety. In certain embodiments, compositions suitable for treatment of a seed or plant part can be obtained by the methods provided in U.S. Pat. No. 10,287,544, which is specifically incorporated herein by reference in its entirety. Various seed treatment compositions and methods for seed treatment disclosed in U.S. Pat. Nos. 5,106,648, 5,512,069, and 8,181,388 are incorporated herein by reference in their entireties and can be adapted for treating seeds with compositions comprising a *Methylobacterium* strain.

In certain embodiments where plant seeds are treated with *Methylobacterium* compositions provided herein, the compositions further comprise one or more lubricants to ensure smooth flow and separation (singulation) of seeds in the seeding mechanism, for example a planter box. Lubricants for use in such compositions include talc, graphite, polyethylene wax based powders (such as Fluency Agent), protein powders, for example soybean protein powders, or a combination of protein powders and a lipid, for example lecithin or a vegetable oil. Lubricants can be applied to seeds simultaneously with application of *Methylobacterium*, or may be mixed with *Methylobacterium* prior to application of the compositions to the seeds.

In certain embodiments, treated plants are cultivated in a hydroponic system. In some embodiments, plant seeds are treated and plants are grown from the treated seeds continuously in the same cultivation system. In some embodiments, plant seeds are treated and cultivated in a hydroponic nursery to produce seedlings. The seedlings are transferred to a different hydroponic system, for example for commercial production of leafy greens. In some embodiments, a *Methylobacterium* strain that enhances early growth or increases the levels of one or more mineral nutrients and/or vitamins persists in the seedlings transferred to a greenhouse production system and continues to provide advantages such as improved micronutrient and/or vitamin content and/or biomass production, through the further growth of the leafy green plant. In some embodiments, plant seedlings transferred to a greenhouse production system may be further treated with LGP2001 (NRRL B-50930), LGP2002 (NRRL B-50931), LGP2009 (NRRL B-50938), LGP2015 (NRRL B-67340), LGP2016 (NRRL B-67341), LGP2017 (NRRL B-67741), LGP2018 (NRRL B-67742), LGP2019 (NRRL B-67743), LGP2020 (NRRL B-67892), LGP2021 (NRRL B-68032), LGP2022 (NRRL B-68033), LGP2023 (NRRL B-68034), LGP2029 (NRRL B-68065), LGP2030 (NRRL B-68066), LGP2031 (NRRL B-68067), LGP2033 (NRRL B-68068), LGP2034 (NRRL B-68069), LGP2167 (NRRL B-67927), or variants thereof, or with one or more other *Methylobacterium* strains that increase the levels of one or more mineral nutrients and/or vitamins prior to, during, or after transfer to the production system.

In certain embodiments, the composition used to treat the seed or plant part can contain a *Methylobacterium* strain and an agriculturally acceptable excipient. Agriculturally acceptable excipients include, but are not limited to, woodflours, clays, activated carbon, diatomaceous earth, fine-grain inorganic solids, calcium carbonate, and the like. Clays and inorganic solids that can be used include, but are not limited to, calcium bentonite, kaolin, china clay, talc, perlite, mica, vermiculite, silicas, quartz powder, montmorillonite, and mixtures thereof. Agriculturally acceptable excipients also include various lubricants such as talc, graphite, polyethylene wax based powders (such as Fluency Agent), protein powders, for example soybean protein powders, or a combination of protein powders and a lipid, for example lecithin or a vegetable oil.

Agriculturally acceptable adjuvants that promote sticking to the seed that can be used include, but are not limited to, polyvinyl acetates, polyvinyl acetate copolymers, hydrolyzed polyvinyl acetates, polyvinylpyrrolidone-vinyl acetate copolymer, polyvinyl alcohols, polyvinyl alcohol copolymers, polyvinyl methyl ether, polyvinyl methyl ether-maleic anhydride copolymer, waxes, latex polymers, celluloses including ethylcelluloses and methylcelluloses, hydroxy methylcelluloses, hydroxypropylcellulose, hydroxymethylpropylcelluloses, polyvinyl pyrrolidones, alginates, dextrins, malto-dextrins, polysaccharides, fats, oils, proteins, karaya gum, jaguar gum, tragacanth gum, polysaccharide gums, mucilage, gum arabics, shellacs, vinylidene chloride polymers and copolymers, soybean-based protein polymers and copolymers, lignosulfonates, acrylic copolymers, starches, polyvinylacrylates, zeins, gelatin, carboxymethylcellulose, chitosan, polyethylene oxide, acrylamide polymers and copolymers, polyhydroxyethyl acrylate, methylacrylamide monomers, alginate, ethylcellulose, polychloroprene, and syrups or mixtures thereof. Other useful agriculturally acceptable adjuvants that can promote coating include, but are not limited to, polymers and copolymers of vinyl acetate, polyvinylpyrrolidone-vinyl acetate copolymer, and water-soluble waxes. Further, agriculturally acceptable adjuvants also include various lubricants (which can provide for smooth flow and separation (singulation) of seeds) such as talc, graphite, polyethylene wax based powders (such as Fluency Agent), protein powders, for example soybean protein powders, or a combination of protein powders and a lipid, for example lecithin or a vegetable oil. Various surfactants, dispersants, anticaking-agents, foam-control agents, and dyes disclosed herein and in U.S. Pat. No. 8,181,388 can be adapted for use with compositions comprising a suitable *Methylobacterium* strain. In certain embodiments, the seed and/or seedling is exposed to the composition by providing the *Methylobacterium* strain in soil in which the plant or a plant arising from the seed are grown, or other plant growth media in which the plant or a plant arising from the seed are grown. Examples of methods where the *Methylobacterium* strain is provided in the soil include in furrow applications, soil drenches, and the like.

Non-limiting examples of treatments of plant seeds, seedling, or other plant parts with a *Methylobacterium* providing for enhanced early growth and/or increased content of one or more mineral nutrients and/or vitamins in a harvested plant part include treatments of vegetable crops with edible leaves including, without limitation, spinach, kale, lettuce (including but not limited to romaine, butterhead, iceberg and loose leaf lettuces), and field greens, including brassica greens. Specific greens that can be treated with *Methylobacterium* provided herein include collard greens, cabbage, beet greens, watercress, swiss chard, arugula, escarole, endive, bok choy, and turnip greens. Other leafy green plants that are grown for production and harvest of microgreens and/or herbs, can also be treated in the methods described herein to provide for increased content of one or more mineral nutrients and/or vitamins in harvested microgreens, including but not limited to lettuce, cauliflower, broccoli, cabbage, watercress, arugula, garlic, onion, leek, amaranth, swill chard, been, spinach, melon, cucumber, squash, basil, celery, cilantro, radish, radicchio, chicory, dill, rosemary, French tarragon, basil, *Pennisetum*, carrot, fennel, beans, peas, chickpeas, and lentils. Treatment of plants grown for harvest of fleshy fruits are also provided herein. Such plants include, for example, melon (including watermelon and cantaloupe), berry (including strawberry, blueberry, blackberry, and raspberry), grape, kiwi, mango, papaya, pineapple, banana, pepper, tomato, squash, and cucumber plants.

In certain embodiments, LGP2001 (NRRL B-50930), LGP2002 (NRRL B-50931), LGP2009 (NRRL B-50938), LGP2015 (NRRL B-67340), LGP2016 (NRRL B-67341), LGP2017 (NRRL B-67741), LGP2018 (NRRL B-67742), LGP2019 (NRRL B-67743), LGP2020 (NRRL B-67892), LGP2021 (NRRL B-68032), LGP2022 (NRRL B-68033), LGP2023 (NRRL B-68034), LGP2029 (NRRL B-68065), LGP2030 (NRRL B-68066), LGP2031 (NRRL B-68067), LGP2033 (NRRL B-68068), LGP2034 (NRRL B-68069), LGP2167 (NRRL B-67927), or variants thereof will also find use in treatment of other plant species to enhance early growth, including, for example field crops, ornamentals, turf grasses, and trees grown in commercial production, such as conifer trees. Without limitation, such additional plant species include corn, soybean, cruciferous or Brassica sp. vegetables (e.g., *B. napus, B. rapa, B. juncea*), alfalfa, rice, rye, wheat, barley, oats, sorghum, millet (e.g., pearl millet (*Pennisetum glaucum*), proso millet (*Panicum miliaceum*), foxtail millet (*Setaria italica*), and finger millet (*Eleusine coracana*)), sunflower, safflower, tobacco, potato, peanuts, cotton, species in the genus *Cannabis* (including, but not limited to, *Cannabis sativa* and industrial hemp varieties), sweet potato (*Ipomoea batatus*), cassava, coffee, coconut, ornamentals (including, but not limited to, azalea, hydrangea, hibiscus, roses, tulips, daffodils, petunias, carnation, poinsettia, and chrysanthemum), conifers (including, but not limited to pines such as loblolly pine, slash pine, ponderosa pine, lodge pole pine, and Monterey pine; Douglas-fir; Western hemlock; Sitka spruce; redwood; true first such as silver fir and balsam fir; and cedars such as Western red cedar and Alaska yellow-cedar), and turfgrass (including, but are not limited to, annual bluegrass, annual ryegrass, Canada bluegrass, fescue, bentgrass, wheatgrass, Kentucky bluegrass, orchard grass, ryegrass, redtop, Bermuda grass, St. Augustine grass, and zoysia grass).

In certain embodiments, a *Methylobacterium* strain used to treat a given cultivar or variety of plant seed, plant, or plant part can be a *Methylobacterium* strain that was isolated from a different plant species, or a different cultivar or variety of the plant species being treated, and is thus heterologous or non-resident to the treated plant or plant part. Plant parts that have increased levels of one or more mineral nutrients and/or vitamins as the result of treatment with *Methylobacterium* as provided herein include, but are not limited to, leaves, stems, flowers, roots, seeds, fruit, tubers, coleoptiles, and the like. In certain embodiments, a plant having enhanced early growth as a result of treatment with LGP2001 (NRRL B-50930), LGP2002 (NRRL B-50931), LGP2009 (NRRL B-50938), LGP2015 (NRRL B-67340), LGP2016 (NRRL B-67341), LGP2017 (NRRL B-67741), LGP2018 (NRRL B-67742), LGP2019 (NRRL B-67743), LGP2020 (NRRL B-67892), LGP2021 (NRRL B-68032), LGP2022 (NRRL B-68033), LGP2023 (NRRL B-68034), LGP2029 (NRRL B-68065), LGP2030 (NRRL B-68066), LGP2031 (NRRL B-68067), LGP2033 (NRRL B-68068), LGP2034 (NRRL B-68069), LGP2167 (NRRL B-67927), or variants thereof, or a plant having enhanced levels of one or more mineral nutrients as a results of treatment with *Methylobacterium* compositions provided herein is a leafy green plant. In some embodiments, a plant having enhanced early growth as a result of treatment with a *Methylobacterium* provided herein, or a plant having enhanced levels of one or more mineral nutrients as a results of treatment with *Methylobacterium* compositions provided herein is an agricultural row crop plant. In some embodiments, increased levels of one or more mineral nutrients and/or vitamins are present in a leaf. In certain embodiments, the increased levels of one or more mineral nutrients and/or vitamins are present in the harvested greens, including leaves and shoots.

In certain embodiments, a manufactured combination composition comprising two or more *Methylobacterium* strains can be used to treat a seed or plant part in any of the methods provided herein. Such manufactured combination compositions can be made by methods that include harvesting monocultures of each *Methylobacterium* strain and mixing the harvested monocultures to obtain the manufactured combination composition of *Methylobacterium*. In certain embodiments, the manufactured combination composition of *Methylobacterium* can comprise *Methylobacterium* isolated from different plant species or from different cultivars or varieties of a given plant.

In certain embodiments, an effective amount of the *Methylobacterium* strain or strains used in treatment of plants, seeds, or plant parts is a composition having a *Methylobacterium* titer of at least about $1 \times 10^6$ colony-forming units per milliliter, at least about $5 \times 10^6$ colony-forming units per milliliter, at least about $1 \times 10^7$ colony-forming units per milliliter, at least about $5 \times 10^8$ colony-forming units per milliliter, at least about $1 \times 10^9$ colony-forming units per milliliter, at least about $1 \times 10^{10}$ colony-forming units per milliliter, or at least about $3 \times 10^{10}$ colony-forming units per milliliter. In certain embodiments, an effective amount of the *Methylobacterium* strain or strains is a composition with the *Methylobacterium* at a titer of about least about $1 \times 10^6$ colony-forming units per milliliter, at least about $5 \times 10^6$ colony-forming units per milliliter, at least about $1 \times 10^7$ colony-forming units per milliliter, or at least about $5 \times 10^8$ colony-forming units per milliliter to at least about $6 \times 10^{10}$ colony-forming units per milliliter of a liquid or an emulsion. In certain embodiments, an effective amount of the *Methylobacterium* strain or strains is a composition with the *Methylobacterium* at least about $1 \times 10^6$ colony-forming units per gram, at least about $5 \times 10^6$ colony-forming units per gram, at least about $1 \times 10^7$ colony-forming units per gram, or at least about $5 \times 10^8$ colony-forming units per gram to at least about $6 \times 10^{10}$ colony-forming units of *Methylobacterium* per gram of the composition. In certain embodiments, an effective amount of a composition provided herein can be a composition with a *Methylobacterium* titer of at least about $1 \times 10^6$ colony-forming units per gram, at least about $5 \times 10^6$ colony-forming units per gram, at least about $1 \times 10^7$ colony-forming units per gram, or at least about $5 \times 10^8$ colony-forming units per gram to at least about $6 \times 10^{10}$ colony-forming units of *Methylobacterium* per gram of particles in the composition containing the particles that comprise a solid substance wherein a mono-culture or co-culture of *Methylobacterium* strain or strains is adhered thereto. In certain embodiments, an effective amount of a composition provided herein to a plant or plant part can be a composition with a *Methylobacterium* titer of at least about $1 \times 10^6$ colony-forming units per mL, at least about $5 \times 10^6$ colony-forming units per mL, at least about $1 \times 10^7$ colony-forming units per mL, or at least about $5 \times 10^8$ colony-forming units per mL to at least about $6 \times 10^{10}$ colony-forming units of *Methylobacterium* per mL in a composition comprising an emulsion wherein a mono-culture or co-culture of a *Methylobacterium* strain or strains adhered to a solid substance is provided therein or grown therein. In certain embodiments, an effective amount of a composition provided herein can be a composition with a *Methylobacterium* titer of at least about $1 \times 10^6$ colony-forming units per mL, at least about $5 \times 10^6$ colony-forming units per mL, at least about $1 \times 10^7$ colony-forming units per mL, or at least about $5 \times 10^8$ colony-forming units per mL to at least about $6 \times 10^{10}$ colony-forming units of *Methylobacterium* per mL in a composition comprising an emulsion wherein a mono-culture or co-culture of a *Methylobacterium* strain or strains is provided therein or grown therein. In certain embodiments, any of the aforementioned compositions comprising a mono-culture or co-culture of a *Methylobacterium* strain or strains can further comprise a mono- or co-culture of Rhizobium and/or Bradyrhizobium.

In certain embodiments, an effective amount of a *Methylobacterium* strain or strains that provides for increased early growth and/or increased mineral nutrient and/or vitamin content provided in a treatment of a seed or plant part is at least about $10^3$, $10^4$, $10^5$, or $10^6$ CFU per seed or treated plant part. In certain embodiments, an effective amount of *Methylobacterium* provided in a treatment of a seed or plant part is at least about $10^3$, $10^4$, $10^5$, or $10^6$ CFU to about $10^7$, $10^8$, $10^9$, or $10^{10}$ CFU per seed or treated plant part. In certain embodiments, the effective amount of *Methylobacterium* provided in a treatment of a seed or plant part is an amount where the CFU per seed or treated plant part will exceed the number of CFU of any resident naturally occurring *Methylobacterium* strain by at least 5-, 10-, 100-, or 1000-fold. In certain embodiments, the effective amount of *Methylobacterium* provided in a treatment of a seed or plant part is an amount where the CFU per seed or treated plant part will exceed the number of CFU of any resident naturally occurring *Methylobacterium* by at least 2-, 3-, 5-, 8-, 10-, 20-, 50-, 100-, or 1000-fold. In certain embodiments where the treated plant is cultivated in a hydroponic system, populations of naturally occurring *Methylobacterium* or other soil microbes will be minimal.

Non-limiting examples of *Methylobacterium* strains that can be used in methods provided herein are disclosed in Table 1. Other *Methylobacterium* strains useful in certain methods provided herein include variants of the *Methylobacterium* strains disclosed in Table 1. Also of use are various combinations of two or more strains or variants of *Methylobacterium* strains disclosed in Table 1 for treatment of plants or parts thereof.

TABLE 1

| *Methylobacterium* sp. strain | | | | |
|---|---|---|---|---|
| Deposit Identifier | Isolate No. | LGP NO. | USDA ARS NRRL No.[1] | Strain Source: Obtained from: |
| *Methylobacterium* sp. #1 | ISO101 | LGP2000 | NRRL B-50929 | a soybean plant grown in Saint Louis County, Missouri, USA |
| *Methylobacterium* sp. #2 | ISO102 | LGP2001 | NRRL B-50930 | a weed grown in Saint Louis County, Missouri, USA |
| *Methylobacterium* sp. #3 | ISO103 | LGP2002 | NRRL B-50931 | a mint plant grown in Saint Louis County, Missouri, USA |
| *Methylobacterium* sp. #4 | ISO104 | LGP2003 | NRRL B-50932 | a soybean plant grown in Saint Louis County, Missouri, USA |
| *Methylobacterium* sp. #5 | ISO105 | LGP2004 | NRRL B-50933 | a broccoli plant grown in Saint Louis County, Missouri, USA |
| *Methylobacterium* sp. #6 | ISO106 | LGP2005 | NRRL B-50934 | a corn plant grown in Saint Louis County, Missouri, USA |
| *Methylobacterium* sp. #7 | ISO107 | LGP2006 | NRRL B-50935 | a corn plant grown in Saint Louis County, Missouri, USA |
| *Methylobacterium* sp. #8 | ISO108 | LGP2007 | NRRL B-50936 | a corn plant grown in Saint Louis County, Missouri, USA |
| *Methylobacterium* sp. #9 | ISO109 | LGP2008 | NRRL B-50937 | a corn plant grown in Saint Louis County, Missouri, USA |
| *Methylobacterium* sp. #10 | ISO110 | LGP2009 | NRRL B-50938 | a corn plant grown in Saint Louis County, Missouri, USA |
| *Methylobacterium* sp. #11 | ISO111 | LGP2010 | NRRL B-50939 | a lettuce plant grown in Saint Louis County, Missouri, USA |
| *Methylobacterium* sp. #12 | ISO112 | LGP2011 | NRRL B-50940 | a corn plant grown in Saint Louis County, Missouri, USA |
| *Methylobacterium* sp. #13 | ISO113 | LGP2012 | NRRL B-50941 | a tomato plant grown in Saint Louis County, Missouri, USA |
| *Methylobacterium* sp. #14 | ISO114 | LGP2013 | NRRL B-50942 | a tomato plant grown in Saint Louis County, Missouri, USA |
| *Methylobacterium* sp. #15 | ISO115 | LGP2014 | NRRL B-67339 | a soybean plant grown in Saint Louis County, Missouri, USA |
| *Methylobacterium* sp. #16 | ISO116 | LGP2015 | NRRL B-67340 | a yucca plant grown in Saint Louis County, Missouri, USA |
| *Methylobacterium* sp. #17 | ISO117 | LGP2016 | NRRL B-67341 | a soybean plant grown in Saint Louis County, Missouri, USA |
| *Methylobacterium* sp. #18 | ISO118 | LGP2017 | NRRL B-67741 | a Dionaea muscipula plant (Venus fly trap) grown in St. Charles, MO. |
| *Methylobacterium* sp. #19 | ISO119 | LGP2018 | NRRL B-67742 | an *Orchidaceae* spp. plant (orchid) grown in Saint Louis County, Missouri, USA |
| *Methylobacterium* sp. #20 | ISO120 | LGP2019 | NRRL B-67743 | a tomato plant grown in Saint Louis County, Missouri, USA |

TABLE 1-continued

*Methylobacterium* sp. strain

| Deposit Identifier | Isolate No. | LGP NO. | USDA ARS NRRL No.[1] | Strain Source: Obtained from: |
|---|---|---|---|---|
| *Methylobacterium* sp. #26 | ISO121 | LGP2020 | NRRL B-67892 | A Lagerstroemia indica (crape myrtle) plant grown in Saint Louis County, Missouri, USA |
| *Methylobacterium* sp. #28 | ISO122 | LGP2021 | NRRL B-68032 | A Cichorium intybus (chicory) plant growing in Saint Louis County, Missouri, USA |
| *Methylobacterium* sp. #29 | ISO123 | LGP2022 | NRRL B-68033 | A Coronilla vario (crown vetch) plant growing in Saint Louis County, Missouri, USA |
| *Methylobacterium* sp. #30 | ISO124 | LGP2023 | NRRL B-68034 | A Catharanthus roseus (periwinkle) growing in Fort Myers, Florida, USA |
| *Methylobacterium* sp. #25 | | LGP2167 | NRRL B-67927 | An Acer ginnala (Amur maple) grown in Saint Louis County, Missouri, USA |
| *Methylobacterium* sp #32 | | LGP2029 | NRRL B-68065 | A Salvia officinalis (sage) growing in Saint Louis County, Missouri, USA |
| *Methylobacterium* sp #33 | | LGP2030 | NRRL B-68066 | A Prunus persica (peach, 'Hale Haven'), growing in Dudley, Missouri, USA |
| *Methylobacterium* sp #34 | | LGP2031 | NRRL B-68067 | An *Acer* spp. (maple) growing in Dudley, Missouri, USA |
| *Methylobacterium* sp #35 | | LGP2033 | NRRL B-68068 | A Rosa rugosa (Japanese rose) growing in Camden, Maine, USA |
| *Methylobacterium* sp #36 | | LGP2034 | NRRL B-68069 | A *Solidago* sp. (goldenrod) growing in Camden, Maine, USA |

[1]Deposit number for strain deposited with the AGRICULTURAL RESEARCH SERVICE CULTURE COLLECTION (NRRL) of the National Center for Agricultural Utilization Research, Agricultural Research Service, U.S. Department of Agriculture, 1815 North University Street, Peoria, Illinois 61604 U.S.A. under the terms of the Budapest Treaty on the International Recognition of the Deposit of Microorganisms for the Purposes of Patent Procedure. Subject to 37 CFR §1.808(b), all restrictions imposed by the depositor on the availability to the public of the deposited material will be irrevocably removed upon the granting of any patent from this patent application.

Variants of a *Methylobacterium* isolate listed in Table 1 include isolates obtained therefrom by genetic transformation, mutagenesis, and/or insertion of a heterologous sequence. In some embodiments, such variants are identified by the presence of chromosomal genomic DNA with at least 99%, 99.9%, 99.8%, 99.7%, 99.6%, or 99.5% sequence identity to chromosomal genomic DNA of the strain from which it was derived. In certain embodiments, such variants are distinguished by the presence of one or more unique DNA sequences that include: (i) a unique sequence of SEQ ID NOs: 1 to 3, SEQ ID NOs: 13 to 15, SEQ ID NOs: 25 to 27, SEQ ID NOs: 37 to 39, SEQ ID NOs: 49 to 51, and SEQ ID NOs: 61 to 73; or (ii) sequences with at least 98% or 99% sequence identity across the full length of SEQ ID NOs: 1 to 3, SEQ ID NOs: 13 to 15, SEQ ID NOs: 25 to 27, SEQ ID NOs: 37 to 39, SEQ ID NOs: 49 to 51, SEQ ID NOs: 61 to 73, and SEQ ID NOs: 74 to 76.

In certain embodiments of the methods provided herein, the *Methylobacterium* strain or strains used to treat a plant, plant part, and/or seed are selected from the group consisting of LGP2000 (NRRL B-50929), LGP2001 (NRRL B-50930), LGP2002 (NRRL B-50931), LGP2003 (NRRL B-50932), LGP2004 (NRRL B-50933), LGP2005 (NRRL B-50934), LGP2006 (NRRL B-50935), LGP2007 (NRRL B-50936), LGP2008 (NRRL B-50937), LGP2009 (NRRL B-50938), LGP2010 (NRRL B-50939), LGP2011 (NRRL B-50940), LGP2012 (NRRL B-50941), LGP2013 (NRRL B-50942), LGP2014 (NRRL B-67339), LGP2015 (NRRL B-67340), LGP2016 (NRRL B-67341), LGP2017 (NRRL B-67741), LGP2018 (NRRL B-67742), LGP2019 (NRRL B-67743), LGP2020 (NRRL B-67892), LGP2021 (NRRL B-68032), LGP2022 (NRRL B-68033), LGP2023 (NRRL B-68034), LGP2029 (NRRL B-68065), LGP2030 (NRRL B-68066), LGP2031 (NRRL B-68067), LGP2033 (NRRL B-68068), LGP2034 (NRRL B-68069), LGP2167 (NRRL B-67927), variants thereof, or any combination thereof. In certain embodiments, one or more of the *Methylobacterium* strains used in the methods can comprise total genomic DNA (chromosomal and plasmid DNA) or average nucleotide identity (ANI) with at least 99%, 99.9%, 99.8%, 99.7%, 99.6%, or 99.5% sequence identity or ANI to total genomic DNA of LGP2000 (NRRL B-50929), LGP2001 (NRRL B-50930), LGP2002 (NRRL B-50931), LGP2003 (NRRL B-50932), LGP2004 (NRRL B-50933), LGP2005 (NRRL B-50934), LGP2006 (NRRL B-50935), LGP2007 (NRRL B-50936), LGP2008 (NRRL B-50937), LGP2009 (NRRL B-50938), LGP2010 (NRRL B-50939), LGP2011 (NRRL B-50940), LGP2012 (NRRL B-50941), LGP2013 (NRRL B-50942), LGP2014 (NRRL B-67339), LGP2015 (NRRL B-67340), LGP2016 (NRRL B-67341), LGP2017 (NRRL B-67741), LGP2018 (NRRL B-67742), LGP2019 (NRRL B-67743), LGP2020 (NRRL B-67892), LGP2021 (NRRL B-68032), LGP2022 (NRRL B-68033), LGP2023 (NRRL B-68034), LGP2029 (NRRL B-68065), LGP2030 (NRRL B-68066), LGP2031 (NRRL B-68067), LGP2033 (NRRL B-68068), LGP2034 (NRRL B-68069), or LGP2167 (NRRL B-67927). In certain embodiments, the percent ANI can be determined as disclosed by Konstantinidis et al., 2006. In certain embodiments of the methods provided herein, the *Methylobacterium* strain or strains used to treat a seed and/or a plant part is LGP2009 which was deposited under the NRRL accession No. NRRL B-50938. In certain embodiments, the strain identified as LGP2009 which was deposited under the NRRL accession No. NRRL B-50938 is used as a control or reference standard for comparison to one or more new test or candidate *Methylobacterium* isolates in a method of identifying a new *Methylobacterium* that can improve levels of one or more mineral nutrients and/or vitamins in a leafy greens harvested from a treated plant.

In certain embodiments of the methods provided herein, plants, plant seeds, and/or plant parts are treated with both a *Methylobacterium* strain and at least one additional component. In some embodiments an additional component can be an additional active ingredient, for example, a pesticide or a second biological. In certain embodiments, the pesticide can be an insecticide, a fungicide, an herbicide, a nematicide, or other biocide. The second biological could be a strain that improves yield or controls an insect, pest, fungi, weed, or nematode. In some embodiments, a second biological is a second *Methylobacterium* strain.

Non-limiting examples of insecticides and nematicides include carbamates, diamides, macrocyclic lactones, neonicotinoids, organophosphates, phenylpyrazoles, pyrethrins, spinosyns, synthetic pyrethroids, tetronic and tetramic acids. In particular embodiments insecticides and nematicides include abamectin, aldicarb, aldoxycarb, bifenthrin, carbofuran, chlorantraniliporle, chlothianidin, cyfluthrin, cyhalothrin, cypermethrin, deltamethrin, dinotefuran, emamectin, ethiprole, fenamiphos, fipronil, flubendiamide, fosthiazate, imidacloprid, ivermectin, lambda-cyhalothrin, milbemectin, nitenpyram, oxamyl, permethrin, tioxazafen, spinetoram, spinosad, spirodichlofen, spirotetramat, tefluthrin, thiacloprid, thiamethoxam, and thiodicarb.

Non-limiting examples of useful fungicides include aromatic hydrocarbons, benzimidazoles, benzthiadiazole, carboxamides, carboxylic acid amides, morpholines, phenylamides, phosphonates, quinone outside inhibitors (e.g. strobilurins), thiazolidines, thiophanates, thiophene carboxamides, and triazoles. Particular examples of fungicides include acibenzolar-S-methyl, azoxystrobin, benalaxyl, bixafen, boscalid, carbendazim, cyproconazole, dimethomorph, epoxiconazole, fluopyram, fluoxastrobin, flutianil, flutolanil, fluxapyroxad, fosetyl-Al, ipconazole, isopyrazam, kresoxim-methyl, mefenoxam, metalaxyl, metconazole, myclobutanil, orysastrobin, penflufen, penthiopyrad, picoxystrobin, propiconazole, prothioconazole, pyraclostrobin, sedaxane, silthiofam, tebuconazole, thifluzamide, thiophanate, tolclofos-methyl, trifloxystrobin, and triticonazole. Non-limiting examples of other biocides include isothiazolinones, for example 1,2 Benzothiazolin-3-one (BIT), 5-Chloro-2-methyl-4-isothiazolin-3-one (CIT), 2-Methyl-4-isothiazolin-3-one (MIT), octylisothiazolinone (OIT), dichlorooctylisothiazolinone (DCOIT), and butylbenzisothiazolinone (BBIT); 2-Bromo-2-nitro-propane-1,3-diol (Bronopol), 5-bromo-5-nitro-1,3-dioxane (Bronidox), Tris(hydroxymethyl)nitromethane, 2,2-Dibromo-3-nitrilopropionamide (DBNPA), and alkyl dimethyl benzyl ammonium chlorides.

Non-limiting examples of herbicides include ACCase inhibitors, acetanilides, AHAS inhibitors, carotenoid biosynthesis inhibitors, EPSPS inhibitors, glutamine synthetase inhibitors, PPO inhibitors, PS II inhibitors, and synthetic auxins. Particular examples of herbicides include acetochlor, clethodim, dicamba, flumioxazin, fomesafen, glyphosate, glufosinate, mesotrione, quizalofop, saflufenacil, sulcotrione, and 2,4-D.

In some embodiments, the composition or method disclosed herein may comprise a *Methylobacterium* strain and an additional active ingredient selected from the group consisting of clothianidin, ipconazole, imidacloprid, metalaxyl, mefenoxam, tioxazafen, azoxystrobin, thiomethoxam, fluopyram, prothioconazole, pyraclostrobin, and sedaxane.

In some embodiments, the composition or method disclosed herein may comprise an additional active ingredient, which may be a second biological. The second biological could be a biological control agent, other beneficial microorganisms, microbial extracts, natural products, plant growth activators, or plant defense agent. Non-limiting examples of the second biological could include bacteria, fungi, beneficial nematodes, and viruses. In certain embodiments, the second biological can be a *Methylobacterium*. In certain embodiments, the second biological is a *Methylobacterium* listed in Table 1. In certain embodiments, the second biological can be a *Methylobacterium* selected from *M. gregans, M. radiotolerans, M extorquens, M. populi, M. salsuginis, M. brachiatum,* and *M. komagatae*.

In certain embodiments, the second biological can be a bacterium of the genus *Actinomycetes, Agrobacterium, Arthrobacter, Alcaligenes, Aureobacterium, Azobacter, Azorhizobium, Azospirillum, Azotobacter, Beijerinckia, Bacillus, Brevibacillus, Burkholderia, Chromobacterium, Clostridium, Clavibacter, Comomonas, Corynebacterium, Curtobacterium, Enterobacter, Flavobacterium, Gluconacetobacter, Gluconobacter, Herbaspirillum, Hydrogenophage, Klebsiella, Luteibacter, Lysinibacillus, Mesorhizobium, Methylobacterium, Microbacterium, Ochrobactrum, Paenibacillus, Pantoea, Pasteuria, Phingobacterium, Photorhabdus, Phyllobacterium, Pseudomonas, Rhizobium, Rhodococcus, Bradyrhizobium, Serratia, Sinorhizobium, Sphingomonas, Streptomyces, Stenotrophomonas, Variovorax, Xanthomonas* and *Xenorhadbus*. In particular embodiments the bacteria is selected from the group consisting of *Bacillus amyloliquefaciens, Bacillus cereus, Bacillus firmus, Bacillus, lichenformis, Bacillus pumilus, Bacillus sphaericus, Bacillus subtilis, Bacillus thuringiensis, Chromobacterium suttsuga, Pasteuria penetrans, Pasteuria usage,* and *Pseudomona fluorescens*.

In certain embodiments the second biological can be a fungus of the genus *Acremonium, Alternaria, Ampelomyces, Aspergillus, Aureobasidium, Beauveria, Botryosphaeria, Cladosporium, Cochliobolus, Colletotrichum, Coniothyrium, Embellisia, Epicoccum, Fusarium, Gigaspora, Gliocladium, Glomus, Laccaria, Metarhisium, Muscodor, Nigrospora, Paecilonyces, Paraglomus, Penicillium, Phoma, Pisolithus, Podospora, Rhizopogon, Scleroderma, Trichoderma, Typhula, Ulocladium,* and *Verticilium*. In particular embodiments, the fungus is *Beauveria bassiana, Coniothyrium minitans, Gliocladium vixens, Muscodor albus, Paecilomyces lilacinus,* or *Trichoderma polysporum*.

In further embodiments the second biological can be plant growth activators or plant defense agents including, but not limited to, harpin, *Reynoutria sachalinensis*, jasmonate, lipochitooligosaccharides, and isoflavones.

In further embodiments, the second biological can include, but are not limited to, various *Bacillus* sp., *Pseudomonas* sp., *Coniothyrium* sp., *Pantoea* sp., *Streptomyces* sp., and *Trichoderma* sp. Microbial biopesticides can be a bacterium, fungus, virus, or protozoan. Particularly useful biopesticidal microorganisms include various *Bacillus subtilis, Bacillus thuringiensis, Bacillus pumilis, Pseudomonas syringae, Trichoderma harzianum, Trichoderma vixens,* and *Streptomyces lydicus* strains. Other microorganisms that are added can be genetically engineered or wild-type isolates that are available as pure cultures. In certain embodiments, it is anticipated that the second biological can be provided in the composition in the form of a spore.

Plants or harvested plant parts having increased levels of at least one mineral nutrient and/or at least one vitamin in comparison to a control plant or plant part are provided, as are methods for obtaining and using such plants and plant parts. In certain embodiments, the content of at least one mineral nutrient and/or at least one vitamin in the plants or harvested plant part is increased by at least about 1%, or 2% to about 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, or 30% per gram dry or wet weight in comparison to the content of the at least one mineral nutrient and/or at least one vitamin in a control plant or plant part. In other embodiments, the content of at least one mineral nutrient and/or at least one vitamin in the plants, plant parts, food ingredients, and feed ingredients is increased by more than 30%, including 35%, 40%, 45%, 50%, or greater than 50% in comparison to the content of the at least one mineral nutrient and/or at least one vitamin in a control plant or plant part. In some embodiments, the content of more than one mineral nutrient and/or more than one vitamin is increased in a plant or harvested plant part, and percent increases can vary for each of the mineral nutrients and/or vitamins, with each increased mineral nutrient and vitamin being increased by at least about 1%, or 2% to about 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, or 30% or more per gram dry or wet weight. Controls include plants or plant parts harvested from control plants grown from an untreated control seed or untreated control.

The mineral nutrient and/or vitamin content of plants or harvested parts thereof grown from seeds or seedlings treated with an effective amount of a *Methylobacterium* strain or strains can be determined by a variety of different techniques or combinations of techniques. Nitrate and nitrite nitrogen content determination methods include Cadmium Reduction and Colorimetric analysis by Flow Injection system (Lachat); AOAC 968.07. Mineral Digestion can be accomplished by Open Vessel Microwave SW846-3051A (AOAC 991-10D(e)). Mineral analysis can be conducted by Inductively Coupled Argon Plasma (ICAP); AOAC 985.01. Mineral nutrients and vitamins content of seeds and various food products can also be determined by standard methods set forth by the AACC, AOAC in Official Methods of Analysis of AOAC INTERNATIONAL, 21st Edition (2019) and in the Codex Alimentarius of International Food Standards set forth by the Food and Agriculture Organization of the United Nations (FAO) or WHO (CXS 234-19991, Adopted in 1999).

DEPOSIT INFORMATION

Samples of the following *Methylobacterium* sp. strains have been deposited with the AGRICULTURAL RESEARCH SERVICE CULTURE COLLECTION (NRRL) of the National Center for Agricultural Utilization Research, Agricultural Research Service, U.S. Department of Agriculture, 1815 North University Street, Peoria, Illinois 61604 U.S.A. under the terms of the Budapest Treaty on the International Recognition of the Deposit of Microorganisms for the Purposes of Patent Procedure. *Methylobacterium* sp. NRRL B-50929, NRRL B-50930, NRRL B-50931, NRRL B-50932, NRRL B-50933, NRRL B-50934, NRRL B-50935, NRRL B-50936, NRRL B-50937, NRRL B-50938, NRRL B-50939, NRRL B-50940, NRRL B-50941 and NRRL B-50942 were deposited with NRRL on Mar. 12, 2014. *Methylobacterium* sp. NRRL B-67339 was deposited with NRRL on Nov. 18, 2016. *Methylobacterium* sp. NRRL B-67340 was deposited with NRRL on Nov. 18, 2016. *Methylobacterium* sp. NRRL B-67341 was deposited with NRRL on Nov. 18, 2016. *Methylobacterium* sp. NRRL B-67741 was deposited with NRRL on Dec. 20, 2018. *Methylobacterium* sp. NRRL B-67742 was deposited with NRRL on Dec. 20, 2018. *Methylobacterium* sp. NRRL B-67743 was deposited with NRRL on Dec. 20, 2018. *Methylobacterium* sp. NRRL B-67892 was deposited with NRRL on Nov. 26, 2019. *Methylobacterium* sp. NRRL B-67927 was deposited with NRRL on Feb. 21, 2020. *Methylobacterium* sp. NRRL B-68032, NRRL B-68033 and NRRL B-68034 were deposited with NRRL on May 20, 2021. *Methylobacterium* sp. NRRL B-68065, NRRL B-68066, NRRL B-68067, NRRL B-68068, and NRRL B-68069 were deposited with NRRL on Sep. 9, 2021.

Subject to 37 CFR § 1.808(b), all restrictions imposed by the depositor on the availability to the public of the deposited material will be irrevocably removed upon the granting of any patent from this patent application.

EXAMPLES

The following examples are given for purely illustrative and non-limiting purposes of the present invention.

Example 1. Effects of *Methylobacterium* Strain LGP2009 (NRRL B-50938) Treatment of Spinach on Mineral Nutrient Content of Harvested Leaves Spinach seeds were treated with *Methylobacterium* strain LGP2009 at a rate of $10^6$ CFU per seed and grown in soil mix (Fick's garden mix soil) in 15 flats (26 seeds per flat) in a greenhouse in parallel with 15 flats of untreated spinach seeds. Flats were thinned to contain no less than 20 plants. At 28 days after planting (approximately 7 true leaves), 15 or more plants per flat were chosen randomly and shoots were collected by cutting one inch above the soil line. The shoots were incubated in sample bags at 45° C. for 4 days to dry and analyzed for macronutrient and micronutrient content. A single-tailed unequal variances (Welch's) t-test was used to analyze the data to determine whether treatment with LGP2009 resulted in a significant increase in nutrient content. *Methylobacterium* LGP2009 significantly enhanced foliar content of three nutrients: nitrogen (N), magnesium (Mg), and iron (Fe). Other nutrients elevated over the untreated control sample (UTC) by treatment with LGP2009 were copper, calcium, potassium, and sulfur. Levels of zinc, boron, phosphorus, and manganese were lower in LGP2009 treated plants in comparison to control untreated plants.

Percent differences between the LGP2009 treatment and the UTC treatment for macro- and micronutrients measured in this experiment are shown in Table 2. P-values were estimated using Student's t-test. Results showing a difference at p<0.1 are noted in italics.

TABLE 2

| Nutrient type | Nutrient (units) | LGP2009 value | UTC value | % difference from UTC | Contrast p-value v. UTC |
|---|---|---|---|---|---|
| Macro-nutrient | Nitrogen (%) | 5.454 | 4.855 | +12.3% | 0.023 |
| | Phosphorus (%) | 0.506 | 0.556 | −8.9% | 0.20 |
| | Potassium (%) | 12.2 | 12.0 | +2.0% | 0.48 |
| | Calcium (%) | 0.92 | 0.88 | +4.6% | 0.41 |
| | Magnesium (%) | 1.27 | 1.09 | +16.2% | 0.045 |
| | Sulfur (%) | 0.463 | 0.456 | +1.5% | 0.59 |
| Micro-nutrient | Zinc (ppm) | 129.1 | 151.1 | −14.6% | 0.060 |
| | Manganese (ppm) | 56 | 57 | −1.8% | 0.69 |
| | Iron (ppm) | 110.1 | 96.9 | +13.6% | 0.086 |
| | Copper (ppm) | 10.9 | 10.2 | +7.0% | 0.18 |
| | Boron (ppm) | 53.7 | 59.4 | −9.7% | 0.033 |

Example 2. Assay for *Methylobacterium* Effect on Micronutrient Content and Increased Early Growth in Hydroponic System The experiment was conducted using a randomized complete block design. An experiment with 3 treatment levels to compare the biomass of plants following seed treatment with 2 *Methylobacterium* strains and water to a control treated with only water was conducted as follows for testing growth enhancement effects of *Methylobacterium* isolates. The experiment had an n=10 and was laid out in 10 completely randomized blocks. Each experimental unit consisted of 24 individual plants grown on a quarter (3×8 cubes) sheet of horticube and bulked for biomass.

Ten horticube sheets (104 cell Oasis HorticubeXL™, single dibble; Smithers-Oasis North America, Kent, OH, USA) were each divided into four 3×8 cube pieces, and 30 pieces were placed into their own clean 1020 mesh tray. The horticube pieces were completely saturated with UV filtered R.O. water, and one seed (lettuce or spinach) was placed in each dibble (pre-formed seed hole) of the horticubes. Seeds were inoculated by applying $10^6$ CFU of a *Methylobacterium* strain to be tested directly to each seed.

Seeds were allowed to grow undisturbed at 23-25° C. and 14 hour days. Plants were broadcast watered and fertilized (15-16-17) on Mondays, Wednesdays and Fridays. Plants were watered with UV filtered RO water on all other days. Fourteen days after planting (approximately 2 true leaf stage), the shoot portion of each plant was harvested by cutting directly below the cotyledon and all the shoots from the same tray were bulked together. The shoots were allowed to dry in an oven at 45° C. for at least 3 days and the bulked shoots from each sheet/tray weighed to identify *Methylobacterium* strains that increase shoot biomass in lettuce or spinach following seed treatment. Shoots may be from the same samples as measured to determine biomass or from a separate experiment conducted as described in Example 1.

Results of analysis of the effect of treatment with various *Methylobacterium* strains on enhanced early growth of 2 true leaf stage lettuce and spinach plants as described above are provided in Tables 3 and 4 below. Lettuce results in Table 3 are from biomass data only. Data are combined results from at least 3 independent repetitions of an experiment with a given isolate. Contrast p-values were taken from Student's t-test post hoc to a linear mixed model. The lettuce results in Table 3 show that using LGP2002, LGP2001, LGP2010, LGP2012, LGP2000, LGP2009, LGP2006, LGP2011, LGP2007, LGP2004, LGP2025, LGP2026, LGP2021, LGP2020, LGP2017, LGP2028, LGP2029, LGP2030, LGP2019, LGP2031, LGP2016, LGP2033, LGP2034, LGP2022, LGP2023, and a combination of LGP2002 and LGP2015 results in a positive percent growth enhancement over control.

TABLE 3

Lettuce Growth Measurement

| Treatment | Percent growth enhancement over Control | Contrast p-value vs. Control |
|---|---|---|
| LGP2002 | +2.9% | 0.24 |
| LGP2001 | +8.4% | 0.035 |
| LGP2010 | +9.7% | 0.0038 |
| LGP2012 | +4.3% | 0.0025 |
| LGP2000 | +7.0% | 0.035 |
| LGP2009 | +9.6% | 0.017 |
| LGP2006 | +5.3% | 0.44 |
| LGP2011 | +2.7% | 0.24 |
| LGP2007 | +9.5% | 0.0043 |
| LGP2004 | +1.4% | 0.56 |
| LGP2024 | −10.5% | 0.14 |
| LGP2025 | +4.1% | 0.53 |
| LGP2026 | +8.2% | 0.23 |
| LGP2021 | +7.8% | 0.0007 |
| LGP2027 | −3.0% | 0.66 |
| LGP2020 | +1.8% | 0.26 |
| LGP2017 | +1.2% | 0.14 |
| LGP2028 | +1.3% | 0.24 |
| LGP2029 | +5.3% | 0.0038 |
| LGP2030 | +2.8% | 0.06 |
| LGP2019 | +2.7% | 0.22 |
| LGP2031 | +0.3% | 0.64 |
| LGP2032 | −7.6% | 0.27 |
| LGP2016 | +1.7% | 0.89 |
| LGP2033 | +2.0% | 0.13 |
| LGP2034 | +4.8% | 0.011 |
| LGP2022 | +10.9% | 0.011 |
| LGP2023 | +4.6% | 0.047 |
| LGP2002 + LGP2015 | +5.3% | 0.0043 |

Spinach results in Table 4 are based on image data as a proxy for aboveground biomass. Data are combined results from 2 independent repetitions of experiment. Contrast p-values were taken from Student's t-test post hoc to a linear mixed model. The spinach results in Table 4 show that using LGP2001, LGP2010, LGP2009, LGP2021, LGP2022, LGP2023, and a combination of LGP2002 and LGP2015 results in a positive percent growth enhancement over control.

TABLE 4

Spinach Growth Measurement

| Treatment | Percent growth enhancement over Control | Contrast p-value vs. Control |
|---|---|---|
| LGP2001 | +2.7% | 0.33 |
| LGP2010 | +2.0% | 0.48 |
| LGP2009 | +0.7% | 0.81 |
| LGP2021 | +0.8% | 0.78 |
| LGP2022 | +4.0% | 0.15 |
| LGP2023 | +1.9% | 0.49 |
| LGP2002 + LGP2015 | +1.4% | 0.62 |

Example 3. Detection or Identification of *Methylobacterium* Strains, Variants and Derivatives Assays are disclosed for detection or identification of specific *Methylobacterium* strains and closely related derivatives. Genomic DNA fragments unique to a *Methylo-

*bacterium* strain were identified and qPCR Locked Nucleic Acid (LNA) based assays were developed.

Genomic DNA sequences of *Methylobacterium* strains were compared by BLAST analysis of approximately 300 bp fragments using a sliding window of from 1-25 nucleotides to whole genome sequences of over 1000 public and proprietary *Methylobacterium* isolates. Genomic DNA fragments were identified that have weak BLAST alignments, indicative of approximately 60-95% identity over the entire fragment, to corresponding fragments of a *Methylobacterium* of interest. Fragments from the LGP2015 genome corresponding to the identified weak alignment regions were selected for assay development and are provided as SEQ ID NOS: 1-3.

TABLE 5

Unique Fragment Sequences of LGP2015

| Fragment | SEQ ID NO | Sequence |
|---|---|---|
| ref1_135566 | 1 | ACGGTCACCCCACGGACTGGGCGAGTACCTCACCGG TGTTCTATCATAACGCCGAGT- TAGTTTTCGACCGTCC CTTATGCGATGTACCACCGGTGTCGGCAGCCGATTT CGTCCCACCGGGAGCTGGCGTTCCGGTTCAGACCAC CATCATCGGTCACGATGTCTGGATTGGACACGGGGC CTTCATCTCCCCCGGCGTGACTATAGGAAACGGCGC GATCGTCGGGGCCCAGGCGGTCGTCACAAGAGATGT CCCACCCTATGCGGTAGTTGCTGGCGTCCCCGCGAC CGTACGACGAT |
| ref1_135772 | 2 | CCAATAAAAGCGTTGGCCGCCTGGGCAACCCGATCC GAGCCTAAGACTCAAAGCGCAAGCGAACACTTGGTA GAGACAGCCCGCCGACTACGGCGTTCCAGCACTCTC CGGCTTTGATCGGATAGGCATTGGTCAAGGTGCCGG TGGTGATGACCTCGCCCGCCGCAAGCGGCGAATTAC TCGGATCAGCGGCCAGCACCTCGACCAAGTGTCGGA GCGCGACCAAAGGGCCACGTTCGAGGACGTTTGAGG CGCGACCAGTCTCGATAGTCTCATCGTCGCGGCGAA GCTGCACCTCGA |
| ref1_169470 | 3 | CGATGGCACCGACCTGCCATGCCTCTGCCGTCCGCG CCAGAATGGTAAAGAGGACGAAGGGGGTAAGGATC GTCGCTGCAGTGTTGAGCAGCGACCAGAGAAGGGG GCCGAACATCGGCATCAAACCTCGATTGCCACTCGG ACGCGAAGCGCGTCTTGAAGGAGGGATGGAAGCGA AACGGCCGCAGAGTAACCGCCGACGAAAGATTGCA CCCCTCATCGAGCAGGATCGGAGGTGAAGGCAAGC GTGGGTTATTGGTAAGTGCAAAAAATATAATGGTAG CGTCAGATCTAGCGTTC |

Regions in SEQ ID NOS: 1-3 where corresponding regions in other *Methylobacterium* strains were identified as having one or more nucleotide mismatches from the LGP2015 sequence were selected, and qPCR primers, designed using Primer3 software (Untergasser et al. (2012), Koressaar et al. (2007)) to flank the mismatch regions, have a melting temperature (Tm) in the range of 55-60 degrees and generate a PCR DNA fragment of approximately 100 bp. The probe sequence was designed with a 5' FAM reporter dye and a 3' Iowa Black FQ quencher and contains one to six LNA bases (Integrated DNA Technologies, Coralville, Iowa). At least 1 of the LNA bases was in the position of a mismatch, while the other LNA bases were used to raise the Tm. The Tm of the probe sequence was targeted to be 10 degrees above the Tm of the primers.

Primer and probe sequences for detection of specific detection of LGP2015 are provided as SEQ ID NOS: 4-12 in Table 6. Each of the probes contains a 5' FAM reporter dye and a 3' Iowa Black FQ quencher.

TABLE 6

Primer and Probe Sequences for Specific Detection of LGP2015

| Primer/Probe | SEQ ID NO | Sequence* |
|---|---|---|
| LGP2015_ref1_135566_forward | 4 | CCTCACCGGTGT TCTATCATAAC |
| LGP2015_ref1_135566_reverse | 5 | CCGATGATGGTG GTCTGAAC |
| LGP2015_ref1_135566_probe | 6 | CGTCCCTTATGC GATGTACCA |
| LGP2015_ref1_135772_forward | 7 | GATCCGAGCCTA AGACTCAAAG |
| LGP2015_ref1_135772_reverse | 8 | GACCAATGCCTA TCCGATCAA |
| LGP2015_ref1_135772_probe | 9 | AACACTTGGTAG AGACAGCC |
| LGP2015_ref1_169470_forward | 10 | AAGGAGGGATGG AAGCGAAAC |
| LGP2015_ref1_169470_reverse | 11 | ATAACCCACGCT TGCCTTC |
| LGP2015_ref1_169470_probe | 12 | CGCAGAGTAACC GCCGACGAA |

*Bold and underlined letters represent the position of an LNA base.

Use of Primer/Probe Sets on Isolated DNA to Detect LGP2015 and Distinguish from Related *Methylobacterium* Isolates Each 10 ul qPCR reaction contained 5 ul of Quantabio PerfeCTa qPCR ToughMix 2× Mastermix, Low ROX from VWR, 0.5 ul of 10 uM forward primer, 0.5 ul of 10 uM reverse primer, 1 ul of 2.5 uM probe, 1 ul nuclease free water, and 2 ul of DNA template. Approximately 1 ng of DNA template was used per reaction. The reaction was conducted in a ThermoFisher QuantStudio™ 6 Flex Real-Time PCR System with the following program: 95° C. for 3 min, then 40 cycles of 95° C. for 15 sec, and 60° C. for 1 min. The analysis software on the PCR instrument calculated a threshold and Ct value for each sample. Each sample was run in triplicate on the same qPCR plate. A positive result was indicated where the delta Ct between positive and negative controls was at least 5.

Use of the three primer/probe sets to distinguish LGP2015 from closely related isolates by analysis of isolated DNA is shown in Table 7 below. The similarity score shown for the related isolates takes into account both the average nucleotide identity and the alignment fraction between the isolates and LGP2015. One of the tested strains, LGP2035, was used as an additional positive control. LGP2035 is a clonal isolate of LGP2015 which was obtained from a culture of LGP2015, which was confirmed by full genome sequencing as identical to LGP2015, and which scored positive in all three reactions. The similarity score of greater than 1.000 for this strain was likely the result of a slightly different assembly of the genome for this isolate compared to LGP2015. The delta Ct of approximately 15 or more between the LGP2015 and LGP2035 isolates and the water only control is consistent with the sequence confirmation of the identity of these isolates. Analysis of other isolates that are less closely related to LGP2015 resulted in delta Ct values similar to those for the water only control.

TABLE 7

| LGP# | Similarity score to LGP2015 | Average Ct Value | | |
|---|---|---|---|---|
| | | Ref1_135566 | Ref1_135772 | Ref1_169470 |
| LGP2035 | 1.005 | 21.08 | 21.31 | 20.35 |
| LGP2015 | 1 | 21.97 | 22.62 | 22.08 |
| LGP2036 | 0.181 | No Ct | 37.85 | >37.91 |
| LGP2037 | 0.87 | >36.8 | >38.31 | No Ct |
| LGP2038 | 0.88 | >38.36 | >38.36 | >38.44 |
| LGP2039 | 0.894 | No Ct | >37.47 | >38.13 |
| LGP2031 | 0.852 | 37.81 | No Ct | 37.97 |
| LGP2040 | 0.862 | 37.94 | 38.37 | >38.35 |
| LGP2034 | 0.807 | 38.44 | No Ct | No Ct |
| LGP2041 | 0.894 | 38.77 | No Ct | >37.91 |
| LGP2042 | 0.872 | 37.64 | 37.20 | 37.96 |
| H$_2$O only | | >38.14 | >35.92 | >37.12 |

Use of Primer/Probes for Detection of LGP2015 on Treated Plant Materials.

For detection of LGP2015 foliar spray treatment on corn: Untreated corn seeds were planted in field soil in the growth chamber and watered with non-fertilized R.O. water. After plants germinated and grew for approximately 3 weeks, they were transferred to the greenhouse. At V5 stage, plants were divided into 3 groups for treatment: foliar spray of LGP2015, mock foliar spray, and untreated. Plants receiving the foliar spray of LGP2015 were treated with 10× glycerol stock at the rate of 71.4 ul per plant using Solo sprayers. This converts to the rate of 10 L/acre in the field. Mock treated plants were sprayed with 71.4 ul water/plant. Untreated plants received no foliar spray treatment. Leaves were harvested two weeks after foliar spray treatment into sterile tubes and DNA from bacteria on the harvested leaves was isolated as described above. Each experiment was grown at least 2 times. As shown in Table 8, LGP2015 was detected on leaves harvested from corn plants treated by a foliar spray application of the *Methylobacterium* strains using all 3 primer probe sets, as demonstrated by delta Ct values of approximately 10 between the sample and the negative controls.

TABLE 8

| Treatment | Average Ct Value Ref1_135566 | Ref1_135772 | Ref1_169470 |
|---|---|---|---|
| Control (no application) | 32.43 | 32.10 | 31.55 |
| Control (mock application) | 35.54 | 35.34 | 34.80 |
| LGP2015 (10 L/acre equivalent) | 23.36 | 22.88 | 22.66 |

The above results demonstrate the use of genome specific primers and probes to detect *Methylobacterium* strain LGP2015 on various plant tissues following treatment with the strains and provide methods to distinguish LGP2015 from closely related isolates. Similar methods were developed for additional *Methylobacterium* strains LGP2002, LGP2019, LGP2018, and LGP2017 using target sequence fragments and primer/probe pairs as shown in the Tables below.

TABLE 9

Target Fragment Sequences of LGP2002

| Fragment | SEQ ID NO | Sequence |
|---|---|---|
| ref4_930 | 13 | GCAAAACGACCTAATAGTTCTACAGCGGCATGCGCCAA GTCAGCGCGGTGAACAGTATACCTGGGAGCAACTTGTC CTCCGAAACCCACATAAAACAAATTACTCCTGGCAGTG CCCAGTCCATCAAAATCGAATACAATATTTCTCGAGGA GGCATCTGTAATAGCCTGCCAAAGCAACAAAGCTATGG CGCCGTTATGACTTTCATTGCTTCTGGTAGACATAAAA TAATATGCCGATTTGTGATCCCAAATGTAGAATATTGC CGCATCAATTGCGCCAAGTTTATTTCGGATCGAT |
| ref1_142021 | 14 | GGCGCCAACGGTATGATCGCATGATTTTCCTGCGGCAT AGCTTGCGGGAATGGCGTATTTGGCGCTCTCCTCAGGA ATTTCTAAGGGCATACGCAGGAACTCTACAGCACTTTT ACTGGTATTTTGTAGTGACAGCGGAGGAGGCTGGTGCT CAAGGTAATCGTGATGAAGTGATCCGGGCCATTCGGGG CGCGTTTCTAGTCTTTCCAATCCGCGCCCTGTACCACG TATTACGCCGGACCGGTCTGCGCCGCGCCGCCCTCTTG ACCGCCCTAAATGTCTAAGAGCGTCTAACAAAGC |
| ref1_142636 | 15 | GACGATATCGCTCATCTTCACTGCATTGAAGCTGGTGC CGTACTGCATAGGGATGAAAAAGTGATGCGGATAGACG GCTGACGGGAAAGCGCCTGGTCGATCGAAGACTTTGCT GACGAGGTTGTGGTAGCCCCGGATATAGGCATCGAAGG CCGGGACGTTGATCCCATCCTTTGCCTTATCTTGACTG GCGTCGTCGCGTGCCGTCAGAACGGGCACGTCGCAGGT CATCGAGGCCAGCACCTTGCGGAACACCTGCGTTCCGC CGTTGGGATTATCGACGGCGAACGCGGTGGCCGC |

TABLE 10

Primer and Probe Sequences for Specific Detection of LGP2002

| Primer/Probe | SEQ ID NO | Sequence* |
|---|---|---|
| LGP2002_ref4_930_forward | 16 | GTCCTCCGAAACCCACATAAA |
| LGP2002_ref4_930_reverse | 17 | CTACCAGAAGCAATGAAAGTCAT |
| LGP2002_ref4_930_probe | 18 | TCTGTAATAGCCTGCCAAAGCA |
| LGP2002_ref1_142021_forward | 19 | GGCTGGTGCTCAAGGTAAT |
| LGP2002_ref1_142021_reverse | 20 | ACATTTAGGGCGGTCAAGAG |
| LGP2002_ref1_142021_probe | 21 | ATGAAGTTGATCCGGGCCAT |
| LGP2002_ref1_142636_forward | 22 | CCGTACTGCATAGGGATGAAA |
| LGP2002_ref1_142636_reverse | 23 | TAAGGCAAAGGATGGGATCAA |
| LGP2002_ref1_142636_probe | 24 | TTGCTGACGAGGTTGTGGTAG |

*Bold and underlined letters represent the position of an LNA base.

TABLE 11

Target Fragment Sequences of LGP2019

| Fragment | SEQ ID NO | Sequence |
|---|---|---|
| ref1_458355 | 25 | CAACTATGTAGACCCGACGGTGCGATTTCACTTCGCAAAGCCGCAGGGCAGCACCCTTGCGCTCAATGTTGACGCCAGCGTGATCTATACTATTACCGTCACGCACACGCAGGGCGGCGTACAGATTCATCGCGAGAGTAAGAACCACCATCAGACCATCACGCGCAGCGACCTGAGCAAGCAGTTCGGCGTTGGTGTGGCCGACCAGCTGACGCGCGATCAGGTCATGAAGGTGATCGAGTCGGCATTTCGCGACGCTACCCGCTAAGATCGGCGCCCACGAAACGCTACGAGACTAGG |
| ref1_459688 | 26 | AGCCGGCATCTTGTTCAAGGCGCTCACCTCGACGCCGACGCTGTAGGCGACTTGAGAGGGCGTCTCATATGAACGAAGCATCTTCGCGTAGAGAACCTTCTTGTTCTCCTGCGTGATGTTCGCTTTGCAGACGTTGACTGCCGCCATGAACGCCGAAGCCTTGCGCGCTTCATCGTAATCGCCTGCGAAGGCGGGTAGTGAAAAGCTTAGTGCAATGGCAAACACAGCCGCCGAACGTCGCATGGTATCCGTCCCCGATTGACGGCAGTGCCGCCATATCTCGGCTTTAGCAGAGCTGAT |
| ref1_3158527 | 27 | AACCTGCGCCGGCCGAGGTTTCGCGAGCCGTCGCCACGGGCAACGCCTCGCCCGCGATGTGCAAAAAAGTCCCCGGCACTTCGCGCCGTCGTCCGATCCACGACCGCGAATTTCTCAACGAGTACAAGGTGCTTATGGGAGATCCGAGCGTCCGTCCCGGAGCCCGAGACCGCGCGGCCCGAGTAATAGGCGAAAAAGACTCCTACTCCTCGGGCTTCTCGGGCCCCCTCAGCAACATCTACGCTTGCCGCCCATCACCCTGGCGGGAGATCAGCGACGAGACACAGGCCCACTTCGCCC |

TABLE 12

Primer and Probe Sequences for Specific Detection of LGP2019

| Primer/Probe | SEQ ID NO | Sequence* |
|---|---|---|
| LGP2019_ref1_458355_forward | 28 | TTGACGCCAGCGTGATCTATAC |

TABLE 12-continued

Primer and Probe Sequences for Specific Detection of LGP2019

| Primer/Probe | SEQ ID NO | Sequence* |
|---|---|---|
| LGP2019_ref1_458355_reverse | 29 | GTGATGGTCTGATGGTGGTTCT |
| LGP2019_ref1_458355_probe | 30 | TATTACCGTCACGCACACG |
| LGP2019_ref1_459688_forward | 31 | CTTCGCGTAGAGAACCTTCTTGTT |
| LGP2019_ref1_459688_reverse | 32 | CTTCGCAGGCGATTACGATGAA |
| LGP2019_ref1_459688_probe | 33 | CGTGATGTTCGCTTTGCAGA |
| LGP2019_ref1_3158527_forward | 34 | CCGCGAATTTCTCAACGAGTACA |
| LGP2019_ref1_3158527_reverse | 35 | GCCCGAGGAGTAGGAGTCTTT |
| LGP2019_ref1_3158527_probe | 36 | AGGTGCTTATGGGAGATCCG |

*Bold and underlined letters represent the position of an LNA base.

Use of the primer/probe sets to distinguish LGP2019 from closely related isolates by analysis of isolated DNA is shown in Table 13 below. The similarity score shown for the related isolates took into account both the average nucleotide identity and the alignment fraction between the isolates and LGP2019. Two of the tested strains, LGP2043 and LGP2014, were used as additional positive controls since a similarity score of 1.00 indicates they are nearly identical to LGP2019. Consistently low Ct values from qPCR using LGP2019 as the DNA template and no detection in the water only control is consistent with the sequence confirmation of the identity of these isolates. Analysis of other isolates that are less closely related to LGP2019 resulted in no detection similar to those for the water only control.

TABLE 13

| LGP# | Similarity to LGP2019 | Average Ct Value ref1_459688 | ref1_3158527 | ref1_458355 |
|---|---|---|---|---|
| LGP2019 | 1.00 | 22.39 | 24.09 | 23.10 |
| LGP2043 | 1.00 | 22.49 | 24.04 | 22.96 |
| LGP2014 | 1.00 | 22.49 | 23.86 | 22.90 |
| Strain A | 0.95 | UDT | UDT | UDT |
| Strain B | 0.94 | UDT | UDT | UDT |
| Strain C | 0.93 | UDT | UDT | UDT |
| Strain D | 0.93 | UDT | UDT | UDT |
| water only (neg control) | — | UDT | UDT | UDT |

TABLE 14

Target Fragment Sequences of LGP2017

| Fragment | SEQ ID NO | Sequence |
|---|---|---|
| ref1_1185955 | 37 | AGTCATTGATCAAGCAACCCCTATTGAGTTGGATATCGAAGGATCAAGGTCGCGTCAATAGATGCATCTATCAGGCCAAATGTCGCTTTTCAAGAATGGCTCTTTCGAAGCTATCTTTATAATCGCTCGCCATTCTCTCATTACCAAAATCGACCTTAACTAGCTCGACATTGATGCGAGCAGCTCCGGCAAACGAGGAGAGATTGACCTTAAGGAATTGAACGCCTCAAGCAATTCAGACACATTACCAGGAGTGCTATAGCAACAACCAGACCCATATCGGTCAATAACCTCTTTTA |
| ref1_3282585 | 38 | CGCAAAACGATTTATCACTGCCATCTTGTTGTTTGATAACCCTTTTTTACCAGACGTTATGCTGGGCGAGAAAGAGGACTAGCAGATCGGAGCGGTATCGCGATTTTTCGGTAGTTCGCGCCTACAACAGGATAAGATCCGATAGTGAAGCAACATGGCTGTTTTTTGATTTGTAAGTCAGCAACTTAAGCAGCCAGCCTATCTGCCGTCGCAGACGCTTGAGGCATCGGGCAGCATCTTAGAAAGGTGGCAGTAATTGCCACAGCGGAACGTAGCGGCACGGATAAGCACGCAGGGTC |
| ref1_4194637 | 39 | CCCATCTGGACCCAATATCCCCTTCATCGACAATTCCCGAGTAAGTGTGGGTTCGAGGATTTCGCGAAACAGCCTTGTTCGTTCCTCCGGCCTTAAAATTGGCGTGCCGTCGGGAGATCGATAGGCATCCCTTACCTGCCTTTCGACCGCCGGCACACGCGCGCCGGTCGTCGTGTTCAC |

TABLE 14-continued

Target Fragment Sequences of LGP2017

| Fragment | SEQ ID NO | Sequence |
|---|---|---|
| | | GGCCACGGAATGGACGAAGG<br>TGCGCCGCTCATTTCGCTCG<br>TTTGCCGTCTCCACCATCCA<br>GGAGGCCAGCAGGACGGTTT<br>CGTCTCGACCGCCGGTCACA<br>CACACCGCAAGGGACTCAGG |

TABLE 15

Primer and Probe Sequences for Specific Detection of LGP2017

| Primer/Probe | SEQ ID NO | Sequence* |
|---|---|---|
| LGP2017_ref1_1185955_forward | 40 | TCGCTCGCCATTCTCTCATTAC |
| LGP2017_ref1_1185955_reverse | 41 | AGGTCAATCTCTCCTCGTTTGC |
| LGP2017_ref1_1185955_probe | 42 | TCGACATTGATG**CGAGCA |
| LGP2017_ref1_3282585_forward | 43 | TTCGCGCCTACAACAGGATAAG |
| LGP2017_ref1_3282585_reverse | 44 | CAGATAGGCTGGCTGCTTAAGTT |
| LGP2017_ref1_3282585_probe | 45 | TCCGATAGTGAAGCAACA |
| LGP2017_ref1_4194637_forward | 46 | GAGTAAGTGTGGGTTCGAGGATTT |
| LGP2017_ref1_4194637_reverse | 47 | AGGTAAGGGATGCCTATCGATCT |
| LGP2017_ref1_4194637_probe | 48 | CGGAGGAACGAACAAGGC |

*Bold and underlined letters represent the position of an LNA base.

TABLE 16

Target Fragment Sequencs of LGP2018

| Fragment | SEQ ID NO | Sequence |
|---|---|---|
| LGP2018_ref1_4871392 | 49 | ACCTGCTAAAATCACGTCCTCTCAGATTGAAA<br>AATCATTGAAGAAACGTGTCGAACGATTGCC<br>GGGGATTATGACGTTAGATCAATTGAAAAAT<br>ACAAGCTTTGAAATTGAGTTACAGCCAAAAG<br>ATGCCCCGGATCCGGACCCATCAGACTTCGGT<br>GGCTAGTTCGAGCCAAACTCGAACGTCGCCAT<br>GGCGCGCAAGTCGCAATACCATTTCACAGCGC<br>AGCGGTTATTTCGTTGTACACTGTAGCAATGC<br>GTCGGCTTGCGCGCTTCCGCTGGCGATCAAAG<br>GTCCGCCGATTTACG |
| LGP2018_ref1_1266930 | 50 | TCCCGAACATACAATGGAGGAAGCGTGTGGT<br>AGGCCAATTTGTAACGAAATATGGCATCGGTC<br>ACGGCTCTCTCAATAAATTCGATCTCAAGTCT<br>TCTGAACGAGCATGCCTCATCCTTATCCTGAG<br>CGAACGCCTGCCAGTTTGCAGTCATTCCAACA<br>TACATAGCCAAAAAGGCGAGGTAGACCTTCA<br>TACGGGCACCTCAATCGTCCCCATTCGTTCAA<br>GCTCCTTCAAGATAACAGCCGCACCACATTGC<br>TGAGATCGAAGATTCGGATCAAATATTCCATC<br>AAATTTATACTTTC |
| LGP2018_ref1_17614 | 51 | GCATCCTTTGCGCTCGCAGGCCTAAGGTCAAG<br>CCCGGTTACTTCGTTTGGTAGAACGAGGTAGA<br>CGATGCCTAGTCTTAAGGTGGCCCATGTTAAC |

TABLE 16-continued

Target Fragment Sequencs of LGP2018

| Fragment | SEQ ID NO | Sequence |
|---|---|---|
| | | CAACAGGGCCAGAACATGATTATAGTTCCGTT AGATGCCAACTTCGGTTACAAAACCGATGGTG AGCAGTCCGACATCATGTTCGAAATACAGGA CGCGGCGCGGTCCGCCGGTCTTGCGGGTGCCG TAGTAGCGTTCTGGCAGTCAGGTGGACAAACC CGTTTCCGGGGCCCGGCTCCGTGGCACCCATT CCTTCGCAGCCTC |

TABLE 17

Primer and Probe Sequences for Specific Detection of LGP2018

| Primer/Probe | SEQ ID NO | Sequence* |
|---|---|---|
| LGP2018_ref1_4871392_forward | 52 | GCGCAAGTCGCAATACCATTTC |
| LGP2018_ref1_4871392_reverse | 53 | CGTAAATCGGCGGACCTTTGA |
| LGP2018_ref1_4871392_probe | 54 | CGCAGCGGTTATTTCGTTG |
| LGP2018_ref1_1266930_forward | 55 | ACGAGCATGCCTCATCCTTATC |
| LGP2018_ref1_1266930_reverse | 56 | CGATTGAGGTGCCCGTATGAA |
| LGP2018_ref1_1266930_probe | 57 | TGCCAGTTTGCAGTCATTCC |
| LGP2018_ref1_17614_forward | 58 | CCCGGTTACTTCGTTTGGTAGAA |
| LGP2018_ref1_17614_reverse | 59 | CGAAGTTGGCATCTAACGGAACTA |
| LGP2018_ref1_17614_probe | 60 | TGGCCCATGTTAACCAACAG |

*Bold and underlined letters represent the position of an LNA base.

Use of Primer/Probes for Detection of LGP2019 on Treated Plant Materials

Detection of LGP2019 from In-Furrow Treated Corn Roots

At planting, corn seeds in soil were drenched with LGP2019 and control strains from frozen glycerol stock to simulate in-furrow treatment. To obtain a final concentration of $10^7$ CFU/seed, 100 ul of each strain at $10^8$ CFU/ml was inoculated onto each seed placed in the dibble holes in soil. A ¹/₁₀ dilution series was made for lower concentration targets. For control treatment, 100 ul Milli-Q water was applied to each corn seed placed in the dibble holes in soil. Pots containing treated seeds were placed in a growth chamber for approximately two weeks and watered with unfertilized RO water every 1-2 days to keep soil moist. After 2 weeks of growth, roots of about 9 plants per replicate sample were harvested into sterile tubes. Each treatment had at least 2 replicate samples in each experiment, and each experiment was conducted at least 3 times.

DNA from bacteria on the harvested corn roots was isolated as follows. Individual roots were submerged in 20 mL of phosphate-buffered saline (PBS) (137 mM NaCl, 10 mM Phosphate, 2.7 mM KCl and a pH of 7.4) in 50 mL conical tubes. Tubes were vortexed for minutes, and then sonicated for 10 minutes. Root tissue was removed, and the remaining supernatant from multiple roots of the same sample were combined and centrifuged at 7500×g for 10 minutes. This process was repeated until there is one tube for each sample. The moist soil pellet was vortexed until it evenly coats the tube wall. Tubes were placed into a laminar flow hood with caps removed and open ends of the tubes facing the air blowers. Once dry, samples were stored at room temperature. 250 mg dried soil was used as input for DNA extraction using Qiagen DNeasy PowerSoil HTP 96 kit (Cat #12955-4) using manufacturer protocols.

Primers and probes for LGP2019 disclosed in Table 12 above were used in qPCR reactions to detect the presence of LGP2019 specific fragments provided in Table 11. Each 10 ul qPCR reaction contained 5 ul of Quantabio PerfeCTa qPCR ToughMix 2× Mastermix, Low ROX from VWR, 0.5 ul of 10 uM forward primer, 0.5 ul of 10 uM reverse primer, 1 ul of 2.5 uM probe, 1 ul nuclease free water, and 2 ul of DNA template. Approximately 1 ng of DNA template was used per reaction. The reaction was conducted in a ThermoFisher QuantStudio' 6 Flex Real-Time PCR System with the following program: 95° C. for 3 min, then 40 cycles of 95° C. for 15 sec, and 60° C. for 1 min. The analysis software on the PCR instrument calculated a threshold and Ct value for each sample. Each sample was run in triplicate on the same qPCR plate. A positive result was indicated where the delta Ct between positive and negative controls is at least 5.

Use of Primer/Probes for Detection of Variants of Additional Table 1 *Methylobacterium* Isolates Variants of *Methylobacterium* isolates listed in Table 1 were identified by the presence of DNA fragments as described above. Unique fragments for use in such methods are provided in Table 18.

TABLE 18

| Strain | Fragment | SEQ ID NO | Sequence |
|---|---|---|---|
| LGP2001 | ref3_25009 | 61 | GCCCTTCTGTCAGGCGATATTGTATAATGGCGTTGCCCCA ATAGAAGCAGCCATTCGTGCGAGGGCAGCAGCGACGCTA GGTCGAAAGAGCATCCTAATCTCGATCAAGATGCGACTG AGATTTCTGATGAAAATATCTAGACACAAGCAAAGCTGG TGAAATTACAACGATCATGGCGACAATTGCGGCCAATTC GGCCGGAACTTGAAGGAACATAAAAATGAATATTACAAA TATACCGCAAAGCATGTAGAGTTGCTACACCAAGGGTCG GGACGTCCAAAAAAACTCACTGAGGA |
| LGP2001 | ref3_25219 | 62 | GGAACATAAAAATGAATATTACAAATATACCGCAAAGCA TGTAGAGTTGCTACACCAAGGGTCGGGACGTCCAAAAAA ACTCACTGAGGAAGTCGACTGGAAGCACGAGGCGCCCCC CCCAGGAGCGGGGCGACCGGCAAGGGGGCCCGCAATTG TCGCCATGATCGACCAGCTTAGGTAGGATCCTCTTTCGAC CTAACGAATGGCTGCTTCTATTGGGGCAACGCCATTATAC AATATCGCCTGACCATCTGGAACGCGGCCCGGTCCACCG GCAGGTTGGCGACGACAGCGTCGGAG |
| LGP2001 | ref1_4361220 | 63 | CGGCGTCGACCAGCCGGGCGAACTGCTTGGGCATGCTCT CCCGCGACGCCGGCCACAGCCGCGTCCCCGTCCCTCCGCA CAGGATCATCGGGTGGATTTGAAAGGCAAAACGGGACAT CAGGATAGGCCGCTCAGGCGTTGGCGCTGAGGCGCTTGA TGTCGGCGTCGACCATCTCGGTGATCAGCGCCTCGAGGC TGGTCTCGGCCTCCCAGCCGAAGGTCGCCTTGGCCTTGGC GGGGTTGCCCAGCAGCACCTCGACCTCTGCCGGCCGGAA CAGCGCCGGGTCGACGATCAGGTGG |
| LGP2001 | ref1_4602420 | 64 | CTGGACATGCGCCCACCCCGGCCAAGTCCGACCGCACCG GCAACCGCTCCTGTAGTCGTCGTCATCGTTCTCACCCCTG AGGCGGAGACCGTCCGCTAACGGGGTGTCTCAAGCAACC GTGGGGCGGAGGAACACGCACGTAGTCGCGTTTCAAGG TTCGCACGAACGCCTCGGCCATGCCGTTGCTCTGCGGGCT CTCCAGCGGCGTCGTTTTTGGCACCAAACCAAGGTCGCG GGCGAAGCGGCGCGTGTCGCGGGGACTGTCAGGAATTT CGTGTGGGGCGGCCATAGTGGATCCG |
| LGP2004 | ref1_194299 | 65 | GGAAATCGGCTTCAAGTACGACGTCACGCCGGCCATGCA GGTCACGGGTGCACTGTTCAATCTCGAGCGCGACAACCA GCCGTTCCCCTCGAACGTGGAGTCCGGCCTCGTCCTTGGC GCAGGTCAGACACGCACCCAGGGCGCGGAAATCGGCCT GGCCGGCTATCTAACCGATTGGTGGCAGGTCTTTGGCGG CTACGCTTATACCGAGGCACGCGTACTCTCGCCACTGGAA GACGATGGAGACGTGATCGCAGCAGGTAATCTCGTCGGC AACGTTCCGCTAAATACTTTCAGTCT |
| LGP2004 | ref1_194305 | 66 | CGGCCTGGCCGGCTATCTAACCGATTGGTGGCAGGTCTTT GGCGGCTACGCTTATACCGAGGCACGCGTACTCTCGCCA CTGGAAGACGATGGAGACGTGATCGCAGCAGGTAATCTC GTCGGCAACGTTCCGCTAAATACTTTCAGTCTGTTCAACA AGTTCGATATCAACGAGAATTTCTCCGTTGCTCTGGGCTA TTACTATCAGGATGCCAGCTTTGCCTCCTCAGACAATGCA GTGCGTTTGCCAAGTTATTCGCGGTTCGATGGCGGGTTGT TCTATCGATTCGACGAGTTGAC |
| LGP2004 | ref1_194310 | 67 | ACGTTCCGCTAAATACTTTCAGTCTGTTCAACAAGTTCGAT ATCAACGAGAATTTCTCCGTTGCTCTGGGCTATTACTATC AGGATGCCAGCTTTGCCTCCTCAGACAATGCAGTGCGTTT GCCAAGTTATTCGCGGTTCGATGGCGGGTTGTTCTATCGA TTCGACGAGTTGACACGCGTTCAGCTTAGCGTCGAGAAC ATTTTCGACAGGCGTTACATCATCAACTCCAACAACAACA ACAACCTCACGCCTGGCGCGCCGAGAACAGTCCGCGTGC AATTGATCGCTCGGTTCTAAA |
| LGP2003 | ref1_86157 | 68 | AGCCCACAAGCCTGATGCACTTAACTACATCCTCTAATGT CGCGCCAATTTGCTTGGCGGCAGGGGATGTTGTATCGTC ATAGGCTTGTCTAACCGGAACTTGTTTGCCAATCTCTTTG GCGATCGCAACCGCCATCTCGTGTTCGTCAACCATGTGCG CGTTCCTCTAATTGCACTCATGGTGCCACGTGCACCTCCG ATCGTCTCGTGTCTAGAATGAAGGTGGGAACAACCTTAC ACAGGCTTTCGCGACGCGCGAATTTCTGGTTTCTCCGCCT CGGATGTGGGTTTGAGCGCTTC |
| LGP2003 | ref1_142469 | 69 | CTTTTCATTTGTCATGATCTCGACCAAGGTATTCACGGCA AGCTCGGTCTGTTCTTAGCAAGTGCCTGAACTTCGCGAA CGATCGGCTCTCGACCCTTCGGGTTCGAGACCTGTCCCTT TTGAAAACCACGTGCCCTACACTTTTCGGGATCAAGGTGC GGGTTGGCTTTGGTCAAAATTCTCTGGCGTCCCATTACAC |

TABLE 18-continued

| Strain | Fragment | SEQ ID NO | Sequence |
|---|---|---|---|
| | | | GCCCTCCGCATCATCGTTCCCGCGAACGATCTGACCCCCG ACTTCCGCGAGGAAGCGTGTGGCGTGATCCTCGAAGCGG AATGCCACCTCGAACTGTTCC |
| LGP2003 | ref1_142321 | 70 | CAGCAGCAAGCAGATCGTTGAAAACCGCTTGAACCGCAT CTTGATCGGGACCGGAACCAATCAGGTCATCTAGGTAAA CCGAGACGTAAACTCGTTTGCGCTCGGCATCTTTCAGAAC GTCCGTGATGCCAGACCGCATTAGTACCATCGTCGCCAAG GCGGGCGACTGAACGAAGCCGATCGGCAGAGAGTAACG GGGACCGCCCCTAATCGGGTTGCGAACGCAAGACCACTT AGCAAAGGTTCGAGCACGGCCGAACTTCGCATGGTGGAG AGCCGCGGCAACACGGTTCCGTGATA |
| LGP2009 | ref1_153668 | 71 | TAGACATTCCAACAAACCGGCAAGAGGCTCGTCCTCACTC GAGGATTTGTTGGGACTTGCATGATGTCGAAGCGGAGCC GTTATGACCTGGGTGCGATCATGCGCCGAGCATGGGAGA TGGCTCGGGAGGCGGCATTCGCGGTTGGCGAGCGGGCA CGGACTCACCTTGCTGCCGCGATGCGCAGCGCGTGGGCC GAAGCCAAGTTGGCACTCGCGCCCACGAAGACGGAGCA GGATCGTCTCTCTCCGAGCGACATGATCGGACATGAGGA CGCCTACCAAGGCCGGGTTCTAAAATAT |
| LGP2009 | ref1_3842117 | 72 | AAGATGGATACGACAAGCGCGATTACATTATTTGCGAAA TAGATGGACAAATAAAAGACAAAGGACTGATGTATTTCC TTAAATCTGGACAAGTTGACCTCTTTCACATAGAAGTCAC CACTCCCTTTGGGACAATTTGGTGTCACGAAAACATAGAG GCCGAACTTCTTAGCTGAATTATCGCGCTCCGGGTTCTTA TGCGGCTGAGTGAAGCGCGGGACAGCTTGCGAGCAGGG CCGCCAATGGCAGCCGGGATGACACAATGCTCGGTCTCC CGACGCTTCTTCAATCGGGAGCGCT |
| LGP2009 | ref1_3842278 | 73 | AGCTGAATTATCGCGCTCCGGGTTCTTATGCGGCTGAGTG AAGCGCGGGACAGCTTGCGAGCAGGGCCGCCAATGGCA GCCGGGATGACACAATGCTCGGTCTCCCGACGCTTCTTCA ATCGGGAGCGCTTCGCAGCCCGGGGCGGCGCGCTCATGC GTCACGACCTGGGCCCTGCGCACCTTCGCGGCCCCGCCG TCCCGGCAGATCCCTGATGCCCCAAGTGGGCGGCCACTC CATCAAAGAACCCCGGCCTGTGGCAGATCTCGTAGGCAT ACCGAGGTTCCGCAGTGCCCCCACC |
| LGP2020 | ref1_2810264 | 74 | ACCGAAGGCGTCCCCGGACACGAAGGCCTGAAACACCAT ATCTGTGGCGATCAGGCCGACGTGGTCGCGGACTTCAAC TGGCAGAGAATGCCAGGCCGCTTCGATTTCAGATGATAC TGGTACGGACATAGGAGCGGCTTAGCTTTCTCAGTGCAA ATGTGATTGATTCCGGCTCAAAAATGATCTTGATCGGACG AGACGTTTTCAATCCATGTCGTGTTGCCATCGCCGATCGG TGCGTCAAGAGACAGATGGCGCCGACCGTAGATACGCGT TCGGGTTGCCCGCACCGCTTCTCCA |
| LGP2020 | ref1_322980 | 75 | GGAGGTGTGATCTGATGATGTGCTGGATGAAATTGGCGG TCGAGCACTTGTTCAGCTTGGCCAGCTCGACGAGATCGG CGTGATGCTCGGCGTCGATCAGGATGTTCAGCGAGACCG GACGTACGCAGGACTTGGTATTAGCGCCGTTGCGCATCA GCTTGCAGCCTTGCTCTGCTTCTCAGCGTGCCGCGTCAGG ATGACCCTGATGTAGCTGTTGAGGTTGATGCCGTAATAG CCTGCGGACTCTGTGAGATCCCGGCGAAGATCGTCGGCG AGGGTCAGGCGGATGGTGCTGGTCGG |
| LGP2020 | ref1_2785241 | 76 | AAGTAACCGCTCAACATGATCTTCAGCATGTTGTCCAACA GCAGGAGAATACATGTAATTCACCATGACCGGCAAGCTG CGACTGGCCATTGCTTCCACCGCTTGAATGTAGCGATCGA ATTTCGCAAAATCAGGGTGGAATGAAAATATCGAACCAA ACTGCGAGCCTTGAATCCGTTCTGCAAAATTATCGAAAAA TTTTCTTGGCCGACTGCCGTTCGAAAACATTCTTACGTTTA CATGCGGCCCGCCTGAAACAAGACAGTCTACCAGCTCTG GGAAATGGGGGTGAAGGGTCGG |

Example 4. Analysis of Effects of *Methylobacterium* Strains on Nutrient Content of Plant Vegetative Tissues Soybean seeds treated as described in Example 1 were grown in multiple field locations in the Midwestern United States in the summer of 2019 in parallel with untreated control soybean plants. Seeds from Canola and wheat were similarly treated and tested. For analysis of field grown corn plants, *Methylobacterium* strains were applied in-furrow at planting. Strains and strain combinations evaluated are shown in Table 19 below.

TABLE 19

| Crop | Methylobacterium strain(s) |
|---|---|
| Soybean (+ Rhizobia treatment) | LGP2009 |
| Soybean (+ Rhizobia treatment) | LGP2020 |
| Soybean (+ Rhizobia treatment) | LGP2016 |
| Soybean (+ Rhizobia treatment) | LGP2002 + LGP2015 |
| Soybean | LGP2002 |
| Soybean | LGP2009 |
| Soybean | LGP2004 |
| Soybean | LGP2015 |
| Soybean | LGP2001 |
| Soybean | LGP2017 |
| Soybean | LGP2002 + LGP2015 |
| Soybean | LGP2019 |

Preliminary analysis of soybean vegetative tissue indicated increased micronutrients were obtained by treatment with *Methylobacterium* strains, including increased boron in R1 stage vegetative tissue in soybean plants grown from LGP2002 and LGP2017-treated seeds, and increased iron in V6 stage vegetative tissue in soybean plants grown from LGP2001-treated seeds.

LGP2002, LGP2017, LGP2001, LGP2016, LGP2019, and LGP2020 are tested to evaluate effects on micronutrient levels and growth enhancement of leafy green plants as described in Example 2.

Example 5. *Methylobacterium* Growth Stimulation of Cannabis Plants

The ability of *Methylobacterium* isolates LGP2002, LGP2009, and LGP2019 to enhance rooting and growth of cannabis plants (*Cannabis sativa* L.) was evaluated as follows. Cuttings were taken from a mature plant and immersed for 2 hours in a suspension of *Methylobacterium* in water at a concentration of approximately $1 \times 10^6$ CFU per ml. A control solution (water only) contained no *Methylobacterium*. The wounded stem portion of cuttings in both the control and *Methylobacteirum* treatments were then dipped in synthetic rooting hormone 0.3% indole-3-butyric acid (IBA) and inserted, stem down, into a potting media plug in a mult-plug tray. Fifty plants total, 10 of each of 5 different CBD oil cannabis varieties, were treated with each *Methylobacterium* isolate. After 2 weeks in the potting medium, plugs were non-destructively harvested and roots were scored using a visual rating scale of 1-5: 1=between 0 and 20% visible roots; 2=between 21 and 40% visible roots; 3=between 41 and 60% visible roots; 4=between 61 and 80% visible roots; 5=between 81 and 100% visible roots.

Rooting scores for plants treated with the tested *Methylobacterium* isolates ranged from 3-3.4, compared to a score of 2.6 for the untreated control plants. Treatments with LGP2002 and LGP2019 resulted in increases that were significantly different from the control at $p<0.05$, and treatment with LGP2009 resulted in increases that were significantly different from the control at $p<0.001$.

The rooted plantlets were transplanted to the field. Aboveground biomass was harvested approximately thirteen weeks after transplanting and dried, and the aboveground dry biomass determined. Treatment with three *Methylobacterium* isolates, LGP2002, LGP2009, and LGP2019, resulted in increased aboveground dry biomass in comparison to the untreated control plants. Treatment with LGP2009 resulted in an 18% increase in aboveground dry biomass, treatment with LGP2002 resulted in a 27% increase in aboveground dry biomass, and treatment with LGP2019 resulted in a 38% increase in aboveground dry biomass, a difference that was significantly different from the control at $p<0.05$. Enhanced rooting as the result of treatment with *Methylobacterium* isolates can lead to earlier transplanting of plantlets to the field without negatively impacting yield, thus resulting in decreased cycling time.

Example 6. *Methylobacterium* Growth Stimulation of Cannabis Plants

The ability of *Methylobacterium* isolates LGP2000 (NRRL B-50929), LGP2001 (NRRL B-50930), LGP2002 (NRRL B-50931), LGP2003 (NRRL B-50932), LGP2004 (NRRL B-50933), LGP2005 (NRRL B-50934), LGP2006 (NRRL B-50935), LGP2007 (NRRL B-50936), LGP2008 (NRRL B-50937), LGP2009 (NRRL B-50938), LGP2010 (NRRL B-50939), LGP2011 (NRRL B-50940), LGP2012 (NRRL B-50941), LGP2013 (NRRL B-50942), LGP2014 (NRRL B-67339), LGP2015 (NRRL B-67340), LGP2016 (NRRL B-67341), LGP2017 (NRRL B-67741), LGP2018 (NRRL B-67742), LGP2019 (NRRL B-67743), LGP2020 (NRRL B-67892), LGP2021 (NRRL B-68032), LGP2022 (NRRL B-68033), LGP2023 (NRRL B-68034), LGP2029 (NRRL B-68065), LGP2030 (NRRL B-68066), LGP2031 (NRRL B-68067), LGP2033 (NRRL B-68068), LGP2034 (NRRL B-68069), and LGP2167 (NRRL B-67927) to enhance rooting and growth of cannabis plants (*Cannabis sativa* L.) are evaluated as follows. Cuttings are taken from a mature plant and immersed for 2 hours in a suspension of *Methylobacterium* in water at a concentration of approximately $1 \times 10^6$ CFU per ml. A control solution (water only) contains no *Methylobacterium*. The wounded stem portion of cuttings in both the control and *Methylobacteirum* treatments are then dipped in synthetic rooting hormone 0.3% indole-3-butyric acid (IBA) and are inserted, stem down, into a potting media plug in a mult-plug tray. Fifty plants total, 10 of each of 5 different CBD oil cannabis varieties, are treated with each *Methylobacterium* isolate. After 2 weeks in the potting medium, plugs are non-destructively harvested and roots were scored using a visual rating scale of 1-5: 1=between 0 and 20% visible roots; 2=between 21 and 40% visible roots; 3=between 41 and 60% visible roots; 4=between 61 and 80% visible roots; 5=between 81 and 100% visible roots.

Rooting scores for plants treated with the tested *Methylobacterium* isolates are determined as compared to the untreated control plants. The rooted plantlets are transplanted to the field. Aboveground biomass is harvested approximately thirteen weeks after transplanting and dried, and the aboveground dry biomass is determined.

Example 7. *Methylobacterium* Inoculation Effect on Promotion of Early Rice Growth

*Methylobacterium* isolates were tested for their ability to enhance early growth of rice seedlings. A randomized complete block design was used, with 12 treatments in each run; 10 unique *Methylobacterium* isolates, a *Methylobacterium* positive control, LGP2018, that demonstrated consistent root growth promotion of rice seedlings during assay development and increased yield levels in corn field trials (WO2020117690). The untreated control sample (UTC) was *Methylobacterium* growth medium applied in the same amount as used for the *Methylobacterium* isolates. Each treatment level had an n of 10. All 10 blocks were grown in the same growth chamber and on the same shelf Procedure:

Media:
0.5× Murashige and Skoog MS agar plates with 0.5% sucrose

Pre-Planting:
Rice seeds were de-husked. Average 100 seed count is 2018 mg with approximately 21 g of husked rice per run.

Planting:
Seeds were sterilized in ~3% sodium hypochlorite+0.05% Tween 20.
Seeds were washed to remove bleach solution and placed on a sterile plate lid to begin drying.
Seeds were plated using a randomized complete block design with each complete block having similarly sized seeds.
Using sterile techniques 8 sterile seeds were evenly spaced in a horizontal line (~40% above the bottom of the plate, using a pre-marked lid as a guide). Seeds were placed with the embryo toward the bottom of the plate and gently pushed into media.

Inoculation:
Each *Methylobacterium* isolate or the culture medium control was applied as an 80 uL streak to the bottom portion of the plate (one isolate per plate) and spread by gently tilting the plate back and forth. A target concentration of $1\times10^6$ CFU per seed was applied.
Plates were allowed to dry for at least on hour and placed in a randomized layout in a Percival growth chamber set to 25° C. and 16 hour days.
Seeds were allowed to grow undisturbed for 8 days.

Harvest:
At 8 days after plating the plates were removed from the growth chambers, and the plants (approximately V2 stage) were measured as follows.
Plants that were not impeded from growing normally (by physical surroundings unrelated to presence of *Methylobacterium*) were removed from plates, and the number of seedlings for that plate was recorded.
Seedlings were scanned using WinRhizo and the images analyzed to determine root length for each plant.

The results of this experiment are shown below in Table 20.

TABLE 20

| Experiment Number | Treatment ID | Treatment | Absolute Root Length (cm) | Normalized Root Length |
|---|---|---|---|---|
| 264PB | 264PB LGP2018 | LGP2018 | 18.82978 | 100 |
| 264PB | 264PB Strain 1 | LGP2025 | 17.39133 | 73.325898 |
| 264PB | 264PB Strain 2 | LGP2073 | 17.19 | 69.59247 |
| 264PB | 264PB Strain 3 | LGP2047 | 16.37316 | 54.44538 |
| 264PB | 264PB Strain 4 | LGP2045 | 15.96066 | 46.796074 |
| 264PB | 264PB Strain 5 | LGP2151 | 15.39851 | 36.371618 |
| 264PB | 264PB Strain 6 | LGP2103 | 15.04489 | 29.814374 |
| 264PB | 264PB Strain 7 | LGP2125 | 14.84019 | 26.018352 |
| 264PB | 264PB Strain 8 | LGP2017 | 14.54892 | 20.61718 |
| 264PB | 264PB Strain 9 | LGP2120 | 13.84252 | 7.517937 |
| 264PB | 264PB Strain 10 | LGP2124 | 13.18279 | −4.715877 |
| 265PB | 265PB Strain 1 | LGP2071 | 14.117796 | 100.010863 |
| 265PB | 265PB LGP2018 | LGP2018 | 14.117132 | 100 |
| 265PB | 265PB Strain 2 | LGP2061 | 12.535499 | 74.124179 |
| 265PB | 265PB Strain 3 | LGP2107 | 11.83976 | 62.741755 |
| 265PB | 265PB Strain 4 | LGP2065 | 9.992807 | 32.52525 |
| 265PB | 265PB Strain 5 | LGP2051 | 9.743358 | 28.444232 |
| 265PB | 265PB Strain 6 | LGP2054 | 8.960485 | 15.636268 |
| 265PB | 265PB Strain 7 | LGP2092 | 8.856461 | 13.934427 |
| 265PB | 265PB Strain 8 | LGP2079 | 8.610079 | 9.903568 |
| 265PB | 265PB Strain 9 | LGP2052 | 7.916505 | −1.443435 |
| 266PB | 266PB Strain 1 | LGP2059 | 15.569966 | 123.451522 |
| 266PB | 266PB Strain 2 | LGP2016 | 14.587924 | 108.443799 |
| 266PB | 266PB LGP2018 | LGP2018 | 14.035398 | 100 |
| 266PB | 266PB Strain 3 | LGP2158 | 13.207394 | 87.346316 |
| 266PB | 266PB Strain 4 | LGP2066 | 12.900975 | 82.663567 |
| 266PB | 266PB Strain 5 | LGP2141 | 11.897894 | 67.334339 |
| 266PB | 266PB Strain 6 | LGP2078 | 10.298694 | 42.8951 |
| 266PB | 266PB Strain 7 | LGP2050 | 10.041706 | 38.967777 |
| 266PB | 266PB Strain 8 | LGP2080 | 9.462625 | 30.118161 |
| 266PB | 266PB Strain 9 | LGP2048 | 9.284123 | 27.390276 |
| 266PB | 266PB Strain 10 | LGP2053 | 7.207347 | −4.347354 |
| 267PB | 267PB Strain 1 | LGP2046 | 14.419073 | 137.78678 |
| 267PB | 267PB LGP2018 | LGP2018 | 12.303465 | 100 |
| 267PB | 267PB Strain 2 | LGP2024 | 11.846345 | 91.835407 |
| 267PB | 267PB Strain 3 | LGP2148 | 10.620679 | 69.94383 |
| 267PB | 267PB Strain 4 | LGP2144 | 9.415631 | 48.420528 |
| 267PB | 267PB Strain 5 | LGP2150 | 9.382432 | 47.827557 |
| 267PB | 267PB Strain 6 | LGP2110 | 9.298016 | 46.319801 |
| 267PB | 267PB Strain 7 | LGP2176 | 8.103827 | 24.990443 |
| 267PB | 267PB Strain 8 | LGP2153 | 7.128328 | 7.567103 |
| 267PB | 267PB Strain 9 | LGP2082 | 6.373293 | −5.91855 |
| 268PB | 268PB Strain 1 | LGP2021 | 15.569966 | 123.451522 |
| 268PB | 268PB Strain 2 | LGP2040 | 14.587924 | 108.443799 |
| 268PB | 268PB LGP2018 | LGP2018 | 14.035398 | 100 |
| 268PB | 268PB Strain 3 | LGP2138 | 13.207394 | 87.346316 |
| 268PB | 268PB Strain 4 | LGP2095 | 12.900975 | 82.663567 |
| 268PB | 268PB Strain 5 | LGP2130 | 11.897894 | 67.334339 |

TABLE 20-continued

| Experiment Number | Treatment ID | Treatment | Absolute Root Length (cm) | Normalized Root Length |
|---|---|---|---|---|
| 268PB | 268PB Strain 6 | LGP2099 | 10.298694 | 42.8951 |
| 268PB | 268PB Strain 7 | LGP2077 | 10.041706 | 38.967777 |
| 268PB | 268PB Strain 8 | LGP2102 | 9.462625 | 30.118161 |
| 268PB | 268PB Strain 9 | LGP2072 | 9.284123 | 27.390276 |
| 268PB | 268PB Strain 10 | LGP2081 | 7.207347 | −4.347354 |
| 269PB | 269PB LGP2018 | LGP2018 | 16.079324 | 100 |
| 269PB | 269PB Strain 1 | LGP2094 | 15.70514 | 95.501874 |
| 269PB | 269PB Strain 2 | LGP2101 | 15.386634 | 91.673054 |
| 269PB | 269PB Strain 3 | LGP2090 | 14.624067 | 82.506105 |
| 269PB | 269PB Strain 4 | LGP2093 | 12.998755 | 62.967937 |
| 269PB | 269PB Strain 5 | LGP2084 | 12.830224 | 60.942001 |
| 269PB | 269PB Strain 6 | LGP2114 | 12.516872 | 57.175138 |
| 269PB | 269PB Strain 7 | LGP2100 | 11.343389 | 43.068489 |
| 269PB | 269PB Strain 8 | LGP2085 | 9.828333 | 24.855728 |
| 269PB | 269PB Strain 9 | LGP2075 | 7.587342 | −2.08362 |
| 269PB | 269PB Strain 10 | LGP2083 | 7.50976 | −3.016248 |
| 270PB | 270PB Strain 1 | LGP2029 | 14.570904 | 104.017951 |
| 270PB | 270PB LGP2018 | LGP2018 | 14.31934 | 100 |
| 270PB | 270PB Strain 2 | LGP2135 | 13.363759 | 84.737607 |
| 270PB | 270PB Strain 3 | LGP2129 | 12.594344 | 72.448632 |
| 270PB | 270PB Strain 4 | LGP2143 | 10.608781 | 40.735534 |
| 270PB | 270PB Strain 5 | LGP2137 | 10.04973 | 31.806444 |
| 270PB | 270PB Strain 6 | LGP2128 | 9.970479 | 30.540667 |
| 270PB | 270PB Strain 7 | LGP2123 | 9.933589 | 29.951459 |
| 270PB | 270PB Strain 8 | LGP2126 | 9.635704 | 25.193695 |
| 270PB | 270PB Strain 9 | LGP2136 | 9.506136 | 23.124249 |
| 270PB | 270PB Strain 10 | LGP2121 | 7.872883 | −2.961817 |
| 271PB | 271PB LGP2018 | LGP2018 | 18.545695 | 100 |
| 271PB | 271PB Strain 1 | LGP2069 | 16.856945 | 83.10707 |
| 271PB | 271PB Strain 2 | LGP2027 | 15.948911 | 74.02381 |
| 271PB | 271PB Strain 3 | LGP2056 | 14.750148 | 62.03233 |
| 271PB | 271PB Strain 4 | LGP2096 | 14.330543 | 57.83493 |
| 271PB | 271PB Strain 5 | LGP2060 | 13.874818 | 53.27622 |
| 271PB | 271PB Strain 6 | LGP2097 | 13.443795 | 48.9646 |
| 271PB | 271PB Strain 7 | LGP2067 | 13.24211 | 46.9471 |
| 271PB | 271PB Strain 8 | LGP2055 | 12.770669 | 42.23118 |
| 271PB | 271PB Strain 9 | LGP2086 | 12.549608 | 40.01986 |
| 271PB | 271PB Strain 10 | LGP2057 | 11.572393 | 30.24456 |
| 273PB | 273PB LGP2018 | LGP2018 | 13.216513 | 100 |
| 273PB | 273PB Strain 1 | LGP2028 | 11.289892 | 71.38989 |
| 273PB | 273PB Strain 2 | LGP2098 | 10.957287 | 66.45074 |
| 273PB | 273PB Strain 3 | LGP2116 | 10.552009 | 60.43241 |
| 273PB | 273PB Strain 4 | LGP2131 | 10.492209 | 59.54438 |
| 273PB | 273PB Strain 5 | LGP2117 | 9.92343 | 51.09808 |
| 273PB | 273PB Strain 6 | LGP2133 | 9.207299 | 40.46361 |
| 273PB | 273PB Strain 7 | LGP2140 | 9.188468 | 40.18397 |
| 273PB | 273PB Strain 8 | LGP2134 | 8.651127 | 32.20451 |
| 273PB | 273PB Strain 9 | LGP2109 | 7.244746 | 11.31992 |
| 273PB | 273PB Strain 10 | LGP2111 | 5.404409 | −16.0089 |
| 274PB | 274PB Strain 1 | LGP2033 | 17.459903 | 136.108331 |
| 274PB | 274PB Strain 2 | LGP2118 | 15.623786 | 106.167536 |
| 274PB | 274PB LGP2018 | LGP2018 | 15.245562 | 100 |
| 274PB | 274PB Strain 3 | LGP2145 | 14.631981 | 89.994584 |
| 274PB | 274PB Strain 4 | LGP2032 | 14.299443 | 84.572029 |
| 274PB | 274PB Strain 5 | LGP2152 | 13.881329 | 77.754029 |
| 274PB | 274PB Strain 6 | LGP2147 | 13.409769 | 70.064484 |
| 274PB | 274PB Strain 7 | LGP2157 | 11.306689 | 35.770445 |
| 274PB | 274PB Strain 8 | LGP2142 | 10.1196 | 16.413079 |
| 274PB | 274PB Strain 9 | LGP2159 | 9.361136 | 4.045128 |
| 274PB | 274PB Strain 10 | LGP2154 | 8.943802 | −2.760155 |
| 275PB | 275PB LGP2018 | LGP2018 | 18.826053 | 100 |
| 275PB | 275PB Strain 1 | LGP2022 | 17.00802 | 80.576456 |
| 275PB | 275PB Strain 2 | LGP2023 | 16.310993 | 73.129541 |
| 275PB | 275PB Strain 3 | LGP2160 | 15.87016 | 68.41976 |
| 275PB | 275PB Strain 4 | LGP2163 | 15.337422 | 62.728087 |
| 275PB | 275PB Strain 5 | LGP2167 | 15.162438 | 60.858589 |
| 275PB | 275PB Strain 6 | LGP2166 | 14.298438 | 51.627764 |
| 275PB | 275PB Strain 7 | LGP2161 | 13.02194 | 37.989883 |
| 275PB | 275PB Strain 8 | LGP2162 | 11.85523 | 25.52496 |
| 275PB | 275PB Strain 9 | LGP2168 | 10.190812 | 7.742619 |
| 277PB | 277PB LGP2018 | LGP2018 | 15.854562 | 100 |
| 277PB | 277PB Strain 1 | LGP2062 | 14.420103 | 81.45296 |
| 277PB | 277PB Strain 2 | LGP2185 | 14.124727 | 77.63385 |
| 277PB | 277PB Strain 3 | LGP2063 | 13.598758 | 70.83327 |
| 277PB | 277PB Strain 4 | LGP2074 | 12.56993 | 57.53088 |
| 277PB | 277PB Strain 5 | LGP2058 | 12.237293 | 53.23002 |

TABLE 20-continued

| Experiment Number | Treatment ID | Treatment | Absolute Root Length (cm) | Normalized Root Length |
|---|---|---|---|---|
| 277PB | 277PB Strain 6 | LGP2064 | 11.790611 | 47.45458 |
| 277PB | 277PB Strain 7 | LGP2091 | 11.598483 | 44.97043 |
| 277PB | 277PB Strain 8 | LGP2186 | 10.193847 | 26.809 |
| 277PB | 277PB Strain 9 | LGP2105 | 10.166668 | 26.45758 |
| 277PB | 277PB Strain 10 | LGP2187 | 10.018778 | 24.54541 |
| 282PB | 282PB LGP2018 | LGP2018 | 17.115992 | 100 |
| 282PB | 282PB Strain 1 | LGP2087 | 15.150588 | 77.27183 |
| 282PB | 282PB Strain 2 | LGP2108 | 14.929319 | 74.71305 |
| 282PB | 282PB Strain 3 | LGP2076 | 14.913514 | 74.53028 |
| 282PB | 282PB Strain 4 | LGP2106 | 13.131888 | 53.92734 |
| 282PB | 282PB Strain 5 | LGP2113 | 12.547632 | 47.17093 |
| 282PB | 282PB Strain 6 | LGP2049 | 12.529399 | 46.96009 |
| 282PB | 282PB Strain 7 | LGP2068 | 12.507406 | 46.70576 |
| 282PB | 282PB Strain 8 | LGP2149 | 12.28271 | 44.10735 |
| 282PB | 282PB Strain 9 | LGP2005 | 11.888991 | 39.55433 |
| 282PB | 282PB Strain 10 | LGP2006 | 10.285192 | 21.00781 |
| 283PB | 283PB Strain 1 | LGP2182 | 14.59702 | 103.904114 |
| 283PB | 283PB LGP2018 | LGP2018 | 14.364828 | 100 |
| 283PB | 283PB Strain 2 | LGP2034 | 13.842152 | 91.211673 |
| 283PB | 283PB Strain 3 | LGP2146 | 12.351052 | 66.14017 |
| 283PB | 283PB Strain 4 | LGP2181 | 12.117376 | 62.211111 |
| 283PB | 283PB Strain 5 | LGP2089 | 11.13865 | 45.754717 |
| 283PB | 283PB Strain 6 | LGP2156 | 10.858914 | 41.051207 |
| 283PB | 283PB Strain 7 | LGP2170 | 10.110786 | 28.472101 |
| 283PB | 283PB Strain 8 | LGP2155 | 9.582397 | 19.587708 |
| 283PB | 283PB Strain 9 | LGP2127 | 8.857205 | 7.394253 |
| 283PB | 283PB Strain 10 | LGP2139 | 8.755959 | 5.691884 |
| 285PB | 285PB LGP2018 | LGP2018 | 12.031742 | 100 |
| 285PB | 285PB Strain 1 | LGP2173 | 11.21333 | 84.0138457 |
| 285PB | 285PB Strain 2 | LGP2172 | 10.228408 | 64.7752232 |
| 285PB | 285PB Strain 3 | LGP2164 | 9.964949 | 59.6290516 |
| 285PB | 285PB Strain 4 | LGP2165 | 9.033842 | 41.4416163 |
| 285PB | 285PB Strain 5 | LGP2008 | 7.982016 | 20.8961413 |
| 285PB | 285PB Strain 6 | LGP2112 | 7.609441 | 13.6186008 |
| 285PB | 285PB Strain 7 | LGP2169 | 7.485808 | 11.2036581 |
| 285PB | 285PB Strain 8 | LGP2044 | 7.402148 | 9.5695127 |
| 285PB | 285PB Strain 9 | LGP2011 | 6.922695 | 0.2042973 |
| 285PB | 285PB Strain 10 | LGP2171 | 5.864521 | −20.4651746 |
| 286PB | 286PB Strain 1 | LGP2001 | 18.47052 | 102.4019 |
| 286PB | 286PB LGP2018 | LGP2018 | 18.29094 | 100 |
| 286PB | 286PB Strain 2 | LGP2012 | 17.23022 | 85.81258 |
| 286PB | 286PB Strain 3 | LGP2000 | 17.06282 | 83.57344 |
| 286PB | 286PB Strain 4 | LGP2015 | 16.97065 | 82.34073 |
| 286PB | 286PB Strain 5 | LGP2007 | 15.82329 | 66.99432 |
| 286PB | 286PB Strain 6 | LGP2003 | 14.07074 | 43.5534 |
| 286PB | 286PB Strain 7 | LGP2010 | 14.04739 | 43.24119 |
| 286PB | 286PB Strain 8 | LGP2013 | 13.72635 | 38.9471 |
| 286PB | 286PB Strain 9 | LGP2004 | 12.51197 | 22.7044 |
| 288PB | 288PB Strain 1 | LGP2031 | 11.73032 | 115.04974 |
| 288PB | 288PB LGP2018 | LGP2018 | 10.961572 | 100 |
| 288PB | 288PB Strain 2 | LGP2030 | 10.823393 | 97.29486 |
| 288PB | 288PB Strain 3 | LGP2184 | 10.428576 | 89.56555 |
| 288PB | 288PB Strain 4 | LGP2188 | 10.060309 | 82.35601 |
| 288PB | 288PB Strain 5 | LGP2132 | 10.004185 | 81.25727 |
| 288PB | 288PB Strain 6 | LGP2179 | 9.603427 | 73.41165 |
| 288PB | 288PB Strain 7 | LGP2183 | 9.371095 | 68.86329 |
| 288PB | 288PB Strain 8 | LGP2122 | 8.820766 | 58.08953 |
| 288PB | 288PB Strain 9 | LGP2009 | 7.664263 | 35.44871 |
| 288PB | 288PB Strain 10 | LGP2088 | 6.600541 | 14.62428 |
| 289PB | 289PB Strain 1 | LGP2002 | 16.64733 | 117.25169 |
| 289PB | 289PB LGP2018 | LGP2018 | 15.73919 | 100 |
| 289PB | 289PB Strain 2 | LGP2174 | 14.52193 | 76.87615 |
| 289PB | 289PB Strain 3 | LGP2178 | 14.47025 | 75.89433 |
| 289PB | 289PB Strain 4 | LGP2119 | 14.41787 | 74.89923 |
| 289PB | 289PB Strain 5 | LGP2070 | 14.39551 | 74.47451 |
| 289PB | 289PB Strain 6 | LGP2104 | 14.2175 | 71.09291 |
| 289PB | 289PB Strain 7 | LGP2175 | 13.17078 | 51.20856 |
| 289PB | 289PB Strain 8 | LGP2115 | 13.15135 | 50.83953 |
| 289PB | 289PB Strain 9 | LGP2177 | 13.0369 | 48.66526 |
| 289PB | 289PB Strain 10 | LGP2180 | 13.00762 | 48.10911 |

Forty-eight *Methylobacterium* strains were selected for gene correlation analysis from the 176 strains tested, including 15 non-hits and 33 hits. The strains were selected from those having the highest and lowest normalized root scores, excluding any isolates that had any signs of any type of microbial contamination. The normalized score standardized each isolate's mean root length value to the UTC (a value of 0) and the positive control LGP2018 (a value of 100).

Genomes of the selected isolates were assembled and putative genes identified. The genes were assigned a putative function by sequence analysis to databases of known genes and gene signatures. A pan-genome for *Methylobacterium* was constructed as described by Page et al. (Roary: rapid large-scale prokaryote pan genome analysis, *Bioinformatics* (2015) 31:3691-3693) except that genome sequences from greater than 1000 different species of *Methylobacterium* were assembled and used to construct the pan-genome as opposed to the single *Salmonella* species described by Page et al.

The genomes of strains identified as enhancing rice seedling growth, "hits", and strains identified as "non-hits" were compared to determine the presence or absence in each strain of each genetic element in the pan-genome. For this analysis, translated genes were clustered across strains using BLASTP with a sequence identity of at least 50% to identify homologous genetic elements across genomes. These results were used to determine which genetic elements are the same or different across strains, leading to a score for each genetic element as present or absent in a given strain. The presence/absence scores were used in a correlation analysis to identify genetic elements that correlate positively with enhancing rice seedling growth as described by Brynildsrud et al. (Rapid scoring of genes in microbial pan-genome-wide association studies with Scoary, *Genome Biology* (2016) 17:238).

The steps in the process were as follows. Correlated genetic elements were collapsed so that genes that are typically inherited together, for example genes on the same plasmid, were combined into a single unit. Each genetic element in the pan-genome received a null hypothesis of no association to the trait. A Fisher's exact test was performed on each genetic element with the assumption that all strains had a random and independently distributed probability for exhibiting each state, i.e. presence or absence of the genetic element. To control spurious associations due to population structure, the pairwise comparisons algorithm was applied using a phylogenetic tree of the *Methylobacterium* genus, constructed using the same genome sequences described above. Empirical p-value was computed using label-switching permutations, i.e. the test statistic was generated over random permutations of the phenotype data. The genetic elements that were significantly positively correlated with enhancing rice seedling root growth were identified based on p value using a threshold for statistical significance of p less than or equal to 0.05. Sensitivity and specificity cutoffs were also employed based on the number of hits and non-hits a gene was present in.

Gene elements that were positively correlated with *Methylobacterium* enhancement of growth in rice seedlings are shown in Table 21 below.

TABLE 21

| Gene name | Consensus Protein SEQ ID NO: | Representative protein sequences | Annotation | Sensitivity | Specificity | p-value |
|---|---|---|---|---|---|---|
| group_4403 | 77 | SEQ 84 | hypothetical protein | 60.61 | 80.00 | 0.003 |
| group_9931 | 78 | SEQ 85 | hypothetical protein | 57.58 | 86.67 | 0.025 |
| group_7199 | 79 | SEQ 86 | hypothetical protein | 66.67 | 86.67 | 0.030 |
| recD2_2 | 80 | SEQ 87 | ATP-dependent RecD-like DNA helicase | 45.45 | 93.33 | 0.035 |
| pinR | 81 | SEQ 88 | Putative DNA-invertase from lambdoid prophage Rac | 69.70 | 80.00 | 0.039 |
| group_2780 | 82 | SEQ 89 | hypothetical protein | 33.33 | 100.00 | 0.055 |
| group_5546 | 83 | SEQ 90 | hypothetical protein | 60.61 | 80.00 | 0.057 |

*Methylobacterium* consensus protein sequences for the above identified genes that positively correlate with enhanced growth or rice seedlings are provided as SEQ ID NO: 77 through SEQ ID NO: 83 below. Consensus sequences are generated by aligning the encoded protein sequences from all isolates from a comprehensive database of *Methylobacterium* genome sequences from public and internal databases. EMBOSS cons was used to generate consensus sequences from the multiple sequence alignment. Where no consensus was found at a position an 'x' character is used. An upper case letter for an amino acid residue indicates that most of the sequences have that amino acid at that position. In the consensus sequences, X can be any amino acid residue or can be absent.

```
                                          SEQ ID NO. 77
xxxxxxxxxxxxxxxxxxxxxxxxxxxxxxxxxxxxxxxxx xxxxxxxxxxxxxxxxxxxxxxxxxxxMPTxLPxxxxxxxxxRxx PVRRLSWPDTARFLILVARVRLLDxxxxxxxxxxxxxxxxx xxxxxxxxxxxxxxxxxxLRLHAxxxxxxxxxxxxxVxRxGSxxA GDxLLxLMRRWLAxHEAIxALLPGVPEPxHVAQVxxxxxx xxxxxxxxxxxxxxxxxxxxRAILQxxxxxxxxxxVPxSRxxxxx Pxxxxxxxxxxxxxxxxxxxxxxxxxxxxxxxxxxxxxxx SEQ ID NO. 78
xxxxxxxxMxxPLRRTVQVxEDGRMNLPADMRRVLGLTGAG RVILTQDEDGIxITTaEQALKRVRSLAAPFxRGxGSVVDE FIAERRADAAREDxExxxxxxxxxxxxxxxxxxxxxxxxx xxxxxxxxxxxxxxxxxxxxxxxxxxxxxxxx SEQ ID NO. 79
MxxxxxxxxxxxxxxxxxxxxxxxxxxxxxxPQSYALQILAI AxAMSVLGLGGVWIASRIYDRNTRRLEAxxxxxRRGDxxxx xxxxxxxxxxxxxxxxxxxxxxxxxx SEQ ID NO. 80
xxxxxxxxDTLExxxxxxxxxxxxxxxxxRxxxxxLACTVxD HxSIAxxQNxVPIIRDIxLxNxxDxDLADVxLxIxAxPxL xRPLTLxIxRIxAGxxxxxIDxPDLRIDxAILxxxxxxAGxx ESxxxxxVTLxLxxSxxxxxxxxxxExARExxDLRLLPPSHWG GxxAAPELLAAFVRPNDPAVDxILRxAAxILxRAxRxTAx xDGYxSGRKARAWEMAEAIxAxxxxxxAMAxxxxxxxxxxx xRIxxxxxxxYVLPPASFERSGQKVRxPxxIVERRLxTCLD LTLLWAACxEQAGLNPLLVLTxxHAxLGLWLxDExxxxxx xDDxQxLRKRRDLQExxxxxxxxxxxxxxLILIETTILTxxxx xxxxxxxDPPxxFxxAxxxxGAxxIDxDAxAxLEMxLDLRRx RxxGIxPLDxGExxxxxxxxxAPxxxxxxxxxxLxxxQxLxxxx xxxxxxxAPPSFxEDxxxxxxIDxxxxxxxPxxRLExWKxRLL DLTLRNKLLNFKPGKGSLTLDCxEPGAxEDxLxAGxxFRL xxRPxxxxxxDxxxxxxxxxxxxxxxxxxxxxxxxxxAxxx xRxEIxxxxxxxxxxxxxxxxxxxELExRLxDLFRLARxxF EEGGANVLFLAxGFLTWTRxxGxxxxxxRAPLLLVPxALxR ASVRAGFRLxxHDEExRLNPTLLEMLRQDFxLxMPDxxxxx LPxDxxSGIDVExIWRIVRTHIRDLKGWEVxxEVVLSAFSF TKFLMWKDLxERxDLLKRSPVVRHLLDTPKAYGDGxxxTx FPxPxRLDxEHPPxxIFxxxxxxPLxADSSQLSAILAAASG KDFVLFGPPGTGKSxxxxxxxxxxxxQTIxNMIAQCLAxxGR TVLFVSQKSAALEVVxxRRRLxxVGLGxxCLEVHAxKAQK TxVIxQLREAWxxRxxxxxxxxWDxAxxDLxxxxRExLNGVV xSLHxxRxNGLSAHxAxGRVIAxxxxxGxxxxxLxLxWPxxx xxxxxxxxxxxSLxxxxxxRAxCxELxxxxxxLxxxVGxIxDHP LRGIxAxxxWSPLWRxEMxxAIxxLxRTLxxxxxxSGQxxAE AMGLxxxLxxxTYxGxxxRxLxxLxxxxLxRxEARxGLxFLxxG xxxLRQAVxARxxxQxxxARLxxRLxxxYxxPxVxxxDLx xLLAEWxxAKxSNFxLRGxRLxRVxxxLxPFAQGxxPxDI GPDLxxLxEIxxxxxxxxxxxxxxxxxxxVxExxxAxLG xxxPxxxxWSDPxxPAxxFxAxMAWAxRLxxVIxxMxPLx xxGxDxVRxxLxxxxxxLDxExxxLxxxxxxxxxxxGGxL AxAxxxFxxxRxxAVKAIExLGRxxxxxxxxxxLAGRAxPD xxxxPVxxExxxxxxxxxxxxxxxxxxxxxxxxxxxxxxx xxxxxxxxxxxxxxxxxxxxxxxxxxxxxxxxxxxxxxxx xxxxxxxxxxxxxxxxxxxxxxxxxxxxxxxxxxxxxxxx DxWVxxTLAVAxRWxxxLxxKAQxWxAWQxAAxxAxKAGL xPLVxAIExGxIxxDxxxxAFExAYARWWIDxxxTDDxxL RxxxxxxFMxQRHEEAIRxFxxADSRLSxLAxxxxVRARxxx xxxxxIGGGVPxxxxxxxxAxAFGxDPEWGTLAxElxxxxxxT KRxRHMPLRQLFxRMPNALTRLxxxTPCLMMSPLSIAQYx PxExxKPFDIVIFDEASQIAPWDAIGAIARGRQVVIVGDPE QLPPTNVGDRGVDEIxxxxxDGxDVADQESILDECLAANLP QRxLxxxxxxWHYRSRHESLIAFSNxHYYxGxLVTFPSPVT DDxRAVRLxxVxDGLYERGxxRVNRPEARALVAEVVxRLx DPxxxxxxxxxAFAxExRSLGIVTENGEQQRLIENLLDxE RRxxxxPELExFFDxxxWxEPVFVKNLExVQGDERDAILF SVAxGPxxDxTGRxxxxxISSLNREGGHxxxRRLNVAITRA RRELVVFASMRxDQVDLGRxxARGVRDFKHFLxFAExxGA xALxxAxAPTGGDIESPFExAVMAxxxxxxxxxALxARGWx IxxQVGVSxFRIDLGIVHPDAPGRYLAGVECDGATYxxxH xAATARDRDRLRExVLTDLGWRIxRVWSTDWWxDxQGALx RLDxxLRxDLDADRAKxxxxxxxxxxxxxxxxxxxxxxxxx xxxxxxxxxxxxxxxxxxxxxxxxxxxxxxxxxxPxxxxx xxxxxxxxxxxxQxxxxxPxxxxxxxxxxxxxxxxxxYxxA DLSxxGxxxDxxRFHDxxYxxxLAAMxAxVVxxEGPVFxD ILxxRLxRAHGxxRITxxLRQxxLxxVDPxxxxxxxxxxxxx xTxExxRIVLWPxGxxPxxxxxxxFRPAxxxxxxxxxxxRAx xxDxPLxELxGLARxLxxxxxxxxxxxxxxMAxRLxxxxxxx xxGLxRMxxAxxxxxxxxxxxxxxxxxxxxxxxxxxxxxxx xRARFAEAxAxLxARESxxxxxxxxxxxxxxxxxxxxxxx xxxxxxxxxxxxxxxxxxxxxxxxxxxxxxxxxxxxxxxx xxxxxxxxxxxxxxxxx
```

```
                                 SEQ ID NO. 81
xxxxxxxxxxxxxxxxxxxxxxxxxxxxxxxxxxxxxxxxxx xxxxxxxxxxxxxxxxxxxxxxxxxxxxxxxxxxxxxxxx xxxMQTILYARVSTADQTIAHQRxQAEAAGFKIxDxVVAD EGVSGVSTxLxDRPQGRRLFDxxMLRRGDVLxxxxxxxxVV RWVDRLGRNYAxxxxxxxxxxxxxxxxxxxxxxxxxxxxx xxxxxxxxDVTETIREFMRxxxxxxxRGVIVRTVINNxxxx xxxxxxMTFDGATTDPMQxAVRDALxxxIGFMAATAQAQA EATxKEAQKAGIEHAKxRxxExDxxAYRGRKPSYTREQxx xDxVRxxLxQGxxxVSAIAKATGLSRQxTVYRIRDNPAEA EAALARxxxxxxxxxxxxxxxxWAAxxxxxxxxxxxxxxx xxxxxxxx
                                 SEQ ID NO. 82
MxxxxxxxxxxxxxxxxxxxYDDxxxADAAAGEERDAIMRA LAEDMxEASxxxxxxxxxxxxGxFVRAERPADLAxxxxxxx xxxxxxxxxxxxxxxxxxxxxxxxxxxxxxxxxxxxxxxx xxxxxxxxxRALGRxxxxxxDRRxxQxxxxxxxxxxxxxxx xxxxxRxASxxxxxxxxxxxxxxxxxxxxxxxxxxxxxxxx xxxxxxxxxxxxxxxxxxxxxx
                                 SEQ ID NO. 83
xxxxxxxxxxxxxxxxxxxxMPVxxGIGIGRGDPLRPAVTRTx RFSGPEGFHxxPGALWLAAAAPLLATxLLLLxxRLAA Representative amino acid sequences
for proteins correlated with enhancing
growth of rice seedlings from specific
Methylobacterium strains are provided
below as SEQ ID NO: 84 through
SEQ ID NO: 90.
The strain from which a representative
sequence was obtained is referenced
below.
LGP2022
                                 SEQ ID NO: 84
MPTAIPIRPAPERCLSWPDTARLLILVARVRILDLEMHTV

VRHGSGFADDRLLHLMRRWLAQHEAISALLPGVAEPRHVA

EVRAILQVPNSRPEPEDRRAL*

LGP2021
                                 SEQ ID NO: 85
MPQRRTIQVTEDGRMNLPADIRRVLGLNGAGRIVLMQDED

GIHLTTAEDPLRRVRELAAPFRRGSGSVVDEFIAERRADS

GED*

LGP2021
                                 SEQ ID NO: 86
MPLDYALQITAIAFGLSVLGLGGAFIASRVYDRNTRRYDE

AAQLHKAD*

LGP2021
                                 SEQ ID NO: 87
VQDGIQITCSVTEHVSLAYHENAVPVIREVVVENTSEQEL

SDVRVRIESRPAVVQPLTLRIDRIPAGSNHHIELPDVRLD

AALLAGFTEASRLELTVIVEDAAGERARHLEELRVLPPSH

WGGGRSAPELLAAFVRPNDPAVDVVLRDAATKLGEAGRET

GLNGYTTAKKSRAWELAEAIWAAIADRRIAYVLPPASFER

AGQKVRGPSDVLERKVGTCLDLSLLYAACLEQAGLNPVLV

LTVGHAFVGVWLQDDDFASATVDDMQLLRKRRDLQDLVFV

ETTLLTPEPPATFKVATTQGGVQVEDEAPAALEIAIDVRR

CRRRGIRPMDLGDGKPTGIAPAPTIPLNQTLSAPPSFEEE

ARAPVDEAPETPVGRVERWKRKLLDLTLRNKLLNFKPGKG

SVSLECASPGALEDGLAAGTEYRLKPLSDVLTGSDERSAD

LYARRHHDDGRRSYLEAALARKEIYTTSTEADLDRRLLDL

YRLARNGFEEGGANILFLAVGFLSWTKKEGEAAYRAPLLL

VPVTLKRSSVRAGFKLALHDDEVRINPTLLEMLREDFKLR

MPELEGDLPRDGSGYDVDGIFRIVRQHVKELRGWEVVPDV

VLSAFSFTKYLMWKDLVDRAEVLKRNPVVRHLIDTPKHSY

GDGTPFPEPTRLDREHPPETVFAPLSADSSQLSAVLAAAG

GKDFVLFGPPGTGKSQTIGNMIAQCLAQGRTVLFVSQKTA

ALEVVQRRLQEIGLGDYCLEVHSTKAQKSAVLGQLRRAWH

ERSTPSQGTWDAATSELASLREELNGLVNALHRRRENGLS

AYEAFGRVIASGGEAPLVLTWPDHLAHNETTLANLRAACR

ELRPVLASVGSLVDHPLQGVEATQWSPVWRDDMGAAIRAV

EQTLGALRVSGQAFABAIGLPSLLATYAGTRGLVVLGNYL

VRSEARCGAAFLADGAGDLRRAVAARERFQTTKVQLLGRL

TGRYRPGILDQNLGALLAEWVAAQGANFLVKGGKLKKVSA

QVQPYAEGPLPPDLGPDLTGLIEVARHVKAGCLEELILAR

LGLPWSNPDCPASEFASAITWAEKVEQLLDILGPLSLGID

GLRDHLVHLVERQGRALADGGRIAQTYAAFAQDRARANEA

MKALGVLA

GRPDPEEPLAAEADWIERSCTIARRLSSGLSRAQGWCAWQ

AAAQSALKTGLAPLIDALEDGRIAPDRAEIAFEIAYARWW

IDRVVSDDPVLRRFLPARHEDAIQRFRAADARVTELSKQV

VRSRLGGGIPGATAFGADPEWGTLSHELTKKTAHMPLRKL

FGKMPTALTKLTPCVMMSPLSIAQYLPPDKEPFDVVIFDE

ASQISPWDAIGALARAKQVVIVGDPEQLPPTNVGDRGVDD

IEDGSDVTDQESILDECLAANIPRRNLDWHYRSRHESLIA

FSNSRYYGGRLVTFPSPVTDDRAVRLTLVPDGVYKRGSGR

VNRPEARAVVADIVRRLRDPSFSEERRSLGVVTFNGEQQR

LIENLLDEQRRSYPELEPFFDRDRWHEPVFVKNLENVQGD

ERDAIIFSVAVGPDQTGRPVSTVSSLNKDGGHRRLNVAIT

RARRELVVFASMRPEQIDLGRTRARGVRDFKHFLEFAERG

ARALAEAFAPTGGDVESPFEAAVMAGLEARGWTVHTQIGV

SGFRIDLGIVHPDAPGRYLAGVECDGATYHSSATARDRDR

LREHVLTDLGWRIRRVWSTEWWMDAEGALTKLDQRLIEDL
```

-continued

```
EADRAKAEAPRDVAVEPEAVEQEHDEPTGEPEVTPPVDTG

PSEPANDLEPVTDLIPQRLYADQALPVTPPAPKPEVYDDV

RAYRIVDLNDLGRSVEPGRFYDASYQQALSAMVDHVLAVE

GPIYEELLIKRIARAHDIQRVGPLVREAIADRIDASVART

EDDGRPVLWPRGEEPRASYPHRPASAAIRSHTDTPMPELV

GIAMTLPSNASEAERARMIGQRLGLSRIEASARARFERAS

ELARQAAVA*

LGP2022
                                   SEQ ID NO: 88
MSVVLYARVSTAEQTLEHQQTQAEAAGFVFDAVVADHGES

GRKPLRDRPEGRRLYDMLRTGDVLVVRWINRLGRSYEDVT

GVMRELMQRGVIVRTIISNMTEDGATKDPMQRAIRDALIA

FMAAAGEAELEATREAQKAGIEHARKQADQTAYRGRKPSY

TRDQLTVISGMLGRGAGVSAIAAETGLSRQTIYRVQADPV

EAEAALARWA*

LGP2016
                                   SEQ ID NO: 89
MLSLDDIAAAAAGEERDALWRSLVEDMEEAAGRRRGGRGL

VQADRPADLARALGRDRRVQPSRLARSAS*

LGP2022
                                   SEQ ID NO: 90
MPVGIGIGRGDPLRPAVTRTARFSGPEGFHPGALWLAAAS

PLLATLLLLVRLAA*
```

Example 8. *Methylobacterium* Inoculation Effect on Nitrogen Utilization in Rice

*Methylobacterium* isolates were tested for their ability to enhance shoot nitrogen content and/or concentration in rice. A randomized complete block design was used, with 12 treatments in each run; five *Methylobacterium* isolates and a control at two nitrogen levels. The untreated control sample (UTC) was *Methylobacterium* growth medium applied in the same amount as used for the *Methylobacterium* isolates. Each treatment level had an n of 10. All 10 blocks were grown in the same growth chamber and on the same shelf Procedure:

Media:
    0.5× Murashige and Skoog MS medium with high or low nitrogen
        High nitrogen media—10400 uM
        Low nitrogen media—250 uM Pre-Planting:
    Rice seeds were de-husked. Average 100 seed count is 2018 mg with approximately 21 g of husked rice per run.
    Agar plates containing high or low nitrogen media were prepared.

Planting:
    Seeds were sterilized in ~3% sodium hypochlorite+0.05% Tween 20.
    Seeds were washed to remove bleach solution and placed on a sterile plate lid to begin drying.
    Seeds were plated using a randomized complete block design with each complete block having similarly sized seeds.
    Using sterile techniques 8 sterile seeds were evenly spaced in a horizontal line (~40% above the bottom of the plate, using a pre-marked lid as a guide). Seeds were placed with the embryo toward the bottom of the plate and gently pushed into media.

Inoculation:
    Each *Methylobacterium* isolate or the culture medium control was applied as an 80 uL streak to the bottom portion of the plate (one isolate per plate) and spread by gently tilting the plate back and forth. A target concentration of $1\times10^6$ CFU per seed was applied.
    Plates were allowed to dry for at least one hour and placed in a randomized layout in a Percival growth chamber set to 25° C. and 16 hour days.
    Seeds were allowed to grow undisturbed for 8 days.

Harvest:
    At 8 days after plating the plates were removed from the growth chambers, and the plants were measured as follows.
    Plants that were not impeded from growing normally (by physical surroundings unrelated to presence of *Methylobacterium*) were removed from plates, and the number of seedlings for that plate was recorded.
    Seedlings were scanned using WinRhizo and the images analyzed to determine root and shoot area for each plant.
    Seedlings were rinsed to remove any remaining plate media and the shoots separated from the seedlings and dried in a drying oven for at least 3 days.
    Dried shoots were combined for each treatment and the mass measured. The plant material was then ground to a powder to be used for nitrogen testing.
    Nitrogen analysis was conducted on the powdered samples by Atlantic Microlab (Norcross, GA).

Results of the analyses are shown below. In all tables, pairwise results are presented separately for the High N and Low N treatments. Data was analyzed using Student's t-test and different letters indicate a significant difference between treatments at $p<0.05$.

TABLE 22

Exp 1 Shoot Area Measurements

| 22A Low Nitrogen Treatment | | 22B High Nitrogen Treatment | | |
| --- | --- | --- | --- | --- |
| Treatment | Mean Shoot Area per Plant (cm$^2$) | Treatment | | Mean Shoot Area per Plant (cm$^2$) |
| LGP2033 | A | 0.30 | LGP2020 | A | 0.51 |
| UTC | A | 0.30 | LGP2033 | B | 0.42 |
| LGP2009 | A | 0.29 | LGP2022 | BC | 0.40 |
| LGP2020 | A | 0.29 | LGP2003 | BC | 0.40 |
| LGP2022 | A | 0.28 | UTC | BC | 0.36 |
| LGP2003 | A | 0.28 | LGP2009 | C | 0.34 |

TABLE 23

Exp 1 Root Area Measurements

| 23A Low Nitrogen Treatment | | | 23B High Nitrogen Treatment | | |
| --- | --- | --- | --- | --- | --- |
| Treatment | | Mean Shoot Area per Plant (cm$^2$) | Treatment | | Mean Shoot Area per Plant (cm$^2$) |
| LGP2020 | A | 0.93 | LGP2020 | A | 0.99 |
| LGP2022 | A | 0.88 | LGP2022 | B | 0.85 |
| LGP2033 | AB | 0.85 | LGP2033 | B | 0.83 |
| LGP2009 | B | 0.79 | LGP2003 | C | 0.67 |

TABLE 23-continued

Exp 1 Root Area Measurements

| 23A Low Nitrogen Treatment | | | 23B High Nitrogen Treatment | | |
|---|---|---|---|---|---|
| Treatment | | Mean Shoot Area per Plant (cm$^2$) | Treatment | | Mean Shoot Area per Plant (cm$^2$) |
| LGP2003 | B | 0.77 | LGP2009 | C | 0.62 |
| UTC | C | 0.64 | UTC | C | 0.59 |

TABLE 24

Exp 1 Shoot Nitrogen Concentration

| 24A Low Nitrogen Treatment | | | 24B High Nitrogen Treatment | | |
|---|---|---|---|---|---|
| Treatment | | Mean % Dry Wt Nitrogen | Treatment | | Mean % Dry Wt Nitrogen |
| UTC | A | 2.73 | LGP2020 | A | 4.92 |
| LGP2020 | B | 2.59 | LGP2022 | B | 4.38 |
| LGP2022 | C | 2.48 | LGP2033 | C | 4.02 |
| LGP2033 | C | 2.49 | UTC | D | 3.23 |
| LGP2009 | D | 2.35 | LGP2009 | D | 3.27 |
| LGP2003 | D | 2.30 | LGP2003 | D | 3.26 |

Significant and substantial shoot growth promotion was observed for some isolates at high nitrogen. Shoot growth promotion was not observed for the *Methylobacterium* treatments at low nitrogen, consistent with some literature reports which indicate that growth promotion effects from plant-beneficial microbes may not be observed when nutrient availability is too low. Root growth promotion was evident at both nitrogen levels, and Root/Shoot ratios are higher under low N than under high N. As expected, plants grown on high N media showed substantially greater shoot N concentration than those grown on low N media. Several *Methylobacterium* isolates demonstrated significantly enhanced shoot nitrogen concentration under high nitrogen growth conditions. Three isolates, LGP2020, LGP2022, and LGP2033, demonstrated the greatest enhancements of shoot growth, root growth, and shoot nitrogen concentration.

The above experiment was repeated using four of the same *Methylobacterium* isolates and one additional isolate. Results were similar to those observed in the first assay and are shown in the tables below. LGP2020 (NRRL B-67892), LGP2022 (NRRL B-68033), and LGP2033 (NRRL B-68068) again demonstrated enhancements of shoot growth, root growth, and shoot nitrogen concentration.

TABLE 25

Exp 2 Shoot Area Measurements

| 25A Low Nitrogen Treatment | | | 25B High Nitrogen Treatment | | |
|---|---|---|---|---|---|
| Treatment | | Mean Shoot Area per Plant (cm$^2$) | Treatment | | Mean Shoot Area per Plant (cm$^2$) |
| LGP2022 | A | 0.18 | LGP2022 | A | 0.30 |
| LGP2033 | A | 0.19 | LGP2033 | AB | 0.30 |
| LGP2020 | A | 0.17 | LGP2020 | AB | 0.29 |
| UTC | A | 0.19 | UTC | AB | 0.26 |
| LGP2023 | A | 0.18 | LGP2003 | AB | 0.25 |
| LGP2019 | A | 0.18 | LGP2019 | B | 0.25 |

TABLE 26

Exp 2 Root Area Measurements

| 26A Low Nitrogen Treatment | | | 26B High Nitrogen Treatment | | |
|---|---|---|---|---|---|
| Treatment | | Mean Shoot Area per Plant (cm$^2$) | Treatment | | Mean Shoot Area per Plant (cm$^2$) |
| LGP2033 | AB | 0.57 | LGP2033 | A | 0.67 |
| LGP2022 | AB | 0.53 | LGP2022 | A | 0.66 |
| LGP2020 | A | 0.59 | LGP2020 | A | 0.64 |
| LGP2019 | AB | 0.56 | LGP2019 | B | 0.54 |
| LGP2003 | AB | 0.52 | LGP2003 | B | 0.49 |
| UTC | B | 0.50 | UTC | B | 0.47 |

TABLE 27

Exp 2 Shoot Nitrogen Concentration

| 27A Low Nitrogen Treatment | | | 27B High Nitrogen Treatment | | |
|---|---|---|---|---|---|
| Treatment | | Mean % Dry Wt Nitrogen | Treatment | | Mean % Dry Wt Nitrogen |
| LGP2020 | AB | 2.36 | LGP2020 | A | 4.28 |
| LGP2022 | AB | 2.30 | LGP2022 | A | 4.06 |
| LGP2033 | AB | 2.38 | LGP2033 | B | 3.68 |
| UTC | A | 2.51 | UTC | BC | 3.45 |
| LGP2003 | B | 2.25 | LGP2003 | C | 3.37 |
| LGP2009 | B | 2.21 | LGP2019 | C | 3.23 |

Percent difference between *Methylobacterium* treatments and UTC at high and low N for 3 different variables: projected root area, projected shoot area, and foliar nitrogen concentration are shown for each experiment. Bold italics are used to denote a statistically significant difference from UTC at p<0.05 using Student's t-test.

TABLE 28

Percent Differences

| N Level | Treatment | % Root GP Exp 1 | % Root GP Exp 2 | % Shoot GP Exp 1 | % Shoot GP Exp 2 | % N Enhancement Exp 1 | % N Enhancement Exp 2 |
|---|---|---|---|---|---|---|---|
| High N | LGP2003 | +15.1% | +2.8% | +10.6% | −1.7% | −0.8% | −2.2% |
|  | LGP2020 | *+68.5%* | *+35.0%* | *+42.0%* | +14.0% | *+49.7%* | *+23.9%* |
|  | LGP2033 | *+41.6%* | *+42.2%* | +16.2% | +15.5% | *+22.4%* | +6.8% |
|  | LGP2022 | *+45.5%* | *+40.1%* | +10.8% | +15.8% | *+33.3%* | *+17.7%* |
| Low N | LGP2003 | *+19.4%* | +4.5% | −8.9% | −8.6% | *−15.8%* | *+10.2%* |
|  | LGP2020 | *+43.5%* | *+18.3%* | −3.2% | −11.5% | *−5.3%* | −6.1% |
|  | LGP2033 | *+31.8%* | +13.8% | +0.7% | −2.5% | *−9.1%* | −5.0% |
|  | LGP2022 | *+37.0%* | +6.1% | −8.6% | −8.5% | *−9.0%* | −8.3% |

Example 9. Evaluation of Optimal Nitrogen Dose for Testing *Methylobacterium* Effect The high nitrogen dose in the experiments described above is the amount in 0.5× MS media, a general plant growth medium, and provides a luxury amount of nitrogen for plant growth. To evaluate plant response to *Methylobacterium* treatment under various reduced nitrogen levels, including a nitrogen level that approximates the amount of nitrogen in a field treated with a 25-30% reduction of optimal nitrogen level, two low nitrogen dose experiments were conducted.

Experiment 3 was conducted as described in Example 8, except that the nitrogen doses used for evaluation of effect of *Methylobacterium* treatment on plant growth were: 5200 uM nitrogen (70% of rice optimal nitrogen level), 7280 uM nitrogen (rice optimal nitrogen level), and 10400 uM nitrogen (rice luxury nitrogen level). Results are shown in Tables 29-31 below. Data was analyzed using Student's t-test, and different letters indicate a significant difference between treatments at $p<0.05$.

TABLE 29

Exp 3 Shoot Area Measurements

| Treatment | 5200 µM N Treatment Mean Shoot Area per Plant (cm$^2$) | | 7280 µM N Treatment Mean Shoot Area per Plant (cm$^2$) | | 10400 µM N Treatment Mean Shoot Area per Plant (cm$^2$) | |
|---|---|---|---|---|---|---|
| LGP2020 | A | 0.41 | A | 0.36 | A | 0.41 |
| LGP2033 | B | 0.33 | A | 0.34 | B | 0.34 |
| Control | C | 0.28 | B | 0.25 | BC | 0.30 |
| LGP2019 | C | 0.27 | B | 0.28 | C | 0.28 |

TABLE 30

Exp 3 Root Area Measurements

| Treatment | 5200 µM N Treatment Mean Root Area per Plant (cm$^2$) | | 7280 µM N Treatment Mean Root Area per Plant (cm$^2$) | | 10400 µM N Treatment Mean Root Area per Plant (cm$^2$) | |
|---|---|---|---|---|---|---|
| LGP2020 | A | 0.82 | A | 0.78 | A | 0.79 |
| LGP2033 | B | 0.70 | A | 0.77 | B | 0.71 |
| LGP2019 | B | 0.62 | B | 0.64 | C | 0.57 |
| Control | C | 0.47 | C | 0.45 | D | 0.49 |

TABLE 31

Exp 3 Shoot Nitrogen Concentration

| Treatment | 5200 µM N Treatment Mean % Dry Wt Nitrogen | | 7280 µM N Treatment Mean % Dry Wt Nitrogen | | 10400 µM N Treatment Mean % Dry Wt Nitrogen | |
|---|---|---|---|---|---|---|
| LGP2020 | A | 4.70 | A | 4.40 | A | 4.61 |
| LGP2033 | B | 3.77 | B | 4.02 | B | 3.96 |
| LGP2019 | C | 3.14 | C | 3.42 | C | 3.41 |
| Control | C | 3.13 | C | 3.22 | C | 3.34 |

Experiment 3 was conducted as described in Example 8, except that the nitrogen doses used for evaluation of effect of *Methylobacterium* treatment on plant growth were: 1560 uM nitrogen (20% of rice optimal nitrogen level), 2600 uM nitrogen (35% of rice optimal nitrogen level), and 5200 uM nitrogen. (70% of rice optimal nitrogen level). Results are shown in Tables 32-34 below.

TABLE 32

Exp 4 Shoot Area Measurements

| Treatment | 1560 µM N Treatment Mean Shoot Area per Plant (cm$^2$) | | 2600 µM N Treatment Mean Shoot Area per Plant (cm$^2$) | | 5200 µM N Treatment Mean Shoot Area per Plant (cm$^2$) | |
|---|---|---|---|---|---|---|
| LGP2020 | A | 0.28 | A | 0.32 | A | 0.38 |
| LGP2017 | A | 0.27 | AB | 0.28 | AB | 0.31 |
| LGP2019 | AB | 0.26 | B | 0.26 | B | 0.26 |
| Control | B | 0.23 | C | 0.22 | B | 0.25 |

TABLE 33

Exp 4 Root Area Measurements

| Treatment | 1560 µM N Treatment Mean Root Area per Plant (cm$^2$) | | 2600 µM N Treatment Mean Root Area per Plant (cm$^2$) | | 5200 µM N Treatment Mean Root Area per Plant (cm$^2$) | |
|---|---|---|---|---|---|---|
| LGP2020 | A | 0.75 | A | 0.73 | A | 0.71 |
| LGP2017 | AB | 0.72 | B | 0.65 | AB | 0.66 |
| LGP2019 | B | 0.65 | B | 0.63 | B | 0.61 |
| Control | C | 0.45 | C | 0.44 | C | 0.45 |

TABLE 34

Exp 4 Shoot Nitrogen Concentration

| Treatment | 1560 µM N Treatment Mean % Dry Wt Nitrogen | | 2600 µM N Treatment Mean % Dry Wt Nitrogen | | 5200 µM N Treatment Mean % Dry Wt Nitrogen | |
|---|---|---|---|---|---|---|
| LGP2020 | A | 3.03 | A | 3.65 | A | 4.67 |
| LGP2017 | A | 3.00 | B | 3.51 | B | 4.22 |
| LGP2019 | AB | 2.86 | C | 3.30 | C | 3.25 |
| Control | B | 2.73 | D | 2.90 | C | 3.15 |

Results of Experiments 3 and 4 again demonstrate significant and substantial shoot and root growth promotion and increased levels of shoot nitrogen levels resulting from treatment with *Methylobacterium* isolates. Shoot area correlated closely to nitrogen levels measured in shoots. Although root area measurements were not observed to be in proportion to increased nitrogen uptake as measured in shoots, additional observations noted that numbers of root tips were increased in line with enhanced nitrogen uptake as measured in shoot nitrogen concentration.

Experiments to identify additional *Methylobacterium* strains that can enhance plant growth and development under reduced nitrogen levels will be conducted using a 5200 µM nitrogen treatment, representing 70% of the optimal N level for rice, or a 30% reduction in nitrogen fertilizer application for rice cultivation.

Example 10. *Methylobacterium* treated Corn Plants Grown under Reduced Nitrogen

Corn seeds treated *Methylobacterium* were grown in a large-scale field trial under reduced nitrogen conditions to determine effects on foliar nitrogen levels and corn yield. The trial was conducted at nine locations using a randomized complete block design at each location with 3 reps per location. *Methylobacterium* LGP2019 (NRRL B-67743) was applied in-furrow at planting with starter fertilizer applied at 150 lbs N per acre, a 25% reduction of the standard nitrogen fertilizer rates at the midwestern US locations. The *Methylobacterium* was applied at a rate of approximately 1×10⁶ CFU per seed to corn hybrid Croplan CP4488SS/RIB, a 104-day hybrid with a high response to nitrogen. Some data points were culled from the final dataset due to environmental stress or as statistical outliers, including removal of all data from one high stress location.

Foliar tissue from the ear leaf at the R2-R4 developmental stage was sampled for nitrogen, phosphorus, and potassium nutrient concentrations. Corn seed was harvested at maturity and seed yield determined. Results are presented in the Tables below.

TABLE 35

Tissue nutrient concentrations

| Treatment | Tissue N concentration (% by mass) | Tissue P concentration (% by mass) | Tissue K concentration (% by mass) |
|---|---|---|---|
| LGP2019 | 2.76 | 0.35 | 1.77 |
| UTC | 2.81 | 0.36 | 1.83 |

TABLE 36

Yield

| Location | UTC Yield (Bu/A) | LGP2019 Yield (Bu/A) |
|---|---|---|
| Steuben, WI (1) | 176.2 | 193.7 |
| Steuben, WI (2) | 174.0 | 184.1 |
| Lime Springs, IA | 174.5 | 180.3 |
| Fairbank, IA | 171.5 | 175.1 |
| Waverly, IL (1) | 207.9 | 209.8 |
| Waverly, IL (2) | 207.9 | 206.6 |
| New Hampton, IA | 180.6 | 179.6 |
| South Park, NE | 164.3 | 157.8 |
| Total | 179.9 | 184.6* |

*indicates significant yield difference between UTC and LG2019 at p < 0.1.

Nutrient content of foliar tissue collected at the R2-R4 developmental stage was not significantly different in the treated plants in comparison to an untreated control. Harvested seed yield was significantly increased over the untreated control plant yields when analyzed over all 8 locations, demonstrating that *Methylobacterium* LGP2019 enhances nitrogen uptake under reduced nitrogen growth conditions and provides for increased seed yield.

To further analyze the effect of treatment of corn seeds with *Methylobacteirum* LGP2019, a second field trial was conducted using standard nitrogen application rates and foliar nutrient contents analyzed at two timepoints. LGP2019 was applied in furrow at planting at a rate of approximately 1×10⁶ CFU per seed to 12 corn hybrids in a non-replicated strip trial. Each strip contained a biostimulant and hybrid combination and was 4 rows wide and ⅛ to ¼ of a mile long in a commercial field in Pittsfield, IL. Aboveground tissue samples were taken to assess foliar nutrient concentrations at V2-V3 (May 27) and at tasseling (July 8). Two of the 12 hybrids planted were selected for tissue sampling and were aggregated for analysis: Lewis 15 DP 899 VT2PRIB and AgriGold A6659 VT2. One data point was generated per sampling period.

Results are presented in Tables 36 and 37 below. Seed yield was not significantly different from the untreated control in this trial that used standard nitrogen fertilizer rates.

TABLE 37

Seed Yield

| Treatment | Yield (Bu/A) |
|---|---|
| UTC | 243.7 |
| LGP2019 | 242.6 |

TABLE 38

Tissue nutrient concentrations

| | V2-V3 Stage | | VT-R1 Stage | |
|---|---|---|---|---|
| Nutrient | UTC | LGP2019 | UTC | LGP2019 |
| N_pct | 3.34 | 4.37 | 3.83 | 4.23 |
| P_pct | 0.24 | 0.227 | 0.367 | 0.393 |
| K_pct | 3.89 | 4.05 | 2.09 | 2.31 |
| Ca_pct | 1.19 | 1.07 | 0.55 | 0.63 |
| Mg_pct | 0.233 | 0.207 | 0.243 | 0.203 |
| S_pct | 0.278 | 0.309 | 0.253 | 0.3 |
| B_ppm | 7.6 | 7.5 | 6.5 | 8.3 |
| Fe_ppm | 520 | 514 | 113 | 127 |
| Mn_ppm | 113 | 112 | 61.4 | 73.6 |
| Cu_ppm | 7.3 | 8.2 | 13.6 | 14.6 |
| Zn_ppm | 22.4 | 25.8 | 26.9 | 31.2 |

Increased levels of nitrogen, potassium, sulfur, copper, and zinc were detected in V2-V3 and VT-R1 stage tissue samples. In addition, increased levels of phosphorus, boron, iron, and manganese were detected in stage VT-R1 stage corn tissue.

Example 11. Increases in Rice Yield by Application of *Methylobacterium*

Rice field trials were conducted at three locations, all near Humphrey, AR, for the purpose of evaluating the effects of three *Methylobacterium* isolates applied as a seed treatment. Treatments included each *Methylobacterium* isolate and an untreated control applied to rice seeds with and without a base treatment of insecticide only (active ingredient Clothianidin). The trial was conducted using a Randomized Complete Block Design (RCBD) with 4 reps per location. LGP2016 (NRRL B-67341), LGP2019 (NRRL B-67743), and LGP2017 (NRRL B-67741) were applied to rice seeds at a target concentration of 10⁶ CFU/seed.

The *Methylobacterium* isolates increased yield in rice field trials as compared to the untreated control both with and without insecticide treatment as shown in the Table below.

TABLE 39

Mean yield (Bu/A) Increase over control and percent increase shown (Bold italics indicates a significant difference at p < 0.05 using Fisher's LSD test.)

| Treatment | UTC | LGP2016 | | LGP2019 | | LGP2017 | |
|---|---|---|---|---|---|---|---|
| Without insecticide treatment | 143.8 | 150.1 | +6.3 (4.3%) | *156.2* | *+12.4 (8.6%)* | 152.4 | +8.6 (6.0%) |
| With insecticide treatment | 151.8 | *164.3* | *+12.5 (8.2%)* | 155.4 | +3.6 (2.4%) | 158.2 | +6.4 (4.2%) |

Also provided herein are methods of improving growth and yield of rice plants by treating rice plants, plant parts, or seeds with one or more *Methylobacterium* isolates. In some embodiments, harvested seed yield and/or nutrient content of rice plants is improved. In some embodiments, rice seeds are treated and such treatment provides for increased rice seed yield. In some embodiments, the *Methylobacterium* isolate is selected from the group consisting of LGP2016 (NRRL B-67341), LGP2017 (NRRL B-67741), LGP2019 (NRRL B-67743), and variants of these isolates. Rice plants, plant parts, or seeds coated with *Methylobacterium* isolates and/or compositions are also provided herein. In certain embodiments, the *Methylobacterium* has chromosomal genomic DNA having at least 99%, 99.9, 99.8, 99.7, 99.6%, or 99.5% sequence identity to chromosomal genomic DNA of LGP2016, LGP2017, or LGP2019. In certain embodiments, the *Methylobacterium* has genomic DNA comprising one or more polynucleotide marker fragments of at least 50, 60, 100, 120, 180, 200, 240, or 300 nucleotides of SEQ ID NOS: 37-39 or SEQ ID NOS: 25-27.

Example 12. Procedure to Test Hits Identified from *Methylobacterium* Inoculation Effect on Promotion of Early Rice Growth for *Methylobacterium* Inoculation Effect on Nitrogen Utilization in Rice Additional *Methylobacterium* strains, including *Methylobacterium* strains that caused increased root length during early rice growth from Example 7, are tested for *Methylobacterium* inoculation effect on nitrogen utilization in rice.

The experiment is conducted using the method as described in Example 8, except replacing the high and low nitrogen conditions with using 5200 uM nitrogen (70% of rice optimal nitrogen level) as described in Example 9. Data can be analyzed using Student's t-test to determine significant differences between strains at p<0.05 to determine strains that have increased nitrogen uptake compared to untreated control samples.

Results shown in Table 40 below provide percent differences in foliar N concentration in treated rice plants compared to N levels in untreated seedlings. Foliar tissue was harvested, dried, and assayed for nitrogen concentration via elemental combustion analysis.

TABLE 40

| *Methylobacterium* Strain | Percent difference from Untreated in Foliar N concentration (% by mass) | Number of times tested |
|---|---|---|
| LGP2020 | +45.2% | 9 |
| LGP2023 | +47.6% | 1 |
| LGP2031 | +38.2% | 3 |
| LGP2034 | +43.9% | 1 |
| LGP2029 | +35.7% | 3 |
| LGP2021 | +41.0% | 1 |
| LGP2167 | +40.5% | 1 |
| LGP2030 | +32.0% | 3 |
| LGP2002 | +42.8% | 1 |
| LGP2018 | +37.5% | 1 |
| LGP2001 | +29.2% | 1 |
| LGP2015 | +27.9% | 1 |
| LGP2188 | +3.0% | 1 |
| LGP2189 | −4.8% | 1 |
| LGP2005 | −4.9% | 1 |
| LGP2004 | −4.7% | 1 |

Example 13. Analysis of Yield and Nitrogen Use Efficiency of *Methylobacterium* Treated Corn and Wheat Plants Wheat field trials were conducted using a Randomized Complete Block Design (RCBD) with 5 treatments replicated 5 times. Treatments include 0% N, 100% N only (100%=180 lbs/A), 85% N+*Methylobacterium* NRRL B-67743 (LGP2019), 70% N+*Methylobacterium* NRRL B-67743 (LGP2019), and 70% N only. *Methylobacterium* treatments are applied to corn or wheat seeds at a target concentration of $10^6$ CFU/seed. Corn seeds were treated by in furrow application. Wheat seedlings were treated at transplant to simulate in furrow application. Data were collected and statistically analyzed to evaluate effects of the *Methylobacterium* isolates on yield and nitrogen use efficiency including soil N, P, and K levels prior to planting, plant tissue N, P, and K concentration and content (uptake), calculated NUE, root architecture, total plant biomass (shoots and fruits), and grain yield. The results of these trials revealed that application of 85% N+*Methylobacterium* NRRL B-67743 (LGP2019) or 70% N+*Methylobacterium* NRRL B-67743 (LGP2019) provided for a dry biomass and N content that was statistically the same as the 100% N treatment.

Additional wheat and corn field trials are conducted using a Randomized Complete Block Design (RCBD) with 5 treatments replicated 5 times. Treatments include 0% N, 100% N only (100%=180 lbs/A), 85% N+*Methylobacterium* NRRL B-67743 (LGP2019) or *Methylobacterium* NRRL B-67892 (LGP2020), 70% N+*Methylobacterium* NRRL B-67743 (LGP2019) or *Methylobacterium* NRRL B-67892 (LGP2020), and 70% N only. The two *Methylobacteirum* isolates are tested in separate, adjacent trials. *Methylobacterium* treatments are applied to corn or wheat seeds at a target concentration of $10^6$ CFU/seed. Corn seeds are treated by in furrow application. Wheat seedlings are treated at transplant to simulate in furrow application. Data are collected and statistically analyzed to evaluate effects of the *Methylobacterium* isolates on yield and nitrogen use efficiency including soil N, P, and K levels prior to planting, plant tissue N, P, and K concentration and content (uptake), calculated NUE, root architecture, total plant biomass (shoots and fruits), and grain yield.

Example 14. *Methylobacterium* Treatment of Herbs

Effects of *Methylobacterium* treatment of *Pennisetum*, basil, French tarragon, rosemary, and oregano were evaluated. Direct seeded plants, transplants, or plants produced by vegetative propagation were treated by applying *Methylobacterium* as a drench at seedling, transplanting, or at sticking (for plants produced by vegetative propagation). Improvements in flowering, bushiness, leaf area, rooting, root length, and biomass were observed as shown in the table below.

TABLE 41

| Herb | *Methylobacterium* treatment | Observations |
| --- | --- | --- |
| PENNISETUM | i) LGP2009 (NRRL B-50938)<br>ii) LGP2015 (NRRL B-67340)<br>Treatments applied at transplant. | 2X increase in flowering compared to controls at 12 weeks after transplanting; visible increase in plant bushiness |
| BASIL | i) LGP2009 (NRRL B-50938)<br>ii) Combination of LGP2002 (NRRL B-50931) and LGP2015 (NRRL B-67340)<br>Treatments applied at seeding. | 30% increase in leaf area at 28 days after planting vs. control |
| FRENCH TARRAGON | LGP2001 (NRRL B-50930)<br>Treatment applied at vegetative propagation. | Enhanced rooting vs. control |
| ROSEMARY | LGP2002 (NRRL B-50931)<br>Treatment applied at vegetative propagation. | 30% increase in dry biomass, 2 × increase in fine root length at 28 days after planting vs. control |
| OREGANO | Combination of LGP2009 (NRRL B-50938) with LGP2001 (NRRL B-50930)<br>Treatment applied at vegetative propagation. | 2X increase in total root length at 14 days after planting vs. control |

REFERENCES

Green, P. N. 2005. *Methylobacterium*. In Brenner, D. J., N. R. Krieg, and J. T. Staley (eds.). "Bergey's Manual of Systematic Bacteriology. Volume two, The Proteobacteria. Part C, The alpha-, beta-, delta-, and epsilonproteobacteria." Second edition. Springer, New York. Pages 567-571.

Green, P. N. and Ardley, J. K. 2018. Review of the genus *Methylobacterium* and closely related organisms: a proposal that some *Methylobacterium* species be reclassified into a new genus, *Methylorubrum* gen. nov. Int J Syst Evol Microbiol. 2018 September; 68(9):2727-2748. doi: 10.1099/ijsem.0.002856.

Konstantinidis K. T., Ramette A., Tiedje J. M., (2006;). The bacterial species definition in the genomic era. Philos Trans R Soc Lond B Biol Sci 361: 1929-1940.

Lidstrom, M. E. 2006. Aerobic methylotrophic prokaryotes. In Dworkin, M., S. Falkow, E. Rosenberg, K.-H. Schleifer, and E. Stackebrandt (eds.). "The Prokaryotes. A Handbook on the Biology of Bacteria. Volume 2. Ecophysiology and biochemistry." Third edition. Springer, New York. Pages 618-634.

Sy, A., Giraud, E., Jourand, P., Garcia, N., Willems, A., De Lajudie, P., Prin, Y., Neyra, M., Gillis, M., Boivin-Masson, C., and Dreyfus, B. 2001. Methylotrophic *Methylobacterium* Bacteria Nodulate and Fix Nitrogen in Symbiosis with Legumes. Jour. Bacteriol. 183(1):214-220.

The breadth and scope of the present disclosure should not be limited by any of the above-described embodiments, but should be defined only in accordance with the following claims and their equivalents.

What is claimed is:

1. An isolated *Methylobacterium* selected from the group consisting of LGP2021 (NRRL B-68032), LGP2022 (NRRL B-68033), LGP2023 (NRRL B-68034), LGP2029 (NRRL B-68065), LGP2030 (NRRL B-68066), LGP2031 (NRRL B-68067), LGP2033 (NRRL B-68068), and LGP2034 (NRRL B-68069).

2. A composition comprising a fermentation product comprising a *Methylobacterium* strain, wherein said fermentation product is essentially free of contaminating microorganisms, and wherein the *Methylobacterium* strain is selected from the group consisting of LGP2021 (NRRL B-68032), LGP2022 (NRRL B-68033), LGP2023 (NRRL B-68034), LGP2029 (NRRL B-68065), LGP2030 (NRRL B-68066), LGP2031 (NRRL B-68067), LGP2033 (NRRL B-68068), LGP2034 (NRRL B-68069), and variants thereof.

3. A method for enhancing plant production that comprises:
   (a) applying a composition of claim 2 to a plant, plant part, or seed; and,
   (b) growing the plant to at least a two leaf stage, thereby enhancing at least one plant trait selected from the group consisting of early plant growth, propagation and transplant vigor, nutrient uptake, stand establishment, stress tolerance, and nutrient utilization efficiency;
   wherein said trait is enhanced in comparison to an untreated control plant that had not received an application of the composition or in comparison to a control plant grown from an untreated seed that had not received an application of the composition.

4. The method of claim 3, wherein the composition is applied to a seed.

5. The method of claim 1, wherein said plant is a leafy green plant.

6. The composition of claim 2, wherein said composition further comprises at least one additional component selected from the group consisting of an additional active ingredient, an agriculturally acceptable adjuvant, and an agriculturally acceptable excipient.

7. A plant, plant part, or seed at least partially coated with the composition of claim 2.

\* \* \* \* \*